Nov. 26, 1968 D. L. BAHRS ET AL 3,413,613
RECONFIGURABLE DATA PROCESSING SYSTEM
Filed June 17, 1966 96 Sheets-Sheet 1

FIG. I.

INVENTORS
RICHARD L. RUTH
JOHN F. COULEUR
DAVID L. BAHRS
WILLIAM A. SHELLY
BY
ATTORNEYS $T = AB$ (AND)

$T = AB$ (AND)

$T = A\bar{B}$ (AND)

$T = \overline{AB}$ (NAND)

$T = \overline{(AB+CD)}$ (NOR)

$T = \overline{(AB+CD)}$ (NOR)

$T = A+B$ (OR)

$T = A+B$ (OR)

$T = A\bar{B} + \bar{A}B$ (EXEC OR)

$T = \bar{A}$ (INV)

Nov. 26, 1968    D. L. BAHRS ET AL    3,413,613
RECONFIGURABLE DATA PROCESSING SYSTEM
Filed June 17, 1966    96 Sheets-Sheet 6
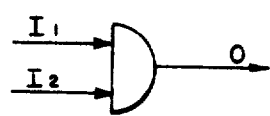
FIG.20a
| I₁ | I₂ | O |
|----|----|---|
| 0  | 0  | 0 |
| 1  | 0  | 0 |
| 0  | 1  | 0 |
| 1  | 1  | 1 |
FIG.20b
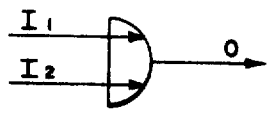
FIG.21a
| I₁ | I₂ | O |
|----|----|---|
| 0  | 0  | 0 |
| 1  | 0  | 1 |
| 0  | 1  | 1 |
| 1  | 1  | 1 |
FIG.21b
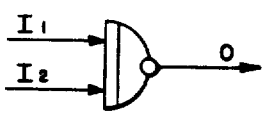
FIG.22a
| I₁ | I₂ | O |
|----|----|---|
| 0  | 0  | 1 |
| 1  | 0  | 1 |
| 0  | 1  | 1 |
| 1  | 1  | 0 |
FIG.22b
FIG.23a
| I | O |
|---|---|
| 0 | 1 |
| 1 | 0 |
FIG.23b
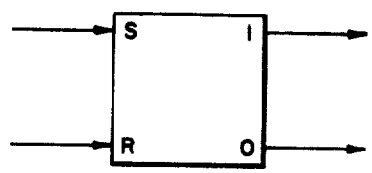
FIG.24a
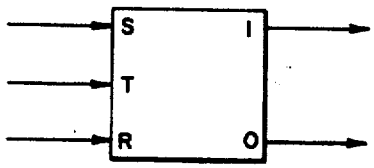
FIG.24b

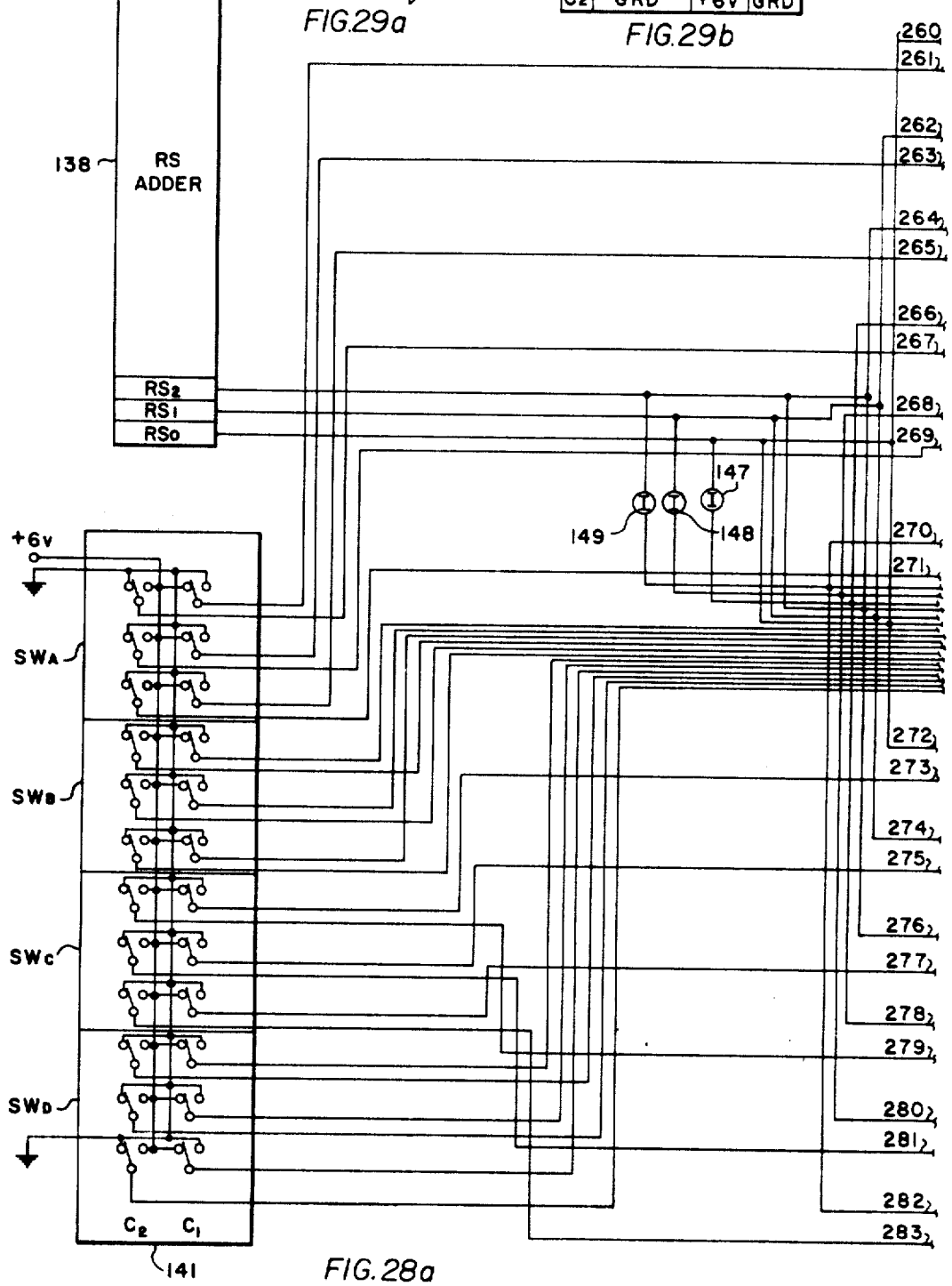

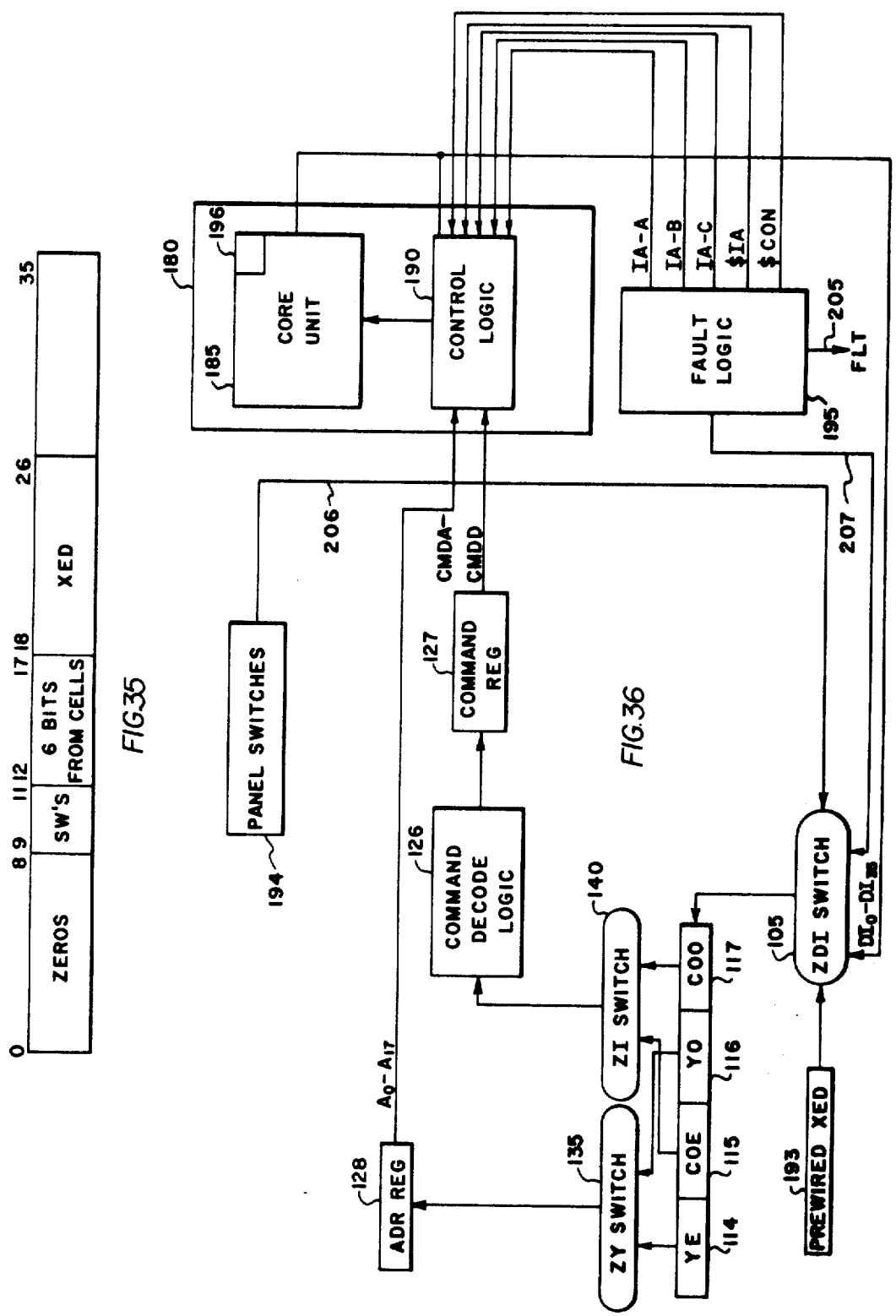

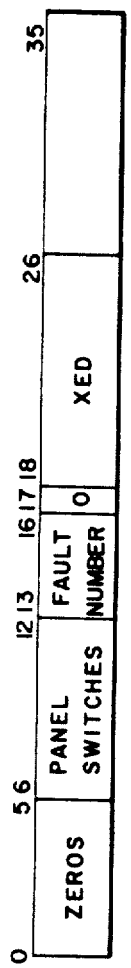
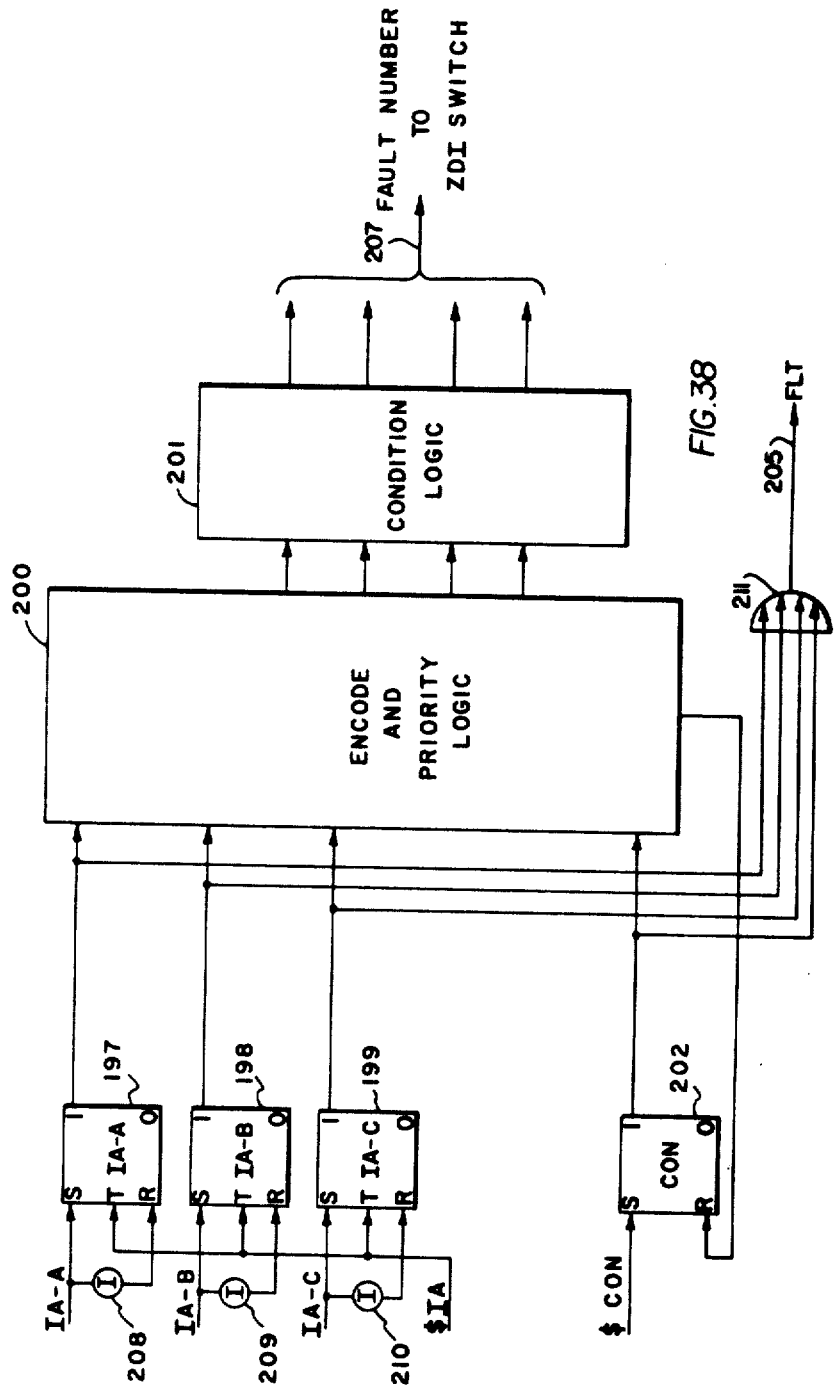

INPUT/OUTPUT CONTROLLER

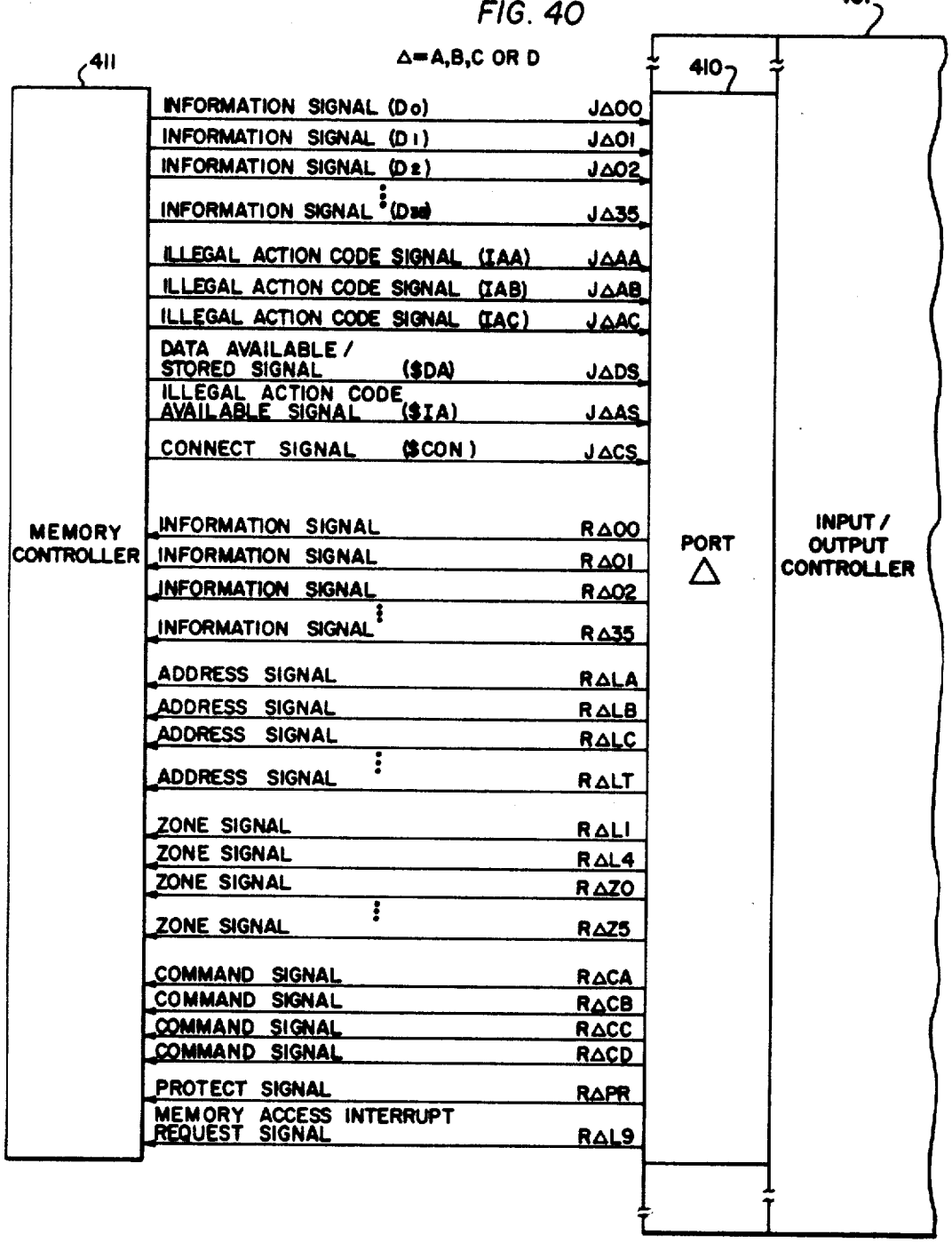

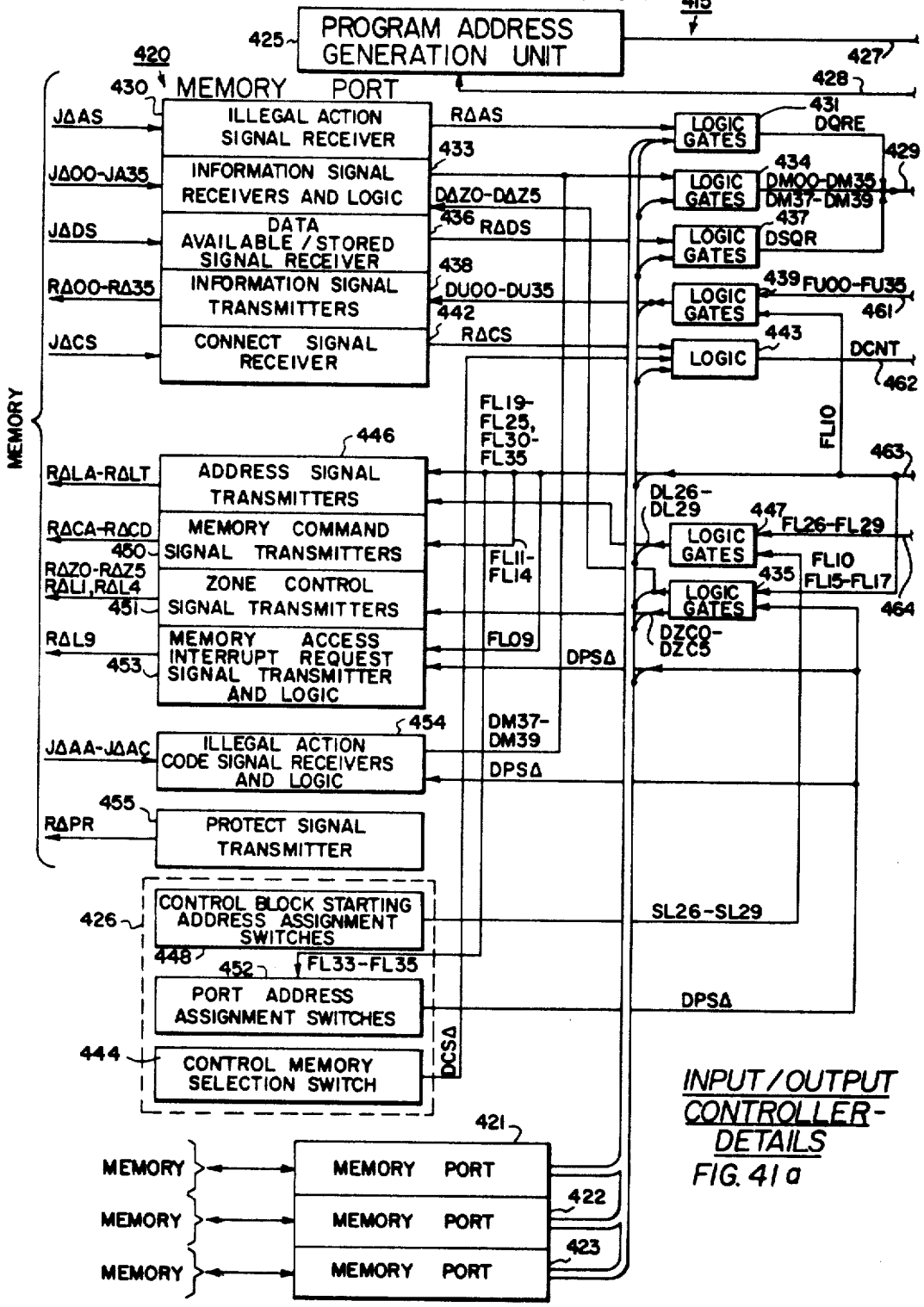

INPUT/OUTPUT CONTROLLER-
DETAILS

CONTROL BLOCK
STARTING ADDRESS
ASSIGNMENT SWITCHES

PORT ADDRESS ASSIGNMENT SWITCHES

| SWITCH SETTINGS | | | MEMORY ADDRESS RANGE (DECIMAL) |
|---|---|---|---|
| $2^{35}$ | $2^{34}$ | $2^{33}$ | |
| 0 | 0 | 0 | 0 — 32,767 |
| 0 | 0 | E | 0 — 65,535 |
| 0 | 0 | 1 | 32,968 — 65,535 |
| 0 | 1 | 0 | 65,536 — 98,303 |
| 0 | 1 | E | 65,536 — 131,071 |
| 0 | 1 | 1 | 98,304 — 131,071 |
| 1 | 0 | 0 | 131,072 — 163,839 |
| 1 | 0 | E | 131,072 — 196,607 |
| 1 | 0 | 1 | 163,840 — 196,607 |
| 1 | 1 | 0 | 196,608 — 229,375 |
| 1 | 1 | E | 196,608 — 262,143 |
| 1 | 1 | 1 | 229,376 — 262,143 |

PORT ADDRESS ASSIGNMENT

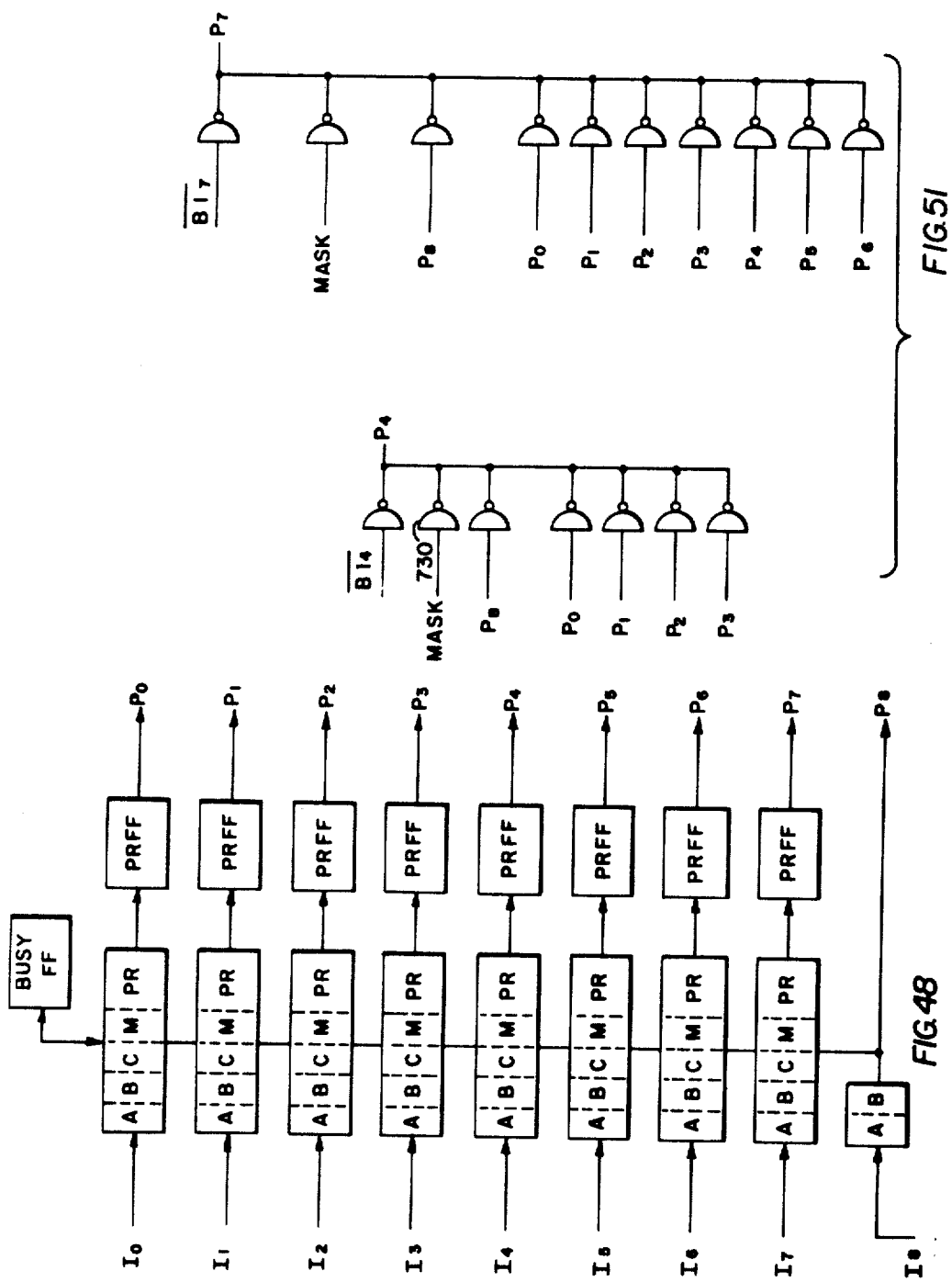

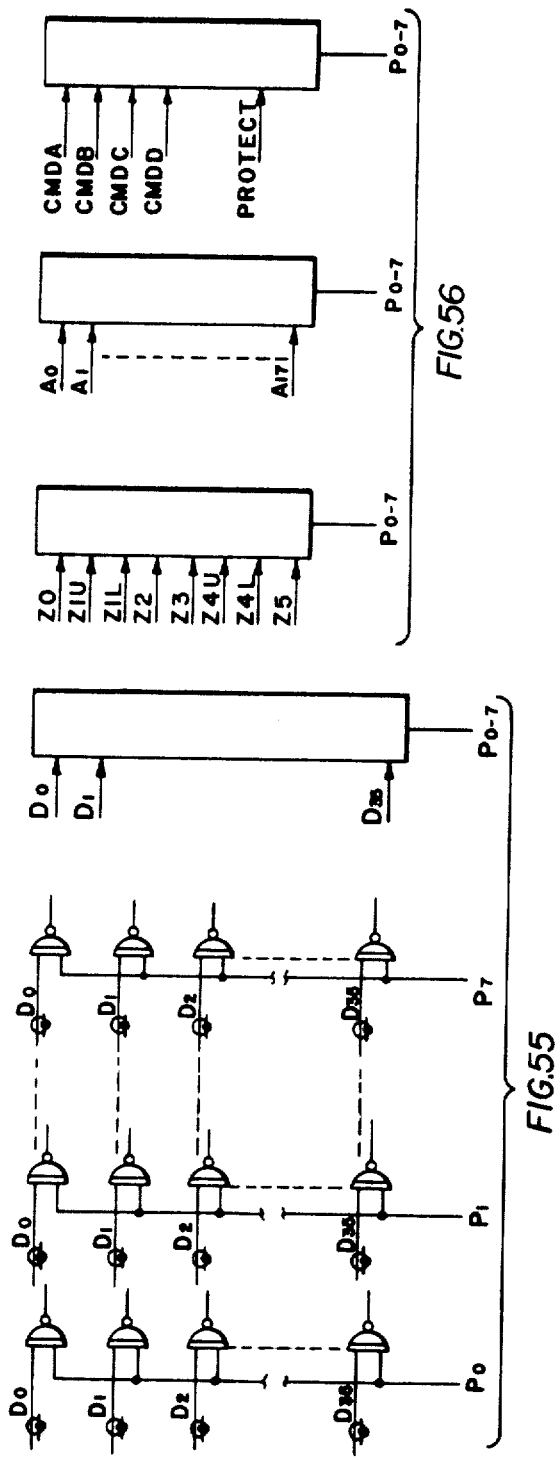

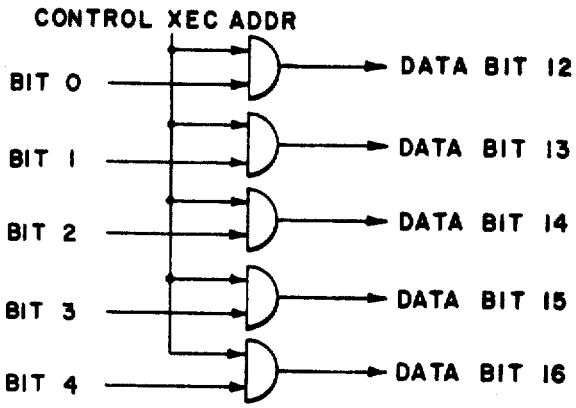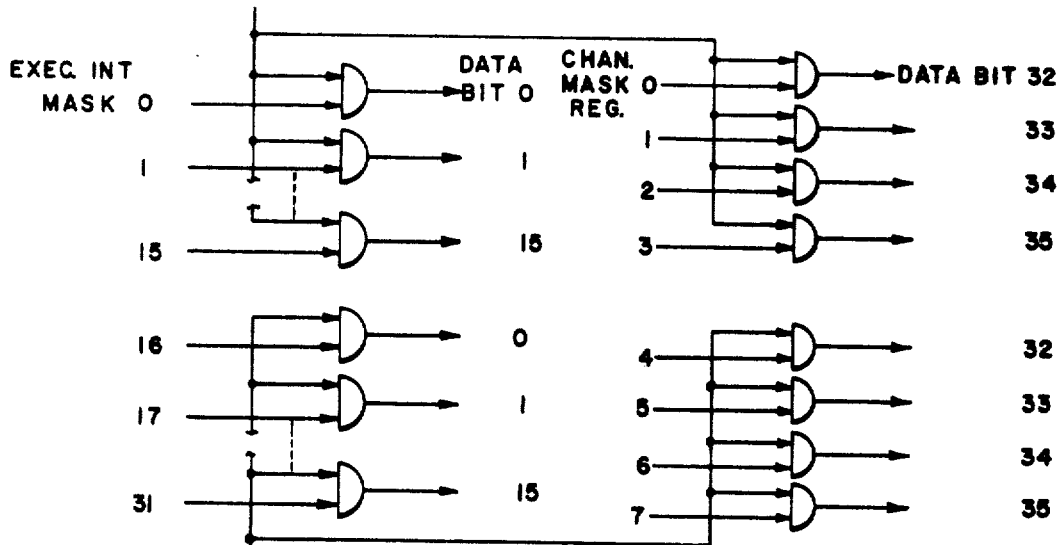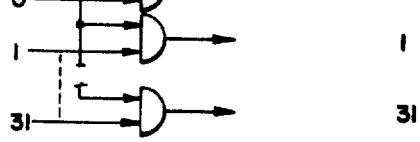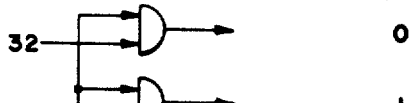
FIG. 92

Nov. 26, 1968  D. L. BAHRS ET AL  3,413,613
RECONFIGURABLE DATA PROCESSING SYSTEM
Filed June 17, 1966  96 Sheets-Sheet 84

FIG. III

United States Patent Office 3,413,613
Patented Nov. 26, 1968

3,413,613
RECONFIGURABLE DATA PROCESSING SYSTEM
David L. Bahrs, Liverpool, N.Y., and John F. Couleur, Richard L. Ruth, and William A. Shelly, Phoenix, Ariz., assignors to General Electric Company, a corporation of New York
Filed June 17, 1966, Ser. No. 558,515
12 Claims. (Cl. 340—172.5)

TABLE OF CONTENTS

| | Column |
|---|---|
| Introduction | 1 |
| Description of Figures | 4 |
| General System Description | 8 |
| System Interface Listing | 10 |
| Processor | 10 |
| General | 10 |
| Processor—Memory Controller Interface Signals | 11 |
| Address Assignment and Channel Selection | 15 |
| Data Output | 17 |
| Address Lines | 18 |
| Boundary Checking | 19 |
| Command Lines | 20 |
| Memory Core Cycle Commands | 20 |
| Memory Controller Cycle Commands | 21 |
| Zone Lines | 21 |
| Control Signals | 23 |
| Data Input Lines | 23 |
| Information Transfer Status Lines | 23 |
| Program Interruption | 24 |
| Faults | 28 |
| Input/Output Controller | 32 |
| Control Information | 32 |
| Input/Output Controller—Memory Communication | 34 |
| Input/Output Controller—Details | 35 |
| Memory Communications Unit | 35 |
| Microprogram Storage Unit | 39 |
| Peripheral Channel Unit | 39 |
| Buffer Storage Unit | 39 |
| Processing and Control Unit | 40 |
| Control Panel | 40 |
| Control Block Starting Address Assignment Switches | 40 |
| Port Address Assignment Switches | 40 |
| Control Memory Selection Switch | 41 |
| Input/Output Controller—Operation | 42 |
| Memory Controller | 44 |
| General | 44 |
| Channel Interrupt (Memory Access Request) | 51 |
| Priority Sharing Scheme | 55 |
| Input Termination | 59 |
| Control Logic | 61 |
| Memory Core System | 77 |
| File Protect | 83 |
| Interrupt Cells | 85 |
| Output Data Switch Circuits | 90 |
| Output Pulse and Select Drivers | 91 |
| Connect Select Output | 92 |
| Commands | 92 |
| Clear/Write Single Precision (CWR SP) | 93 |
| Clear/Write Double Precision (CWR DP) | 95 |
| Read/Restore Single Precision (RRS SP) | 97 |
| Read/Restore Double Precision (RRS DP) | 99 |
| Read/Alter/Rewrite (RAR) | 100 |
| Connect (CON) | 102 |
| Set Execute Interrupt Cells (SXC) | 104 |
| Execute (XEC) | 105 |
| Set File Protect Register (SFP) | 106 |
| Read File Protect Register (RFP) | 108 |
| Set Execute and Channel Interrupt Mask Register (SMSK) | 109 |
| Read Execute and Channel Interrupt Mask Register (RMSK) | 110 |
| Control Panel | 112 |
| Memory Controller Mnemonic Definitions | 115 |

INTRODUCTION

The present invention pertains to data processing systems, and more specifically, to a data processing system that may assume several different configurations to accommodate a wide range of programming environments and applications.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily have much lower operating speeds than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, an input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

In systems utilizing plural processors, unique advantages are gained through the use of plural memory controllers. Each of the memory controllers is connected to a different memory device and is also connected to one or more input/output controllers. The transfer of data and instructions throughout the system is facilitated and expedited by the memory controllers through the appropriate awarding of priority and control of access to memory. The multiple memory controllers also individually control communication among the subsystems connected thereto; since the memory controllers may share connection to several subsystems, intercommunication becomes possible. The configuration utilizing multiple data processors and memory controllers effectively yields overlapping data processing systems wherein each system is semi-autonomous and each may execute independent programs. Each input/output controller is provided with means for selecting a particular memory controller as its main memory controller; similarly, each memory controller includes means for selecting a particular data processor as the control processor. By thus appropriately selecting the various subsystems each system of the overlapping systems is chosen to permit the recognition of communication among the subsystems as communication from within the same data processing system.

Specific programs and certain applications may require a system having a configuration uniquely adaptable to perform a given task; therefore, a specific system configuration may not be the most efficient configuration for all applications of the system. The ability of a system to reconfigure itself permits the utilization of a greater variety of programs and permits the system to most efficiently perform the various programs. In multiprocessing systems wherein plural programs are simultaneously executed, the ability of the system to reconfigure itself in accordance with a program or programs presently being undertaken results in a system having an efficiency unobtainable with a fixed system configuration. The system of the present invention will be described having means for reconfiguring the system; in the embodiment chosen for illustration the means comprises a plurality of switches. It will be obviously skilled in the art that the switches may conveniently be replaced by any of a variety of program settable switch devices such as flip-flops etc. The switches described in the system of the present invention facilitate the description of the concept without undue complexity while nevertheless teaching those skilled in the art the reconfigurability of the system of the present invention.

It is therefore an object of the present invention to provide a data processing system that may readily be reconfigured.

It is another object of the present invention to provide a data processing system having means for predetermining the system configuration.

It is still another object of the present invention to provide a data processing system that may take the form of a multiprocessing and overlapping multiple system including means for reconfiguring each of the multiple systems.

It is further another object of the present invention to provide a data processing system having means for selectively directing addresses received by or generated by subsystems to a memory device.

It is another object of the present invention to provide a data processing system wherein the subsystems thereof are provided with means for selectively directing addresses to a specific memory controller to thereby define a system configuration that may subsequently be altered.

These and other objects of the present invention will become apparent to those skilled in the art as the description proceeds.

Certain portions of the apparatus herein disclosed are not of our invention, but are the inventions of:

Harry N. Cantrell and John F. Couleur, as defined by the claims of their application Ser. No. 563,519, filed July 7, 1966;

Robert Cohen, John F. Couleur, and Richard L. Ruth, as defined by the claims of their application Ser. No. 563,521, filed July 7, 1966;

Robert Cohen, John F. Couleur, and William A. Shelly, as defined by the claims of their application Ser. No. 563,522, filed July 7, 1966;

Robert Cohen, William A. Shelly, and Samuel M. Vidulich, as defined by the claims of their application Ser. No. 567,221, filed July 22, 1966;

David L. Bahrs and John F. Couleur, as defined by the claims of their application Ser. No. 567,222, filed July 22, 1966;

John F. Couleur and Richard L. Ruth, as defined by the claims of their application Ser. No. 569,750, filed Aug. 2, 1966;

John F. Couleur, Philip F. Gudenschwager, Richard L. Ruth, William A. Shelly, and Leonard G. Trubisky, as defined by the claims of their application Ser. No. 577,376, filed Sept. 6, 1966;

John F. Couleur, as defined by the claims of his application Ser. No. 581,467, filed Sept. 23, 1966; and John F. Couleur, Richard L. Ruth, and William A. Shelly, as defined by the claims of their application Ser. No. 584,801, filed Oct. 6, 1966; all such applications being assigned to the assignee of the present application.

DESCRIPTION OF FIGURES

The present invention may more readily be described by reference to the accompanying drawings in which:

FIGURE 20a is a schematic representation of an AND-gate as it is used in the description of the processor of the present system;

FIGURE 20b is a truth table for the AND-gate of FIGURE 20a;

FIGURE 21a is a schematic representation of an OR-gate as it is used in the description of the processor of the present invention;

FIGURE 21b is a truth table for the OR-gate of FIGURE 21a;

FIGURE 22a is a schematic representation of a NAND-gate as it is used in the description of the processor of the present system;

FIGURE 22b is a truth table for the NAND-gate of FIGURE 22a;

FIGURE 23a is a schematic representation of an inverter as it is used in the description of the processor of the present system;

FIGURE 23b is a truth table for the inverter of FIGURE 23a;

FIGURE 24a is a schematic illustration of a standard flip-flop as it is used in the description of the processor of the present system;

FIGURE 24b is the schematic illustration of a trigger flip-flop as it is used in the description of the processor of the present system;

FIGURES 28a and 28b, taken together as indicated thereon, illustrate the channel selecting means in accordance with the concepts of the present invention;

FIGURE 29a is an illustration of a three-position switch utilized in the illustration of FIGURE 28a;

FIGURE 29b is a table used in the explanation of FIGURES 28a, 28b and 29a;

FIGURE 35 is a depiction of an instruction word formulated during the processing of an interrupt and utilized in the explanation of the block diagram of FIGURE 34;

FIGURE 36 is a block diagram illustrating the manner in which faults are processed in the system of the present invention;

FIGURE 37 is a depiction of an instruction word formulated during the processing of a fault and utilizing the explanation of the block diagram of FIGURE 34;

FIGURE 38 illustrates in greater detail the processing of faults and the generation of certain signals necessary to this operation;

FIGURE 40 is a diagram illustrating the interconnection of a memory controller and a memory port of the input/output controller and the signals transmitted between a memory port and a memory controller;

FIGURES 41a and 41b are a block diagram illustrating major components of the input-output controller;

FIGURE 48 is a simplified block diagram showing the channel interrupt cell of the memory controller;

FIGURE 51 is a schematic illustration showing the wired priority of certain channels useful for describing the priority arrangement of the memory controller;

FIGURE 55 is a schematic representation of the input termination of data received by the memory controller;

FIGURE 56 is a schematic representation of the termination of input zone, address and command information received by the memory controller;

FIGURES 91 and 92 schematically illustrate the information applied to the output data switch circuits and the control signals from the control logic circuits;

GENERAL SYSTEM DESCRIPTION

Figure 1:
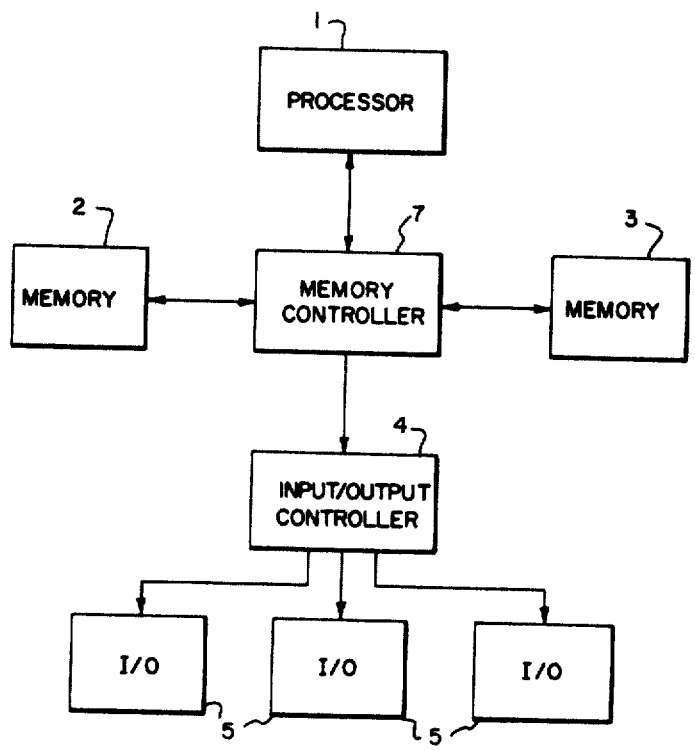
FIGURE 1 is a block diagram of a data processing system in a single memory controller configuration.

Referring to FIGURE 1, a single memory controller configuration data processing system is shown. The data processing system includes a data processor 1, memory devices 2 and 3, an input/output controller 4, and a plurality of input/output devices 5. The processor, input/output controller, and memories are interconnected by a memory controller 7 which controls all communication among the subsystems and performs certain other tasks as will become more apparent as the description proceeds.

Figure 2:
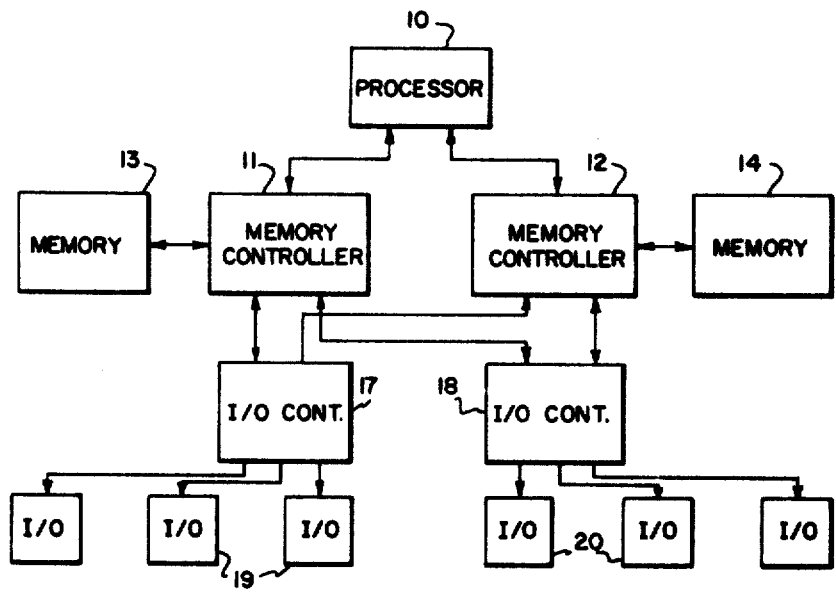
FIGURE 2 is a schematic diagram of a data processing system utilizing multiple memory controllers.

Referring to FIGURE 2, a multiple memory controller configuration is shown. A single processor 10 is connected to two memory controllers 11 and 12. Each memory controller is connected to a corresponding memory 13 and 14 respectively. Thus, each of the memories may be accessed only through the corresponding memory controller. Input/output controllers 17 and 18 are each connected to both of the memory controllers 11 and 12; however, input/output controller 17 provides the necessary buffering and controlling of input/output devices 19 whereas input/output controller 18 controls input/output devices 20.

Figure 3:
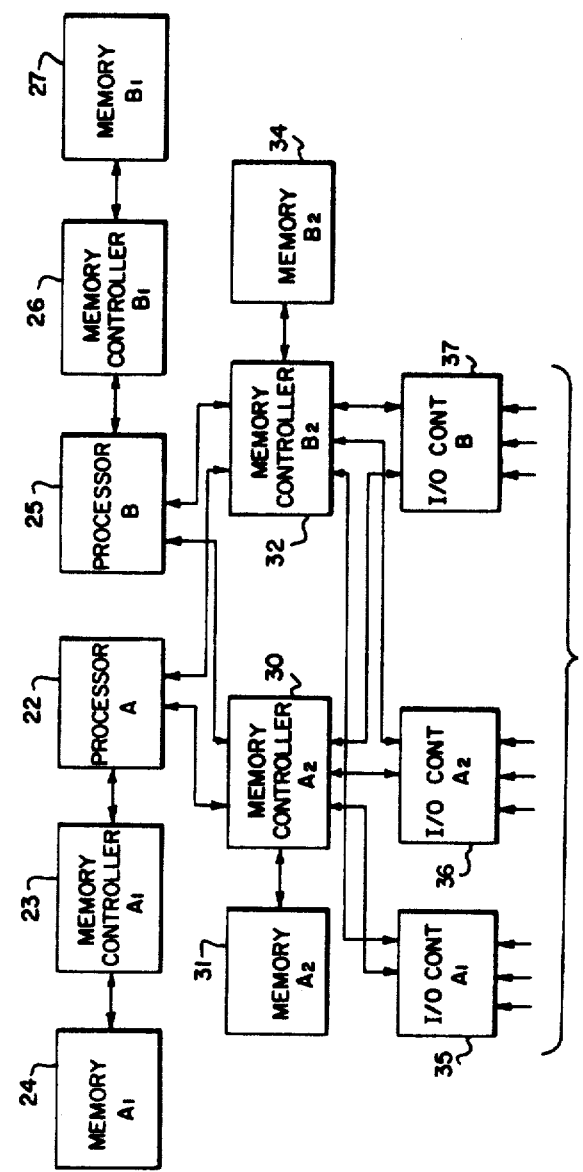
FIGURE 3 is a schematic block diagram of a multi-processor configuration wherein two data processing systems overlap and share certain subsystems.

Referring to FIGURE 3, a multiprocessor configuration facilitated by the utilization of a plurality of memory controllers is shown. The configuration of FIGURE 3 actually comprises overlapping data processing systems having intercommunication capabilities. Processor 22 is connected to a memory controller 23 and thus to a memory device 24. The memory controller 23 is thus the "main memory controller" for the processor 22 and is accessible only by the processor 22 thus reserving the memory 24 for use of the processor 22. The second data processor 25 also has associated and connected thereto a memory controller 26 and a memory device 27. Similarly, the memory 27 is for the use of processor 25 and may not be accessed by any of the remaining subsystems of the configuration of FIGURE 3.

Memory montroller 30 is connected to both data processors 22 and 25; however, the memory controller includes provision therewith for selecting one of the data processors as the control processor. Accordingly, processor 22 is designated internally by the memory controller as the control processor and the controller will therefore look to that processor for certain types of command information. The memory controller 30 is connected to memory device 31 thus permitting both processor 22 and 25 to access the memory 31 through the memory controller 30. Similarly, memory controller 32 is connected to both data processor 22 and data processor 25; however, the memory controller 32 also includes means for designating a particular data processor as the control processor. Memory controller 32 will thus provide a means for selecting the data processor 25 as the control processor thereby recognizing certain commands and certain operations only by the processor 25 even though the memory controller 32 is connected to both processors 22 and 25. The memory controller 32 is connected to a memory device 34 thereby permitting both the data processor 22 and data processor 25 to gain access to the memory 34.

A plurality of input/output controllers 35, 36 and 37 are provided and all are connected to both memory controllers 30 and 32. Each input/output controller may therefore access either memory device 31 or memory device 34 through the corresponding memory controller 30 or 32. An input/output controller may therefore also request access to memory and be awarded priority in accordance with a predetermined priority scheme in a particular memory controller while nevertheless being awarded a different priority in a different priority scheme in a second memory controller. Each input/output controller is connected to a plurality of input/output devices as described previously. The configuration shown in FIGURE 3 may actually comprise overlapping but otherwise independent data processing systems. Accordingly, the processors and other subsystems have been designated by either the letter A or the letter B. Data processing system A would include the processor 22, memory controller 23, and memory 24. The processor would communicate with input/output controllers 35 and 36 through the memory controller 30 and would also share access to memory 31 through the memory controller 30. Data processing system B would include processor 25, memory controller 26, and memory device 27. The processor 25 would gain access to the memory 34 through the memory controller 32 and share the memory with input/output controller 37. The two data processors A and B may intercommunicate through the corresponding memory controllers 30 and 32 and may thus access each others memory to gain information and data to perform multiprocessing operations wherein each processor is executing an independent program which nevertheless may be interrelated in certain circumstances such as the execution of an executive program simultaneously with a slave program.

Figure 4:
FIGURES 4, 5 and 6 are schematic representations of AND-gates used throughout the system.
Figure 5:
Figure 6:
Figure 7:
FIGURE 7 is a schematic representation of a NAND-gate utilized in various subsystems of the present system.
Figure 8:
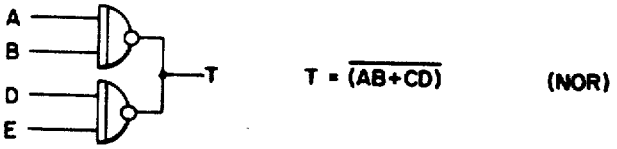
FIGURES 8 and 9 are schematic representations of NOR-gates utilized throughout the present system.
Figure 9:
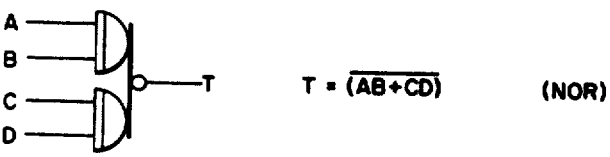
Figure 10:
FIGURES 10 and 11 are schematic representations of OR-gates used throughout the present system.
Figure 11:
Figure 12:
FIGURE 12 is a schematic representation of an exclusive OR circuit used in the system of the present invention.
Figure 13:
FIGURES 13 and 14 are schematic representations of inverters used in the various subsystems of the present invention.
Figure 14:
Figure 15:
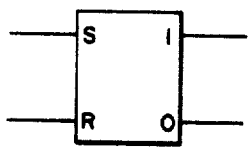
FIGURES 15 and 16 are schematic representations of flip-flops used in various subsystems of the present system.
Figure 16:
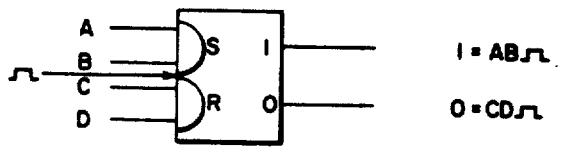

To facilitate the detailed description of the present invention, the data processing system has been divided into three major components each corresponding to a major subsystem of the data processing system. The data processor will first be described, the input/output controller will then be described, and finally, the memory controller together with a connected memory device will be described. To facilitate the detailed description of the subsystems, reference may first be had to FIGURES 4–19 illustrating the logic symbology utilized in the various subsystems to be described. Referring to FIGURES 4, 5 and 6, typical symbols for AND-gates are shown each performing the logical conjunction of inputs A and B; however, FIGURE 6 indicates a logical inversion of the input B prior to the conjunction in the AND-gate. FIGURE 7 shows a logic symbol for a NAND-gate while FIGURES 8 and 9 show logic symbology for NOR-gates. The difference between FIGURES 8 and 9 merely represents a different physical electronic connection of the element of the gate and the figures are otherwise identical. FIGURES 10 and 11 each show logical OR-gates for performing the disjunctive combination of inputs A and B. In some instances, the utilization of OR-gate requires the logical implementation of an exclusive OR. Thus, FIGURE 12 indicates the logic symbol for an exclusive OR-gate. FIGURES 13 and 14 show the two symbols utilized for inverters. An inverter receives a logic level and provides at the output thereof a logic level indicating the inverse of the level received. FIGURE 15 shows a logic symbol for a flip-flop; the inputs to the flip-flop correspond to the set and reset logic levels and the output thereof corresponds to the one and zero logic values. FIGURE 16 indicates a gated flip-flop wherein the set input assumes a true logic level only upon the receipt of true logic levels A and B; similarly, the reset input to the flip-flop assumes a true state only when logic levels C and D are true. The flip-flop FIGURE 16 will assume either the set or reset state, assuming an appropriate logic level is applied thereto, only after a pulse is received by the flip-flop. Thus, to set or reset a flip-flop of FIGURE 16, the appropriate logic levels must be received by the flip-flop and must be present at the set or reset input thereof when the triggering pulse is received thereby.

Figure 17:
FIGURES 17, 18 and 19 are schematic representations of amplifiers used in the subsystems of the present system.
Figure 18:
Figure 19:

FIGURES 17, 18 and 19 each indicate amplifiers for receiving and amplifying pulse signals throughout the system. FIGURE 17 indicates a simple amplifier receiving a positive-going pulse and providing a similar positive-going pulse. FIGURE 18 indicates a pulse inversion together with the amplification. FIGURE 19 indicates that the amplifier requires a certain predetermined polarity input to provide an output therefrom.

The various subsystems of the data processing system to be described may, in some instances, utilize signal designations that are not necessarily consistent with designations in other subsystems; accordingly, to facilitate signal tracing the following System Interface Listing is provided. This listing will enable one to determine the signal designation at the input and output of the memory controller and the corresponding signal designation at the connection between the processor and memory controller or the input/output controller and memory controller.

SYSTEM INTERFACE LISTING

| Processor | Memory Controller | Input/Output Controller |
|---|---|---|
| $DI_0$ | $D_0$ (Input) | $R_{\Delta}00$ |
| $DI_1$ | $D_1$ | $R_{\Delta}01$ |
| $DI_2$ | $D_2$ | $R_{\Delta}02$ |
| . | . | . |
| . | . | . |
| . | . | . |
| $DI_{35}$ | $D_{35}$ | $R_{\Delta}35$ |
| $DO_0$ | $D_0$ (Output) | $J_{\Delta}00$ |
| $DO_1$ | $D_1$ | $J_{\Delta}01$ |
| . | . | . |
| . | . | . |
| . | . | . |
| $DO_{35}$ | $D_{35}$ | $J_{\Delta}35$ |
| $A_0$ | $A_0$ | $R_{\Delta}LA$ |
| $A_1$ | $A_1$ | $R_{\Delta}LB$ |
| $A_2$ | $A_2$ | $R_{\Delta}LC$ |
| . | . | . |
| . | . | . |
| . | . | . |
| $A_{17}$ | $A_{17}$ | $R_{\Delta}LT$ |
| IA–A | IA–A | $J_{\Delta}AA$ |
| IA–B | IA–B | $J_{\Delta}AB$ |
| IA–C | IA–C | $J_{\Delta}AC$ |
| CMDA | CMD A | $R_{\Delta}CA$ |
| CMDB | CMD B | $R_{\Delta}CB$ |
| CMDC | CMD C | $R_{\Delta}CC$ |
| CMDD | CMD D | $R_{\Delta}CD$ |
| \$IA | \$IA | $J_{\Delta}AS$ |
| PRO | Protect or M or S | $R_{\Delta}PR$ |
| \$PIN | \$PIN | |
| \$DA | \$DA | $J_{\Delta}DS$ |
| Z0 | Z0 | $R_{\Delta}L1$ |
| Z1U | Z1U | $R_{\Delta}L4$ |
| Z1L | Z1L | $R_{\Delta}Z0$ |
| Z2 | Z2 | $R_{\Delta}Z1$ |
| Z3 | Z3 | $R_{\Delta}Z2$ |
| Z4U | Z4U | $R_{\Delta}Z3$ |
| Z4L | Z4L | $R_{\Delta}Z4$ |
| Z5 | Z5 | $R_{\Delta}Z5$ |
| \$INT | \$INT | $R_{\Delta}L9$ |
| XIP | XIP | |
| \$DP | \$DP | |
| \$CON | \$CON | $J_{\Delta}CS$ |

PROCESSOR

*General*

Before beginning with a detailed description of the processor portion of the electronic data processing system of the present invention, it is believed that a few words are appropriate concerning the manner in which this portion or unit will be described. It is to be expressly understood that in the description which follows, much of the control circuitry has been omitted for the purposes of brevity and clarity but that these additional circuits would obviously be present in a complete system. However, inasmuch as the generation, use and interrelationship of a large number of these control signals does not, per se, form a part of the present invention and inasmuch as the omission of these factors does not detract from a thorough understanding of the present invention, they are not here included. Additionally, it is to be understood that, while many single lines are shown interconnecting the various switches, registers and other components of the system, these lines in many cases represent a bus having multiple conductors. The number of conductors in any bus will, of course, vary in accordance with the dictates of the individual situation.

In the subsequent discussion of the processor, the logic utilized employs the so-called "conventional" AND-gates, OR-gates and inverters and the more recently devised NAND-gates. An AND-gate, represented in FIGURE 20a, is a multiple input logic element whose output is at a high level (a binary 1) only when all of its inputs are at a high level. A truth table for the AND-gate of FIGURE 20a is shown in FIGURE 20b. An OR-gate, FIGURE 21a, is a multiple input logic element whose output is a binary 1 when any one or more of its inputs is a binary 1. The truth table for an OR-gate is shown in FIGURE 21b. A NAND-gate, which is represented in FIGURE 22a, is a multiple input logic element whose output is at a low level only when all of its inputs are at a high level. At all other times the output is at a high level. A truth table for the NAND-gate of FIGURE 22a is shown in FIGURE 22b. While only a two input AND-gate, OR-gate and NAND-gate have been illustrated, it is to be realized that additional inputs are possible. However, the same logical relationship exists for these gates employing more than two inputs.

An inverter, FIGURE 23a, is a single input, single output logic element whose output is, as the name implies, the inverse of its output. More explicitly, if the input to an inverter is a binary 1, the output will be a binary 0 while if the input is a binary 0, the output will be a binary 1. The truth table for an inverter is illustrated in FIGURE 23a.

A flip-flop, as the term is used in the description of this portion of the present invention, is a bistable device whose output is a function of its last input. Two types of flip-flops are shown. The first of these, FIGURE 24a, is a two input, two output device having set (S) and reset (R) input terminals and 1 and 0 output terminals. In this type of device, a binary 1 supplied to the set (S) terminal places the flip-flop into its set state in which condition there is a binary 1 at its 1 output terminal and a binary 0 at its 0 output terminal. Conversely, a binary 1 supplied to the reset (R) terminal places the flip-flop into the state in which there is a binary 1 at its 0 output terminal and a binary 0 at its 1 output terminal. The second type of flip-flop illustrated (FIGURE 24b) differs only from that of FIGURE 24a by the inclusion of a third input terminal T. The operation of the flip-flop shown in FIGURE 24b is essentially identical to that of the flip-flop of FIGURE 24a except that there must be a binary 1 at the T input terminal at the same time there is a binary 1 placed at either the set or reset terminals in order for the flip-flop to change its state.

PROCESSOR—MEMORY CONTROLLER
INTERFACE SIGNALS

Figure 25:
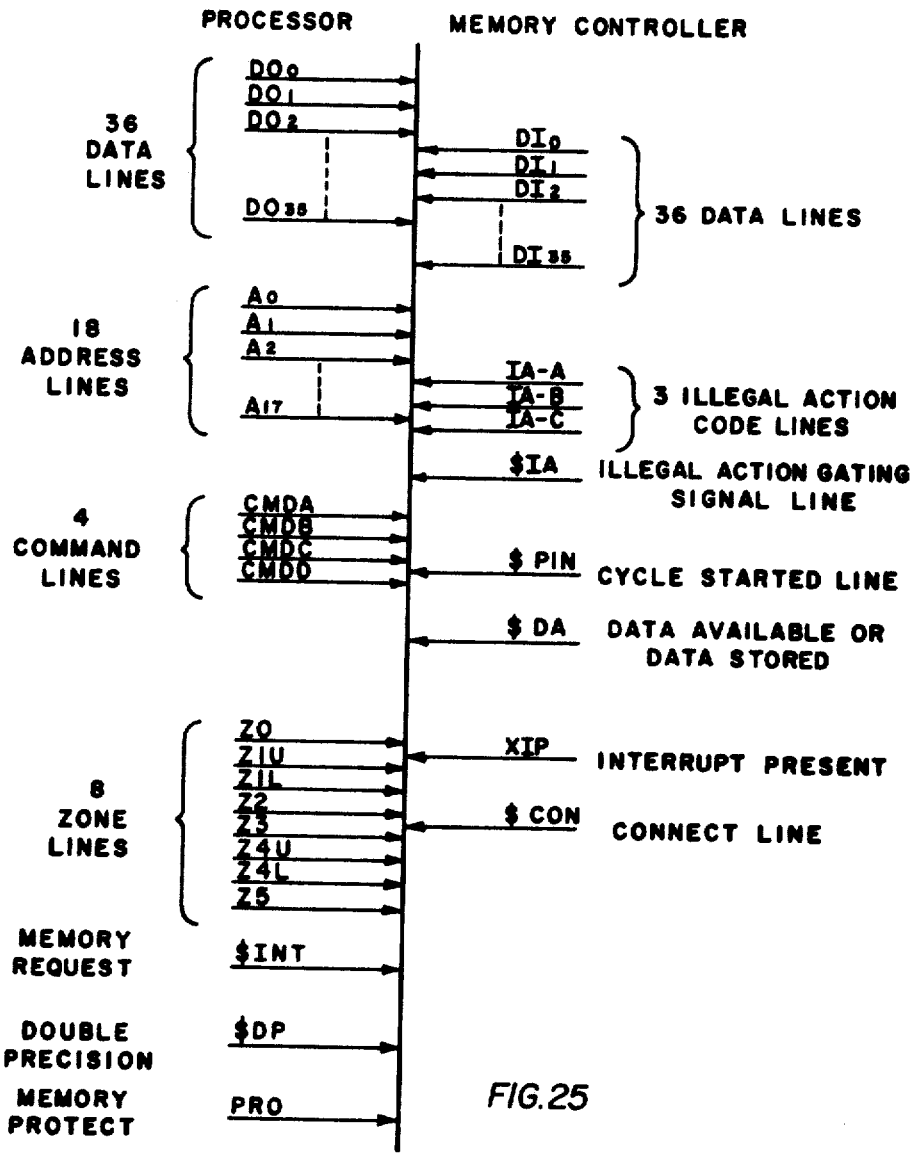
FIGURE 25 is a drawing illustrating the signals at the interface between the processor and the memory controller of the system of the present invention.

Referencing now FIGURE 25, there is shown the signal interface between a processor and a memory controller of the present invention. By interface, in the present description, is meant that imaginary line which defines the boundary between the processor and the memory controller. In FIGURE 25 this is represented by the vertical line to which extend, from both sides thereof, a plurality of arrows representing signals. While all of the signals shown in FIGURE 25 will be discussed in greater detail subsequently in this description, a brief summary shows that the lines or conductors extending from the processor to the memory controller include thirty-six data lines $DO_0$–$DO_{35}$, eighteen address lines $A_0$–$A_{17}$, four command lines designated CMDA, CMDB, CMDC and CMDD, and eight zone lines designated respectively Z0, Z1U, Z1L, Z2, Z3, Z4U, Z4L and Z5. Also included in those lines extending from the processor to the memory controller is a memory request line $INT, a double precision line $DP, and a memory protect line PRO. Those lines or conductors which extend from the memory controller to the processor include thirty-six data lines $DI_0$–$DI_{35}$, three illegal action code lines IA–A, IA–B and IA–C, and an illegal action gating signal line $IA. In addition to the above, there are shown four additional control and timing signal lines designated $PIN, $DA, XIP and $CON. In the subsequent discussion the designation for the line is also utilized to designate a high level signal on that line.

It is well, at this time, to point out one discrepancy which exists between this description and that which will subsequently follow with respect to the memory controller. This discrepancy concerns the designation of the thirty-six data lines extending from the memory controller to the processor. As has just been stated, these lines are here designated $DI_0$–$DI_{35}$. In the memory controller description these same lines and signals are designated as $D_0$–$D_{35}$.

Before continuing with the discussion of the drawings, the modularity concept of the system of the present invention warrants reiteration. As has been previously explained, the present system enjoys the possibility of employing a plurality of processors, memory controllers and input/output units. In the specific example here being described, and insofar as the processor is concerned, it is possible to connect or interface a single processor with four memory controllers. Thus, it is to be borne in mind that, while in many instances in the subsequent discussion only a single port or channel is being discussed, that this is only a representative description which applies equally to each of the four ports or channels of the processor.

It should also be remembered that each processor within the system is capable of operating in two separate and distinct modes. These modes are called the Master mode and the Slave mode. In this system, there is also the provision that one processor is the "control processor" for the system. Ramifications of these designations are that only certain functions can be performed while a processor is in the Master mode or, in certain other instances, by the processor designated the control processor. Normally, the program of the present data information processing system will be divided into two portions, the "executive" portion and the "user" portion. The executive portion is the overall governing or directing factor of the total system while the user portion includes the actual programs utilized to perform specific user tasks. In normal operation, the executive portion of the program is accessed only by the processor while it is in the Master mode while the user portions of the program are executed by the processor or processors in the Slave mode. The designation of the control processor is a function of certain manually operated switches on the control panels of the various system components while the Master or Slave mode designation of the processor results, as will be more fully understood as this description proceeds, through the setting of certain flip-flops within the processor.

Figure 26:
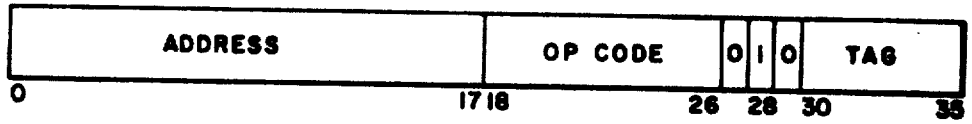
FIGURE 26 illustrates a typical instruction word utilized in the system of the present invention.

FIGURE 26 illustrates a typical instruction word used in the operation of the system of the invention here being described. The instruction word as shown is a thirty-six bit word which is comprised, essentially, of two basic parts. The first part is the address portion of the word and encompasses bits 0 through 17. The second part of the word, bits 18 through 35, is the command portion and is further divided into several parts. The nine bits 18 through 26 define the type of operation to be performed. At present, bits 27 and 29 are not normally used while bit 28 is designated as an "interrupt bit" and may be a binary 1 or 0 according to the circumstances as will be hereinafter described. The last part of the command portion of the instruction word is the tag portion which comprises the six bits 30 through 35. The tag portion has several uses with perhaps the most predominant use being in indirect addressing or address development where this portion identifies the type of address modification to be performed and the registers within the processor to be used in this modification. It is, of course, to be expressly understood that FIGURE 26 is only a typical word and that in certain specific instances the format of the instruction word will vary therefrom. A data word, in the system of the invention here being described, is also thirty-six bits in length with the data information employing the full thirty-six bits.

Figure 27A:
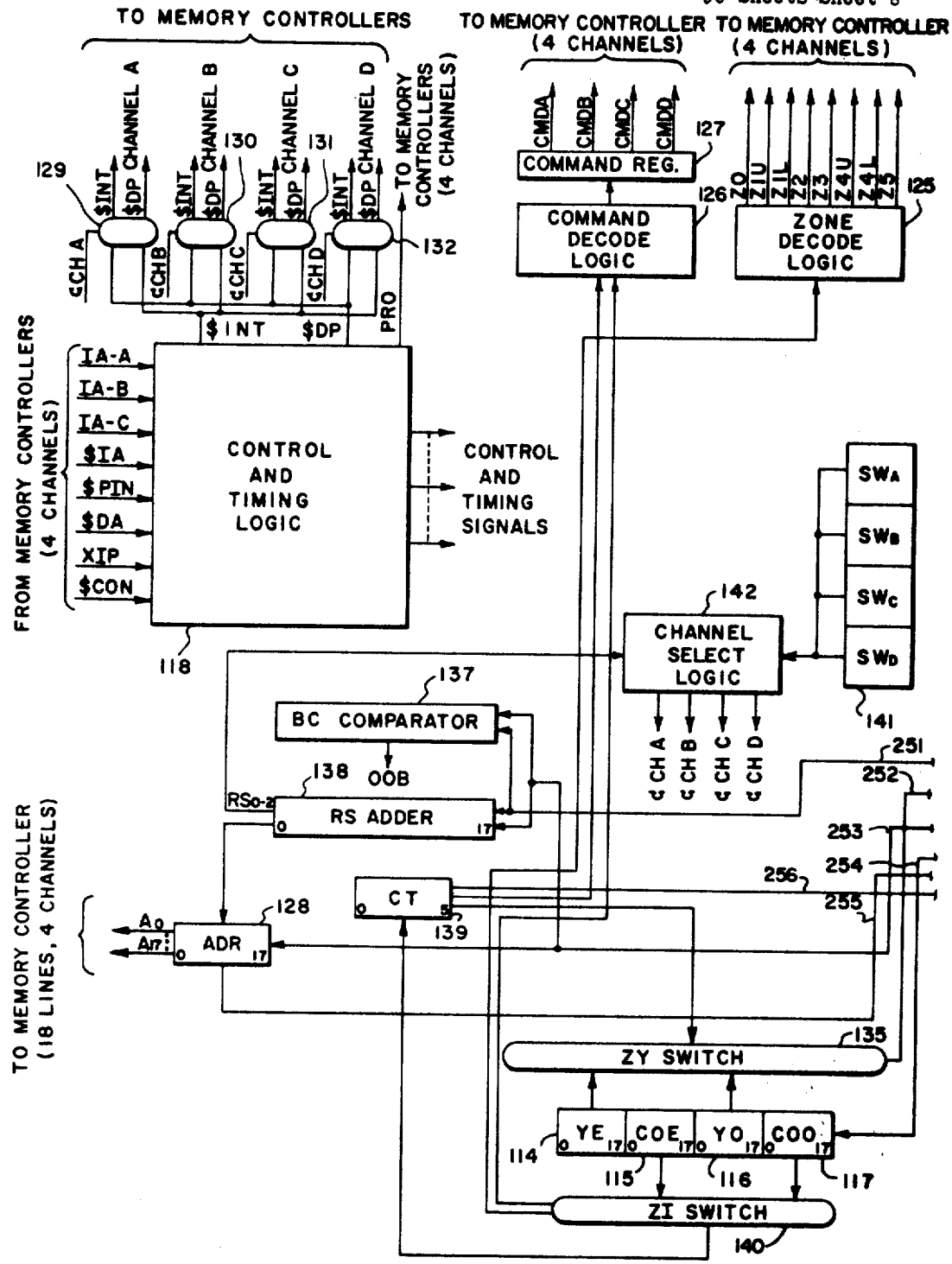
FIGURES 27a and 27b, taken together as indicated, consitute a major block diagram of the processor.
Figure 27B:
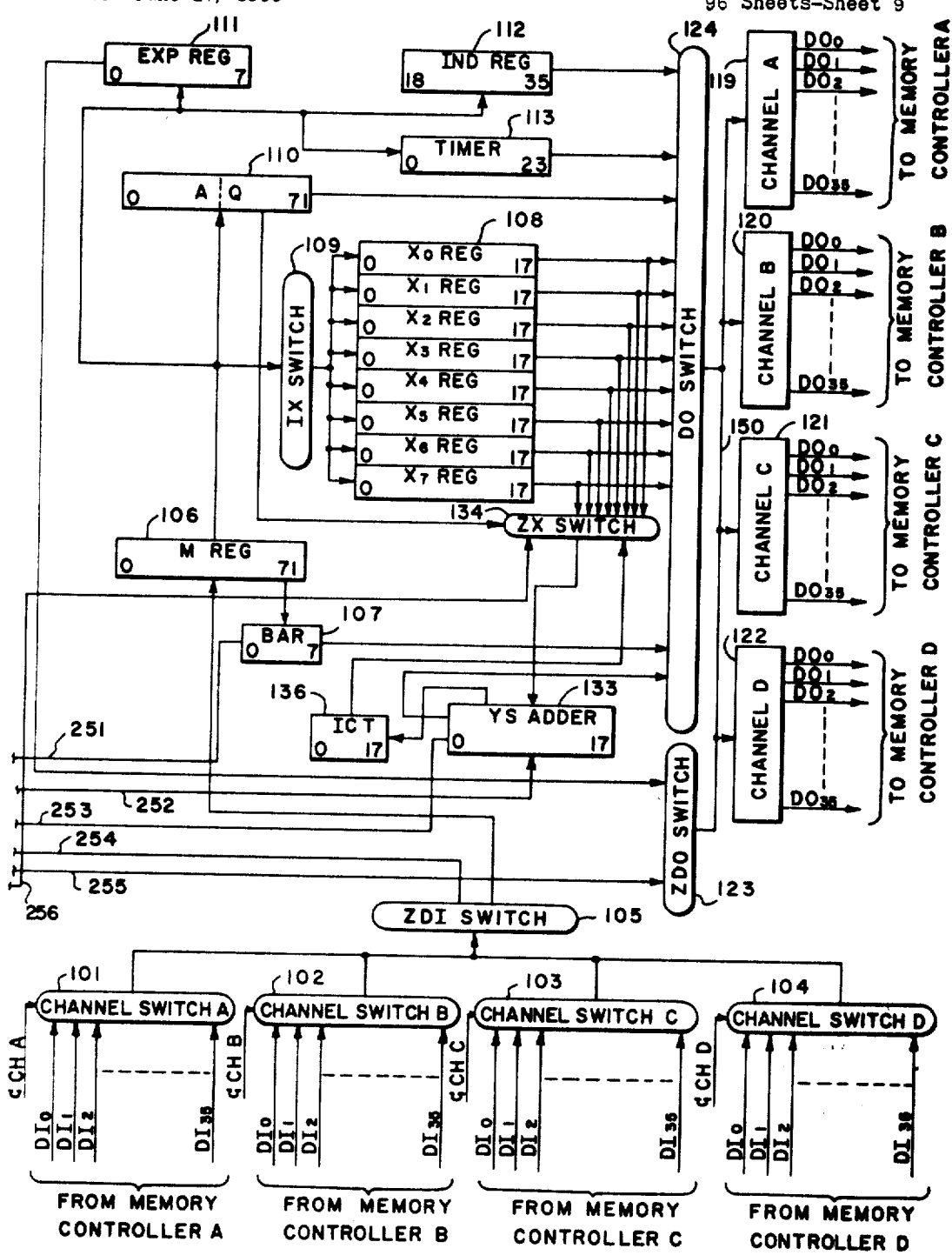

Referencing now FIGURES 27a and 27b which collectively, in the manner indicated thereon, form FIGURE 27 there is shown a major block diagram of the processor of the present invention. FIGURE 27 illustrates the major registers and additional components which provide and which accept the several interface signals shown in FIGURE 25. Before proceeding with a more detailed explanation of how these interface signals are developed and received, it is believed beneficial to briefly describe the general flow of data within the processor as is shown in FIGURE 27.

As has been previously stated, a processor of the present invention is capable of being connected to four memory controllers through four ports or channels. Incoming data from one of the memory controllers is brought in on one channel via the $DI_0$–$DI_{35}$ lines or bus to one of four channel switches (channel switch A, B, C or D) designated respectively 101 through 104. Under the control of a channel select signal, $\phi Ch$, the formation of which will be described in detail hereinafter, the data on that input channel is directed to a ZDI switch 105. From the ZDI switch 105, incoming data may be directed along one of two paths. The first of these paths is to an M-Register 106, a seventy-two bit register capable of holding two words. From the M-Register, incoming data, or portions thereof, may be directed to an eight bit Base Address Register (BAR) 107 or to a plurality of eighteen bit Index Registers 108. The eight index registers are identified as $X_0$–$X_7$ and the incoming data to these registers is directed to the appropriate index register by means of an IX switch 109. Data may also pass from the M-Register to a seventy-two bit Accumulator 119 (AQ-Register), to an eight bit Exponent Register 111, to an eighteen bit Indicator Register 112 or to a twenty-four bit Timer 113. The second path incoming data may take from the ZDI switch 105 is to a plurality of eighteen bit registers collectively known as the Instruction Registers. The Instruction Registers are comprised of four eighteen bit registers, namely a YE-Register 114, a COE-Register 115, a YO-Register 116, and a COO-Register 117. In the normal operation of the presently being described system, instruction words are brought from the memory controller in pairs. Thus, under suitable gating, the address portion of the first or even instruction of a pair is placed in the YE-Register while the command portion of this even instruction is placed into the COE-Register. Similarly, the address portion of the odd instruction of a pair is placed into the YO-Register and the command portion of the odd instruction is placed into the COO-Register.

The remaining signal lines, brought from the memory controllers to the processor, enter the processor as is shown in FIGURE 27 at a block 118 labeled Control and Timing Logic. These signal lines (one group for each memory controller) include the three illegal action code lines IA–A, IA–B and IA–C and the illegal action gating signal $IA. Also included are the $PIN, $EA, ZIP and $CON lines.

Those lines or buses extending from the processor to the memory controller include a thirty-six line data output bus $DO_0$–$DO_{35}$ from each of four output ports 119 (channel A), 120 (channel B), 121 (channel C), and 122 (channel D). Data or information is delivered to each of the four output ports 119 through 122, and hence to the data output buses $DO_0$–$DO_{35}$, through one of two switches, a ZDO switch 123 or a DO switch 124. The two switches 123 and 124 receive data from the several registers and components within the processor in a manner to be more fully described.

Additional lines going from the processor to the memory controller include the eight zone lines ($Z_0$–$Z_5$) previously enumerated which have their origin in block 125 designated Zone Decode Logic. The four command lines CMDA, CMDB, CMDC and CMDD which are brought from a Command Register 127 into which information is transmitted from block 126 designated Command Decode Logic.

There are eighteen address lines $A_0$–$A_{17}$ which collectively form an address bus extending from an eighteen bit Address Register (ADR) 128. The Address Register 128 serves to retain an address in which to be sent to a memory controller until such proper time for transfer at which time the address is gated from the Address Register 128 onto the address bus.

A memory protect line PRO extends from the processor to each of the four memory controller channels from the Control and Timing Logic 118.

The two remaining signals $INT and $DP which extend from the processor to a memory controller also emanate from the Control and Timing Logic 118. As is seen in FIGURE 27, these two signals are each gated to one of the ports or channels A, B, C or D through respective gates 129 through 132 by the appropriate $\phi Ch$ signal. The Control and Timing Logic 118 also provides a plurality of control and timing signals for the processor as will become more apparent as this description proceeds.

Also included within the depiction of FIGURE 27 is a a YS adder 133 which is a general purpose adder used to prepare addresses for instructions, perform modifications of indirect words, alter the contents of the several X-Registers 108 and other related functions. The YS adder receives information from the X-Registers via a ZX switch 134. Data may also be transferred to the YS adder 133 from the AQ-Register 110 via the ZX switch 134. A further information input to the YS adder 133 is from the YE and YO Registers 114 and 116 via a ZY switch 135. A first output of the YS adder 133 is connected to the Address Register 128. An additional output of this adder is to an eighteen bit Instruction Counter Register (ICT) 136 which holds the address of an instruction being prepared by the processor. The output of the ICT Register 136 may be placed on the output data lines $DO_0$–$DO_{35}$ via the ZX switch 134 and DO switch 124. Further outputs of the YS adder 133 are to a BC comparator 137 which performs an address checking function within the processor, and to an RS adder 138 which adder is used in the address development of the information processing system here in discussion. It should also here be noted that the Base Address Register 107 also forms an input to both the BC comparator 137 and the RS adder 138.

A six bit CT Register 139 stores the tag portion of an instruction word and receives data via a ZI switch 140 from the COE and COO Registers 115 and 117. The output of the CT Register 139 is delivered to the Command Decode Logic 126, the ZX switch 134 and a ZY switch 135. The ZI switch 140 further serves to transmit data from the COE and COO Registers to the Zone Decode Logic 125.

The final items illustrated in FIGURE 27 include a Channel Select Logic 142 and a block of switches 141. The block of switches 141 is divided into four parts designated, respectively, $SW_A$, $SW_B$, $SW_C$ and $SW_D$. The outputs of the switches of block 141 are directed to the Channel Select Logic 142 and function in the development of the ¢ChA, ¢ChB, ¢ChC and ¢ChD signals which were previously noted and which served to gate data into the processor through one of the four input channels and also serve to direct the $INT and $DP signals to one of four memory controllers.

*Address assignment and channel selection*

Figure 28B:
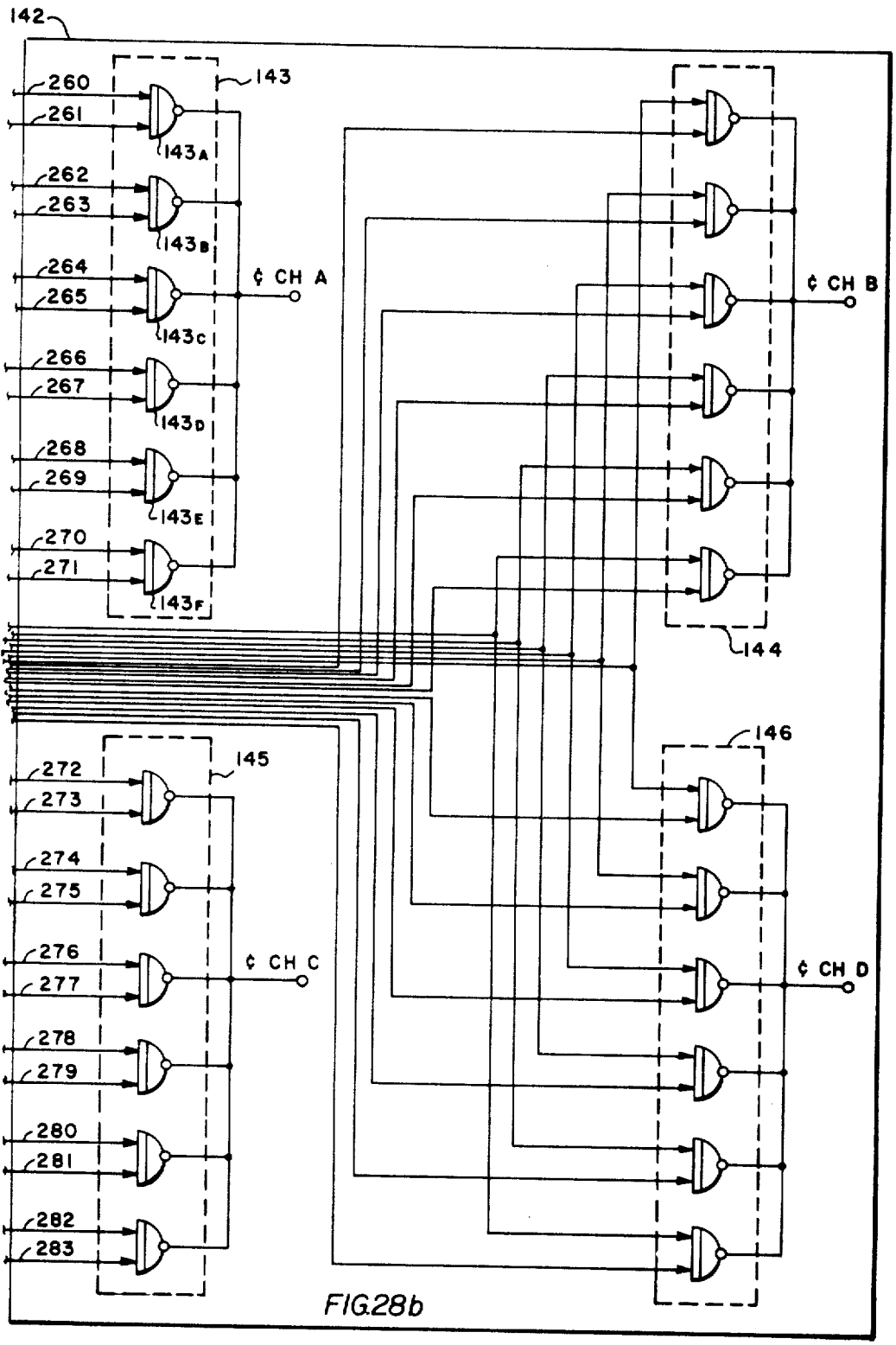

FIGURES 28a and 28b, taken together as indicated thereon, form FIGURE 28 which illustrates in detail the formation of the several ¢Ch signals. Referencing now FIGURE 28 in detail, it is seen that there is shown the RS adder 138, the block of switches 141 and the Channel Select Logic 142.

Each of the SW blocks of the switch block 141 includes 3 three-position switches. The three positions of each of these switches are designaed as the "one" position, the "either" position and the "zero" position. These three positions are best illustrated in FIGURE 29a. Referencing again FIGURE 28, it is seen that the three switch positions are achieved by providing that each switch is comprised of two single pole double throw portions with the right-hand portion of the switch being designated as the $C_1$ side and the left-hand portion of the switch being designated as the $C_2$ side. Further inspection of FIGURE 28 shows that the outside terminals of each of the switches are connected to ground while the inside terminals are connected to a potential of +6 volts. These potential levels (ground and +6 volts) designate, respectively, a binary 0 and a binary 1. The chart of FIGURE 29b illustrates that when the switches are in the middle or either (E) position, as shown in FIGURE 29a, both the $C_1$ and the $C_2$ sides of the switch are connected to ground. Further examination of FIGURE 29b shows that, if the switch output is to correspond to a binary 1, the $C_1$ side is connected to ground while the $C_2$ side is connected to a +6 volts. If the switch is to be in the zero position (binary 0 output), the $C_1$ side is connected to +6 volts while the $C_2$ side is connected to ground.

Referencing once again FIGURE 28, the outputs from the $C_1$ and $C_2$ sides of the several switches are applied to the Channel Select Logic 142. Within the Channel Select Logic 142 are four groups of NAND-gates, 143 through 146 inclusive. Each of these groups is, in turn, comprised of 6 two input NAND-gates, the outputs of which connect to or form a common bus. The output of the group of NAND-gates 143, when it is a binary 1, is the ¢ChA signal while the binary 1 outputs of groups 144, 145 and 146 respectively are the ¢ChB, ¢ChC and ¢ChD signals. Using the three switches of the switch block $SW_A$ and the NAND-gate block 143 as an example, it is seen that the six outputs of the three switches are respectively connected to one input of each of the six NAND-gates within the block 143. The second input to each of the NAND-gates comes from the RS adder 138. (It was previously noted that the RS adder 138 was used in address development. It is more explicit to here state that the development of the address which is to be transferred to a memory controller via the Address Register 128 is finalized in the RS adder 138. This address is called the effective address.) The first three bits, $RS_0$, $RS_1$ and $RS_2$ of the RS adder are the most significant bits of the address and are compared to the switch settings. With specific reference now to FIGURE 28, it is seen that the six NAND-gates of block 143 have been designated as 143a through 143f. The $C_1$ side of the uppermost switch of block $SW_A$ is connected to one input of the NAND-gate 143a whose second input is connected to bit $RS_0$ of the RS adder. NAND-gate 143b has as one input the $RS_1$ bit and as its second input the $C_1$ side of the middle switch of the switch block $SW_A$. NAND-gate 143c is, in a like manner, connected to bit $RS_2$ and to the $C_1$ side of the lower of the three switches in block $SW_A$. Similarly, NAND-gates 143d, 143e, and 143f are connected respectively to the $C_2$ sides of the upper, middle and lower switches within the switch block $SW_A$ and have as their second inputs the inversion of the RS adder bits. This inversion is achieved by the three inverters 147, 148 and 149 connected respectively to the $RS_0$, $RS_1$ and $RS_2$ bits of the RS adder. Connections similar to those of NAND-gate block 143 are made between the switches of $SW_B$ and the NAND-gates of block 144, between the switches of $SW_C$ and the NAND-gate block 145 and the switches of $SW_D$ and the NAND-gate block 146. As was the case with the block 143, the three bits of the RS adder and their inversions are also supplied to each of the NAND-gate blocks 144, 145 and 146.

Continuing now with the specific example started, let it be assumed that all addresses up to 65,535 are to be transmitted and received over the A channel or port of the processor. Therefore, inasmuch as the addresses here used are eighteen bit addresses, all addresses must have binary 0's as their two most significant bits while the third most significant bit may be either a binary 0 or a binary 1. Translating this to the bit positions of the RS adder 138, $RS_0$ and $RS_1$ must contain binary 0's while $RS_2$ may contain either a binary 0 or a binary 1. Matching this requirement with the setting of the switches of block $SW_A$, the upper switch of that block will be placed in the zero position; i.e., its $C_1$ side connected to +6 volts and its $C_2$ side connected to ground. The middle switch within the block $SW_A$ will also be in the zero position thus having its $C_1$ side connected to +6 volts and its $C_2$ side connected to ground. The lower switch, however, which corresponds to bit $RS_2$, is in the either position and as such will have both sides of the switch connected to ground.

Assume now that the RS adder 138 includes an address which is to be compared to the settings of the switches. It may be seen from FIGURE 28 that, because of the switch settings, NAND-gates 143c, 143d, 143e and 143f will all have a binary 0 (ground) at one of their inputs. These gates will, therefore, all have a high level (binary 1) output regardless of the contents of the corresponding bit in the RS adder 138. NAND-gates 143a and 143b each have binary 1's applied as the input from the switches and will, therefore, have binary 1 outputs only when the $RS_0$ and $RS_1$ bit positions contain binary 0's. If $RS_0$ or $RS_1$ were to contain a binary 1, its corresponding NAND-gate would have binary 1's at both inputs and hence the output of that gate would be a binary 0. Only when the outputs of all of the NAND-gates of block 143 are at the high level can the output of the block be a binary 1. Thus, if the address in the RS adder 138 does not exceed the setting of the switches of block $SW_A$ the output of the NAND-gate block 143 will be a high level signal which is here defined as the ¢ChA signal. Further examination of FIGURE 28 reveals that when the setting of a particular group of switches does not match with the first three bits; i.e., bits 0, 1 and 2 of the RS adder, one or more NAND-gates of one of the four blocks has a binary 0 at its output. This binary 0 pulls the outputs of any NAND-gate which may be at a high level down to a binary 0 and thus prohibits the development of that particular channel enabling signal.

Similar rationales and descriptions could be developed for a large variety of switch settings addresses and the several NAND-gate blocks 143 through 146 to provide that various addresses would produce the several ¢Ch signals. This, however, is believed unnecessary and suffice to here state that, through the setting of the twelve switches, the first three bits of the address as it is developed and contained in the RS adder 138 are compared to a switch configuration and when a positive comparison is found, the appropriate channel enabling signal ¢Ch is developed.

While further specific examples will not be here given, the following table represents the more common switch settings. It is to be expressly understood, however, that these are not all of the possible combinations. By way of example, a switch setting not included within the table is EEE (all switches in the either position). This setting would permit all addresses to be transmitted via that particular channel.

| Upper Switch | Middle Switch | Lower Switch | Available Address (Decimal) |
|---|---|---|---|
| 0 | 0 | 0 | 0 to 32,767. |
| 0 | 0 | E | 0 to 65,535. |
| 0 | 0 | 1 | 32,768 to 68,535. |
| 0 | 1 | 0 | 65,536 to 98,303. |
| 0 | 1 | E | 65,536 to 131,071. |
| 0 | 1 | 1 | 98,304 to 131,071. |
| 1 | 0 | 0 | 131,072 to 163,839. |
| 1 | 0 | E | 131,072 to 196,607. |
| 1 | 0 | 1 | 163,840 to 196,607. |
| 1 | 1 | 0 | 196,608 to 229,375. |
| 1 | 1 | E | 196,608 to 262,143. |
| 1 | 1 | 1 | 229,376 to 262,143. |

As all of the switches of the switch block 41 are manually adjustable, it is seen that by the proper positioning of the switches the available addresses may be assigned to particular channels of communication between the processor and the memory controllers. This enables the several memory controllers to be switched with one another insofar as their addressing by the processor is concerned and lends a great deal of versatility to the over-all system.

By way of summary, it is seen that the four ¢Ch signals enable communication between the processor and one of the memory controllers. Insofar as signals coming from the memory controller are concerned, these four signals are used to gate the data in through one of the four channels (see FIGURE 27). With respect to outputs to the memory controller from the processor, these signals are utilized to direct the $INT and $DP signals to a particular memory controller and hence ready that memory controller for the acceptance of data and other signals from the processor.

*Data output*

The output data lines were briefly mentioned earlier. Referencing once again FIGURE 27 the output data lines consist af thirty-six lines designated $DO_0$–$DO_{35}$ extending from the processor to each of four memory controllers via four ports or channels. These ports or channels are labeled as channels A, B, C and D and are respectively given the reference characters 119 through 122. The four channels 119 through 122 are all in communication with a common bus 150 to which data is supplied via a ZDO switch 123 and a DO switch 124. Data which is switched from the ZDO and DO switches is applied simultaneously to all four of the channels with the appropriate memory controller selecting the data by virtue of its previous receipt of the $INT signal. The $INT signal is sent to only one memory controller under the control of the ¢Ch channel select signals as will be hereinafter described. Data is switched onto the common bus 150 through the ZDO switch 123 from essentially two sources. The first of these sources is the eighteen bit Address Register 128. While the contents of the Address Register are normally sent to a memory controller over the address lines ($A_0$–$A_{17}$), the contents of this register are placed on the data output lines when there has been a modification to the address of an instruction which is to be retained by the memory controller. The second source of data through the ZDO switch is from the eight bit Exponent Register 111 which serves to hold the exponent of a number during floating point arithmetic operations.

Data is also supplied to the common bus 150 through the DO switch 124 from the YS adder 133. The YS adder is a general purpose adder used in the processor for address modification, to alter the X-Registers and for other general purposes. When it is desired for some purpose to store the address of an instruction presently being prepared by the processor, appropriate instruction words such as an instruction to load the ICT Register 136 cause the eighteen bit contents of that register to be transferred through the DO switch onto the common bus 150. Similarly, the contents of the Base Address Register (BAR) 107 may be transmitted through the DO switch to the four ports to memory controllers. The eight Index or X-Registers 108 are program accessible and are also capable of having their contents placed upon the bus 150 via DO switch 124 as is also true of the seventy-two bit Accumulator Register 110, the Timer 113 and the Indicator Register 112.

*Address lines*

Figure 30:
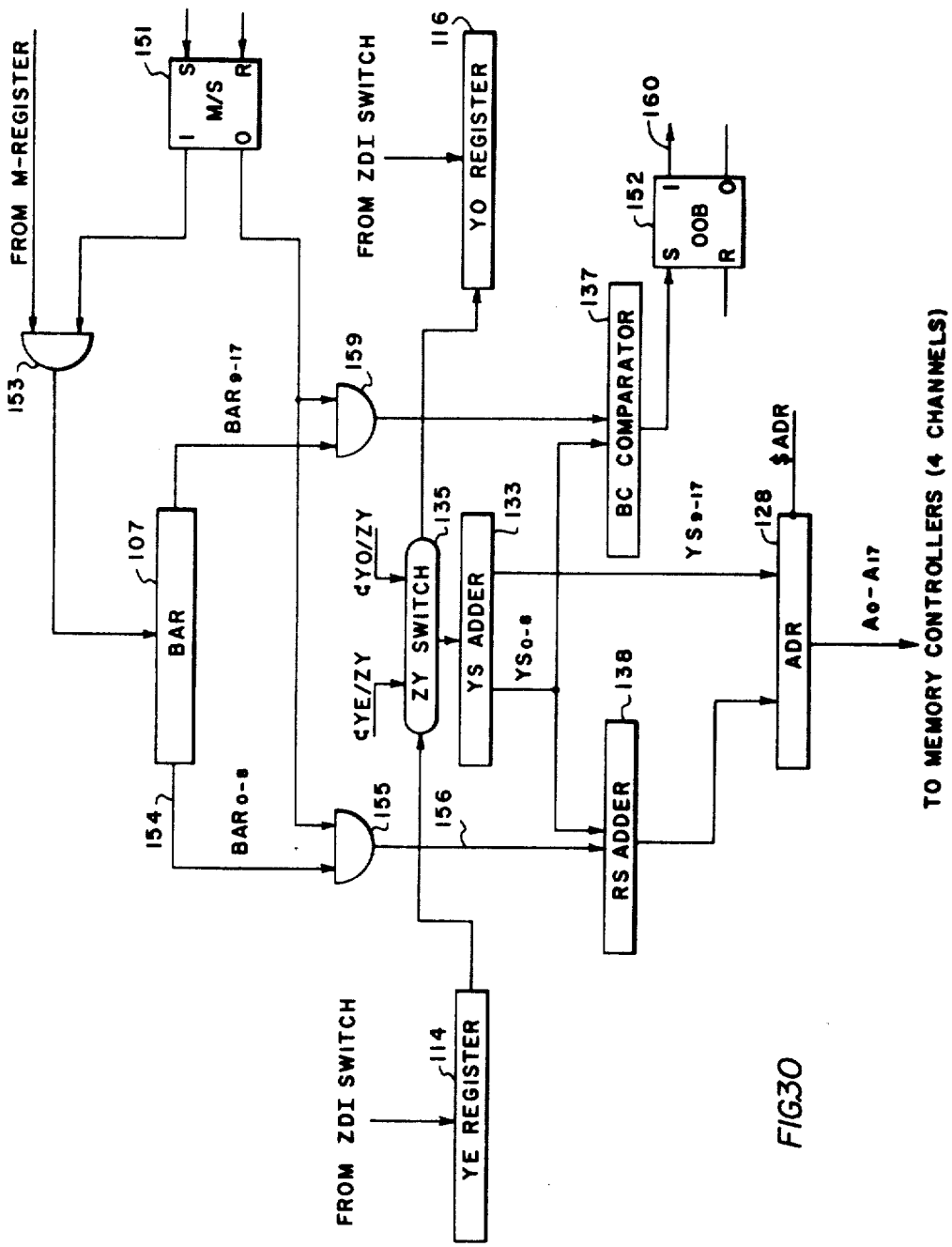
FIGURE 30 is a block diagram illustrating that portion of the processor used for developing addresses and for checking addresses with respect to boundary limitation.

With reference still to FIGURE 27, it is seen that the eighteen address lines $A_0$–$A_{17}$ extend from the Address Register 128 to each of the four ports and hence the four memory controllers. FIGURE 30 illustrates in detail the manner in which the Address Register 128 is loaded.

Before proceeding with the description of FIGURE 30, however, it is believed well to reiterate that the processor of the data processing system here being described is operable in two separate and distinct modes, the Master mode and Slave mode. Certain operations may be performed by the processor only in the Master mode. For example, in the Master mode the processor has unrestricted access to the core storage locations within the memory controller while, as will be explained hereinafter, in the Slave mode the processor performs a relative addressing.

Referencing now FIGURE 30 in detail, four registers are shown. These are the YE Register 114, the YO Register 116, the Base Address Register (BAR) 107 and the Address Register ADR (128). The illustration of FIGURE 30 also includes two adders; the YS adder 133 and the RS adder 138. Two flip-flops, a Master/Slave flip-flop (M/S) 151 and an out-of-bounds flip-flop (OOB) 152, and the BC comparator 137 complete the major components of the FIGURE 30 illustration.

The YE and YO Registers 114 and 116 perform, in the present invention, their customary function of holding the address portions of instruction words which are brought from the memory controller. That is, if the instruction word from the memory controller is an even instruction, bits 0 through 17 of that instruction word are placed via the ZDI switch 105 into the YE Register 114 (FIGURE 27). In a similar manner, if the instruction word being brought from the memory controller is an odd instruction, the address portion; i.e., bits 0 through 17, are placed into the YO Register 116 via the ZDI switch 105.

The Base Address Register 107 is loaded (eighteen bits); that is, its contents are changed, by the placement therein of an information item from the memory controller via the ZDI switch 105 and the M-Register 106 (FIGURE 27). As may be seen in FIGURE 30, the contents of the Base Address Register 107 may be changed only when the M/S flip-flop 151 is in its set state indicating that the processor is in the Master mode. The M/S flip-flop being in its set state provides a high level signal to a two input AND-gate 153 which permits the contents of the M-Register to be transferred into the Base Address Register 107.

The Base Address Register (BAR) 107 is an eighteen bit register whose contents are utilized to perform two separate and distinct functions. The first of these functions

19 employs the upper or most significant half of the Base Address Register 107 contents, bits 0 through 8, which are applied via a data bus 154, an AND-gate 155 and a data bus 156 to the RS adder 138. These nine bits represent what is known as a base address. This transfer can be accomplished only if the system is in the Slave mode with the M/S flip-flop 151 in its reset state to thus enable the AND-gate 155.

At the same time that the most significant half of the BAR 107 is supplied to the RS adder, this adder also receives information from the YS adder 133. The contents of the YS adder 133 are dependent upon whether an even or an odd instruction is being executed with the contents of either the YE Register 114 or the YO Register 116 being supplied to the YS adder through the ZDI switch 135. More specifically, the contents of the YE Register 114 are gated to the YS adder 133 by a signal designated ¢YE/ZY which causes the ZY switch 135 to transfer the contents of the YE Register into the YS adder 133. In a similar manner the contents of the YO Register 116 are placed into the YS adder 133 by the application of a ¢XO/ZY signal to the ZY switch 135.

Bits 0 through 8 of the YS adder 133 are supplied to the RS adder 138. The RS adder 138 adds the first nine bits of the Base Address Register 107 to the first nine bits of the YS adder and, as is indicated, delivers these bits to the Address Register 128. These nine bits from the RS adder are placed in the nine most significant bits of the Address Register. As was previously stated, this function is carried out only when the processor is in the Slave mode and it may thus be seen that in the Slave mode the address of an instruction being brought from memory is combined with the base address which was placed within the BAR 107 while the system was in the Master mode to develop the effective address of that instruction.

From the foregoing it is readily seen that no instruction being executed while the system is in the Slave mode can have an effective address less than the contents of the nine most significant bits of the Base Address Register, i.e., bits 0 through 8. The least significant or lower half of the effective address; i.e., bits 9 through 17, are brought directly from the least significant half of the YS adder 133 and placed into bit positions 9 through 17 of the address register 128 via suitable data buses. With the combining of bits 0 through 8 of the RS adder and bits 9 through 17 of the YS adder in the Address Register 128, the effective address to be accessed in memory is present in the Address Register 128 and this effective address may be transferred via the lines $A_0$–$A_{17}$ to the memory controllers.

From the foregoing it is seen that bit 8 of the BAR 107 is added to bit 8 of the YS adder. Inasmuch as eighteen bit addresses are here utilized, bit 8 of the YS adder represents the 512 increment in the binary system. Thus, the Base Address Register contents are capable of designating addresses for a particular program in increments of 512 address locations within the memory controller.

*Boundary checking*

The second function for which the contents of the Base Address Register 107 are used employs the lower or least significant half of the Base Address Register contents; i.e., bits 9 through 17. This second function is that of checking addresses to assure that they do not exceed a prescribed boundary for a given user program. The least significant half of the Base Address Register 107 (bits 9 through 17) is transmitted via suitable data busing and an AND-gate 159 to the BC comparator 137. This transfer can only take place when the processor is in the Slave mode and the M/S flip-flop 151 is in its reset state. This is because one input to the AND-gate 157 is from the "0" output terminal of the M/S flip-flop 151 and this input will, therefore, be a binary 1 only when the flip-flop is in

20 the reset state. Bits 0 through 8 (the most significant half) of the YS adder are also applied to the BC comparator 137. The BC comparator 137 compares bits 9 through 17 of the Base Address Register to bits 0 through 8 of the YS adder. If this comparison is true, an output signal is provided by the BC comparator 137 to the OOB flip-flop 152 placing this flip-flop into its set state. In its set state the OOB flip-flop provides an output signal, representing an error, at its "1" output terminal (arrow 160 of FIGURE 30).

Figure 31:
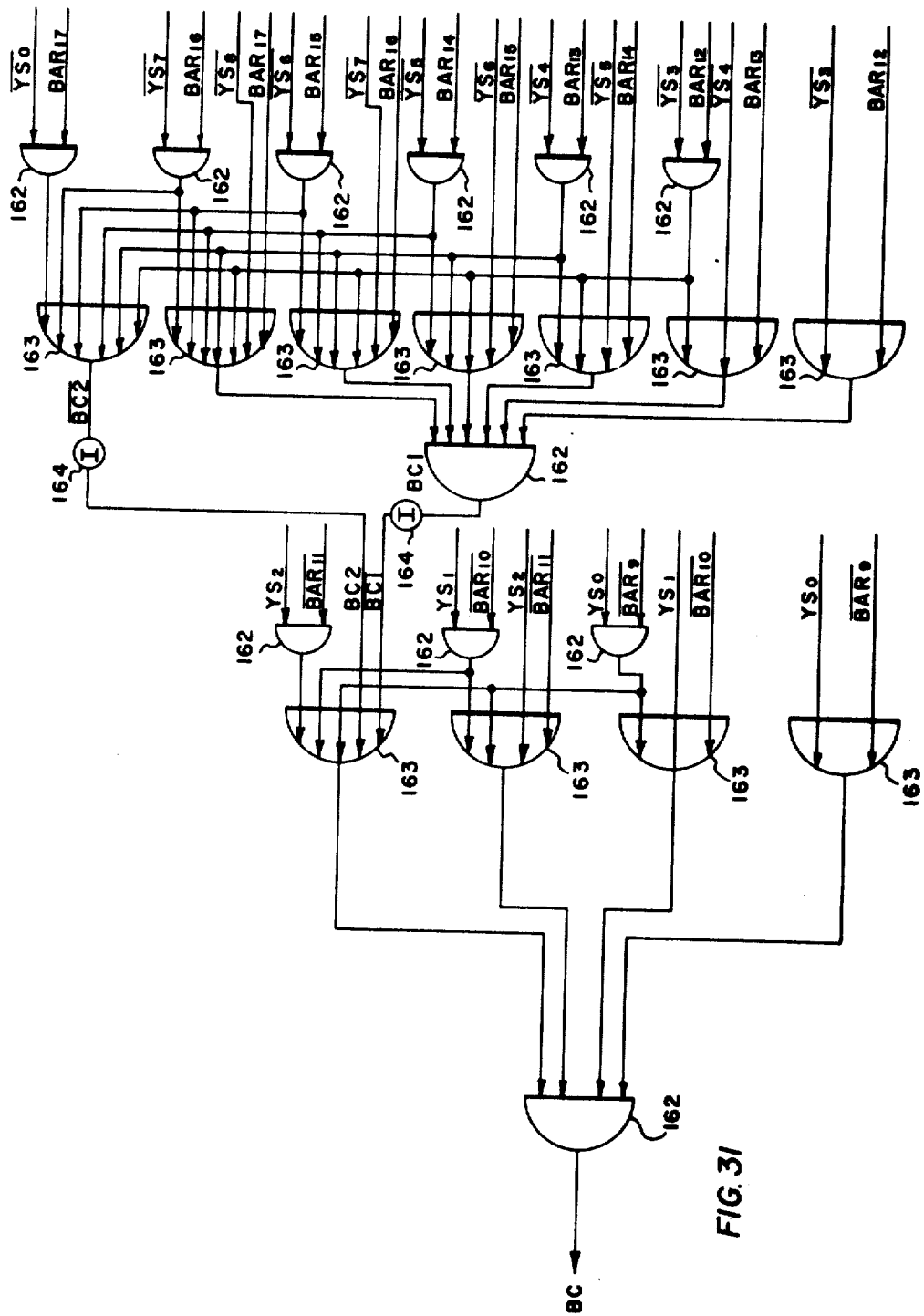
FIGURE 31 is a detailed schematic drawing of a part of the illustration of FIGURE 30 showing the address comparison scheme used in the system of the present invention.

FIGURE 31 is a logic diagram illustrating the details and operation of the BC comparator 137. The BC comparator is comprised of a plurality of AND-gates 162, OR-gates 163 and inverters 164. Bits 9 through 17 of the Base Address Register 107 and bits 0 through 8 of the YS adder 133 are applied in the manner illustrated in FIGURE 31 to the inputs of the several gates. The following three equations define the operation of the diagram shown in FIGURE 31. The term "BC" in the first equation is that signal which, when it is a binary 1, places the OOB flip-flop 152 into its set state. These three equations utilize the standard notation of YS and BAR with a numerical subscript to designate the bit position within the register or adder and are:

$$BC = (YS_0 + \overline{BAR_9})(YS_1 + \overline{BAR_{10}} + YS_0 \cdot \overline{BAR_9})(YS_2 + \overline{BAR_{11}} + YS_1 \cdot \overline{BAR_{10}} + YS_0 \cdot \overline{BAR_9})(\overline{BC1} + BC2 + YS_2 \cdot \overline{BAR_{11}} + YS_1 \cdot \overline{BAR_{10}} + YS_0 \cdot \overline{BAR_9});$$

where, $$BC1 = (\overline{YS_3} + BAR_{12})(\overline{YS_4} + BAR_{13} + \overline{YS_3} \cdot BAR_{12})(\overline{YS_5} + BAR_{14} + \overline{YS_4} \cdot BAR_{13} + \overline{YS_3} \cdot BAR_{12})(\overline{YS_6} + BAR_{15} + \overline{YS_5} \cdot BAR_{14} + \overline{YS_4} \cdot BAR_{13} + \overline{YS_3} \cdot BAR_{12})(\overline{YS_7} + BAR_{16} + \overline{YS_6} \cdot BAR_{15} + \overline{YS_5} \cdot BAR_{14} + \overline{YS_4} \cdot BAR_{13} + \overline{YS_3} \cdot BAR_{12})(\overline{YS_8} + BAR_{17} + \overline{YS_7} \cdot BAR_{16} + \overline{YS_6} \cdot BAR_{15} + \overline{YS_5} \cdot BAR_{14} + \overline{YS_4} \cdot BAR_{13} + \overline{YS_3} \cdot BAR_{12});$$

and, $$\overline{BC2} = (\overline{YS_8} \cdot BAR_{17} + \overline{YS_7} \cdot BAR_{16} + \overline{YS_6} \cdot BAR_{15} + \overline{YS_5} \cdot BAR_{14} + \overline{YS_4} \cdot BAR_{13} + \overline{YS_3} \cdot BAR_{12}).$$

From a study of the foregoing equations, it may be readily seen that any time the most significant half (bits 0 through 8) of the YS adder is equal to or greater than the least significant half (bits 9 through 17) of the Base Address Register there is an error signal created. This error signal is designated "BC" in the equations and in FIGURE 31. As was previously stated, the BC signal is applied to the OOB flip-flop to place that flip-flop in the set condition. The high level signal from the "1" output of the OOB flip-flop 152 (FIGURE 30) may be utilized in any of several ways to indicate that an error has occurred. In the implementation of the system of the present invention this signal causes the system to enter a general memory fault routine.

*Command lines*

In the system of the present invention, the processor is capable of issuing twelve types of commands to the memory. These twelve commands are divisible into two groups with the first group being memory core cycle commands and the second group being the memory controller cycle commands. The listing below is of the twelve commands and includes further their abbreviation and their binary code designation.

MEMORY CORE CYCLE COMMANDS

Read/alter/rewrite (RAR) 1000
Read/restore single precision (RRS SP) 0000
Read/restore double precision (RRS DP) 0001
Clear/write single precision (CWR SP) 0100
Clear/write double precision (CWR DP) 0101
Connect (CON) 1100

MEMORY CONTROLLER CYCLE COMMANDS

Set execute interrupt cells (SXC) 1110
Execute (XEC) 1101
Set file protect register (SFP) 0111
Set execute and channel interrupt mask register (SMSK) 0110
Read file protect register (RFP) 0011
Read execute and channel interrupt mask register (RMSK) 0010

In the above listing, it is the four bit binary figure which is sent on the command lines CMDA to CMDD to the memory controllers (FIGURE 27).

Figure 32:
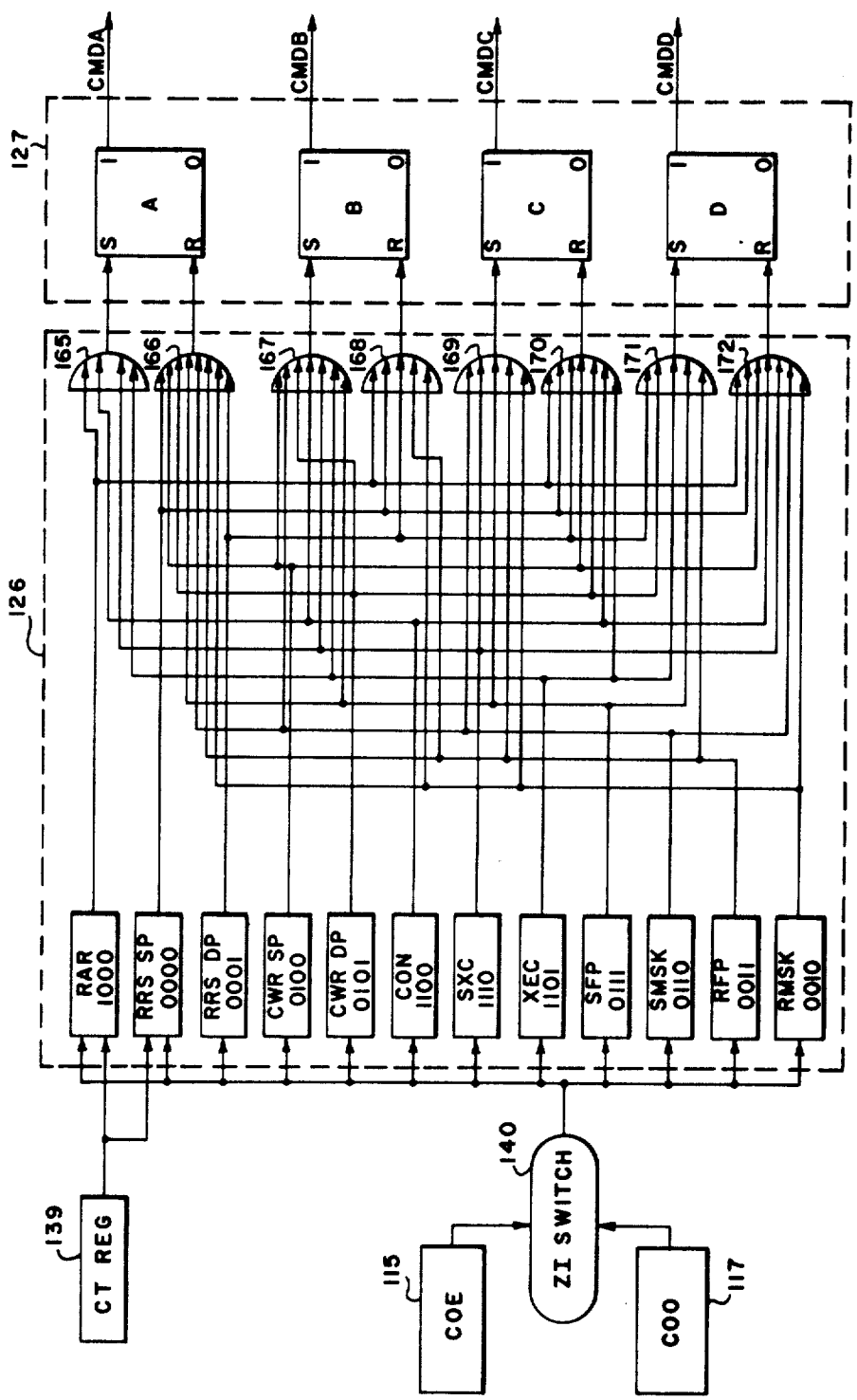
FIGURE 32 is a schematic drawing illustrating the manner in which the command signals sent to the memory controller are formulated in the processor.

For a more complete understanding of the manner in which the signals are developed for placement on the command lines, reference is made to FIGURE 32. In that figure there is shown the Command Register 127 which includes four flip-flops, A, B, C and D, the "1" outputs of which are, respectively, the CMDA, CMDB, CMDC and CMDD signals. Because the command lines are connected only to the "1" outputs of the four flip-flops, it is seen that the signals on these lines will be either a binary 1 or a binary 0 in accordance with whether the particular flip-flop is in its set or reset state. The four flip-flops of the Command Register 127 are set or have their condition determined in accordance with the outputs of the Command Decode Logic 126. Inasmuch as decoding logic is, per se, considered to be well known in the art, the actual decoding logic is not here shown but is instead represented by twelve blocks within the Command Decode Logic 126, each of which is labeled as one of the twelve possible commands. The outputs of these twelve blocks are applied as inputs to a plurality of OR-gates 165 through 172 whose outputs in turn determine the state of the four flip-flops of the Command Register 127. For example, assume that the command decode is clear/write double precision (CWR DP). From FIGURE 32 it is seen that the output of the CWR DP block forms an input to OR-gates 166, 167, 170 and 171. The outputs of these four OR-gates in turn place flip-flops A and C of the Command Register 127 into their reset states and flip-flops B and D into their set states. With these conditions of the four Command Register flip-flops, the output code on the four command lines from the Command Register 127 is 0101. Similar developments may be made for each of the eleven other commands.

The inputs to the twelve blocks of Command Decode Logic 126 are from the COE Register 115 and the COO Register 117 through the ZI switch 140. The bits transferred from the COE and the COO Registers are those in positions 0 through 8, and 12 through 17. These are the bits which represent the operation code (bits 0 through 8) and the tag portion (bits 12 through 17) of the command instruction word. It may also be seen from FIGURE 32 that for two of the instructions, read/alter/rewrite (RAR) and read/restore single precision (RRS SP), the contents of the CT Register 139 are also used. The CT Register is a six bit register which holds the tag portion of an instruction word during certain types of address development.

Zones lines

As was previously mentioned, the processor of the present invention operates with a data word of thirty-six bits. These thirty-six bits may be further broken down in two ways, six characters of six bits each, and four characters of nine bits each. Inasmuch as the processor has the capability of performing with either six or nine bit characters, some means of communication between the processor and the memory controller must, therefore, be provided so that the memory controller will have knowledge of the mode of operation to be performed. This communication is performed by the previously mentioned zone lines emanating from the Zone Decode Logic 125 of FIGURE 27.

Figure 33:
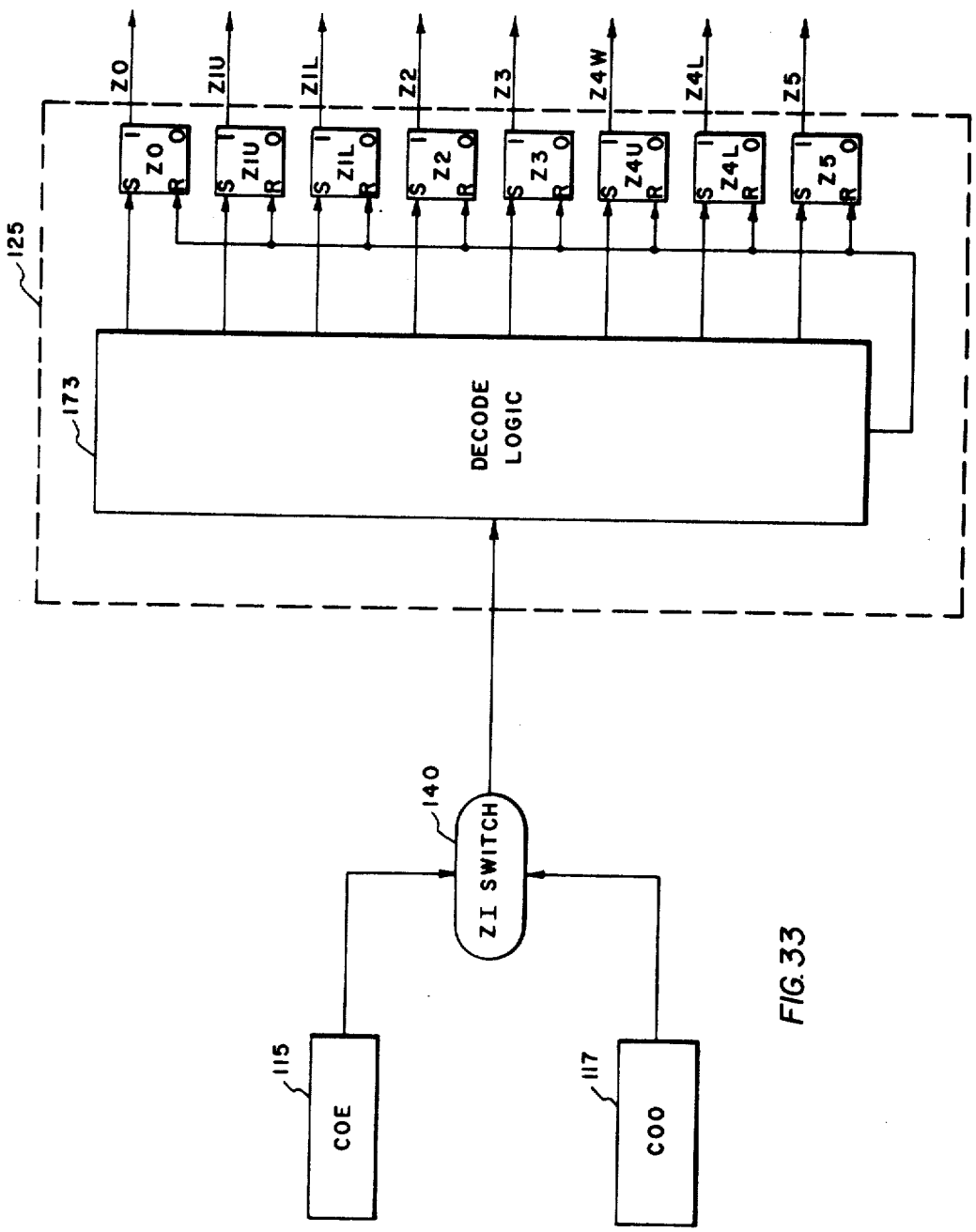
FIGURE 33 is a block diagram illustrating the manner in which the zone control signals are formulated in the processor.

The eight zone lines are each connected to the "1" output terminal of a flip-flop which is set in accordance with information taken from the COE or COO Registers. Referencing FIGURE 33 it is seen that the contents of either the COE Register 115 or the COO Register 117 are transmitted via the ZI switch 140 to the Zone Decode Logic 125 which contains a decoding logic block 173. The block 173 controls the state of eight flip-flops which shall be referred to with the designation of their outputs, i.e., the zone lines.

Insofar as the memory controller, which receives the signals on the several zone lines is concerned, the Z0 line controls access to the first six bit character while the Z1U and Z1L collectively control access to the second six bit character. Z2 and Z3, respectively, control the third and fourth six bit characters while Z4U and Z4L collectively control the fifth six bit character. The last six bit character is controlled by the line Z5. Nine bit characters are made up by dividing two six bit characters in half and adding one-half of a six bit character to each of the adjoining six bit characters. Therefore, the first nine bit character is controlled by Z0 and Z1U while the second nine bit character is controlled by Z1L and Z2. Similarly, Z3 and Z4L control the third nine bit character ad Z4L and Z5 collectively control access to the fourth nine bit character.

As has been stated, the contents of the COE and the COO Registers when decoded determine the state of the several flip-flops and hence the signal on the zone lines. This is an instruction function. Referencing once again FIGURE 26, the operation code portion of the instruction word, bits 18 through 26, will determine the type of instruction and whether the operation to be performed is to employ six or nine bit characters. The tag portion of the instruction word, bits 30 to 35, will determine which character or characters will be affected. If the operation is to be one utilizing nine bit characters, only the first four bits of the tag portion (bits 30, 31, 32 and 33) will be utilized. If the operation is to employ six bit characters, all six bits of the tag portion will be used.

By way of example, assume that the operation to be performed is that of storing the second and fourth nine bit characters from the A portion of the AQ Register 110 (FIGURE 27) into a particular memory storage location. In this case, the instruction word of FIGURE 26 would have in its address portion (bits 0 to 17) the address of the storage location to be accessed. The operation code portion of the word (bits 18 to 26) would have the code for the mnemonic STBA which represents the command, store character of A (nine bit). Inasmuch as the second and fourth nine bit characters are to be stored, bits 31 and 33 of the tag register will be binary 1's. As a second example, assume that it is desired to store the third, fourth and fifth six bit characters of the Q portion of the AQ Register 110 into the corresponding positions of a particular memory location. Once again the address portion would hold the address of the memory location to be addressed. The operational code portion would be STCQ, store character of Q (six bit). Bits 32, 33 and 34 of the tag portion would be binary 1's to indicate that these characters are to be stored.

Relating now the storage of these characters to the state of the several flip-flops and hence the signals on the zone lines, it is seen that in the first example, the storing of the second and fourth nine bit characters, zone lines Z1L and Z2, will be at a high level for the storage of the second character and lines Z4L and Z5 would be at a high level for the fourth character. In the case of the second example, the six bit character storage, zone lines Z2 and Z3, will each carry binary 1 signals for the storage of the third and fourth six bit characters. The fifth character will also be stored as a result of binary 1 signals on the Z4U and Z4L lines.

Control signals

The three remaining lines which carry signals from the processor to the memory controller are the $INT, the $DP and the protect (PRO) lines. In a modular data processing system such as is here being described, some means is necessary for the processor to communicate to the memory controller that the processor desires to perform a memory access. In the present case this communication is achieved by a signal designated $INT sent over the line bearing the same designation and reserved for this purpose.

The $DP line transmits a signal $DP to the memory controller. This $DP signal is generated by the processor and is sent to the memory controller as a function of the second half of a clear/write double precision command or as a function of the rewrite portion of a read/alter/rewrite type command. The $DP signal is given to the memory controller by the processor on double precision operations after the processor receives from the memory controller the signal that its present operation, in this case the disposition of the first half of the double precision word, is complete.

The $INT and $DP signals also serve in another capacity. These two signals (see FIGURE 27) are the only signals sent from the processor to the memory controller under the control of the $\phi Ch$ signals from the Channel Select Logic 142. Thus the $INT and $DP signals are sent to only a single memory controller and serve to inform that particular memory controller that information for that memory controller is available or is forthcoming on the other interface lines extending from the processor. In other words, the $INT and $DP signals under the control of the $\phi Ch$ signals select the memory controller which is to accept information available on the several other lines.

Previous mention was made of the Master and Slave modes of operation of the processor. It was also previously noted that, in the Slave mode, the processor may access only certain areas of core storage. In the Master mode, however, the processor has unlimited access to the core storage and, accordingly, the condition or state of the processor must be communicated to the memory controller so that the memory controller may permit the processor to access the core storage in areas determined by its mode of operation. In the system of the present invention, the processor will, in the Master mode, place a high level signal (binary 1) on the protect line PRO, thus indicating to the memory controller that the processor is in the Master mode and thus has unlimited access to the core storage locations.

Data input lines

Referencing once again FIGURES 25 and 27 it is seen that there are included within those lines extending from the memory controller to the processor thirty-six data lines designated as $DI_0-DI_{35}$. As shown in FIGURE 27, thirty-six such lines are brought to the processor from each of the memory controllers to the four channels A, B, C and D. The information on these data lines is gated through four channel switches 101 through 104 by the selective application of the $\phi ChA-\phi ChD$ signals from the Channel Select Logic 142 and is transmitted from these channel switches to the ZDI switch 105. The ZDI switch 105 in turn routes the data from the data lines to the instruction registers YE, COE and YO, COO (registers 114 through 117) or to the M-Register 106.

Information transfer status lines

Referring still to FIGURE 27, it is seen that there is a group of signal lines which originate at each memory controller and are brought to the Control and Timing Logic 118 of the processor. Two of of these lines, $PIN and $DA, carry signals of like designation which the memory controller sends to the processor and which, taken together, designate the status of the memory controller in the processing or transfer of information. The signal $PIN always precedes the signal $DA and indicates generally that the memory controller is involved in a memory cycle for that processor. Where the memory cycle is one in which the processor is to receive information from the memory controller, the signal $PIN indicates to the processor that it should prepare itself for accepting the information. In the situation where the processor is giving information to the memory controller for storage, the signal $PIN will permit the processor to begin preparation of the next instruction. The $DA signal, which follows $PIN, has essentially two functions. In the case of information transfer from the memory controller to the processor, $DA designates that the information requested is now on the data input lines $DI_0-DI_{35}$. In the case of a store instruction, that is, where information is being transferred to the memory controller. The $DA signal indicates that the information has been stored and that the processor may remove the information from its output lines $DO_0-DO_{35}$. Thus, it is seen that the $PIN and $DA signals are what might be considered as information transfer status report signals between the memory controller and the processor.

Program interruption

As in any electronic data processing system, some means must be provided to enable the several components to communicate one with the other. In the present type of system, which may employ a multiplicity of components combined in a modular basis, some means must be provided for the subservient components of the system to initiate a communication with the central or controlling component of the system. In the present system, the means by which a subservient component initiates communication with the controlling component (control processor) is manifested to that control processor by an interface signal XIP coming to the control processor from the memory controller on the XIP line. The XIP signal, which is sent only to the processor designated as the control processor, indicates to that control processor only that one of the components connected to the particular memory controller originating the XIP signal desires to communicate with the control processor. While it is true, as has been stated, that the XIP signal indicates only that there is a request for communication, the response to the presence of this signal by the control processor is much more complex as will be hereinafter described. The manner in which the control processor responds to the existence of an XIP signal may best be understood with reference to FIGURE 34 which depicts those elements of the processor and memory controller which are believed necessary for the understanding of this invention, While it is realized that many of the elements shown in FIGURE 34 have been previously described in their interconnected relationship, the repetition which exists in this portion of the description is believed desirable for purposes of clarity in understanding the present invention.

Figure 34:
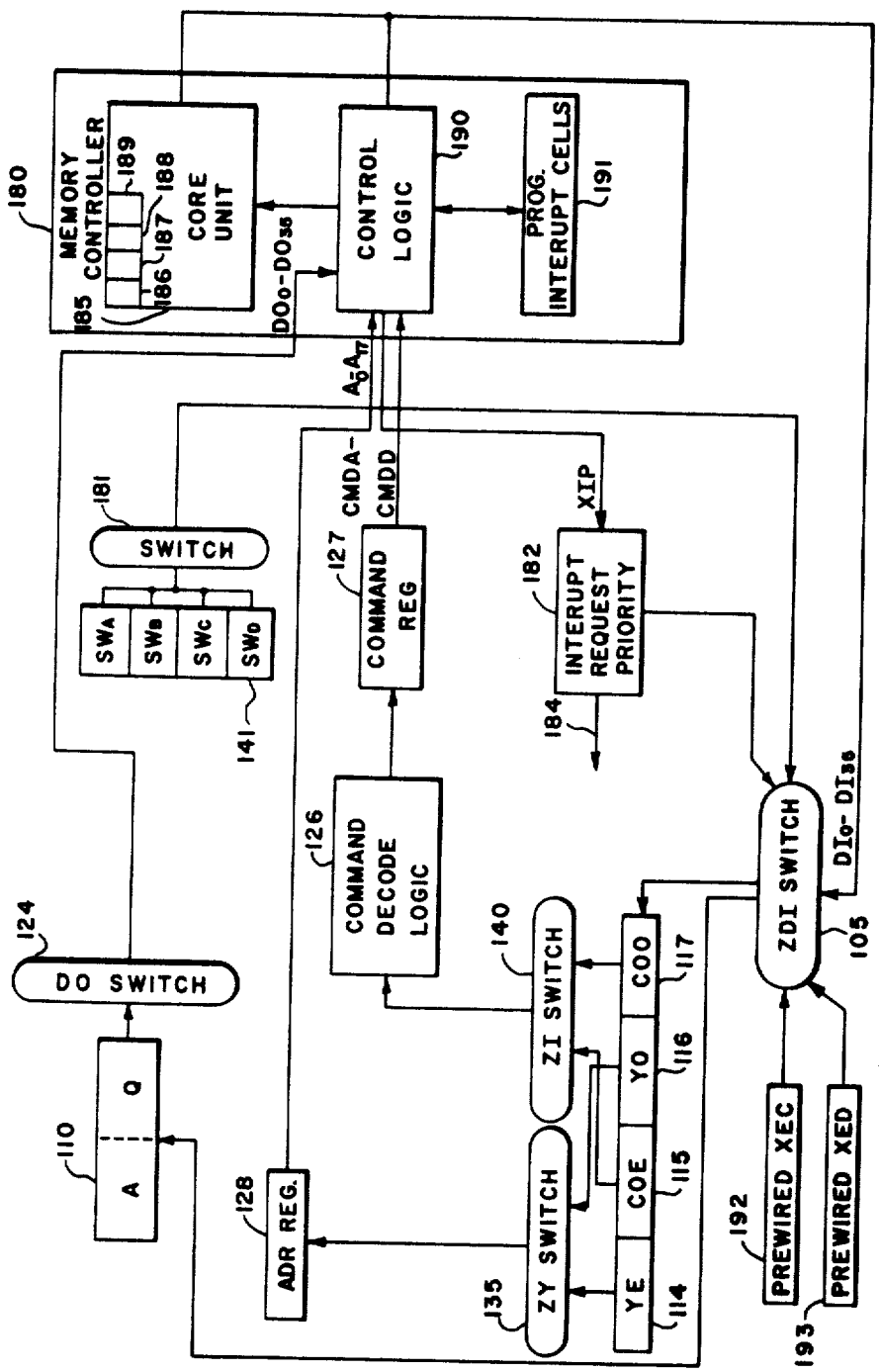
FIGURE 34 is a block diagram illustrating the manner in which interruptions of the processor are processed in the system of the present invention.

Referencing now FIGURE 34 in detail, there is shown a memory controller 180 which includes a core unit 185 of the type customary in the art and which may be addressed by the coincident current method. Included within the core unit 185 are four blocks 186, 187, 188 and 189 each of which represents, in the illustrated embodiment, sixty-four discrete memory address locations within the core unit 185. Each block of sixty-four locations corresponds to a memory controller which may be included within a complete data processing system. The sixty-four memory locations within each of the blocks 186–189 are capable of retaining certain prescribed information, the nature of which will be more fully explained hereinafter. The memory controller 180 further includes suitable control logic 190 for addressing the memory locations within the core unit 185 as well as for governing the over-all operation of the memory controller. The remaining component of the memory controller 180 illustrated in FIGURE 34 is a group of 32 bistable elements (e.g., flip-flops) called "program interrupt cells" and collectively designated by the reference character 191. A more detailed description of the memory controller is provided later in this specification.

The memory controller transmits data and other information from the control logic 190 and the core unit 185 to the ZDI switch 105 of the processor via the data lines $DI_0-DI_{35}$. The ZDI switch also receives information from the switches of block 141 via switch 181 and from two elements 192 and 193 designated, respectively, "prewired XEC" and "prewired XED." The final input to the ZDI switch 105 is from a block 182 designated "interrupt request and priority logic" which receives the XIP signal from the memory controller 180. The nature and function of the components 182, 192 and 193 will be explained hereinafter.

The ZDI switch directs the information thus received to either the AQ Register 110 or to the instruction registers YE 114, COE 115, and YO 116, COO 117. The contents of the AQ Register 110 are transmitted via the DO switch 124 to the memory controller 180 on the data output lines $DO_0-DO_{35}$. The contents of the YE and YO registers are transferred via the ZY switch 135 to Address Register 128, which in turn transmits an address to the memory controller 180 via the eighteen address lines $A_0-A_{17}$. The COE and COO registers deliver information via the ZI switch 140 to the Command Decode Logic 126 which in turn controls the Command Register 127 whose output is the signals for the command lines CMDA through CMDD.

Before continuing with the description of this portion of the invention, it should be pointed out that, while the processor portions here described are of the control processor, inasmuch as these portions answer a program interrupt request, and that while the control processor does not normally set the program interrupt cells in order to communicate with itself (although it may do so under certain conditions), the steps involved for setting the program interrupt cells are identical for all processors within the system. Therefore, the same processor is here being utilized to set the program interrupt cells and to respond to their setting for the sake of simplicity of description.

The purpose of the present invention is to provide a means whereby the several operating components of a modular data processing system may communicate with the control processor. The first step in this procedure is that of setting one or more of the thirty-two program interrupt cells 191. (The manner in which a processor sets these cells differs slightly from that by which they are set by one of the input/output controllers which is described elsewhere in this specification.) As will be more fully described with respect to the memory controller, the thirty-two program interrupt cells are divided into two banks of sixteen cells each. To place one or more of these cells into a state indicating an interrupt request there is provided, in a repertoire of the program being run, an instruction which places into the A portion of the AQ Register 110 (hereinafter called the A-Register) the contents of a particular memory location. The placement of these contents, or "loading" of the A-Register as it is more commonly called, is accomplished as is shown in FIGURE 34 by the transmission of data or information from the core unit 185 via the $DI_0-DI_{35}$ data bus to the ZDI switch 105 and from thence to the A-Register. The contents of the A-Register indicate which of the program interrupt cells 191 are to be set. In the particular system here being described, the first sixteen bits of the A-Register specify which of the sixteen cells of a particular bank are to be set while bit 35 designates which of the two sixteen cell banks is to be utilized. Thus, if cells are to be set in each of the two banks, it is necessary to perform this operation twice.

With the cells which are to be placed into their set condition being designated by the contents of the A-Register, the next instruction in the program repertoire which is brought from the core unit 185 to the instruction registers YE, COE and YO, COO via the $DI_0-DI_{35}$ lines and the ZDI switch 105 is one designated SMIC (set memory interrupt cells). The first three bits of the SMIC instruction word will determine via the Channel Select Logic 142 (see FIGURE 27) which memory controller is to accept the command in accordance with the normal addressing procedure previously described. The command portion of the instruction word is decoded by the Command Decode Logic 126 to provide the proper code (SXC, binary 1110—reference FIGURE 32 and related description) for placement on the command lines CMDA to CMDD to be sent to the control logic 190. Substantially simultaneously with the application of the command line signals, the A-Register contents are gated via the DO switch 124 and the $DO_0-DO_{35}$ lines to the control logic 190. In response to these two inputs, the control logic 190 of the memory controller 180 places the proper program interrupt cell(s) of the group 191 into its (their) set state indicating that an interrupt is requested.

When any one of the program interrupt cells of the group 191 is in its set state indicating an interrupt request, there is provided as an input to the interrupt request and priority logic 182 of the processor the XIP signal on the XIP line. This is a high level signal which will be maintained until all interrupt requests have been answered and all cells of the group 191 have been placed into their reset state. As only the control processor of a system can answer interrupt requests, only the XIP line connected to the control processor for that particular memory will have thereon the XIP signal.

The interrupt request and priority logic 182 will, in a multi-memory controller system configuration, have the XIP input line from each memory controller. The interrupt request and priority logic 182 determines the order in which the interrupts from the several memory controllers are to be answered but inasmuch as this feature does not, per se, constitute a part of the present invention, it is deemed sufficient to here state that this logic provides an orderly sequence for answering interrupt requests in a prescribed manner and that output 184 of the logic 182 will remain high for so long as any of the input XIP lines are high representing a request by one of the cells within one of the memory controllers.

The answering of interrupt requests by the control processor may take place only at particular times during the execution of a program by the control processor. Referencing once again FIGURE 26 which shows a typical instruction word it is seen, as has been previously mentioned, that there is an "i" in bit position 28. Bit 28 has been designated as the "interrupt bit" and is present in each program instruction word. In the embodiment presently being described, an interrupt request may be answered only at the end of the processing of an odd instruction of an instruction pair and only then if bit 28 of that instruction word is a binary 0. At the end of each odd instruction cycle in which a bit 28 is a binary 0, output 184 of the interrupt request and priority logic 182 is interrogated to see whether or not there is an interrupt request present.

Assuming that output 184 is high and that the processor is at a point in the program at which it may answer interrupt requests, the manner in which the interrupt request is recognized and answered is as follows. Through the operation of the interrupt request priority logic 182 the processor is notified of the memory controller whose interrupt cell is to be answered. In response to this notification, the processor places the address of that memory controller along with a pre-wired instruction designated XEC into the processor instruction registers (YE, COE and YO, COO) via the ZDI switch 105. The prewired XEC instruction is represented in FIGURE 34 by the block 192. The XEC instruction is then sent to the appropriate memory controller in the normal manner via the command lines CMDA to CMDD. In response to the XEC command, the memory controller returns a six bit data item via the $DI_0$–$DI_{35}$ data input lines. This six bit item is peculiar to the particular interrupt cell being answered and is placed, via the ZDI switch 105, into bit positions 12 through 17 of both of the YE and YO Registers. At the same time, a three bit information item representing the switch positions of the three switches of the block 141 which correspond to the memory controller being addressed is provided via a switch 181 to the ZDI switch 105 to be placed in the YE and YO Registers in bit positions 9, 10 and 11. Also at the same time, a nine bit information item is brought from block 193, through the ZDI switch into the command portion of the instruction registers, i.e., the COE and COO Registers. Block 193 represents the prewired command designated XED (execute double). These inputs to the instruction registers constitute the instruction word which will next be used and the format of this instruction word is illustrated in FIGURE 35.

Referencing FIGURE 35 it is seen that the instruction word now contained in each of the YE, COE and YO, COO combinations is as follows. bits 0 through 8 are zeros; bits 9, 10 and 11 contain a bit configuration representative of the switch positions corresponding to the memory controller whose interrupt request is being answered; bits 12 through 17 contain the six bit configuration which was sent from the memory controller and which is peculiar to the interrupt cell being answered; bits 18 through 26 contain the binary configuration for the command XED; and bits 27 through 35 are zeroes.

It is noted that the instruction word just formulated has binary 0's in each of its first three bit positions. Therefore, in accordance with what has been previously described with respect to addressing, this instruction will be sent to that memory whose addresses start at zero. Bits 9 through 17 collectively form an address within the core unit 185 of the memory controller being addressed. This, in accordance with the present example, is memory controller 180 of FIGURE 34. Applying this example to the FIGURE 34 representation, bits 9 through 11 designate which of the sixty-four location blocks 186 to 189 is to be addressed while bits 12 through 17 designate the particular location to be addressed within the designated block. It is well to here note that inasmuch as the system of the present invention always brings two words from memory, the six bit configuration peculiar to the interrupt cells always has a binary 0 in its least significant position. This corresponds to bit position 17 in the instruction word shown in FIGURE 35. Therefore, only even addresses are sent to the memory controller in the answering of interrupt requests and, because two wards are brought from memory, each memory cell provides an address for a two word location within one of the sixty-four word blocks.

Having the configuration shown in FIGURE 35 in the instruction registers, the normal memory access cycle is commenced with the XED command being decoded and transmitted to the memory controller 180 via the command lines CDMA to CMDD. The address provided by bits 0 through 18 will direct the XED command to the memory controller of the system whose addresses start with zero (in the present example, memory controller 180). In response to this command the memory controller 180 of the system will address a particular location in one of the sixty-four location blocks as defined by the bits 9 through 17. As is customary with the system of the present invention, the memory controller 180 will pull a pair of words from the core unit 185 starting with the above address and transmit these two words to the processor in the normal manner over the $DI_0$–$DI_{35}$ lines to the ZDI switch 105 and from that switch into the instruction registers.

The action directed by these two words would be dependent upon the particular situation involved. Assuming that a branching operation were desired, the two words would be instructions. The first or even of these two instructions might direct the processor to store the data and instructions of the program upon which it was working and that upon the completion of this operation the second instruction would direct the processor to transfer or branch to a particular location in the memory which is the starting location of some subroutine. The last instruction of the subroutine would, in the normal case, return the processor to its original program.

*Faults*

The five remaining lines extending from the memory controller to the processor contribute to what is, in the processor, a mode of system operation or routine referred to as faults. The term "fault," as it is herein utilized, does not necessarily mean that there has been an error made or that there has been a malfunctioning of the system. Fault, in the present context, means merely that the processor is to go or be placed into a special mode of operation or routine and that it will enter this mode on any of several different conditions. There are four general fault classifications: (1) instruction generated faults, (2) program generated faults, (3) hardware generated faults, and (4) manual generated faults.

Of the four above-listed categories the first one, instruction generated faults, clearly indicates that all faults are not the result of a malfunction. The other three categories are more likely to be faults which indicate some form of error. As a brief example of an instruction generated fault, the $CON signal, about which more will be stated hereinafter, issues from the memory controller in response to an instruction given to the memory controller by the processor and causes the processor to then go into a fault routine.

A portion of the ways in which the processor may be forced into a fault routine involves the five remaining lines which have been illustrated as extending from the memory controller to the processor. These are the illegal action code line (IA–A, IA–B and IA–C), the $IA line and the $CON line. However, before proceeding with a detailed description of the way in which the signals delivered to the processor on these lines are utilized, it is believed advantageous to first describe the manner in which the processor functions once a fault condition has been established, regardless of the circumstances which gave rise to the condition. As will become apparent as this discussion of faults proceeds, there are many similarities between this and the just previously described program interruption mode of processor operation.

The fault routine operation of the processor is best understood with reference to FIGURE 36. In that figure there is shown a memory controller 180 having a core unit 185 and a portion designated as control logic 190. Included within the core unit 185 is a block 196 which represents a prescribed number of specific memory locations which are selectively addressed by the processor in the execution of a fault routine. That portion of the processor shown includes the ZDI switch 105 which receives information on the $DI_0$–$DI_{35}$ lines from the memory controller 180. The ZDI switch also receives information from the XED block 193 which, as was described with respect to FIGURE 34, provides the command XED. Further inputs to the ZDI switch 105 are a seven line bus 206 from a group of panel switches 194 and a four line bus 207 from a component designated as fault logic 195. Fault logic 195 receives information, insofar as the depiction of FIGURE 36 is concerned, from the control logic 190 of the memory controller 180 via the illegal action code lines, the $IA line and the $CON line. In addition to the four line bus 207, the fault logic 195 provides an output designated FLT (represented by arrow 205) whose function it is to indicate to the processor that a fault condition exists.

Also shown in FIGURE 36 are the instruction registers YE, COE and YO, COO (114 through 117 respectively) with the outputs of the YE and YO Registers being connected to the Address Register 128 via the ZY switch 135. The output of the Address Register 128, lines $A_0$–$A_{17}$, extends from that register to the control logic 190 of the memory controller 180. The outputs of the COE and COO Registers are directed, as before, via the ZI switch 140 to the Command Decode Logic 126 whose output forms the input to the Command Register 127, the output of which is the four command lines CMDA–CMDD. The command lines CMDA–CMDD connect to the control logic 190.

The panel switches 194 are two-position switches, the two positions representing respectively binary 1's and binary 0's. There are seven of these switches, in the present embodiment, and they may be positioned on the control panel of the processor. The seven panel switches 194 are operator adjustable and serve to form a part of the address of an instruction word, to be subsequently described, which is one of those within the block 196 of the core unit 185. The portion of the address which these switches designate is the starting address of those locations of the block 196.

Assume now that a fault condition has been recognized by the processor by virtue of an output on the FLT line 205 from the fault logic 195. The fault logic 195 will develop a four bit output, in a manner to be hereinafter described, which is delivered to the ZDI switch 105 over bus 207. The ZDI switch also receives the output from the seven panel switches 194 and the nine bit XED command from the block 193 in a manner similar to that which was done in the program interrupt mode. These several information units; i.e., from elements 193, 194 and 195, are then transmitted by the ZDI switch 105 to the proper positions within the instruction registers YE, COE and YE, COO such that the contents of these registers are as shown in FIGURE 37. Referencing that figure, it is seen that insofar as the YE and YO Registers are concerned (bits 0 through 17), bit positions 0 through 5 are zeros while positions 6 through 12 contain the bit configuration established by the panel switches 194. Bit positions 13 to 16 contain the four bit configuration which was derived from the fault logic 195. Bit 17 is a zero. The address bits 6 through 17 collectively designate a particular location within block 196 of the core unit 185. In the command portion of the instruction word (COE and COO Registers) bit positions 18 through 26 contain the binary designation of the XED command. The rest of the bit positions of the command portion of the instruction word are not important to this instruction.

Having the above-described contents in the instruction registers, the processor, in its normal manner of operation, decodes the XED command in the Command Decode Logic 126 and sends the results via the Command Register 127 and the CMDA–CMDD lines to the memory controller 180. At the same time, the address (bits 0 through 17) is sent to the memory controller via the Address Register 128. Because bits 0, 1 and 2 of the address are zeros, as was previously discussed ¢C*h* signal will transmit a $INT signal (see FIGURE 27) to that memory having addresses starting with 000 to direct that memory to accept the signal on the command lines. Bits 6 through 17 of the address will access a particular location within the block 196 of the core unit 185 of that memory controller in accordance with the configuration of these bits. Because this is an execute double (XED) command, the memory controller will, in response to this command, bring a pair of instruction words from the memory starting with the address designated by bits 6 through 17 of the address. The two words accessed by this address will be brought from the memory controller and sent via the $DI_0$–$DI_{35}$ lines to the ZDI switch to be placed into the instruction registers 140 through 170. As was the case with the program interrupt mode, the two instructions thus brought to the instruction registers direct the future course of action of the processor; i.e., branching, etc.

FIGURE 38 illustrates in greater detail the operation of the fault logic 195 and the manner in which it develops the four bits utilized as a portion of the just described address and the signal on the FLT line 205. One way in which these four bits are developed involves the illegal action code lines. The illegal action code lines IA–A, IA–B and IA–C respectively form inputs to the set input terminals of three flip-flops 197, 198 and 199. The inversion of each of the signals on the illegal action code lines are applied to the respective reset terminals of the three flip-flops. Therefore, inasmuch as flip-flops 197–199 are trigger flip-flops and have as an input to the trigger terminal thereof the $IA line, it is seen that, with each occurrence of a signal on the $IA line, the state of the flip-flops 197–199 will conform to the configuration of signals on the illegal action code lines IA–A, IA–B and IA–C. The three illegal action code lines and the $IA line are utilized by the memory controller to remit to the processor that there has been an attempt to communicate with the memory and that this attempt was either proper or improper. If the attempt was improper the signals sent to the processor will cause the processor to enter the fault routine.

One of six possible combinations of bits is returned to the processor after each memory communication attempt. These possible combinations are:

|   |                        | Line |      |      |
|---|------------------------|------|------|------|
|   |                        | IA–A | IA–B | IA–C |
| 1 | Not control processor  | 1    | 0    | 0    |
| 2 | Not Master mode        | 0    | 1    | 0    |
| 3 | Protected area         | 1    | 1    | 0    |
| 4 | Nonexistent address    | 0    | 0    | 1    |
| 5 | Parity error           | 0    | 1    | 1    |
| 6 | No illegal action      | 0    | 0    | 0    |

The first five of the above cause the processor to enter the fault routine. In brief explanation of the above, the first configuration is returned to the processor when there has been an attempt by other than the control processor to execute an instruction reserved for the control processor. The second indicates that a processor in the Slave mode has attempted to execute an instruction which can only be executed while the processor is in the Master mode while the third situation results from an attempt by a processor in the Slave mode to access a memory location outside of the prescribed boundaries for that processor at that time. The fourth and fifth configurations appear to be self-explanatory while number six, no illegal action, is sent to the processor when the attempted communication is proper. The processor does not enter a fault routine in response to this last configuration.

Referencing once again FIGURE 38, the "1" outputs of the three flip-flops 197–199 are connected to an encode and priority logic 200 which may be comprised of encoding and priority determination logic circuits which are known in the art and do not form a part of the present invention. When the illegal action code lines, and hence the outputs of the flip-flops 197–199, are of any of the five previously described configurations representing a fault, the logic 200 will provide a particular four bit output corresponding to that particular fault for transmission to the instruction registers to be used, as previously described, as the address for the XED command.

A second way in which the four bit information item is developed concerns the interface line $CON which is connected to the set input terminal of a flip-flop 202. The "1" output of flip-flop 202 is connected to the encode end priority logic 200. When a high level signal (also called $CON) is received from the memory controller, flip-flop 202 is placed in its set state with a resulting signal being delivered to the logic 200. In response to this input from the flip-flop 202 the logic 200 will provide a prescribed four bit output which will, as before, be utilized as a portion of the address for an XED instruction. The $CON signal is, therefore, another method of initiating a fault routine. Once the fault occasioned by the $CON signal has been recognized, flip-flop 202 will be reset by a signal from the logic 200.

With respect to the over-all system operation, however, the $CON signal is the result of an important communication operation. It will be remembered from the discussion of the program interruption mode that the several system components may initiate a communication with the control processor of a system by setting an interrupt cell within the memory controller which in turn transmits a signal to the control processor. In response to this signal, and at the appropriate time, the control processor enters the program interruption mode and essentially services that other component. However, as only the control processor has the ability to respond to the setting of the interrupt cells, it is evident that the program interruption mode does not provide a means whereby the control processor can initiate a communication to one of the other components connected to a port on a memory controller. There exists, therefore, within the instruction repertoire of the system, an instruction word designated as CIOC which can be executed only when the processor is in a Master mode. This instruction differs slightly from most instructions in that bits 33 to 35 of the CIOC command designate which channel of the eight available to the memory controller is to be subsequently utilized by the memory controller. In response to this instruction the memory controller will send out the $CON signal to the component connected to the channel designated by bits 33 to 35 of the CIOC instruction. If the component connected to that channel is a processor, the fault routine previously described will be entered. The response to the $CON signal by an input/output controller is explained subsequently in that portion of this description dealing specifically with the input/output controller.

It is noted that the logic 200 is said to include priority logic. It is to be expressly understood that the illegal action code lines and the $CON line represent only two ways of initiating a fault routine. In the implementation of the complete system of which the present description forms a part, there are approximately sixteen different types of faults. The majority of these act in a manner similar to that of the $CON signal; i.e., the setting of a single flip-flop in response to an instruction or to a particular condition. Because of the nature of these faults, some must be answered before others and they are, therefore, divided into five priority groups. The priority portion of logic 200 determines the order of answering the various faults. This priority scheme, however, does not, per se, form a portion of the present invention and as priority schemes in general are known, it is not deemed here necessary to describe in detail this scheme.

The four bits from the logic 200 are transmitted to a block of circuitry designated condition logic 201. The condition logic 201 prevents the transmission of the four bit information item until such time as the processor, which has been previously made aware of the fault condition, has had time to reorient itself and to prepare itself for the execution of a new instruction. This new instruction, as was previously discussed, will be the XED instruction which was explained with respect to FIGURE 37. This reorientation or initialization is necessary because a fault may occur at any time and the processor may be in the middle of an operation which cannot be interrupted. The faults, as previously explained, are divided into several categories, some of which must be answered immediately and others which can, of course, wait until such time as the processor is ready to handle them in the normal sequence. However, in accordance with the priority of the individual fault, as soon as the appropriate conditions have been met the condition logic block 201 will release the four bit information item for transfer to the ZDI switch 105 via bus 207 (see FIGURE 36).

The last feature to be described with respect to the fault routine concerns the generation of the signal on the FLT line 205 which indicates to the processor that a fault routine is to be entered. In essence, this signal is the output of an OR function represented by OR-gate 211 in FIGURE 38. The inputs to the OR-gate 211 are from the 1 output terminals of the several flip-flops shown in that figure. Thus, if any of the flip-flops are in their set state, as would be the case if there is a fault present, the signal on the FLT line 205 will be high indicating to the processor that a fault is present. (It should, in addition, be noted that in a complete system which will employ several more fault flip-flops, the 1 outputs of all the fault flip-flops will be similarly connected.)

INPUT/OUTPUT CONTROLLER

Figure 39:
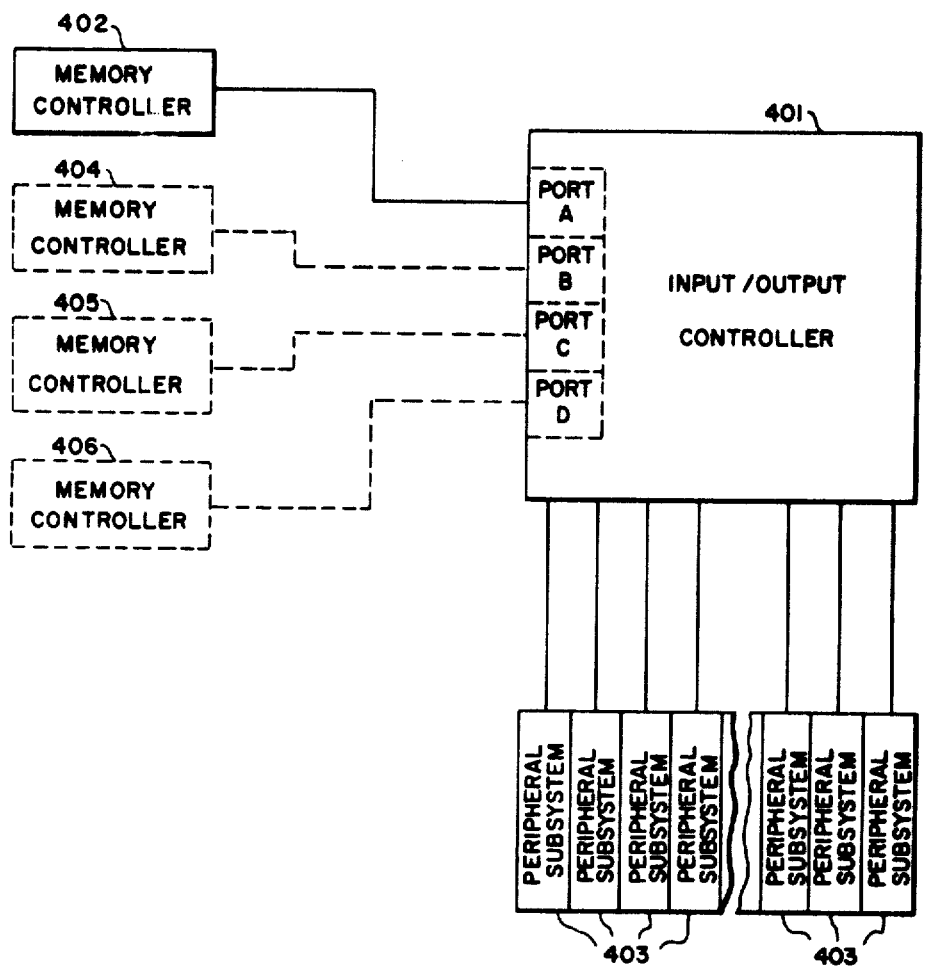
FIGURE 39 is a block diagram illustrating the connection of the input/output controller to the peripheral subsystems and to one or more memory controllers.

FIGURE 39 illustrates the input/output controller 401 and the connection of input/output controller 401 to memory controller 402 and to a plurality of peripheral subsystems 403. The input/output controller includes four memory ports, identified in FIGURE 39 as port A, port B, port C and port D. Up to four memory controllers (hereinafter referred to as memories) may be connected to input/output controller 401, each memory being connected to one of the memory ports. In FIGURE 39, memory 402 is shown connected to port A of input/output controller 401. One or more additional memories 404, 405 and 406 may be connected to ports B, C and D respectively, as illustrated. Input/output controller 401 also includes sixteen peripheral channels (not shown), each peripheral channel providing communication between input/output controller 401 and one peripheral subsystem. Up to sixteen peripheral subsystems 403 may be connected to input/output controller 401. The lines interconnecting the elements in FIGURE 39 symbolically represent paths of data and control information.

The input/output controller 401, illustrated in FIGURE 39, is an independent data processing unit of the data processing system and is capable of executing microinstructions to perform its function of providing communications between one or more memories and the peripheral subsystems of the data processing system. The micro-instructions, termed IOC commands, are stored in memory, along with other control information, and are retrieved from memory by the input/output controller. Input/output controller 401, in executing a microinstruction, proceeds independently until execution of the instruction is completed. Input/output controller 401 can receive IOC commands and other control information from only one memory, termed the control memory. The control memory is specified by switches in input/output controller 401.

*Control information*

Control information for directing the operations of input/output controller 401 is stored in predetermined storage locations of the control memory. Other predetermined storage locations of the control memory are employed to store control information transferred from input/output controller 401 to the control memory.

Data processing and data transfer operations in input/output controller 401 are performed under control of mailbox words stored in the control memory which may, for example, be memory 402. Mailbox words are classified as primary mailbox words and secondary mailbox words. A single primary mailbox word is provided for input/output controller 401. The primary mailbox word contains the information that is required by input/output controller 401 to initiate an operation involving a peripheral subsystem or to request status from a peripheral subsystem. The information contained in the primary mailbox word is inserted in the predetermined memory storage location by a processor (not shown).

The primary mailbox word contains a coded representation of a peripheral device command which designates the function to be performed by a particular peripheral subsystem or by a particular device of a multidevice peripheral subsystem. The primary mailbox word also contains a peripheral device address which designates the particular device within a multidevice subsystem for which the peripheral device command is intended. The peripheral device address field is ignored if the peripheral subsystem consists of only a single peripheral device. The primary mailbox word also identifies the peripheral channel of input/output controller 401 to which the particular peripheral subsystem is connected.

A micro-instruction or IOC command is contained in a predetermined field of the primary mailbox word. The IOC command controls the internal operation of input/output controller 401, facilitating operations in input/output controller 401 and increasing the data throughput of the input/output controller. A record count field is also provided in the primary mailbox word for use with certain of the IOC commands. One bit of the primary mailbox word serves to indicate whether or not a new primary mailbox word may be stored by a processor in the predetermined memory storage location.

Four secondary mailbox words are provided for each of the sixteen peripheral channels of input/output controller 401. These secondary mailbox words contain control information which enables input/output controller 401 to perform its function. Secondary mailbox word #1, called a data control word, contains address information which, during a data transfer operation in input/output controller 401, provides the address of the memory location to which or from which a word or character is to be transferred. Secondary mailbox word #1 also contains a word count field which specifies the number of words to be transferred between memory and the peripheral subsystem. A zone control field is provided to specify the character position within a word of a character being transferred between memory and input/output controller 401. A read/write bit specifies whether the operation of input/output controller 401 is a read or a write operation. Secondary mailbox word #1 also contains an action code or subcommand which further defines the operation to be performed by input/output controller 401.

Secondary mailbox word #2 is employed to obtain and check additional data control words during a data transfer operation in input/output controller 401. An address field of secondary mailbox word #2 contains the address of the next data control word to be used by input/output controller 401 after the word count field of the current data control word has been reduced to zero. Secondary mailbox word #2 also contains upper and lower address limits which are employed to check the address field of the new data control word to insure that the address falls within the permissible range of addresses in the program.

Secondary mailbox word #3 is an exact duplicate of the primary mailbox word and is employed at certain times during the operation of input/output controller 401 after the primary mailbox word has been destroyed. Secondary mailbox word #4 is employed by input/output controller 401 to store status information and to store address and count information for use with particular IOC commands. The IOC status field of secondary mailbox word #4 contains two error codes, an internal or IOC error code which indicates an error, if any, originating in input/output controller 401 and an external or memory error code indicating an error, if any, originating in memory.

In addition to the mailbox words discussed above, predetermined storage locations in the control memory are set aside for storage of three interrupt queue counter words and forty-eight interrupt queue table words. One of the three interrupt queue counter words and sixteen of the forty-eight interrupt queue table words are assigned to each of the three types of program interrupts which may be initiated by input/output controller 401, viz. initiation interrupts, terminate interrupts and special interrupts. The interrupt queue table words are employed by input/output controller 401 to communicate status and other required control information through memory to a processor. Successive ones of the sixteen interrupt queue table words assigned to each interrupt type are employed to store this information.

The interrupt queue counter word associated with each type of interrupt is employed to identify the word of the corresponding interrupt queue table in which the last entry was made by input/output controller 401. The count field of the interrupt queue counter word is incremented each time input/output controller 401 stores information in the corresponding interrupt queue table.

*Input/output controller—Memory communication*

Communication between a memory port of input-output controller 401 and the memory connected to that memory port is effected by a group of lines carrying predetermined signals, this group of signals comprising input signals transmitted from memory to the memory port of input/output controller 401 and output signals transmitted from the memory port of input/output controller 401 to memory. The identification of the signals passing between a memory port of input/output controller 401 and the memory connected to the port is the same for each memory-memory port connection. FIGURE 40 illustrates the group of lines interconnecting a memory port of input/output controller 401 with a memory and the signals on these lines. The illustrated memory port is designated port $\Delta$, where $\Delta$ is one of the alphanumeric characters A, B, C or D corresponding to one of the memory ports of input/output controller 401. Port $\Delta$ in FIGURE 40 is identified by reference numeral 410. The memory to which port $\Delta$ is connected is identified by reference numeral 411.

The input signals transmitted from memory 411 to input/output controller 401 through memory port 410 include thirty-six information signals $J\Delta00$–$J\Delta35$, three illegal action code signals $J\Delta AA$–$J\Delta AC$, data available/stored signal $J\Delta DS$, illegal action code available signal $J\Delta AS$ and connect signal $J\Delta CS$. If memory port 410 were, for example, port A, the thirty-six information signals would be identified as $JA00$–$JA35$. In FIGURE 40, the signal in parenthesis indicates the identification of the signal in memory. For example, the information signals, as generated in memory, are identified as signals $D_0$–$D_{35}$ but, as received in input/output controller 401, are identified as signals $J\Delta00$–$J\Delta35$.

The thirty-six information signals $J\Delta00$–$J\Delta35$ are employed to transfer both mailbox words and data words from memory 411 to memory port 410 of input/output controller 401. Illegal action code signals $J\Delta AA$–$J\Delta AC$ indicate to input/output controller 401 whether or not an error was detected by memory 411 during its operation and also the type of error detected, if any. Data available/stored signal $J\Delta DS$ is furnished by memory 411 to memory port 410 to indicate to input/output controller 401 that one of the following events has occurred:

(a) Information has been placed on the information lines and is available to input/output controller 401 in the form of information signals $J\Delta00$–$J\Delta35$; or (b) Information transmitted from input/output controller 401 to memory 411 has been stored in the addressed storage location and the storage cycle is completed.

Illegal action code available signal JΔAS is furnished by memory 411 to input/output controller 401 to indicate that the memory cycle requested by input/output controller 401 has been completed and that the illegal action code signals JΔAA-JΔAC are available on the illegal action lines. The illegal action information represented by the illegal action code signals is valid only at the time that the illegal action code available signal JΔAS occurs. Connect signal JΔCS is transmitted from memory 411 to input/output controller 401 through memory port 410 to cause input/output controller 401 to initiate an input/output operation. In response to connect signal JΔCS, input/output controller 401 obtains mailbox words from memory 411, these mailbox words containing information required by the input/output controller to perform the input/output operation.

The output signals transmitted from input/output controller 401 through memory port 410 to memory 411 include thirty-six information signals RΔ00-RΔ35, eighteen address signals RΔLA-RΔLT, eight zone signals RΔL1, RΔL4, and RΔZ0-RΔZ5, four command signals RΔCA-RΔCD, protect signal RΔPR and memory access interrupt request signal RΔL9. Information signals RΔ00-RΔ35 are employed to transfer data words and program interrupt information, as well as control information, from input/output controller 401 to memory 411. Address signals RΔLA-RΔLT specify the storage location in memory 411 from which information is to be transferred to input/output controller 401 or to which information is to be transferred from input/output controller 401. Zone signals RΔL1, RΔL2 and RΔZ0-RΔZ5 are employed during transfer of single data characters from memory 411 to input/output controller 401 to specify the character position in a word of the character to me transferred. During transfer of a word between input/output controller 401 and memory 411, the zone signals are all binary 1's.

Command signals RΔCA-RΔCD are generated by input/output controller 401 to specify the operation to be performed by memory 411 when a memory access interrupt request is granted by memory 411. Command signals RΔCA-RΔCD may specify to memory 411 the read/restore command, the clear/write command or the set execute interrupt cell command. Protect signal RΔPR is always a binary 1 and indicates to memory 411 that input/output controller 401 is permitted unrestricted access to all storage locations of memory 411. Memory access interrupt request signal RΔL9 is employed by input/output controller 401 to request access to memory 411, in order to effect the transfer of information between input/output controller 401 and memory 411 or to transfer a program interrupt request to memory 411. In memory 411, a memory access interrupt request is sometimes called a channel interrupt request.

*Input/output controlled—Details*

Figure 41B:
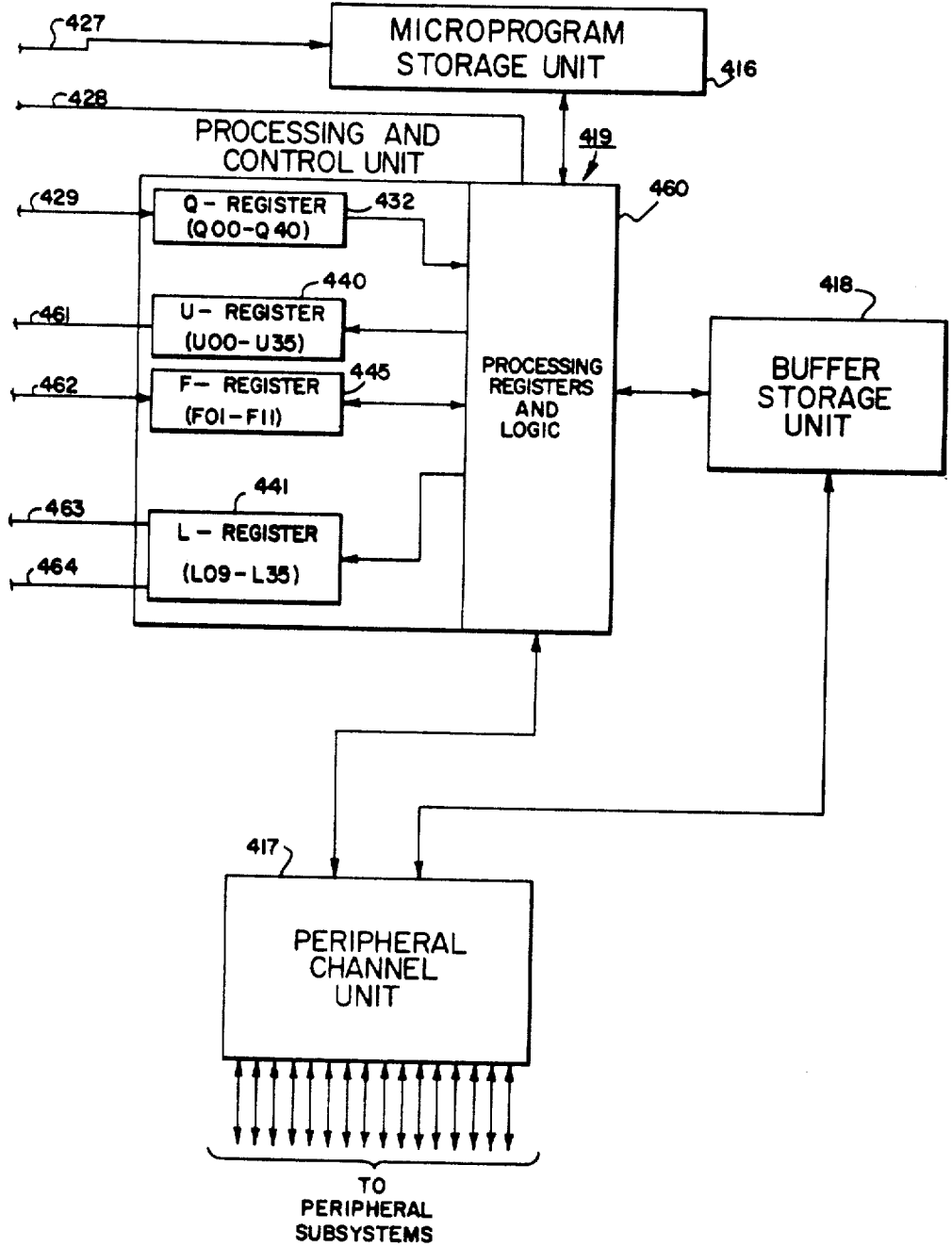

With reference to FIGURE 41, input/output controller 401 comprises a memory communications unit 415, a microprogram storage unit 416, a peripheral channel unit 417, a buffer storage unit 418 and a processing and control unit 419. Each of the five units of the input/output controller 401 comprises registers for temporarily storing information, logic circuits for transferring information between registers, and flip-flops and one-shots employed as control sources. The peripheral channel unit and the processing and control unit further include timing control elements for controlling the timing of operations in input/output controller 401. The elements of the five units of input/output controller 401 and the structure interconnecting these elements comprise assemblages of AND-gates, OR-gates, inverters, NAND-gates, NOR-gates, flip-flops, registers and one-shots.

MEMORY COMMUNICATIONS UNIT

Memory communications unit 415 of input/output controller 401 comprises memory ports 420, 421, 422 and 423, program address generation unit 425 and control panel 426, as illustrated in FIGURE 41. Each of memory ports 420-423 comprises a plurality of signal receivers for receiving signals transmitted from the associated memory to input/output controller 401 and also a plurality of signal transmitters for transmitting signals from input/output controller 401 to the memory connected to the particular memory port. These signals providing communication between input/output controller 401 and from one to four memories are described in the section entitled "Input/Output Controller—Memory Communication."

FIGURE 41 illustrates the signal transmitters and receivers of port 420. The signal transmitters illustrated for memory port 420 are duplicated in each of memory ports 421-423. These signal transmitters serve to amplify the signals being transmitted from the memory port to the associated memory. These transmitters also control the pulse width if the information is being transmitted in the form of pulses, provide impedance matching with the cable employed to carry the signals to memory and, in some cases, perform a logic function. The signal receivers illustrated for memory port 420 are also duplicated in each of memory ports 421-423. These signal receivers provide impedance matching for the signal transmission lines carrying the signals from memory to the memory port. These receivers also amplify the received signals and, in some instances, perform a logic operation involving the signals and other signals generated within input/output controller 401.

With reference to FIGURE 41, illegal action signal receiver 430 receives illegal action code available signal JΔAS (identified as $IA in memory) from memory and provides signal RΔAS to logic gates 431. The symbol "Δ" may be any one of the alphanumeric characters A, B, C or D, identifying memory port A, memory port B, memory port C or memory port D respectively. Logic gates 431 also receive the illegal action code available signals from memory ports 421-423 to generate signal DQRE which sets flip-flop Q40 of Q-Register 432 in processing and control unit 419.

Information signal receivers and logic 433 receive information signals JΔ00-JΔ35 (identified as signals D00-D35 in memory) from the memory connected to memory port 420 and provide corresponding output information signals for application to logic gates 434. Information signal receivers and logic 433 also receive as an input the zone control gating signals DΔZ0-DΔZ5 from logic gates 435, in the event that a single character is being transmitted from memory to input/output controller 401. Logic gates 434 also receive corresponding inputs from memory ports 421-423 and generate signals DM00-DM35 which are applied to the corresponding flip-flops of Q-Register 432.

Data available/stored signal receiver 436 receives signal JΔDS (identified as signal $DA in memory) from memory and provides signal RΔDS to logic gates 437. Logic gates 437 receive similar inputs from memory ports 421-423 to generate signal DSQR which is transmitted to Q-Register 432 of processing and control unit 419. Signal DSQR causes information represented by signals DM00-DM35 from logic gates 434 to be gated into flip-flops Q00-Q35 of Q-Register 432.

Information signal transmitters 430 receive signals DU00-DU35 from logic gates 439 to provide information signals RΔ00-RΔ35 to the memory connected to memory port 420. Logic gates 439 receive output signals FU00-FU35 of U-Register 440 of processing and control unit 419 and also the output of flip-flop L10 of L-Register 441 to generate signals DU00-DU35 for application to information signal transmitters 438. If a character is being transmitted from input/output controller 401 to memory, this character is represented by signals FU30-FU35 from U-Register 440; logic gates 439, in response to signal FL10, place this character in each of the six character positions represented by signals DU00–DU35. As a result, a word comprising six identical characters, represented by signals DU00–DU35, is provided to information signal transmitters 438 for transfer to memory. Logic gates 439 provide identical signals to memory ports 421–423.

Connect signal receiver 442 receives connect signal JΔCS (identified as signal $CON in memory) from memory and provides signal RΔCS for application to logic 443. Logic 443 receives similar inputs from memory ports 421–423 and also receives signal DCSΔ from control memory selection switch 444 of control panel 426. Signal DCSΔ specifies the memory port through which input/output controller 401 may receive a connect signal to initiate input/output operation. Control memory selection switch 444 on control panel 426 thus enables the system operator to specify the control memory, i.e., the memory which is to exercise operational control over input/output controller 401. A connect signal received through any other memory port from its corresponding memory is ignored by input/output controller 401. Logic 443, in response to a signal from a connect signal receiver of one of memory ports 420–423 and in response to a corresponding signal from control memory selection switch 444, generates signal DCNT for application to flip-flop F07 of F-Register 445 of processing and control unit 419.

Address signal transmitters 446 receive address signals FL18–FL25 and FL30–FL35 from L-Register 441 of processing and control unit 419. Address signal transmitters 446 also receive address signals DL26–DL29 from logic gates 447. Logic gates 447 receive address signals FL26–FL29 from L-Register 441 and also signals SL26–SL29 from control block starting assignment switches 448 on control panel 426. Logic gates 447 employ control block starting assignment switch signals SL26–SL29 when the input/output controller is transferring information to or from fixed memory locations in the control memory, for example, during retrieval of primary or secondary mailbox words or storage of information in the interrupt queue counters or the interrupt queue tables. The control block starting address assignment switches 448 are thus employed to specify the block of memory in which the fixed memory locations are located. Address signal transmitters 446 provide address signals RΔLA–RΔLT to the memory connected to memory port 420. Memory ports 421–423 receive similar address signals from L-Register 441 and logic gates 447.

Memory command signal transmitters 450 receive signals FL11–FL14 from L-Register 441 of processing and control unit 419 and provide memory command signals RΔCA–RΔCD to the memory connected to memory port 420. Memory ports 421–423 also receive the command signals represented by L-Register output signals FL11–FL14.

Zone control signal transmitters 451 receive output signals DZC0–DZC5 of logic gates 435 and provide zone control signals RΔZ0–RΔZ5, RΔL1 and RΔL4 to the memory connected to memory port 420. Memory ports 421–423 also receive the output signals of logic gates 435. Logic gates 435 have as their inputs the output signals FL10 and FL15–FL17 of L-Register 441. Logic gates 435 also receive port select signal DPSΔ from port address assignment switches 452 on control panel 426. Logic gates 435 employ signals FL10 and FL15–FL17 to develop signals DZC0–DZC5 for application to zone control signal transmitters 451. Logic gates 435 employ signals FL10, FL15–FL17 and DPSΔ to develop signals DΔZ0–DΔZ5 for application to information signal receivers and logic 433. Port address assignment switches 452 on control panel 426 provide output signal DPSΔ to identify the memory port connected to the memory having a range of memory addresses including the memory address specified by signals RΔLA–RΔLT. Signal DPSΔ from port address assignment switches 452 is also applied to memory ports 421–423.

Memory access interrupt request signal transmitter and logic 453 receives signal FL09 from L-Register 441 and port select signal DPSΔ from port address assignment switches 452 to provide memory access interrupt request signal RΔL9 to the memory connected to memory port 420. Signals FL09 and DPSΔ are also transmitted to memory ports 421–423. Since signal DPSΔ identifies only one memory port, only the memory port identified by this signal will transmit a memory access interrupt request signal to its associated memory in response to signal FL09.

Illegal action code signal receivers and logic 454 receive illegal action code signals JΔAA–JΔAC (identified as signals IA–A, IA–B and IA–C in memory) from the memory connected to memory port 420. Illegal action code signal receivers and logic 454 also receive port select signal DPSΔ from port address assignment switches 452 and provide signals DM37–DM39 to logic gates 434 for transmission to Q-Register 432 of processing and control unit 419. Logic gates 434 receive the illegal action code signals from only one of memory ports 420–423, as specified by signal DPSΔ.

Protect signal transmitter 455 is connected to a source of positive potential and continuously provides protect signal RΔPR to the memory connected to memory port 420. This protect signal permits input/output controller 401 to have access to all storage locations of the memory.

Control panel 426 of memory communications unit 415 comprises control block starting address assignment switches 448, port address assignment switches 452 and control memory selection switch 444. The structure of these switches is described in the section entitled "Control Panel." Control block starting address assignment switches 448 provide signals SL26–SL29 which are applied to logic gates 447 to specify, in conjunction with signals FL18–FL25 and FL30–FL35, the block of the control memory which contains the mailbox words and the interrupt queue counters and tables. Signals SL26–SL29 are employed by logic gates 447 only during transfer of information to or from these fixed memory locations.

Port address assignment switches 452 receive high-order address signals FL33–FL35 from L-Register 441. Port address assignment switches 452 include three switches for each memory port, the settings of the three switches determining the range of addresses to be employed with the memory connected to that port. Address signals FL33–FL35 are effectively compared with the settings of the switches associated with each port to determine the port handling the range of addresses including the address of interest. Port select output signal DPSΔ of port address assignment switches 452 is generated to specify that port. Signal DPSΔ controls the transmission of the memory access interrupt request signal to the port connected to the memory having the range of addresses including the address of interest, and also controls the receipt of illegal action code signals from that memory and the transmission of zone control information to the information signal receivers of the port connected to that memory.

Control memory selection switch 444 provides signal DCSΔ to identify the memory port connected to the memory which is to be considered the control memory. Signal DCSΔ is applied to logic gates 443, permitting the connect signal to be received only through the port connected to that control memory.

Program address generation unit 425 of memory communications unit 415 includes a first register which functions as a program counter and which provides microstep addresses to microprogram storage unit 416. Program address generation unit 425 also includes a second register for updating or incrementing the microstep address in the first register and an additional register for temporarily storing the next microstep address in the event a jump address is transmitted to program address generation unit 425 from processing and control unit 419.

MICROPROGRAM STORAGE UNIT

Microprogram storage unit 416 of input/output controller 401, illustrated in FIGURE 41, receives microstep addresses from program address generation unit 425 of memory communications unit 415. Microprogram storage unit 416 includes decode-encode logic which, in response to each address received from program address generation unit 425, generates a predetermined combination of control signals which are transmitted to processing and control unit 419. These control signals enable processing and control unit 419 to control the execution of microsteps in input/output controller 401. All operations in input/output controller 401 comprise predetermined sequences of microsteps, the sequence of microsteps being controlled by program address generation unit 425 of memory communications unit 415. The actual execution of each microstep by input/output controller 401 is directed by the control signals generated in microprogram storage unit 416.

PERIPHERAL CHANNEL UNIT

Peripheral channel unit 417 includes sixteen peripheral channels for connection to a corresponding number of peripheral subsystems. Peripheral channel unit 417 also includes clock and timing control logic for controlling the timing of operations in the peripheral channel unit, priority logic for assigning priority to program interrupt requests and peripheral channel service requests provided by peripheral channels, registers for temporary storage of information and data switching matrices for transferring data from the peripheral channels to buffer storage unit 418.

Each of the peripheral channels provides a path for the transfer of data characters and control information between input/output controller 401 and the peripheral subsystem connected to that peripheral channel. Data transfer between a peripheral subsystem and input/output controller 401 is a character at a time. A character transmitted from a peripheral subsystem through its corresponding peripheral channel is routed by the data switch matrices to the buffer storage unit for temporary storage in a buffer register. A character transferred from input/output contoller 401 to a peripheral subsystem is temporarily stored in a register of peripheral channel unit 417 prior to transfer through the corresponding peripheral channel. Another register of peripheral channel unit 417 identifies the peripheral channel in which a transfer operation is to be performed. A predetermined priority is given to each of the peripheral channels and logic is provided in peripheral channel unit 417 to grant a request for program interrupt or a request for peripheral channel service on the basis of the predetermined priority allocation.

BUFFER STORAGE UNIT

Buffer storage unit 418 of input/output controller 401 includes sixteen pairs of buffer registers for temporarily storing information being transferred between the peripheral subsystems and memory. Each pair of buffer registers is associated with a different one of the sixteen peripheral channels and handles the data transfers involving that channel. Buffer storage unit 418 also includes several registers for temporarily storing information. Six of the pairs of buffer registers of buffer storage unit 418 provide temporary storage for two data words of six characters each while ten of the pairs each provide temporary storage for two data characters. One of the temporary storage registers stores a data word or character being transferred from memory to a buffer register or a data word or character being transferred from a buffer register to a preipheral channel of peripheral channel unit 417. Another register provides temporary storage for a character being transferred from a peripheral channel of peripheral channel unit 417 to a buffer register. A register is also provided for storing the address of the buffer register to which or from which an information transfer is to be effected.

PROCESSING AND CONTROL UNIT

Processing and control unit 419 comprises Q-Register 432, U-Register 440, L-Register 441, F-Register 445 and processing registers and logic 460, as illustrated in FIGURE 41. Processing registers and logic 460 include an arithmetic unit for performing arithmetic operations on information processed by the processing and control unit 419.

Processing and control unit 419 of input/output controller 401 coordinates and controls operations in input/output controller 401 as well as executing microsteps in response to the control signals generated by microprogram storage unit 416. Processing and control unit 419 provides apparatus and signal paths for operating upon and transferring information between memory communications unit 415 and buffer storage unit 418 in the course of data transfers between memory and a peripheral subsystem.

Control panel

Control panel 426 of memory communications unit 415 enables the operator to manually control, to a certain extent, operations within input/output controller 401. Control panel 426 includes control block starting address assignment switches 448, port address assignment switches 452 and control memory selection switch 444.

CONTROL BLOCK STARTING ADDRESS ASSIGNMENT SWITCHES

Figure 42:
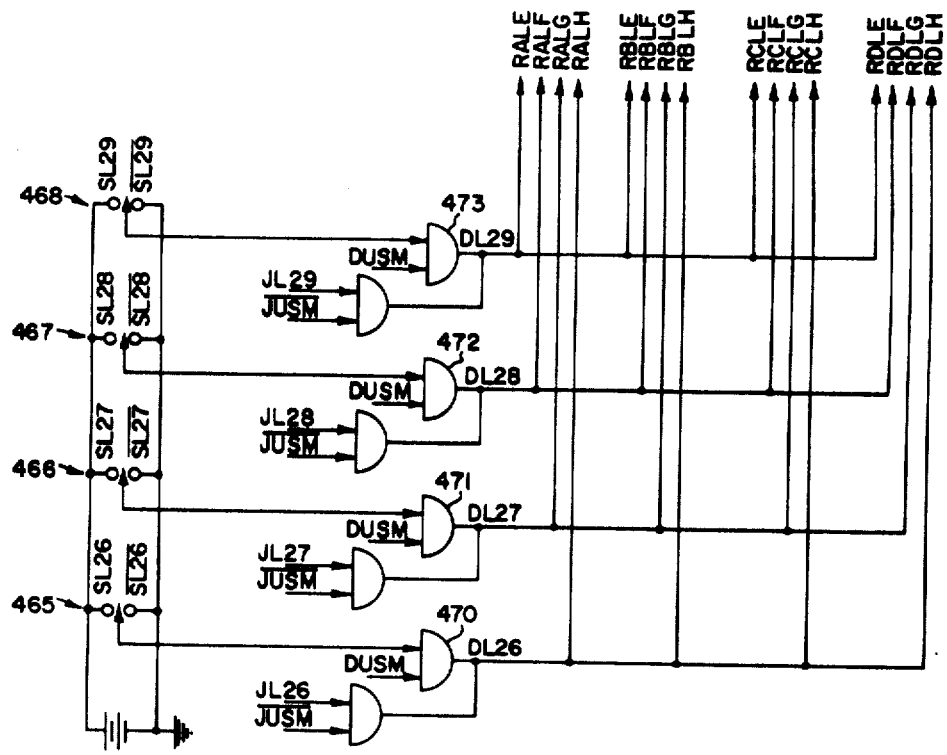
FIGURE 42 is a logic diagram illustrating the control block starting address assignment switches.

The control block starting address assignment switches 448 and the logic associated with these switches are illustrated in FIGURE 42. Potentials representing binary 1 and binary 0 are applied to respective contacts of single pole, double throw switches 465, 466, 467 and 468. The movable contact of each of the switches 465-468 may be moved to form an electrical connection with either of the remaining two contacts of the switch, the resulting signal on the movable contact being transmitted to respective AND-gates 470, 471, 472 and 473. The output signal of switch 465 is identified as signal SL26 if a binary 1 or $\overline{SL26}$, if a binary 0. The output signals of switches 466, 467 and 468 are identified as signals SL27, SL28 and SL29, if binary 1's, or by the corresponding logically inverse signal designation, if binary 0's.

If logical combination signal DUSM is applied to AND-gates 470-473, indicating that an operation requiring access to a fixed storage location of the control memory is being performed, signals DL26-DL29 at the outputs of AND-gates 470-473 respectively represent the signals generated by switches 465-468. Signals DL26-DL29 form the ninth through twelfth bit of the eighteen-bit address transmitted to memory by address signal transmitters 446 of memory communications unit 415. Signals DL26-DL29 therefore determine which block of control memory contains the memory locations for storing mailbox and interrupt queue words. If signal DUSM is a binary 0, the ninth through twelfth bits of the eighteen-bit address transmitted to each of the memory ports is determined by signals JL26-JL29, which represent the states of flip-flops L26-L29 respectively of the L-Register 441 in the processing and control unit.

PORT ADDRESS ASSIGNMENT SWITCHES

Figures 43, 44:
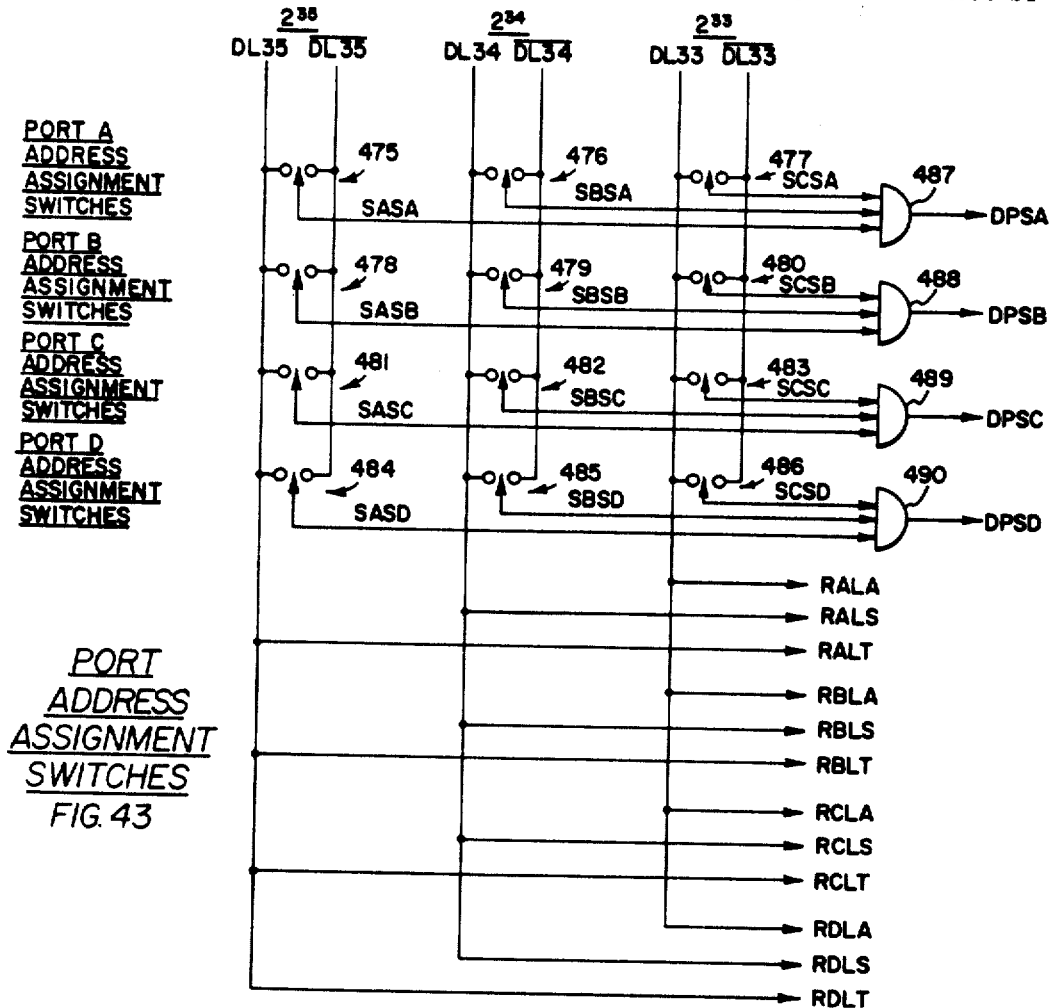
FIGURE 43 is a diagram illustrating the port address assignment switches.
FIGURE 44 is a chart illustrating port address assignment.

FIGURE 43 illustrates the port address assignment switches and accompanying logic which generate signals DPSA, DPSB, DPSC and DPSD. One of these signals issues in response to each address stored in the L-Register 441 of processing and control unit 419 to identify the port connected to the memory having the address range including the address in the L-Register. Referring to FIGURE 43, the three highest-order address signals DL33–

DL35 from L-Register 441 and the logically inverse forms of these signals are applied to respective pairs of contacts of port A address assignment switches 475, 476 and 477, port B address assignment switches 478, 479 and 480, port C address assignment switches 481, 482 and 483, and port D address assignment switches 484, 485 and 486. The movable contact of each of switches 475–486 may be moved to make an electrical connection with either of the two fixed contacts of the switch or may be left in the neutral position out of contact with either of the fixed contacts. In the neutral position, the output signal from the switch is floating.

The output signals from each of these switches associated with one of the ports, for example port A, are applied to an AND-gate. The output signals of the port A address assignment switches are applied to AND-gate 487, the output signals of the port B address assignment switches are applied to AND-gate 488, the output signals of the port C address assignment switches are applied to AND-gate 489 and the output signals of the port D address assignment switches are applied to AND-gate 490. The output signals of AND-gates 487–490 are designated DPSA–DPSD respectively.

The positions of the movable contacts of the address assignment switches and the states of the input signals to the address assignment switches determine which of AND-gates 487–490 will be enabled to generate its corresponding output signal to select one of the four memory ports. FIGURE 44 illustrates the possible combinations of switch settings when the low-order switch is moved between the binary 1, the binary 0 and the neutral position while the two higher-order switches are in either the binary 1 or binary 0 positions. This pattern of switch settings is employed when the memory connected to each memory port has a maximum storage capacity of 65,536 words. Thus, if port A is connected to a memory having a storage capacity of 65,536 words and if switch 475 is switched to $\overline{DL35}$, switch 476 is switched to DL34, and switch 477 is switched ot the neutral position, any address in the range of 65,536 through 131,071 will cause signal DPSA to issue, causing memory access interrupt request signal RAL9 to be transmitted to the memory connected to port A and permitting illegal action code signals JAAA, JAAB and JAAC to be received from the memory connected to port A.

CONTROL MEMORY SELECTION SWITCH

Figure 45:
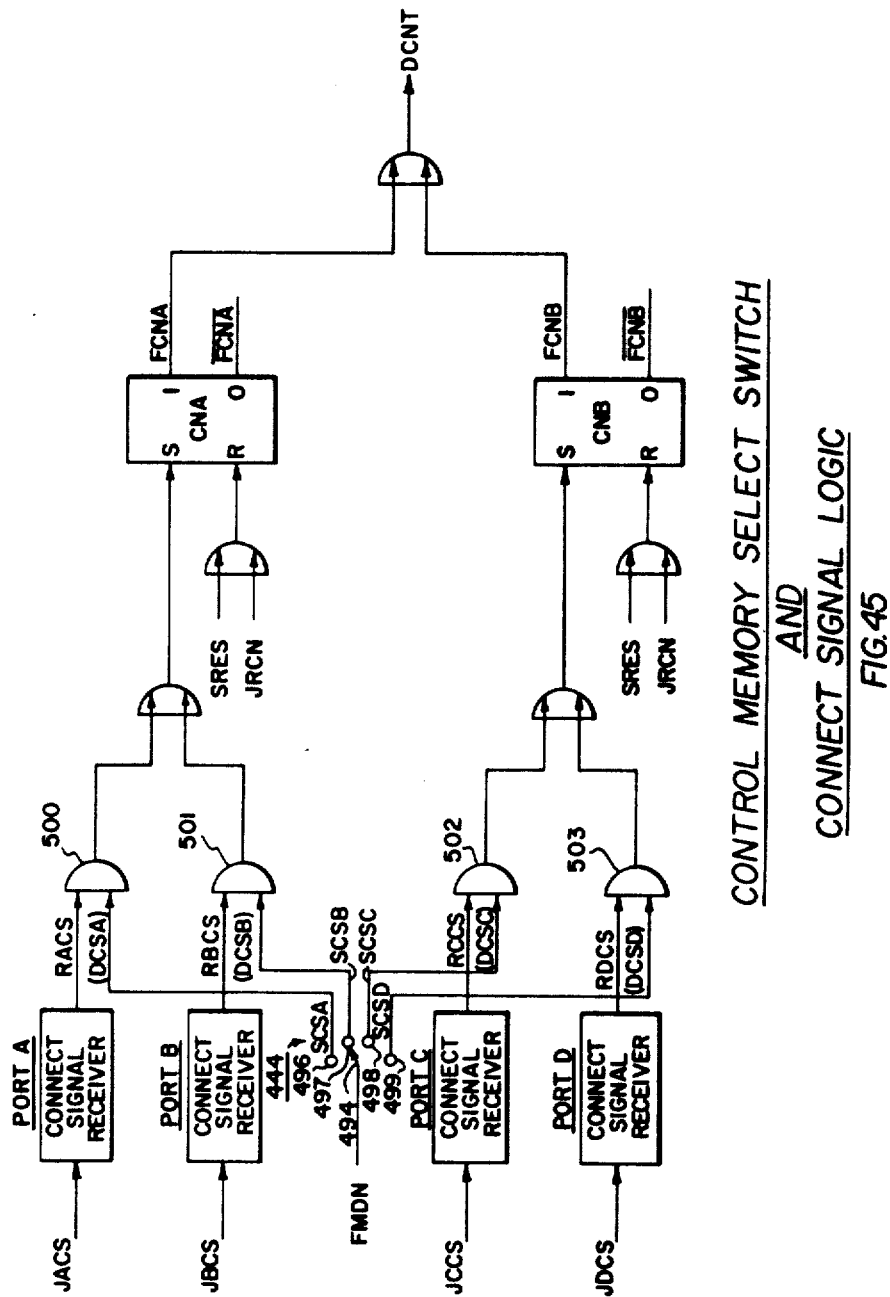
FIGURE 45 is a logic diagram illustrating the control memory selection switch and the connect signal logic.

FIGURE 45 illustrates the control memory selection switch 444 of control panel 426 and the associated logic for controlling the port through which a connect signal will be accepted by input/ouptut controller 401. Referring to FIGURE 45, the movable contact 494 of the control memory selection switch 444 is energized by signal FMDN and is movable to form an electrical contact with any one of four fixed contacts 496–499, each fixed contact being associated with one of the four memory ports; fixed contact 496 is associated with port A while fixed contacts 497, 498 and 499 are associated with memory ports B, C and D respectively. If movable contact 494 is positioned to form an electrical connection with fixed contact 496, signal SCSA issues to provide signal DCSA to AND-gate 500. If movable contact 494 is positioned to form an electrical connection with fixed contact 497, signal SCSB issues to provide signal DCSB to AND-gate 501. Similarly, if movable contact 494 of control memory selection switch 444 is positioned to form an electrical contact with either of fixed contact 498 or 499, signals SCSC or SCSD issue to provide signals DCSC or DCSD respectively to AND-gates 502 and 503. Signals DCSA, DCSB, DCSC and DCSD are enabling signals which permit a connect signal received from the memory connected to the corresponding port to be accepted in input/output controller 401. A connect signal accepted from either port A or port B causes flip-flop CNA to be set to the 1-state, causing signal DCNT to issue. Similarly, if a connect signal is accepted from either port C or port D, flip-flop CNB is set to the 1-state, causing signal DCNT to issue, Thus, control memory selection switch 444 permits input/output controller 401 to accept a connect signal only from the memory connected to the port corresponding to the position of control memory selection switch 444. Control memory selection switch 444 thus designates the memory port to which the control memory is connected.

*Input/output controller—Operation*

An operation in input/output controller 401 is initiated by a connect signal JACS received through the memory port connected to the memory specified by control memory selection switch 444 to be the control memory. In response to the connect signal from the control memory, flip-flop F07 of F-Register 445 is set to the 1-state. If no peripheral channel service requests or program interrupt requests are present in input/output controller 401, signal FF07 causes program address generation unit 425 of memory communications unit 415 to jump to a predetermined address corresponding to the first microstep of a sequence for servicing the connect signal from memory.

In response to resulting control signals generated by microprogram storage unit 416, processing registers and logic 460 of processing and control unit 419 transfer a memory address and a memory command into L-Register 441, in addition to setting flip-flop L09 to the 1-state. Signal FL09 causes the memory access interrupt request signal transmitters and logic 453 of the memory port connected to the control memory to generate memory access interrupt request signal RAL9 for transmission to the control memory. In response to the memory command information stored in L-Register 441, the memory command signal transmitters 450 of the appropriate memory port transmit memory command signals RACA–RACD to memory, to specify a read/restore operation. The address signal transmitters 446 of the appropriate memory port transmit to memory as address signals RALA–RALT the address information contained in L-Register 441, as modified by the control block starting address assignment switches 448.

In response to memory access interrupt request signal RAL9, memory command signals RACA–RACD and address signals RALA–RALT, the memory transmits the primary mailbox word, represented by signals JA00–JA35, from the predetermined storage location to the information signal receivers and logic 433 of the memory port. When the primary mailbox word is available on the information lines, memory also transmits the data available/stored signal JADS to the data available/stored signal receiver 436 of the memory port. Upon receipt of the latter signal, the primary mailbox word is stored in Q-Register 432. Subsequently, memory transmits illegal action code available signal JAAS to the illegal action signal receiver 430 of the memory port and illegal action code signals JAAA–JAAC to the illegal action code signal receivers and logic 454 of the memory port. This illegal action code is then stored in Q-Register 432 of processing and control unit 419. The primary mailbox word is transferred from Q-Register 432 to the processing registers and logic 460 of processing and control unit 419 which proceeds to execute the IOC command contained in the primary mailbox word. In the process of executing the IOC command, the input/output controller may read one or more of the secondary mailbox words from the predetermined storage locations of the control memory into processing registers and logic 460. The control signals directing the performance of the microsteps required to execute the IOC command are generated by microprogram storage unit 416 in response to a sequence of addresses provided by program address generation unit 425 of memory communications unit 415.

During execution of an IOC command, information may be transferred between memory and a peripheral subsystem connected to peripheral channel unit 417. The path of information transfer within input/output controller 401, for a transfer of information from memory to a peripheral subsystem, comprises memory communications unit 415, processing and control unit 419, buffer storage unit 418 and peripheral channel unit 417, in that order. For an information transfer from a peripheral subsystem to memory, the information transfer path comprises peripheral channel unit 417, buffer storage unit 418, processing and control unit 419 and memory communications unit 415, in that order.

In the course of transferring information from a peripheral subsystem to memory, input/output controller 401 temporarily stores informaiton, which may be either a single character or a full word of six characters, in U-Register 440. The address of the memory location in which the information is to be stored is inserted in L-Register 441. A clear/write command for memory is also stored in L-Register 441. If the information to be transferred to memory comprises a single character, zone information is also inserted in L-Register 441 by processing registers and logic 460. Flip-flop L09 of L-Register 441 is set to the 1-state, as previously described, to cause memory access interrupt request signal R∆L9 to be transmitted to the memory connected to the appropriate memory port. The memory port transmitting the memory access interrupt request signal is determined by port address assignment switches 452 which compare the memory address in L-Register 441 to the range of addresses assigned to each of the memories. Only the memory port connected to the memory having the range of addresses including the address in L-Register 441 is permitted by the port address assignment switches 452 to transmit the memory access request signal R∆L9.

Information signal transmitters 438, address signal transmitters 446, memory command signal transmitters 450 and zone control signal transmitters 451 of the selected memory port provide the information, address, command and zone signals to the corresponding memory. When memory grants the memory access interrupt request and stores the information, either a character or a word, in the addressed memory location, memory transmits the data available/stored signal J∆DS to the memory port to indicate that the information has been stored and that the information, address, command and zone control signals may be removed from the lines.

In the course of an information transfer from memory to a peripheral subsystem, the processing registers and logic 460 of processing and control unit 419 load L-Register 441 with the address of the memory location containing the desired information, the memory command specifying a read/restore operation, and zone information if only a single character is to be transferred from memory. As with an information transfer to memory, port address assignment switches 452 determine to which memory a memory access request signal R∆L9 is transmitted. Upon completion of the read/restore cycle in memory, the information is provided to the memory port in the form of signals J∆00–J∆35 along with the data available/stored signal J∆DS. If only a single character is being transferred, zone signals D∆Z0–D∆Z5 generated by logic gates 435 gate the desired character through the information signal receivers and logic of the memory port for application to Q-Register 432. The information in Q-Register 432, either a character or a word, is transferred by processing registers and logic 460 through buffer register unit 418 to peripheral channel unit 417 for transfer to the peripheral subsystem.

Subsequent to each memory cycle, memory transmits to input/output controller 401 illegal action code signals J∆AA–J∆AC to indicate whether or not an error occurred during the memory cycle and, if so, the type of error detected. Memory also transmits to input/output controller 401 the illegal action code available signal J∆AS to indicate the time at which the illegal action code signals correctly represent memory operation. The illegal action code signals, which may indicate one of a number of conditions, for example no error, parity error, non-existent address, etc., are stored in Q-Register 432. If a memory error is indicated by the illegal action code signals, input/output controller 401 may transmit a program interrupt request to memory to service the error.

Three types of program interrupt requests may be made by input/output controller 401 to memory, viz. initiation interrupt requests, terminate interrupt requests and special interrupt requests. Each of these three types of program interrupt requests occurs due to predetermined conditions in the input/output controller or the peripheral subsystems. Upon occurrence of a program interrupt request, the appropriate interrupt queue table is located with status and other information for use by a processor in servicing the interrupt. The corresponding interrupt queue counter is incremented. The "set execute interrupt cells" command is then stored in L-Register 441 and information regarding the type of program interrupt request is stored in U-Register 440. Flip-flop L09 of L-Register 441 is set to the 1-state, causing a memory access interrupt request signal R∆L9 to be transmitted to memory. The "set execute interrupt cells" command transmitted to memory by memory command signal transmitters 450 of the selected memory port causes a predetermined interrupt cell of memory to be set to the 1-state. Input/output controller 401 then continues operation while a processor serves the interrupt.

MEMORY CONTROLLER

General

The memory controller comprises a subsystem for receiving command, address, and data information from data processors and input/output controllers. The memory controller controls the access to a memory core system and also provides communication control between data processors and/or input/output controllers. The controller acts as a data processing coordinating device for overseeing intersystem communication as well as performing certain functions within itself. A basic data processing system may contain a single memory controller; however, multi-processor or multi-computer configurations may utilize several memory controllers. In those environments wherein more than one memory controller is used, each of the memory controllers are independent of each other and may function simultaneously thereby providing parallelism in memory accessing of the corresponding core memory system. Each memory controller is associated with a core memory system which, in the embodiment chosen for illustration, is divided into an internal and an external core block. The address scheme utilized in the embodiment chosen for illustration includes eighteen bits thereby rendering it possible for a single memory controller to control access to a total of 256K locations or alternatively, for a group of memory controllers to collectively access a total of 256K locations.

The memory controller of the present invention provides eight ports or channels for connection to processors or input/output controllers. The channels are numbered 0–7 and are provided with an alterable positional priority in increasing order of their numbers 0–7. The priority scheme permits the simultaneous receipt from communicating devices (processors or input/output controllers) of memory access request signals (channel interrupt requests). The memory controller will temporarily store these requests and service the channels in accordance with the priority scheme.

Data transfers between communicating devices and the memory controller are word oriented and, in the embodiment chosen for illustration, thirty-six bits are transferred at one time for single precision data transfers and two successive thirty-six bit words are transferred for double precision transfers. The memory controller and its associated memory core systems operate on a sevently-two bit time basis and access a seventy-two bit word from memory at each memory access. The seventy-two bits correspond to two instructions, two data words, or one double precision word fixed or floating point.

The memory controller receives commands from the communicating devices and, once a communicating device has been awarded priority, the command sent by it to the memory controller is decoded and performed. The commands are divided into two categories to be described in greater detail later; however, one category of command involves the interaction of the memory controller with its associated memory core system whereas the other category involves the transfer of information to and from registers in the memory controller without access to the memory core system.

Figure 46:
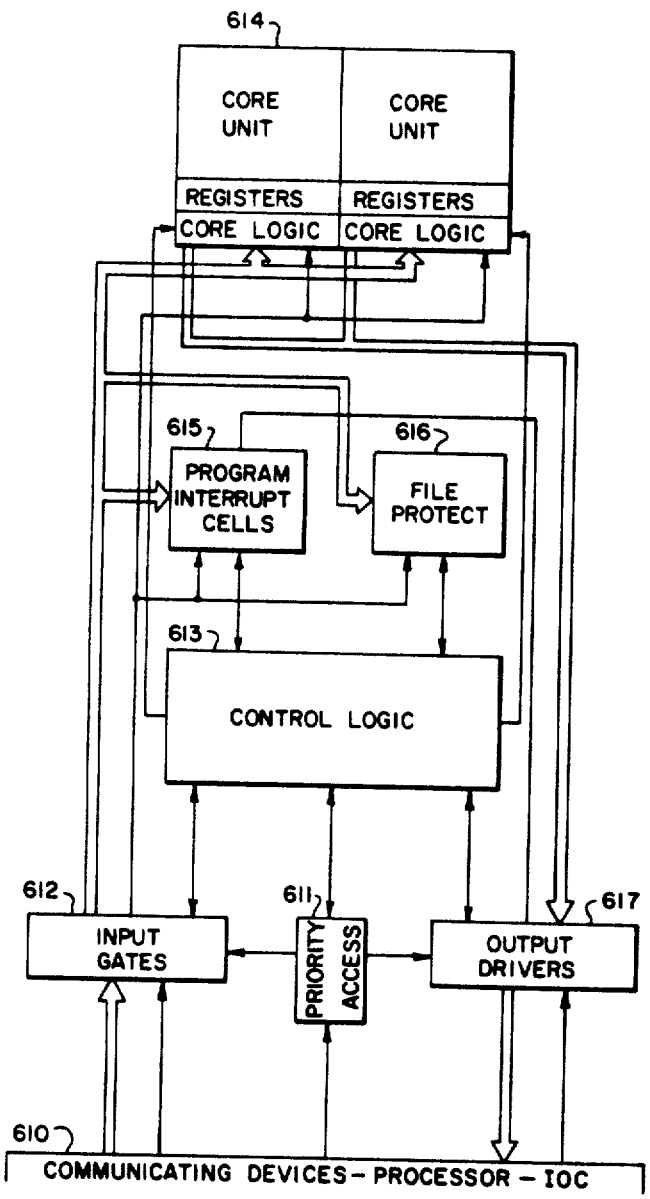
FIGURE 46 is a schematic block diagram, greatly simplified, showing the interrelationship of elements of the memory controller.

A simplified block diagram is shown in FIGURE 46 of the memory controller of the present invention. Referring to FIGURE 46, a memory controller interface is shown basically at 610 and indicates the connections between the communicating devices at the eight ports or channels of the memory controller. The communicating devices may be processors or input/output controllers or, in those instances requiring special devices, the controller may be connected to such equipment as real time input/output controllers. The heavy lines of FIGURE 46 generally indicate the transfer of data whereas the lighter lines indicate command and control information. The communicating device applies command and data information to the memory controller as well as a signal representing a request for access. The request for access or channel interrupt is applied to a priority and access arrangement illustrated in FIGURE 46 by the block 611. When the communicating device has been awarded priority, the data and control information is gated through input gates 612; the commands accompanying the data are applied to the control logic 613 which decodes the commands and subsequently provides the necessary decoded command information to the memory core system 614, to the program interrupt cell 615, and to the file protect block 616. The data gated by the input gates 612 may be used to load the interrupt cell 615, the file protect block or register 616, and is most frequently utilized to address and load or read the memory core system 614. When information is to be read from the memory core system 614, the appropriate addresses are applied thereto and the contents of the core units stored in memory registers which are read through the core logic to output drivers 617. The output drivers are gated by the priority logic and provide the requested information to the communicating device. The contents of the program interrupt cells and the file protect register may also be read to a communicating device upon execution of an appropriate command.

Thus, it may be seen that communicating devices may access core memory through the memory controller and be provided with the requested information in accordance with the predetermined priority awarded to the communicating device. Similarly, functions of program interrupt and file protect (to be described later) are also provided by the memory controller and do not require access time to the memory core system.

Figure 47A:
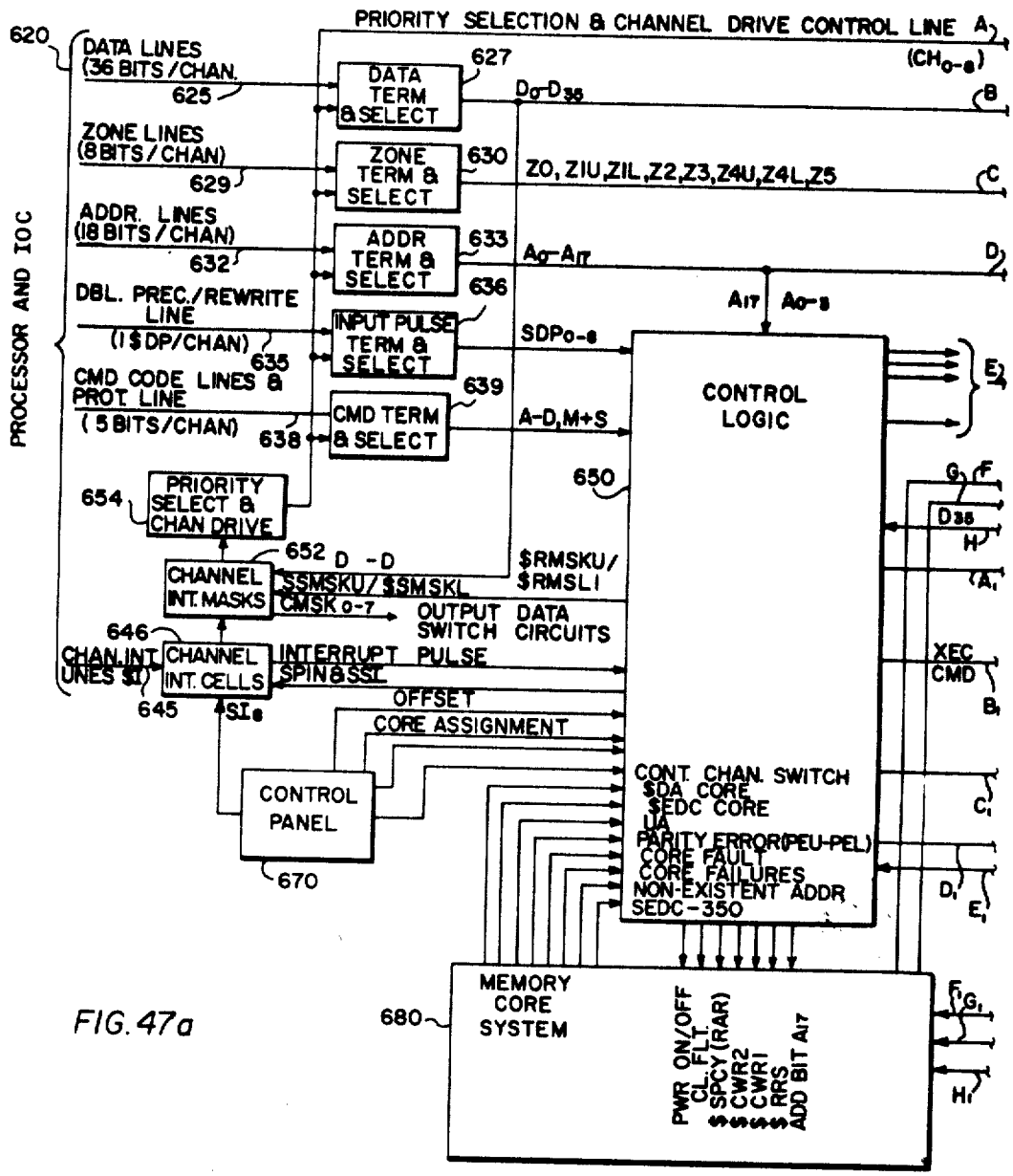
FIGURES 47a and 47b are collectively a schematic block diagram, in greater detail than FIGURE 46, of the memory controller.
Figure 47B:
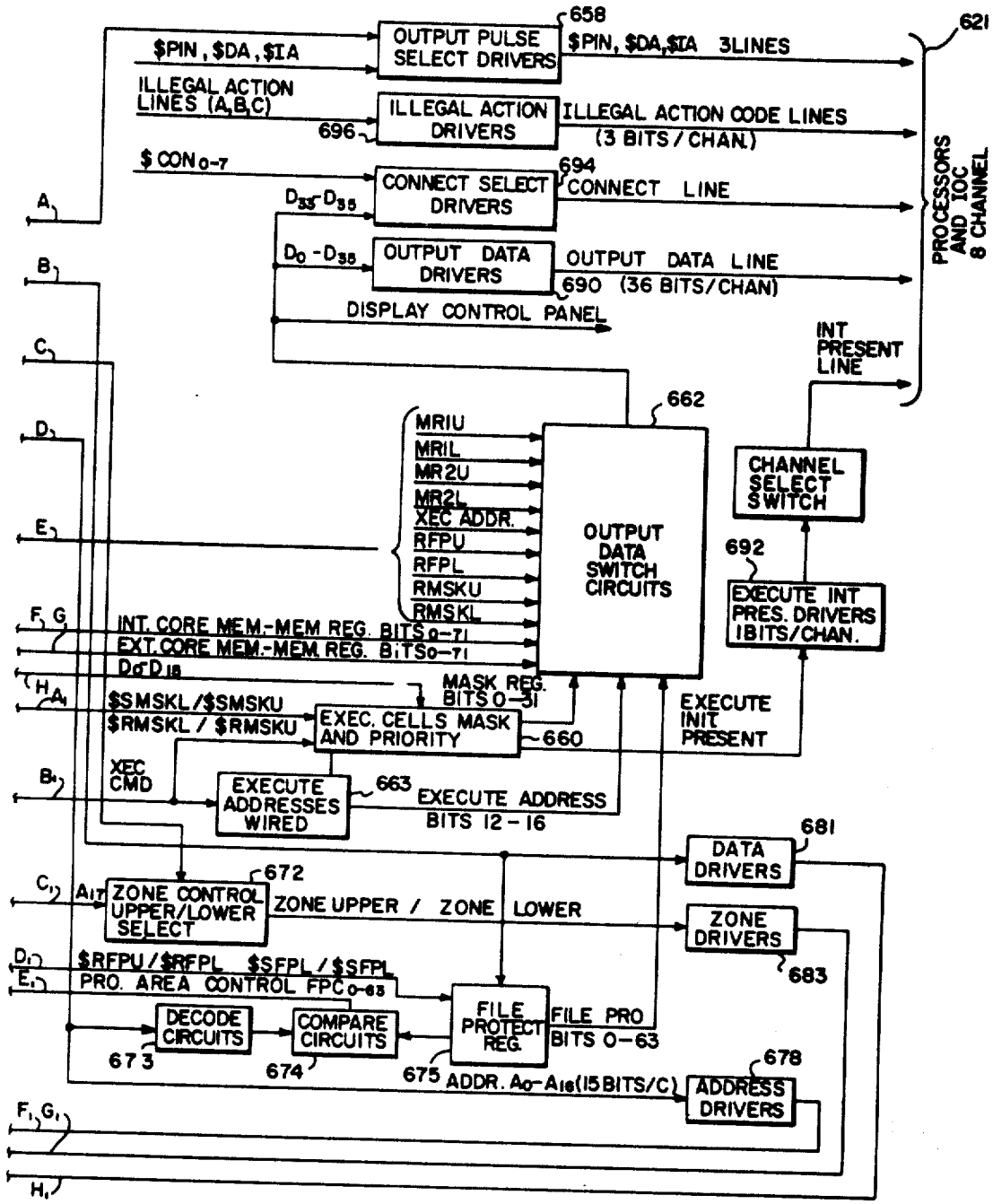

A more detailed description of the memory controller of the present invention may be seen by reference to FIGURE 47 wherein the memory controller is divided into logical functional blocks to facilitate the discussion of the subsystem. Referring to FIGURE 47, it may be seen that two interfaces 620 and 621 are shown. It will be understood that the interface 620 represents the incoming portion of the memory controller channels and interface 621 represents the output of the same memory controller channels, the division of the input and output interfaces merely being chosen to facilitate the description of the system. The memory controller receives thirty-six bit data words over thirty-six data lines 625; the bits of a data word are designated $D_0$–$D_{35}$ (these memory controller data bits correspond to input/output controller data bits $RA00$–$RA35$ and to processor data bits $DO_0$–$DO_{35}$, respectively). A data termination and select circuit 627 provides a gating means for the data from each of the eight channels.

The memory controller receives zone information from the communicating device over eight zone lines each providing one of eight zone bits. The eight bits of the zone code are designated Z0, Z1U, Z1L, Z2, Z3, Z4U, Z4L and Z5. The zone lines are connected to the zone termination and select circuit 630 which gates the zone information to the memory controller when the communicating device is awarded priority. The zone signals correspond to $RAL1$, $RAL4$, $RAZ0$–$RAZ5$ in the input/output controller and to TA0001–TA7001 in the processor.

Eighteen address lines 632 are connected to the memory controller from the communicating device each line providing one of eighteen address bits. The address bits are designated $A_0$–$A_{17}$ and are applied to an address termination and select circuit 633 which gates the address information applied thereto in accordance with the priority awarded each corresponding memory controller channel. The address bits are designated $RALA$–$RALT$ in the input/output controller and R00101–R17101 in the processor.

A double precision/rewrite line 635 is connected from the communicating device to an input pulse termination and select circuit 636 the latter being gated by an appropriate gating signal in accordance with the channel having priority. Four command code lines and one protect line 638 are connected to the command terminate and select circuit 639. The four bit command code provides a memory controller instruction to enable the controller to perform predetermined tasks. The protect line is utilized as a means for detecting the master or slave mode of the processor connected thereto. When the protect line is at a logic level of a binary 1 the connected processor is in the master mode; conversely, when the protect line is at a logic level binary 0, the connected processor is in the slave mode. Certain equipment, such as input/output controllers, have their respective protect lines wired to provide a permanent master mode indication; the reasons for the wired logic level will become apparent as the description thereof proceeds.

The data lines present a thirty-six bit data word to the memory controller for manipulation in the controller and/or for storage of the information in the memory core system. The zone lines present a six or nine bit option as will be described later and permit predetermined character configurations to be read or written in the thirty-six bit data word. The address lines include an eighteen bit address which selects and retrieves a seventy-two bit word from the memory core system; the least significant bit $A_{17}$ is then utilized to operate upon either the upper or lower half of the seventy-two bit word thus retrieved from the memory core system. The double precision/rewrite line is utilized to provide a double precision pulse $DP for those manipulations within the memory controller designated as double precision functions. For example, when writing a double precision (seventy-two bits) word into memory, it is necessary to write the word by applying thirty-six bits to the memory controller and subsequently following with another thirty-six bits and a double precision pulse over the double precision/rewrite line. The function of the pulse and the double precision line will become apparent as the description proceeds.

The memory controller is also connected through the channel interrupt or memory access lines 645 to the communicating devices. When a memory access request or channel interrupt is applied to the memory controller, the pulse $I_{0-7}$ is applied to the channel interrupt cells 646. The request for access is temporarily stored and the control logic 650 of the memory controller is informed that a channel or communicating device is requesting time. The channel interrupt cells are connected to a channel interrupt mask circuit 652 which provides a means for inhibiting the awarding of priority to any given channel. If the channel mask for the requesting channel is not set, then the request for priority is applied to a priority select and channel drive circuit 654. This circuit provides the predetermined wired priority together with the alterable priority selection scheme to be described in greater detail in the section pertaining to the priority scheme. Once priority has been awarded by the priority select and channel drive circuit 654, the gating circuits for admitting the data bits, zone bits, address bits, double precision bit, command code bits and protect line bits are enabled thus admitting the corresponding binary information to the memory controller. Simultaneously, the priority select and channel drive circuit 654 gates output pulse select drivers 658 to permit the application of pulses (to be described) to the communicating device which has been awarded priority.

The thirty-six data bits gated through the data termination and select circuit 627 are applied throughout the memory controller for a variety of functions. Data bits $D_{32}$–$D_{35}$ are applied to the channel interrupt mask circuit 652 to set the channel interrupt masks in accordance with the bit configuration of the four least significant bits of the data word. Data bits $D_0$–$D_{15}$ are also applied to execute interrupt cells 660 to permit the loading of the execute interrupt cells with an appropriate bit configuration representing program interrupts. The execute interrupt cells, in the embodiment chosen for illustration, include thirty-two cells each placed in the set or reset state in accordance with the existence or nonexistence of a program interrupt. Since data bits $D_0$–$D_{15}$ are utilized to load the execute interrupt cells, and since there are thirty-two execute interrupt cells, data bit $D_{35}$ is applied to the control logic 650 to designate whether the upper or lower half of the execute interrupt cells are to be loaded by the data bits $D_0$–$D_{15}$. A set execute command decoded by the control logic 650 combined with the data bit $D_{35}$ results in the generation of the set execute cell lower or set execute cell upper pulses $SXCL or $SXCU. The execute cells may also be masked thereby preventing program interrupts on certain cells in a manner to be described more completely hereinafter. The set mask command also utilizes the data bits $D_0$–$D_{15}$ and data bit $D_{35}$; the execute interrupt cells include a mask flip-flop for each flip-flop of the interrupt cells and may be set in accordance with a predetermined mask configuration. Further, the contents of the mask flip-flops may be read through the generation of a read mask command. The application of the read mask pulse $RMSK to the execute interrupt cells 660 results in the application of the contents of the mask register being applied to output data switch circuits 662 which gates the information to the communicating device. If any execute interrupt cell 660 is in a set condition, thereby indicating that a program interrupt is requested, an execute interrupt present signal is applied to the control processor connected to the memory controller.

Each of the execute interrupt cells 660 has associated therewith a wired address which, when an execute command XEC is returned to the memory controller in response to execute interrupt present signal XIP, will apply a five bit address corresponding to the execute interrupt cell that has been set to the output data switch circuits for application to the communicating device. The five bits of the wired execute interrupt cell address are applied to the output in data positions 12–16.

The memory controller is provided with a control panel 670 which provides numerous manual control functions through the expediency of switches such as address assignment, offset switches, etc. (these functions and switches will be described in the section relating to the control panel). The control panel also provides testing and diagnostic functions and is connected to the channel interrupt cells 646 to permit the control panel to gain priority over communicating devices to enable diagnostic routines and test procedures. The control panel is connected to the control logic 650 tnd communicates therewith to provide the many test and indicating functions; however, three of the most important functions of the control panel are the setting of specific switches which materially affect the overall system configuration and the ability of the memory controller to cooperate with memory core systems of various sizes. These switches include an offset switch, a core assignment switch and a control channel switch.

The eighteen bit address applied to the memory controller is gated through the address termination and select circuit 633 and is utilized within the memory controller to access designated areas of the memory core system as well as to perform certain other functions to be described later. Data bits $A_0$–$A_{16}$ are used to access a specific seventy-two bit word location in the core memory; the address bit $A_{17}$ is utilized to select the upper or lower half of the seventy-two bit word thus permitting the reading and writing of thirty-six bit words. Bit $A_{17}$ and bits $A_0$–$A_3$ are applied to the control logic circuit 650 to permit the control of the upper or lower selection in the reading or writing in the core system as well as to permit certain functions to be performed in connection with the three most significant bits $A_0$–$A_3$ by combining and decoding these bits with the logic levels provided by the offset and core assignment switches on tne control panel 670.

Address bit $A_{17}$ is also applied from the control logic circuit 650 to the zone control upper/lower select circuit 672 to control which half of the seventy-two bit data word will be utilized in the data word manipulation specified by the decoded command applied to the memory controller. Address bits $A_2$–$A_7$ are also applied to decoding circuit 673, the output of which are applied to compare circuit 674 for comparison with the contents of a file protect register 675. The file protect register contains information relating to specified areas of memory that are to be protected and are not to be accessed. Thus, address bits $A_2$–$A_7$ are decoded and compared to the contents of the file protect register and a positive comparison results in the application of a file protect signal applied to the control logic circuits 650 indicating that a protected area of memory has been accessed. The file protect system will help prevent the accessing or destruction of predetermined areas of memory unless certain conditions exist. The file protect register 675 is, in the embodiment chosen for illustration, a sixty-four bit register each bit corresponding to a 1K block of memory to be protected. A file protect register is loaded by the application thereto of the thirty-six data bits $D_0$–$D_{35}$ together with a set file protect pulse $SFP and is loaded one-half at a time by using two set file protect pulses representing the upper and the lower half of the file protect register. The contents of the file protect register may also be read out to a communicating device to the application of a read file protect upper $RFPU and a read file protect lower $RFPL pulse thereto; in response to the read file protect pulse, the contents of the file protect register are applied through the output data switch circuits 662 to the communicating device.

The address bits $A_0$–$A_{16}$ are applied through address drivers 678 to the memory core system 680, the data bits $D_0$–$D_{35}$ are also applied to the memory core system through data drivers 681.

The zone lines 629 gated through the zone termination and select circuit 630 applies zone information to the zone control circuit 672. The zone information comprising an eight bit code designates what specific portions of a thirty-six bit data word are to be read or altered. The application of the eight bit zone code to the zone control 672 together with the application thereto of the address bit $A_{17}$ results in the zone code being applied to the upper or lower half of the seventy-two bit data word being accessed in memory. The zone codes are applied to the memory core system through zone drivers 683.

The control logic circuit 650 provides the necessary sequencing, timing, decoding and logic for the memory controller. The control logic circuit 650 receives, as indicated previously, address bits $A_{17}$ and $A_0$–$A_3$, as well as data bit $D_{35}$. The control logic also receives the command code and the double precision pulses received from the communicating device. The control logic receives and interprets a memory access request or channel interrupt pulse and also receives an indication from the compare circuit 674 that a protected area of memory is being accessed. The control logic circuits provide numerous control and timing signals to circuits throughout the memory controller system. The control logic also acts as the principle control signal communication link with the memory core system 680. Such functions as power on/off and clear fault are provided to the core memory system from the control logic as well as pulses representing decoded memory core system cycles and the commands read/alter/rewrite RAR, clear/write double precision CWR2, clear/write single precision CWR1, read/restore RRS and the logic level of a flip-flop set in accordance with the logical value of the address bit $A_{17}$.

The memory core system provides the control logic with a plurality of signals each indicating certain necessary control information. The memory core system provides the control logic 650 with a data available pulse $DA_{CORE}$ to indicate that the memory register is loaded from the core and is available for transmission by the control logic to the communicating device. An end-of-cycle pulse $EOC_{CORE}$ tells the control logic 650 that the memory core system has completed its cycle and is available for the next cycle; the unit available logic level UA indicates the readiness of the memory core system and a preliminary end-of-cycle signal $EOC–350 is a preliminary end-of-cycle pulse to the control logic to indicate that within 350 nanoseconds the memory core system will be available for the next cycle. The condition of the memory core system and the information contained therein is also provided to the control logic 650 in the form of signals representing parity error, core fault, core failure or the application to the memory core system of a nonexistent address.

The memory core system loads memory registers with the addressed contents of the cores and applies the memory register output to the output data switch circuits 662. In the embodiment chosen for illustration, the memory core system is divided into two blocks of memory designated as internal core and external core. Each of these core blocks include a seventy-two bit memory register and each is connected to the output data switch circuits. The gating of the contents of the memory register bits to the communicating device is under the control logic 650. The contents of the memory registers are applied to the output lines through the expediency of gating signals applied to the output data switch circuits designating which memory registers and which half of the memory register is to be applied to the output lines. Thus, the control signals MR1U, MR1L, MR2U and MR2L designate the first or second memory register and whether the upper or lower half of that register is to be applied to the output data lines.

When an execute interrupt cell is set and a program interrupt is present, as stated previously the wired address of the execute interrupt cell having been set is gated to the output lines. The control signal XEC ADDR applied to the output data switch circuit 662 from the control logic 650 accomplishes the gating of this wired address. The file protect register may be read and the gating of the contents of the upper or lower half of the register is accomplished by the application of control signals read file protect RFPU or RFPL to the output data switch circuits from the control logic. Similarly, the condition of the channel mask flip-flops in the channel interrupt masks 652 and the condition of the mask flip-flops corresponding to the execute interrupt cells 660 may also be read by gating the contents thereof through the output data switch circuits by application thereto of the read mask signals RMSKU and RMSKL from the control logic.

The output data bits $D_0$–$D_{35}$ are applied to the communicating device through the interface 621 after appropriate amplification and impedance matching through the output data drivers 690. The data bits may also be applied to the display on the control panel.

Certain other pulses and information are applied to the communicating device from the memory controller. As discussed previously, the set condition of an execute interrupt cell results in the signal execute interrupt present XIP being applied to the control processor. The signal XIP is delivered to the communicating device through the execute interrupt present driver 692 which applies the signal to the control processor designated by the channel select switch of the control panel. A specific command designated as connect and resulting in a connect pulse $CON is generated by the control logic 650; the pulse is applied to the connect select pulse drivers 694 which apply the connect pulse to a memory controller channel designated by the decoded three least significant bits of the data word applied from the output data switch circuits $D_{33}$–$D_{35}$. The connect command will be described more completely under the section on commands; however, the connect command results in the accessing of a word from memory, the application of this word to the output data lines, the application of the data bits $D_{33}$–$D_{35}$ and the connect pulse $CON to the connect select pulse drivers 694 which provide the connect pulse to the memory controller channel corresponding to the decoded bit configuration of data bits $D_{33}$–$D_{35}$.

The control logic 650 also detects certain illegal actions and encodes the actions into a three bit code which is applied through the illegal action drivers 696 to the communicating device. The illegal action codes designate such things as parity error, a command received from other than a control processor when only the control processor is authorized to issue such a command etc. The illegal action code provided to the communicating device is accompanied by an illegal action pulse $IA which is provided from the control logic 650 to the output pulse select drivers 658. The communicating device to receive the illegal action pulse has been designated by the priority select and channel drive circuits 654 which gate the illegal action pulse to only the presently communicating device. The same output pulse select drivers utilized to transmit the illegal action pulse $IA to the communicating device are used to provide a data available pulse $DA and a cycle started delayed pulse $PIN to the communicating device. The data available pulse $DA indicates to the communicating device that data information is no longer required by the memory controller or, in the case of data being read from memory, indicates that the data being read is on the data output lines. In those instances where a double precision command is being executed, two data available pulses $DA1 and $DA2 are provided to the communicating device. The cycle started delayed pulse $PIN is provided to the communicating device to indicate that the zone, address and command information is no longer required by the memory controller and that the communicating device may prepare new zone address and command information to apply to the memory controller on the next memory controller cycle to which the communicating device is awarded priority. Double precision commands are accomapnied by two cycle started delayed pulses $PIN1 and $PIN2. The communicating device is thus apprised when its control information provided to the memory controller may be removed from the controller input lines and when to generate new command information. Even though control information may be removed from the controller input lines, the communicating device must nevertheless leave data information on the data lines until the receipt of a data available pulse $DA indicating that the data lines are no longer needed for the execution of present command.

The description of the memory controller of the present invention is given in terms of a specific embodiment and in terms of a specific memory core system. The speed with which the memory controller operates will be determined in part by the operating speed of the core units used in the memory core system. Thus, timing and gating signals will be generated and delayed in accordance with the speed at which the memory core system can operate. For example, a signal may be designated as another signal delayed by a predetermined time; it will be obvious that if the memory core system were to be changed so that its speed is increased or decreased, the timing and delays of various signals throughout the system will differ from that given in the embodiment chosen for illustration. A specific example is shown in FIGURE 47 wherein the preliminary end-of-cycle pulse $EOC–350 from the memory core system 680 indicates that the end-of-cycle pulse $EOC will follow the preliminary pulse by approximately 350 nanoseconds. The specific time, 350 nanoseconds, depends on the speed with which the memory core system operates and if a faster memory is used, this particular time delay will be changed. Similar examples may be cited throughout the memory controller description; however, specific reference to a particular delay time will be avoided unless it is deemed necessary to utilize the particular time delay in the complete understanding of the operation of the memory controller of the present invention.

*Channel interrupt (memory access request)*

As stated previously, the memory controller is connected to communicating devices such as data processors and/or input/output controllers and acts as a communications receiver and transmitter between the devices. Eight channels are provided, each of which terminates at a port adapted to receive a connector from a communicating device. To facilitate the orderly reception and transmission of commands, data, etc., a priority arrangement is provided and is arranged to permit the communicating devices to be connected to the controller in accordance with a desired priority of communication. Within each of the ports provided for connection to a communicating device there is provided a channel interrupt line or a memory access interrupt line. The terminology "channel interrupt" connotes the request by a communicating device to gain access to and communicate with the memory controller; since the memory controller is primarily concerned with operations affecting memory, the term "memory access interrupt request" may also be used. Care should be taken not to confuse the term channel interrupt or memory access interrupt with the term "program interrupt." The latter term, to be explained more completely hereinafter, is intended only for those situations where a specific operation within the memory controller is to be executed in conjunction with the interruption of a program in process in one of the communicating devices.

The channel interrupt lines, one for each channel, are connected to a plurality of registers arranged to temporarily store and subsequently manipulate the interrupt request in a predetermined manner. The predetermined priority may be a completed wired priority, or, if desired, switches are provided to enable the priority to implement a priority sharing scheme wherein certain selected high priority channels are prevented from monopolizing communications with the memory controller.

To become familiar with the channel interrupt or memory access interrupt scheme of the present memory controller, reference will now be made to FIGURE 48 wherein a simplified block diagram is shown of the channnel interrupt cells or registers, the channel interrupt mask registers and the priority selection. Channel interrupt requests are represented in FIGURE 48 by signals designated as $I_0$–$I_7$. These eight channels are each connected to a communicating device and a request from any communicating device is defined by the existence of a logic 1 signal on the channel interrupt line connected to that device. This channel interrupt request signal is responsible for setting an A flip-flop in the channel interrupt A-Register; the A-Register provides a temporary storage of the interrupt request until the memory controller cycle starts. Based upon the condition of a BUSY flip-flop the contents stored in the A flip-flop of the A-Register corresponding to the channel having received the channel interrupt request will be transferred to the B flip-flop of the B-Register for that channel. When priority is granted to that channel, the C flip-flop of the C-Register corresponding to that channel will be set and will inhibit, in accordance with the position of certain switches to be described more fully hereinafter, a repeated or monopolized priority in the requesting channel.

It may be necessary under certain circumstances to prevent priority being granted to a particular channel; a mask register comprising a plurality of flip-flops each corresponding to an input channel is therefore provided to prevent the granting of priority to any channel having its corresponding mask register flip-flop in the reset state. The setting of the mask register (or resetting) may be controlled either by program or by manual switches provided on the control panel of the memory controller.

The existence of a priority request evidenced by the storage of a request in a B flip-flop will result in the application of a priority signal being applied to a priority gating arrangement represented in FIGURE 48 by the blocks designated as PR. This priority arrangement may comprise a plurality of wired gates interconnected in a manner to enable the highest priority requesting channel to inhibit the granting of priority to any channel of lower priority. The granting of priority through the wired priority arrangement results in the setting of a priority flip-flop in the priority register. The condition of the priority flip-flop permits the gating and driving of certain control signals as will be described more fully hereinafter.

For reasons such as testing and diagnostic routines, the ninth "channel" is provided and is wired into the memory controller control panel. This signal, indicated in FIGURE 55 as $I_8$, controls an A and a B flip-flop and is given the highest priority of all channel interrupt priority signals. Since the signal $I_8$ is generated by the manipulation of a switch, no provision is made for priority sharing of this maintenance "channel."

Figure 49:
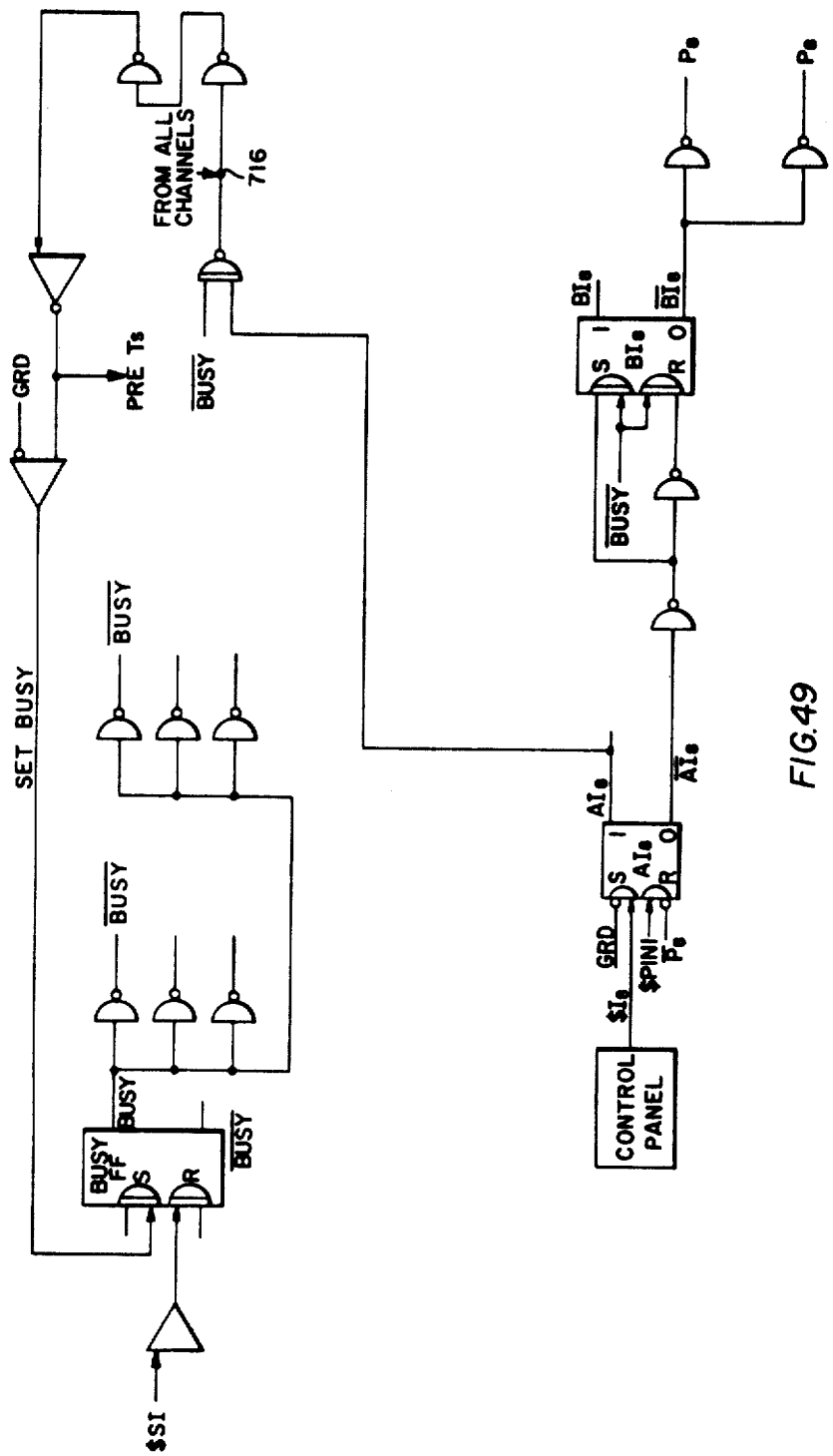
FIGURE 49 is a schematic block diagram showing the effects of the control panel and other channels on the BUSY flip-flop.

The arrangement of the ninth channel, or the control panel channel, and the operation of all channels on the BUSY flip-flop may be seen by reference to FIGURE 49. Referring to FIGURE 49, the control panel is shown providing the channel interrupt signal $I_8$ which is applied to the A flip-flop $AI_8$. The other half of the set input gate to the $AI_8$ flip-flop is connected to ground and is inverted prior to application to the set input. The resulting setting of the $AI_8$ flip-flop provides an $AI_8$ signal at the set output thereof and an $\overline{AI}_8$ at the reset output thereof. The reset output, being at a binary 0 level, is inverted and applied to the set input gate of the $BI_8$ flip-flop. The simultaneous occurrence of the inverted $\overline{AI}_8$ signal and the $\overline{BUSY}$ signal at set input to the $BI_8$ flip-flop results in a binary 0 level at the reset output thereof. The signal $BI_8$ is inverted and is utilized as the priority signal for the ninth channel (channel 8). This priority signal $P_8$ may be used to inhibit the granting of priority to all channels having a lower priority than channel 8.

The set output of the $AI_8$ flip-flop, being at a binary 1 level, is anded in a NAND-gate with the $\overline{BUSY}$ signal, is amplified and is utilized to set the BUSY flip-flop. This signal is also used as a pre-$T_S$ signal which will be described later. The BUSY flip-flop, since the second input to the set gate is open-ended, will assume the set state and the set output thereof (BUSY) may be used in its inverted form ($\overline{BUSY}$) to enable or inhibit other gates and thus to grant priority to $P_8$ and inhibit priority to $P_{0-7}$.

Figure 50:
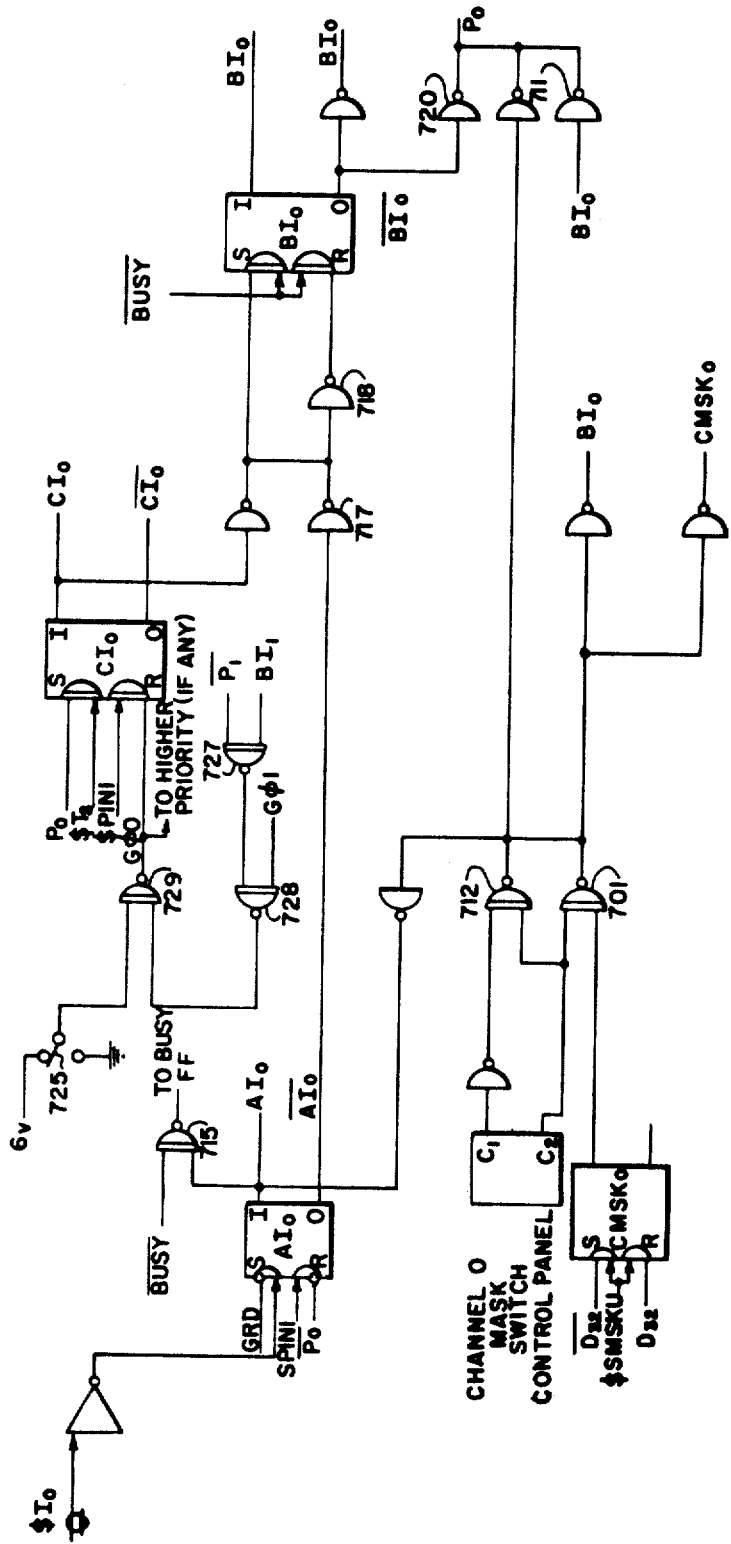
FIGURE 50 is a schematic diagram showing the relationship of the channel mask registers in relation to each channel.

The interaction of the A, B, C and mask registers in relation to each channel may be described by reference to FIGURE 50. In FIGURE 50, the channel mask flip-flop CMSK is shown receiving the set mask upper signal $SMSKU as an enabling signal to set or reset the mask flip-flop in accordance with the binary value of the thirty-second data bit $D_{32}$. The generation of the signal $SMSKU, in response to an appropriate decoded command, will be described more fully later; however, the application of this enabling signal to all of the channel mask flip-flops in the upper priority half of the channel mask register enables these flip-flops to be set in accordance with the binary value of predetermined data bits applied thereto. Data bits $D_{32}$–$D_{35}$ are applied to the channel mask register and set or reset the corresponding channel mask register flip-flops. Channels 0–3 are designated as the upper priority channels and channels 4–7 are designated as the lower priority channels. Accordingly, the set mask upper signal $SMSKU enables the setting or resetting of channel mask flip-flops 0–3 and set mask lower signals $SMSKL enable the setting or resetting of channel mask flip-flops 4–7. Each of the channel mask flip-flops is provided with a data bit corresponding to the set or reset condition to be imposed on the flip-flop. Channel 0 receives data bit $D_{32}$, channel 1 receives data bit $D_{33}$, etc.

The receipt of the signal $SMSKU by the channel mask register $CMSK_0$ flip-flop together with a binary 1 at the data position 32 ($D_{32}$) results in the resetting of the flip-flop. In the reset state, the set output thereof is at a binary 0. This 0 output level is inverted through a NAND-gate 710 and is again inverted in an inverter 711 resulting in the pulling down of the output $P_0$ to a binary 0 level. The result of the resetting of the mask register flip-flop $CMSK_0$ is the prevention of the priority level $P_0$ from obtaining a binary 1 level. Thus, channel 0 is inhibited from obtaining priority until the channel mask register $CMSK_0$ is set. The reset state of the channel mask register flip-flop $CMSK_0$ also results in a 0 output level for the signal $BI_0$ which may be used elsewhere in the system, and also results in the signal $CMSK_0$ being at a 0 level to thus indicate that the channel mask flip-flop $CMSK_0$ has been forced into the reset state.

A channel mask switch is provided on the control panel to override the operation of the channel mask register flip-flop $CMSK_0$. The channel mask switch is a three position switch which, when in the in-line position, results in a binary 1 occurring at both of the outputs $C_1$ and $C_2$ thereof. In the on position, the outputs of the channel mask switch $C_1$ and $C_2$ are 1 and 0 respectively. In the off position, the channel mask switch outputs $C_1$ and $C_2$ are a binary 0 and a binary 1 respectively. When the channel mask switch is in the in-line position, the binary 1's existing at both outputs $C_1$ and $C_2$ enable the mask flip-flop to assume the set or reset state in accordance with the application of the set mask signal $SMSKU and the appropriate data bit input $D_{32}$. With the channel mask switch in the on position and outputs $C_1$ and $C_2$ being a binary 1 and a binary 0 respectively, NAND-gates 710 and 712 are disabled thereby forcing the channel to be masked (the output of the inverter 711 is forced to be a binary 0). With the channel mask switch in the off position, and outputs $C_1$ and $C_2$ a binary 0 and 1 respectively, a NAND-gate 712 is enabled thus forcing the channel to be unmasked regardless of the condition of the channel mask flip-flop $CMSK_0$. The outputs of gates 710 and 712 are inverted and applied to NAND-gate 715 together with the $\overline{BUSY}$ signal and fed back to the BUSY flip-flop (to point 716 of FIGURE 47).

A channel interrupt request signal $I_0$ is applied to an amplifier and subsequently to the A-Register flip-flop $AI_0$. The application of this signal to the flip-flop sets the flip-flop causing the set output thereof to assume a 1-state. It will be noted that the 1 output may be forced to assume the 0-state regardless of the flip-flop output through the application of the output of NAND-gates 710 and 712. When the $AI_0$ flip-flop is in the set state, the reset output thereof ($\overline{AI_0}$) is in the binary 0-state. This latter state is inverted in the inverter 717 and applied to the set input of the corresponding B-Register flip-flop $BI_0$. This status remains until a $\overline{BUSY}$ signal is applied to the $BI_0$ flip-flop thus enabling it to assume the set state. The output of the gate or inverter 717 is again inverted in the inverter 718 and applied to the reset input of the $BI_0$ flip-flop. The reset output of the B-Register flip-flop $BI_0$ is inverted in an inverter 720 and forms the priority signal $P_0$.

The C-Register flip-flop $CI_0$ forms a priority sharing scheme in combination with the switch 725 which will be explained in greater detail later. The set output of the B-Register flip-flop for channel 1, $BI_1$, as well as the no priority signal $\overline{P_1}$, is applied to NAND-gate 727, the output of which is applied to NAND-gate 728 together with the signal $G\phi1$. The latter signal is received from the immediately succeeding or lower priority channel. The output of NAND-gate 728 is applied to NAND-circuit 729 wherein it is conjunctively coupled with the input from the switch 725 to provide signal $G\phi0$ applied to the reset input of the C-Register flip-flop $CI_0$. It will be noted that if there were a higher priority channel (which, in the case chosen for illustration, there is not) the signal $G\phi0$ would be used to connect channel 0 to the next higher priority channel. The C-Register flip-flop $CI_0$ is reset by the application of the above $G\phi0$ signal and the cycle in process signal $PIN1. The set state of flip-flop $CI_0$ is provided by the application of the priority signal $P_0$ and the cycle initiated signal $T_S$.

The A flip-flop $AI_0$ having been set by the receipt of a channel interrupt signal $I_0$ may be reset when the cycle in process signal is received at the reset input thereof together with the non-priority signal $\overline{P_0}$. Each of the remaining channels 1–7 are identical to the channel 0 just described. Each is connected to the immediately higher and the immediately lower priority channel and each is provided with means for manually masking or unmasking the channel as well as means for program masking and unmasking. The description of the operation of the channels, and the interaction of the channels to share priority may be described first by referring to FIGURE 51 to demonstrate the wired priority of the channels.

Referring to FIGURE 51, the wired priority of channels 4 and 7 has been chosen for illustration. Priority is awarded to a specific channel by that channel's priority output assuming a binary 1-state. It will also be remembered that if two gates or logic circuits have an output connected to a common conductor, and one of the circuits assumes a 0-output level, the output at the juncture of the two devices will be considered and is recognized by the system as a binary 0. Thus, referring to FIGURE 51, the priority signal for channel 4, $P_4$, assumes a binary 1 value when the output of the B-Register flip-flop corresponding to that channel $BI_4$ is in the set state ($\overline{BI_4}$ equal to zero). The priority signal $P_4$ will thus assume a binary 1 value unless any of the remaining inverters having outputs connected to the signal $P_4$ force signal $P_4$ to assume a 0 level. For example, if the mask signal applied to the inverter 730 is a binary 1, the output thereof will be a binary 0 and the signal $P_4$ will be "dragged down" to a binary 0. The same action will take place if any of the remaining connected priority signals assume a 1-level; thus, if any of the priority signals $P_0$, $P_1$, $P_2$, $P_3$ or $P_8$ assume a binary 1 level, the inversion of that signal will force the priority signal $P_4$ to assume a binary 0 state.

Figure 52:
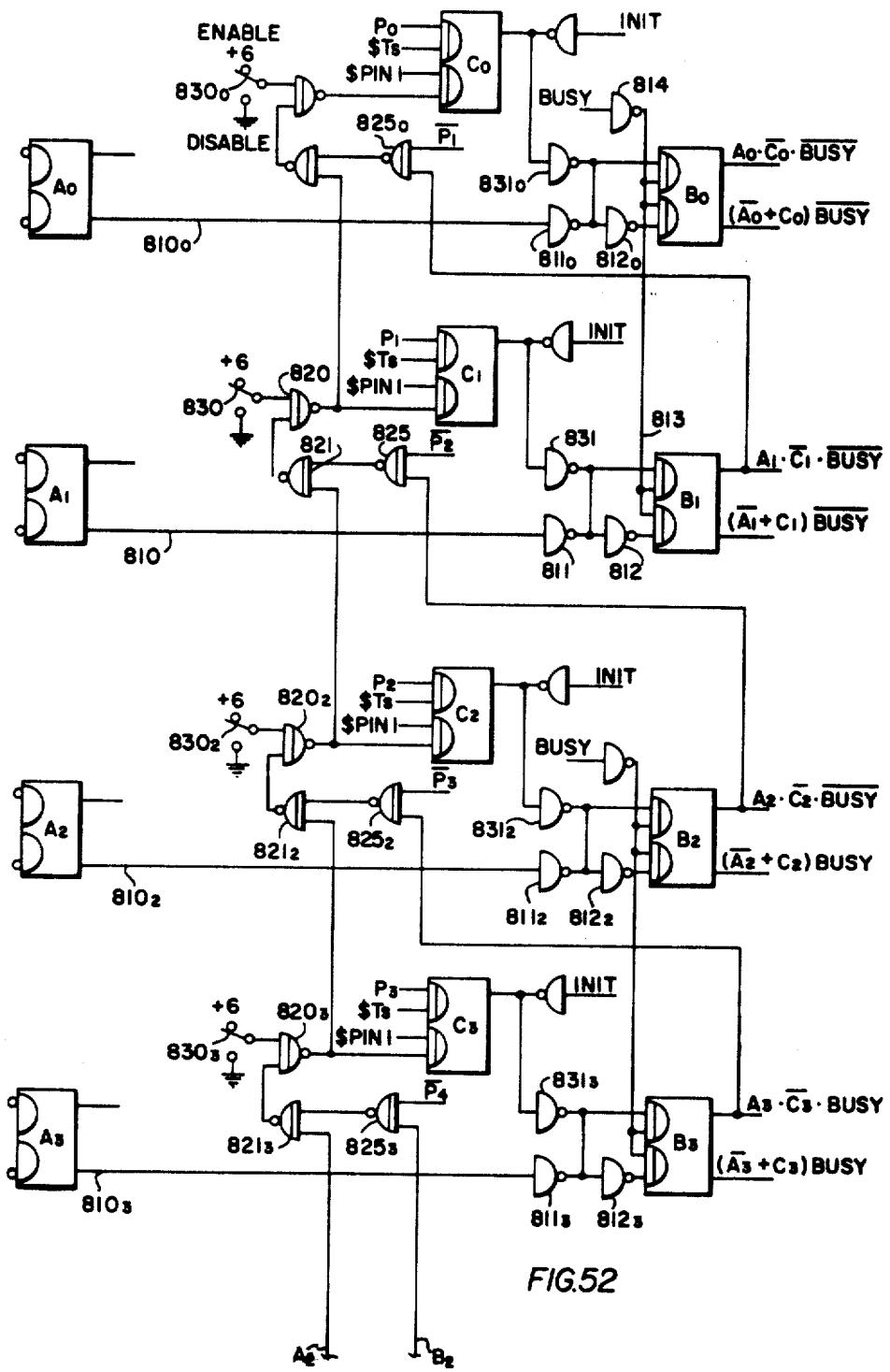
FIGURES 52 and 53 are schematic representations of the channel priority elements of the memory controller showing the priority sharing scheme afforded by the utilization of the memory controller.

The same description may be given of the priority signal for channel 7, $P_7$. Since $P_7$ is a lower priority channel than channel 4, there are more priority signals from other channels applied to the channel 7 priority output. Since priority register. The priority register is shown in FIGURE 52 wherein it may be seen that each of the flip-flops assigned to a specific channel is set or reset in accordance with the existence or nonexistence of a binary 1 priority signal $P_0$ through $P_7$. The changing of each flip-flop from one state to the next is enabled by the application of the cycle started signal $PIN. The next succeeding application of the signal $PIN after a flip-flop has been set results in the automatic resetting of that flip-flop through the ex-channel 7 is the lowest priority wired channel, all priority signals from other channels $P_0$ through $P_6$ and $P_8$ are connected to the output of channel 7 thus ensuring that the signal $P_7$ from channel 7 will remain a binary 0 if any of the other channels have priority signals in a binary 1 state.

The priority signals $P_0$ through $P_7$ developed through the wired priority schemes as described in connection with FIGURE 51 are utilized to set priority flip-flops of a pediency of a feedback connection from the reset output of each flip-flop to an inverted reset input of the same flip-flop. Thus, for example, if a priority signal $P_0$ assumes a binary 1-state, the next succeeding application of the cycle started pulse $PIN will result in the setting of the $P_0$ flip-flop. The output signal from the set output thereof will assume a positive one binary value. The next cycle started signal $PIN to be applied to the priority register will result in the inversion of the binary 0 output from the reset output of the $P_0$ flip-flop being inverted and applied to the reset input thereof to cause the flip-flop $P_0$ to assume the reset state. The priority register provides temporary storage of priority allocations.

Having discussed the wired priority of the various channels, we may now progress to the priority sharing scheme wherein the predetermined wired priority may be modified to accommodate a variety of priority arrangements and priority schemes within a predetermined priority arrangement.

Priority sharing scheme

Figure 53:
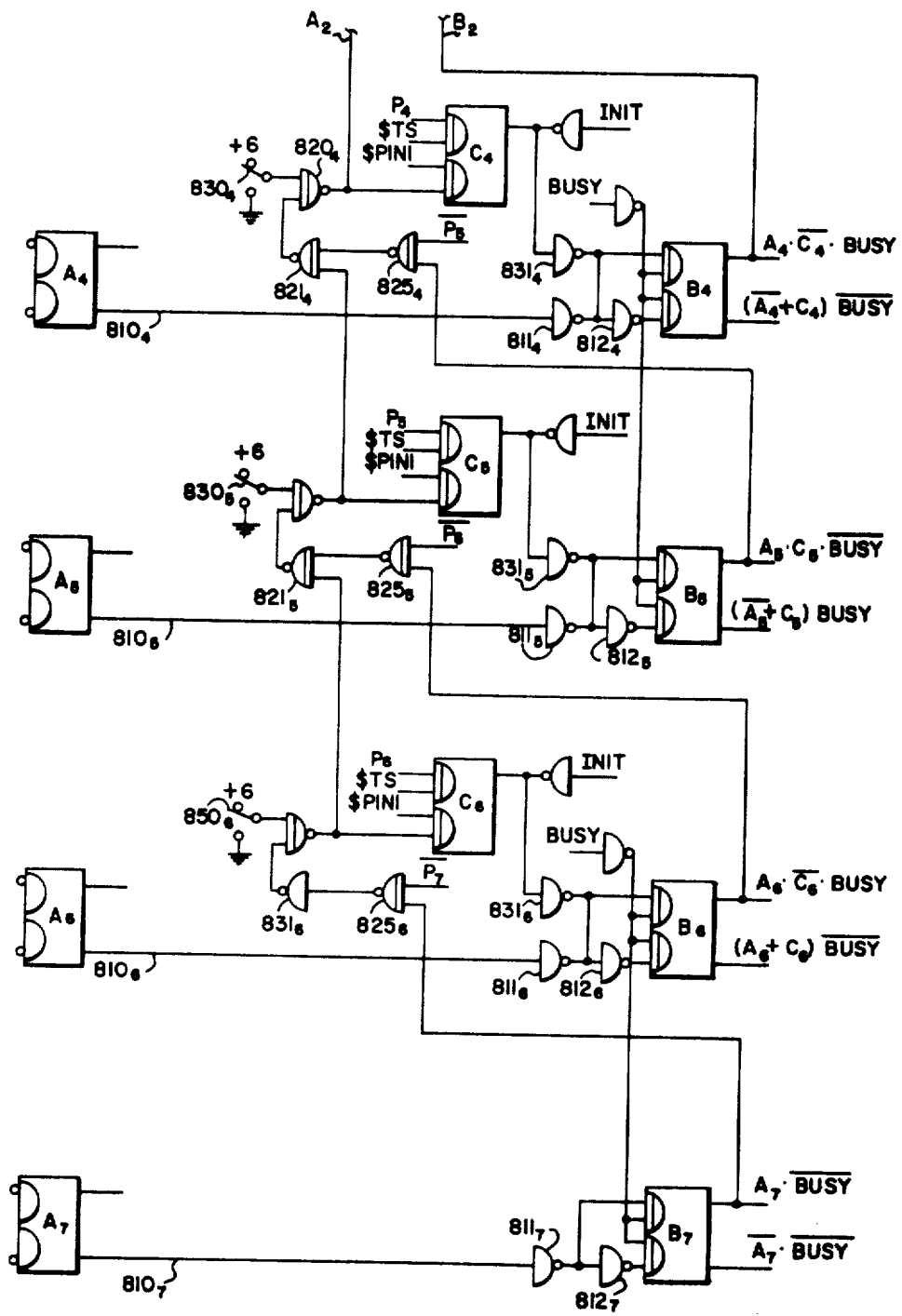

The priority sharing scheme of the present invention may more readily be described by reference to FIGURES 52 and 53 which, combined, show a simplified arrangement of the A-, B- and C-Registers. As described previously, each incoming channel is assigned to an A, B and C flip-flop. The A flip-flop is used as a temporary storage of a memory access request while the B flip-flop serves as a storage and acknowledgement flip-flop until the memory cycle ends. The corresponding C flip-flop provides a means for imposing priority sharing on a respective channel to prevent that channel monopolizing the memory systems by virtue of its being a communicating device having a high priority. FIGURES 52 and 53 are not intended to show all of the signals or connections involved in the A-, B- and C-Registers and are intended to show only that portion of the registers and means interconnecting the registers to facilitate the present description.

Since each channel, and its concomitant connection to the registers, is identical, a detailed description will be given of only one channel; therefore, reference will now be made to FIGURE 52 and channel 1.

The $A_1$ flip-flop receives a memory access request from the communicating device and is forced into the set state thereby; accordingly, the reset output assumes a 0 level. The reset output is connected by a conductor 810 through inverters 811 and 812 to the reset input of the $B_1$ flip-flop. The output of the inverter 811 is also connected to the set input of the $B_1$ flip-flop. The remaining set and reset inputs to the $B_1$ flip-flop are provided through conductor 813 from inverter 814 to which is applied a signal BUSY. Since the inverter 814 inverts the signal applied thereto, the signal thus applied through conductor 813 to $B_1$ flip-flop is $\overline{BUSY}$. The $C_1$ flip-flop is connected to receive, at the set input thereof, the priority signal $P_1$ and the cycle initiate signal $T_S$. The reset input to the $C_1$ flip-flop is connected to receive the signal $PIN1 and to receive the output of AND-gate 820. AND-gate 820 is provided with a signal from a priority sharing switch 830 which may be connected to a positive 6 volt source (a logical 1) or to ground (a logical 0). The other input to the AND-gate 820 is connected to the output of AND-gate 821 which receives, as 1-input thereto, the output of the AND-gate $820_2$ which corresponds in channel 2 to the AND-gate 820 in channel 1. The remaining input to AND-gate 821 is connected to the output AND-gate 825 which receives as inputs thereto the priority signal $\overline{P}_2$ and the set output of the succeeding channel B flip-flop (set output of $B_2$).

Only the set output of the $C_1$ flip-flop is utilized. This output is connected through an inverter 831 to the set input of flip-flop $B_1$. The remaining channels are each assigned an A, B and C flip-flop of the A-, B- and C-Registers in a manner identical to that described for channel 1; since the lowest priority channel (channel 7) does not require means for preventing it from monopolizing priority, it is not provided with a C flip-flop or with a priority sharing switch. To understand the interaction of the respective flip-flops, each of the elements of the remaining channels has been given the same number designations as channel 1 with a subscript to designate the specific channel to which that element is connected.

The principal purpose of the C flip-flop in each channel is to prevent that channel from regaining priority upon completion of a cycle to which it has already been granted priority if any priority B flip-flops have been set. A simple example may now be given. It will be assumed that all of the priority sharing switches 830 have been set to the +6 volt state with the exception of the switch in channel 2 (switch $830_2$) which, it will be assumed, has been placed in the ground state. With the switch $830_2$ in the ground position, the output of the AND-gate $820_2$ will always be a 1. We must also assume that the highest priority channel (channel 0) has just been given priority and that it subsequently requests priority for the next cycle before the previous cycle is complete. We will also assume that channel 1, flip-flop $B_1$, is in the set state and thus channel 1 is also requesting priority. Under these conditions the input to the AND-gate 825 is 1 and 0 and the output thereof is, consequently, a 1; with two 1's thus applied to the AND-gate 821 the output is 0 and since the priority sharing switch 830 has been placed in the +6 volt position, the output of the AND-gate 820 will be a 1. Since the $B_1$ flip-flop is in the set state, and since the priority signal $\overline{P}_1$ is a 0, the output of the AND-gate $825_0$ will be a 1. Since both inputs to the AND-gate $821_0$ are 1, the output thereof will be 0 and the application of this signal together with the positive 6 volt or 1 level from the priority sharing switch $830_0$ to the AND-gate $820_0$ will result in an output of 1 being applied to the reset input of the flip-flop $C_0$. When the flip-flop $C_0$ assumes the reset state the set output thereof will assume a 0 level and after that signal is inverted in the inverter $831_0$ the $B_0$ flip-flop may assume whatever state is dictated by the $A_0$ flip-flop. In other words, channel 0 may regain priority even though it has just been serviced and even though the immediately succeeding channel, channel 1, is now requesting priority. The priority of channel 0 is thus unaffected by the priority sharing switch and may maintain priority over channel 1 so long as memory access requests continue to be applied to channel 0 before the preceding memory cycle has been completed. The effect of placing the priority sharing switch in the ground position may now be described.

The conditions will be assumed to be the same as described above with the exception that the flip-flop $B_2$ is also in the set state. The inputs to the AND-gate 825 thus result in an output of a logical 0 thereby changing the output of AND-gate 821 to a logical 1 and also changing the output of the AND-gate 820 to a 0. Output of AND-gate $821_0$ is changed to a 1 and the output of AND-gate $820_0$ is changed to a 0. As a result of priority sharing switch 832 being switched to the positive 6 volt state, the input to the flip-flop $C_0$ has been changed. Flip-flop $C_0$ will thus stay in the set state (since the priority signal $P_0$ and the cycle initiate signal $T_S$ had previously been applied to the set input thereof). The set output of the flip-flop $C_0$ is inverted in the inverter $831_0$ and applied to the flip-flop $B_0$ forcing the latter into the reset state. As a result of the forcing of the flip-flop $B_0$, channel 0 no longer may gain priority and is forced to share priority with the lower priority channel until all of the channels having requests for memory access have been serviced. With the switch configuration discussed in connection with this simplified example, (switch $830_2$ placed in the ground position), all channels having a lower priority than channel 2, as well as channel 2, will share priority with all channels having a higher priority. A similar example could be given assuming a B flip-flop to be set in one of the lower priority channels. By appropriately tracing signal levels, it may be seen that the input to the $C_0$ flip-flop would react in an identical manner and prevent the 0 channel from regaining priority after it has gained priority on the immediately preceding memory cycle. Setting of switch $830_2$ to the ground state does not, however, affect any other channels of higher priority (viz. channel 1). It is therefore possible for channel 0 to regain priority over channel 1 while it may not regain priority over channels 2–7. By appropriately setting the priority sharing switches, it is possible to divide the channels into groups within which priority is allocated in accordance with the wired priority without regard to priority sharing and therefore permitting the highest priority channel within the group to continuously regain priority under the circumstances described above. However, between groups of channels priority is shared such that a higher priority channel may not immediately regain priority and must share priority with lower priority channels until all B flip-flops of lower priority channels have been reset.

Figure 54:
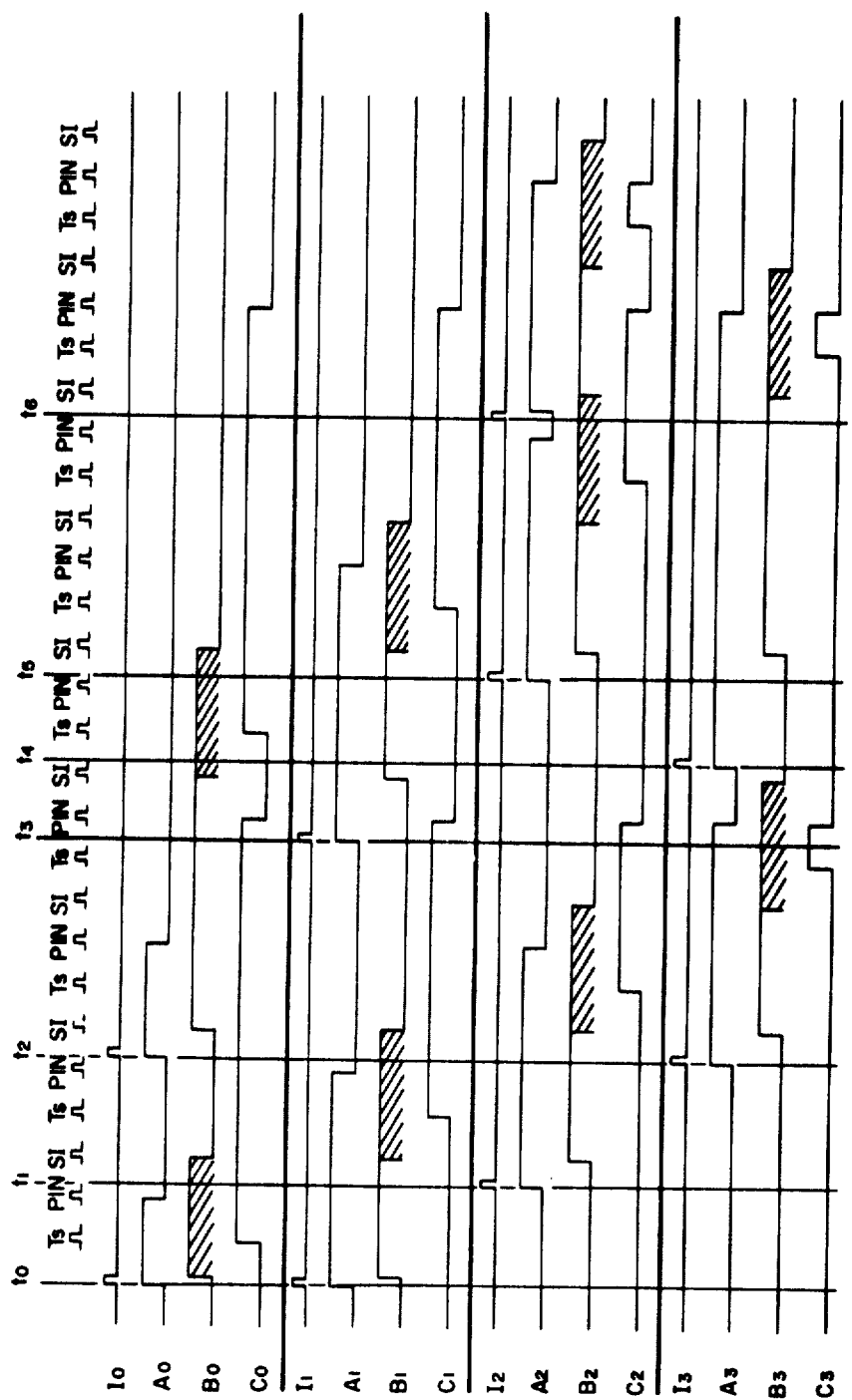
FIGURE 54 is a timing diagram illustrating the awarding of priority and priority sharing implemented by the memory controller.

To facilitate the explanation of priority sharing, reference will now be made to FIGURE 54 wherein a timing diagram is shown. In FIGURE 54, it is assumed that all of the priority sharing switches are placed in the positive 6 volt position and, initially, all A, B and C flip-flops are in the reset state and the BUSY flip-flop is also in the reset state. The timing diagram is divided into four basic areas each of which represent the state of the A, B and C flip-flops of a respective channel. For purposes of illustration, channels 0–3 have been chosen. The request for memory access signals or pulses $I_0$–$I_3$ represent the request of that specific channel for access to the memory. Seven requests are shown in FIGURE 54 each occurring at a different time $t_0$–$t_6$. The abscissa of the timing diagram represents time divided into periods between the sample initiate pulse $T_S$, the cycle in process pulse $PIN$ and the sample interrupt pulse $SI$. It will be noted that the succeeding pulses are not connected in FIGURE 54; therefore, the abscissa is not to any particular time scale and the distances between succeeding pulses is not intended to represent a particular time lapse. The abscissa is merely provided as a convenient media to describe succeeding states of the various flip-flops of the priority sharing scheme.

At time $t_0$ channels 0 and 1 simultaneously request access to memory; accordingly, the corresponding A and B flip-flops assume the set state. Since channel 0 is awarded a higher priority, the latter is granted priority over channel 1 as indicated by the shaded area of the curve representing the state of flip-flop $B_0$. The cycle initiate pulse $T_S$ following the awarding of priority to channel 0 results in the corresponding C flip-flop ($C_0$) assuming the set state. While channel 0 is being serviced, the flip-flops $A_1$ and $B_1$ of channel 1 remain in the set state awaiting the awarding of priority. Flip-flop $A_0$ is reset upon receipt of the cycle in process pulse PIN after priority is awarded. During the servicing of channel 0 a request for memory access is received from channel 2. The corresponding A flip-flop $A_2$ is immediately forced into a set state; however, the corresponding B flip-flop is not placed in the set state until the next succeeding sample interrupt pulse SI. The existence of the sample interrupt pulse indicates that the servicing of channel 0 has come to an end and priority will now be awarded to the channel having the next highest priority, viz. channel 1. Therefore, channel 1 is awarded priority as indicated by the shaded area of the curve representing the state of flip-flop $B_1$. Flip-flop $C_1$ assumes a set state upon receipt of a cycle initiate pulse $T_S$ after the award of priority to that channel. In a manner identical to that of channel 0, the A flip-flop of channel 1, $A_1$, is reset when the cycle in process pulse PIN is applied thereto following the award of priority to that channel. The next sample interrupt pulse resets flip-flop $B_1$; however, it will be noted that at times $t_1$ and $t_2$ requests for memory access have been received from channels 2 and 3. The sample interrupt pulse will result in the awarding of priorities to the next highest priority channel, channel 2.

At time $t_2$, as stated previously, a request for access has been received from channel 3; however, simultaneously therewith, a second request for access to memory was received from channel 0. Therefore, a flip-flops $A_0$ and $A_3$ have been forced into the set state and flip-flops $B_0$ and $B_3$ assume the set state at the sample interrupt pulse following the setting of the corresponding A flip-flop. At that same sample interrupt pulse, flip-flop $B_1$ was reset and priority was awarded to channel 2 as indicated by the shaded area of the curve representing the state of the flip-flop $B_2$. The next succeeding sample interrupt pulse following the award of priority to channel 2 results in the resetting of flip-flop $B_2$ and the awarding of priority to another channel. At this point it will be noted that there exists two requests for access to memory, channels 0 and 3. Under ordinary circumstances channel 0 having a higher priority would thus be awarded priority. However, since channel 0 has previously been awarded priority, and its C flip-flop, $C_0$, having been set to the set state, channel 0 may not regain priority until its C flip-flop is reset. At the time of the resetting of flip-flop $B_2$ and the awarding of priority to another channel, it will be noted that the flip-flop $C_0$ is still in the set state thus preventing channel 0 from regaining priority; accordingly, priority is awarded to channel 3 over channel 1.

At time $t_3$ a second request for access to memory is made by the channel 1 which, accordingly, immediately sets the $A_1$ flip-flop and the $B_1$ flip-flop at the next sample interrupt pulse SI. At that sample interrupt flip-flop $B_3$ is reset and priority is then awarded to channel 0 which has been waiting for priority since time $t_2$. While channel 0 is being serviced for the second time, pulses representing request for memory access are received from channel 3 at time $t_4$ and from channel 2 at time $t_5$. Both the $A_2$ and $A_3$ flip-flops are therefore set and the corresponding B flip-flops will assume the set state at the sample interrupt pulse next following the receipt of the request for access. At that sample interrupt, servicing of channel 0 will be complete and priority will then be awarded to channel 1 which had requested memory access at time $t_3$. At completion of servicing channel 1, and since both $B_2$ and $B_3$ flip-flops are in the set state, priority will be awarded to whichever of these two channels is the higher priority (channel 2). Channel 3 therefore remains in a waiting condition with flip-flop $B_3$ in the set state. At the sample interrupt pulse after the award of priority to channel 2, the flip-flop $B_2$ would normally assume the reset state; however, it may be noted that a second request for memory access has been received from channel 2 at time $t_6$ (while channel 2 is being serviced through its previous memory access request). At the sample interrupt pulse following the award of priority to channel 2, the condition then exists that both channels 2 and 3 are requesting priority and channel 2 has just previously been awarded priority. When priority was awarded to channel 2, the corresponding C flip-flop was forced into the set state and, consequently, priority is now awarded to channel 3 rather than to channel 2. Channel 2 thus remains in a waiting state and the B flip-flop remains set while channel 3 is being serviced. Upon completion of the servicing of channel 3 priority is again awarded to channel 2.

The timing diagram of FIGURE 54 therefore illustrates that the priority sharing scheme wherein all of the priority sharing switches are set to the positive 6 volt position permits the usual wired priority of channels in those instances where the previous priority does not interfere with the selection. Thus, priority is awarded to channels 0–3 with channel 0 having highest priority and channel 3 having the lowest priority. When a lower priority channel requests access to memory before a higher priority channel is through being serviced, it subsequently has priority over the higher priority channel if the higher priority channel makes a second memory access request (the higher priority channel C flip-flop is in the set state). This condition is illustrated in FIGURE 54 by the fact that channel 2 was given priority over channel 0 when the latter had requested memory access for the second time. Even though priority sharing is imposed on the respective channels, wired priority is preserved except under specific circumstances described; for example, if a high priority channel is busy and a low priority channel requests access, and while the high priority channel is being serviced, an intermediate priority channel requests service, the intermediate channel would have priority over the low priority channel when the high priority channel has been serviced. However, both the intermediate and the low priority channel will have priority over the high priority channel when the latter requests a second access to memory before either the intermediate or low priority channels have been serviced. Thus, a great variety of priority arrangements may be achieved by appropriately setting the priority sharing switches to force certain channels or groups of channels to share priority with lower priority channels while nevertheless permitting designated other channels to gain priority in accordance with a predetermined fixed wired priority scheme.

Input termination

The eight ports of the memory controller to which communicating devices are connected are each adapted to receive specific information commands, pulses, etc. The information received at the respective ports is applied to gating circuits that are enabled by the receipt of priority signals discussed previously. The granting of priority to a specific channel or port upon receipt of the channel interrupt request from that port results, as discussed previously, in a priority signal designating that port as the recipient of present priority. This priority signal has been applied to a plurality of input termination circuits for gating the information present on the incoming lines of the selected port or channel to the memory controller. The incoming information may be divided into groups of signals each intended for a specific purpose in the memory controller. These groups may be designated as data, zone information, addresses, double precision signal, command information and protect information.

The manner of gating this information to the memory controller may best be described by reference to FIGURE 55 wherein the data information is shown as it is gated from a selected port or channel. Data received from a communicating device by the memory controller comprises thirty-six bit words, each bit being received over a separate conductor. Accordingly, the data word is divided, and the incoming signals are divided, into bits $D_0$–$D_{35}$. Each of these conductors, carrying a signal, are applied to a NAND-gate which effectively terminates the incoming conductor. Each of the NAND-gates also receives an enabling signal derived from the priority selection scheme described previously. These priority signals $P_0$–$P_7$ designate which of the groups of input data gates are to be enabled. For example, if channel 0 is to be awarded priority, $P_0$ will assume a binary 1-state; accordingly, each of the NAND-gates connected to receive the signal $P_0$ will become enabled and will present as an output thereof a signal representing the binary value of the data bit $D_0$–$D_{35}$ applied thereto. Since each channel will include thirty-six data bits, or signals $D_0$–$D_{35}$, a plurality of NAND-gates is provided for each channel and a different priority signal $P_0$–$P_7$ is applied to each respectively. As shown in FIGURE 55, the input termination and select gates may be illustrated in logic diagram form; however, to facilitate the description and to more conveniently illustrate the manner in which input information is received and gated, a simple block form is chosen and is shown to the right in FIGURE 55. Referring to this block, it may be seen that data bits $D_0$–$D_{35}$ are applied thereto and priority signals $P_0$–$P_7$ are applied to gate those data bits received on the channels awarded priority.

Referring to FIGURE 56, the same type of schematic representation of the termination and selection of input channels for the respective types of information is shown. Accordingly, zone information for determining the reading or writing of specific zones in a data word (to be described more fully hereinafter) are shown as signals Z0, Z1U, Z1L, Z2, Z3, Z4U, Z4L and Z5. Concurrently with the application of these zone signals to the zone termination and select gating circuit represented by the block, priorty signals $P_0$–$P_7$ are also applied to enable the selected or present priority channel. Similarly, address information represented by eighteen address bits $A_0$–$A_{17}$ are applied to an address termination and select gating circuit together with the same priority signals $P_0$–$P_7$. Command information is provided to the memory controller through the expediency of a four bit code applied to four input lines designated as CMDA, CMDB, CMDC and CMDD. The binary coding implemented by the signals applied to the command lines enables the memory controller to perform certain operations as will be described more fully hereinafter. In addition to the command lines, the same termination and select circuit represented in FIGURE 56 as receiving command lines is also utilized to receive a signal over a line designated as a protect line. The protect signal performs an important function in the operation of the memory controller and will be described later.

Figure 57:
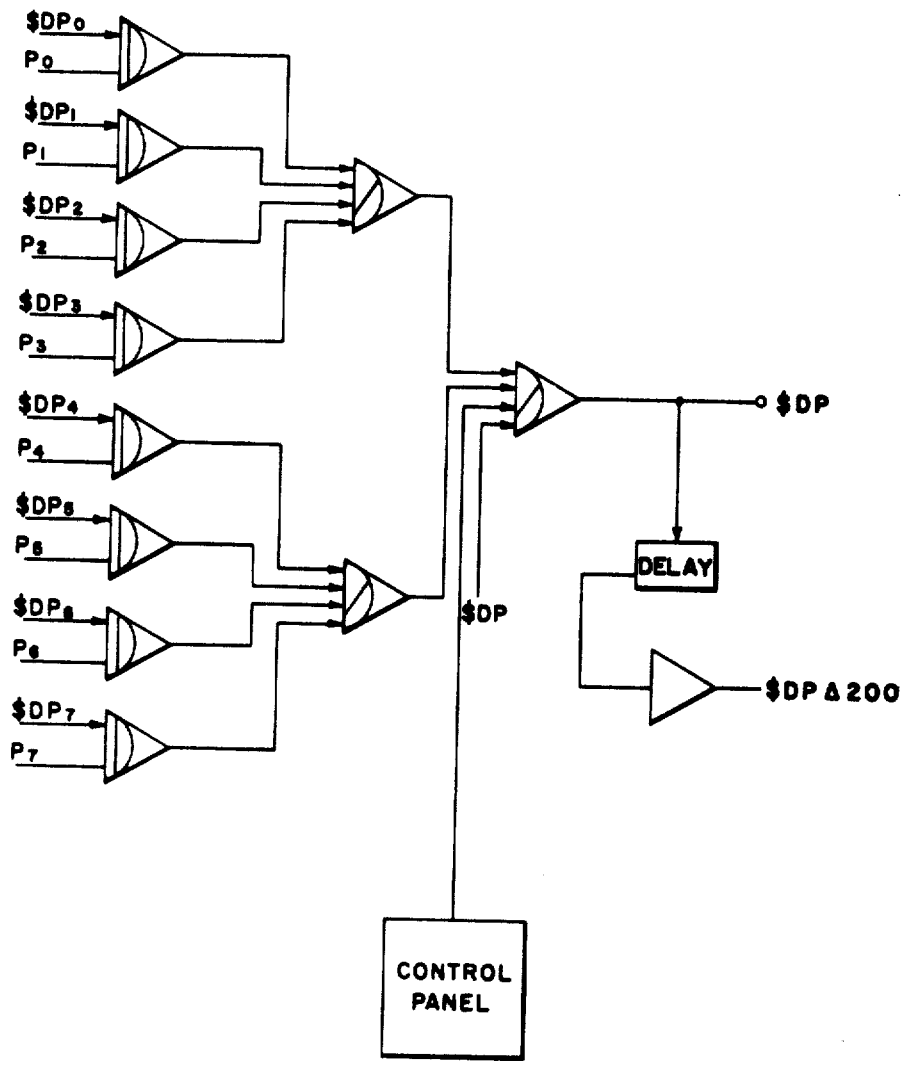
FIGURE 57 is a schematic illustration of the gating of double precision signals by the priority signals of the memory controller.

The receipt of a double precision signal from a communicating device by the memory controller is treated somewhat differently than the receipt of the information gated as described above. Referring to FIGURE 57, the schematic logic representation is shown of the manner in which the respective double precision signals are gated by the priority signals derived from the priority scheme described above. Each of the double precision signals ($\$DP_0$–$\$DP_7$) is applied to a conjunctive amplifier each of which is enabled by the corresponding priority signal $P_0$–$P_7$. The four higher priority channels 0–3 are grouped and the conjunctive amplifiers thereof have their respective outputs tied to a disjunctive amplifier; similarly, the lower four priority channels, channels 4–7 are similarly grouped. The output of the disjunctive amplifiers are applied to still another disjunctive amplifier which also receives signals from the control panel including the double precision signal $\$DP$, to be described more fully hereinafter. The result of the disjunctive combination of signals is the generation of the double precision signal $\$DP$ to be utilized in the memory controller. This signal $\$DP$ is also applied to a delay line which, including the delay incorporated in the output amplifier thereof, imposes a 200 nanosecond delay on the signal $\$DP$. This latter signal is thus designated $\$DP\Delta200$. The operation of the logic of FIGURE 57 may readily be described. The award of priority to any specific channel results in the application of the priority signal $P_{0-7}$ to that corresponding channel. The priority signal having been applied to the conjunctive amplifier gate enables the latter and, if a double precision signal is applied from the communicating device, the resulting signal will generate a $DP signal for use in the memory controller together with the delayed $DP signal designated as $DPΔ200. It may be noted that the receipt of a double precision signal from any of the communicating devices $DP$_0$–$DP$_7$ is not effective unless the corresponding priority signal $P_0$–$P_7$ is simultaneously present.

Control logic

A variety of logical functions as well as timing and control signals are developed in the memory controller by the control circuits. These control circuits receive and decode commands and make logical decisions in accordance therewith to provide appropriate gating signals for the transfer of information within the memory controller. The control circuits, also enable signals to be received by the memory controller and to be transferred into the memory unit and subsequently out from the memory controller to the communicating device.

Figure 58:
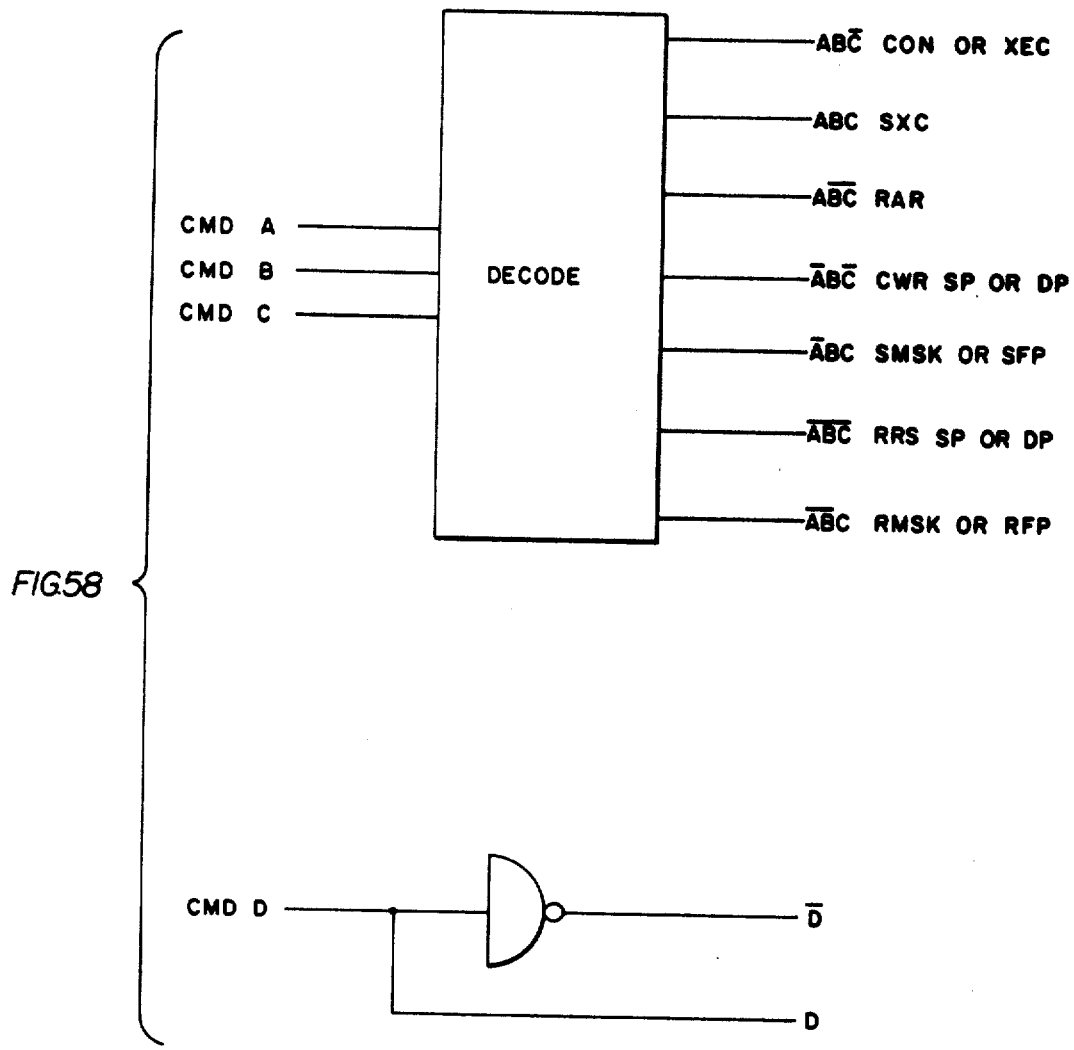
FIGURE 58 is a schematic illustration of the receipt and decoding of command signals by the memory controller.

One of the important functions of the control circuits is the decoding of command signals received from the communicating device. These command signals in the form of a command code are received by the control circuits from the command terminate and select circuits described previously. Referring to FIGURE 58, the four bits of the command code are shown and received by the control circuit as CMD A, CMD B, CMD C and CMD D. These signal designations correspond to CA0001–CD0001 in the processor and to RΔCA–RΔCD in the input/output controller. Command signal C is applied to a decoding network which may be formed from any of several well known decoding matrices in the prior art. The output of the decoding matrix is presented in the form of seven logic signals, each representing a logical combination of the three input command signals. The first output $AB\overline{C}$ is utilized throughout the memory controller as the decoded command for the connect signal (CON) or the execute signal (XEC). The second output of the decode matrix represents the logical combination of commands ABC which is utilized as the set execute cell signal SXC. The decoded command $A\overline{BC}$ is utilized as the read/alter/rewrite command RAR; $\overline{ABC}$ command is utilized as either a clear/write single precision CWR SP or the clear/write double precision CWR DP command. The fifth decode matrix output represents the command $\overline{A}BC$ utilized as a set mask command SMSK or a set file protect command (SFP). The decode matrix output $\overline{AB}C$ is utilized as either a read/restore single precision RS SP or a read/restore double precision RRS DP command. The seventh and last decode matrix output $\overline{A}B\overline{C}$ is utilized by the memory controller as a read mask command RMSK or as a read file protector command (RFP).

The output of the decode matrix, as seen from the above description, frequently represents alternative commands. In those instances where alternatives are present, the fourth and final bit of the command code (command bit D, CMD D) is utlized as the final logical information bit. Thus, when the decode matrix decodes the commands A, B and C into a signal representing $AB\overline{C}$, the resulting signal represents either a connect signal (CON) or execute signal (XEC). If a connect signal is intended, the final bit of command code, bit D, will be a binary 0 or $\overline{D}$. If the command is to be an execute command, the D bit will be a 1 or D. Thus, the output from the code matrix may be applied to a utilizing circuit in combination with the command bit D to provide the necessary information concerning the respective command being received.

Figure 59:
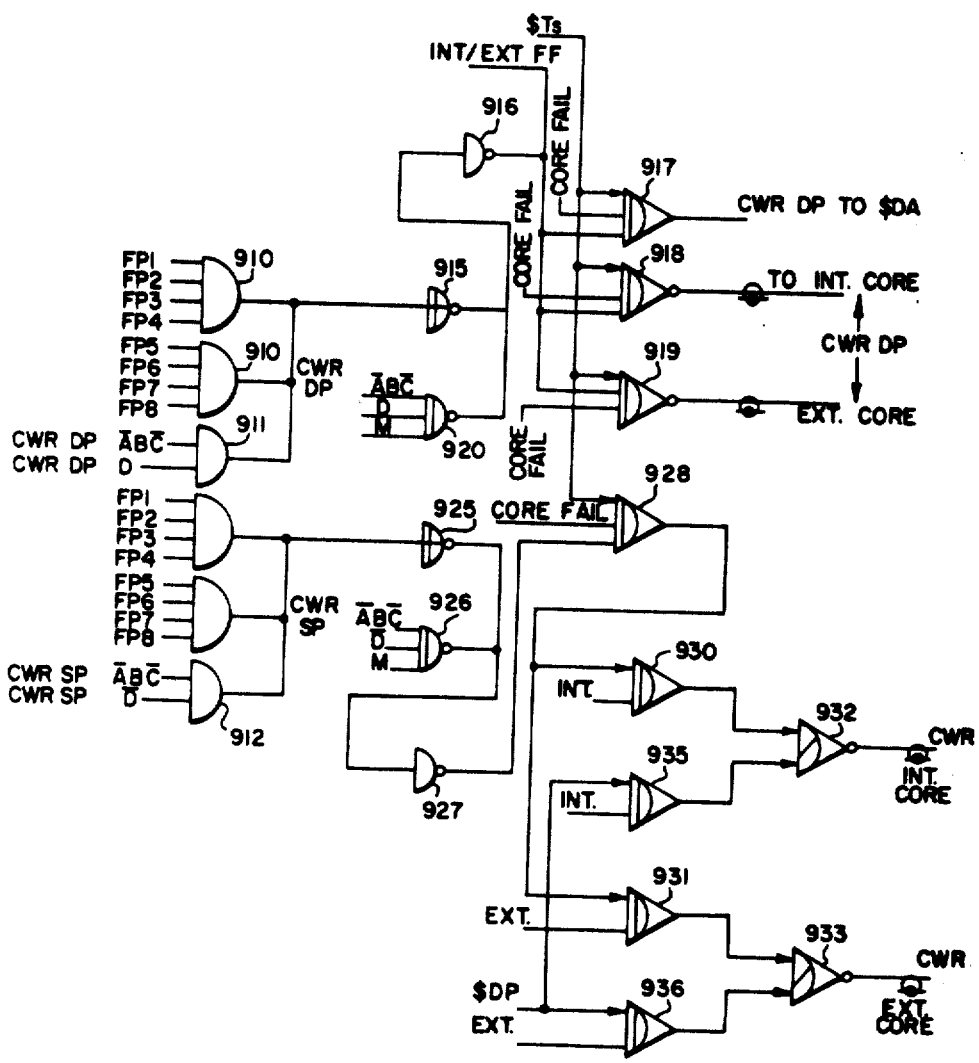
FIGURE 59 is a schematic illustration of the utilization of a clear/write single precision command or the clear/write double precision command by the memory controller.

The decoded commands are utilized to perform specified functions within the memory controller as will become apparent as the description thereof proceeds. Referring to FIGURE 59, the utilization of the clear/write single precision command (CWR SP) or the clear/write double precision command (CWR DP) is shown. A plurality of AND-gates 910 are provided for receiving signals from the file protect register (to be described) to insure that the protected area of memory is not being addressed. AND-gate 911 is utilized to receive the decoded command $\overline{ABC}$ as well as the command bit D. This command is interpreted as a clear/write double precision command and, when all the conditions of the input AND-gates 910 and 911 are satisfied, the appropriate signal will be generated through the NAND-gate 915 and inverter 916 and applied to amplifiers 917, 918 and 919. The same decoded command clear/write double precision (CWR DP) is applied to NAND-gate 920 together with the protect command VMP. The NAND-gate 920 provides a means for generating the clear/write double precision command without regard to the status in the file protect register comparison circuis. The NAND-gate 920 permits the generation of clear/write double precision when the protect line is high or the communicating processor is in the master mode (indicated by the letter M). The output of the internal/external flip-flop is applied to amplifiers 917 and 918 to be conjunctively joined with the clear/write double precision command to provide the appropriate signal CWR DP to either the internal or external core. The amplifiers are also gated by the application of the cycle initiate signal $T$_S$. A signal is also provided to the amplifiers as an indication that there are no core failures in the memory unit being accessed.

In the clear/write single precision command CWR SP, the decoded command $\overline{ABC}$ and the final bit of the command code $\overline{D}$ is applied to the AND-gate 912 which is subsequently applied through the gate 925. The master mode generation of the clear/write single precision command is provided by the AND-gate 926 which receives the same clear/write single precision decoded signals $\overline{ABC}$ and $\overline{D}$ as well as the processor master mode signal M. The outputs of the gates 925 and 926 are inverted in the inverter 927 and applied to the amplifier 928. The amplifier 928 also receives the core failure signal indicating that no core failures are present to inhibit the access to core, and also receive the cycle initiate signal $T$_S$. The output of the amplifier 928 is applied to amplifiers 930 and 931, each of which receives an additional signal, the first from the internal/external flip-flop indicating that internal memory is to be accessed and the second from the same flip-flop indicating that the external memory is to be accessed. The outputs of amplifiers 930 and 931 are fed through amplifiers 932 and 933, respectively to the internal and external memory units, respectively. A provision is also made for the receipt of the double precision signal $DP by applying the same to the amplifiers 935 and 936 which also receive the internal/external signals from the internal/external flip-flop. The outputs of these amplifiers are also applied to amplifiers 932 and 933 for the application of a clear/write signal to either the internal or external memory unit. The procedure and functions of the decoded command clear/write single precision CWR SP and clear/write double precision CWR DP will be described more fully hereinafter in the description of the operation of the respective commands.

Figure 60:
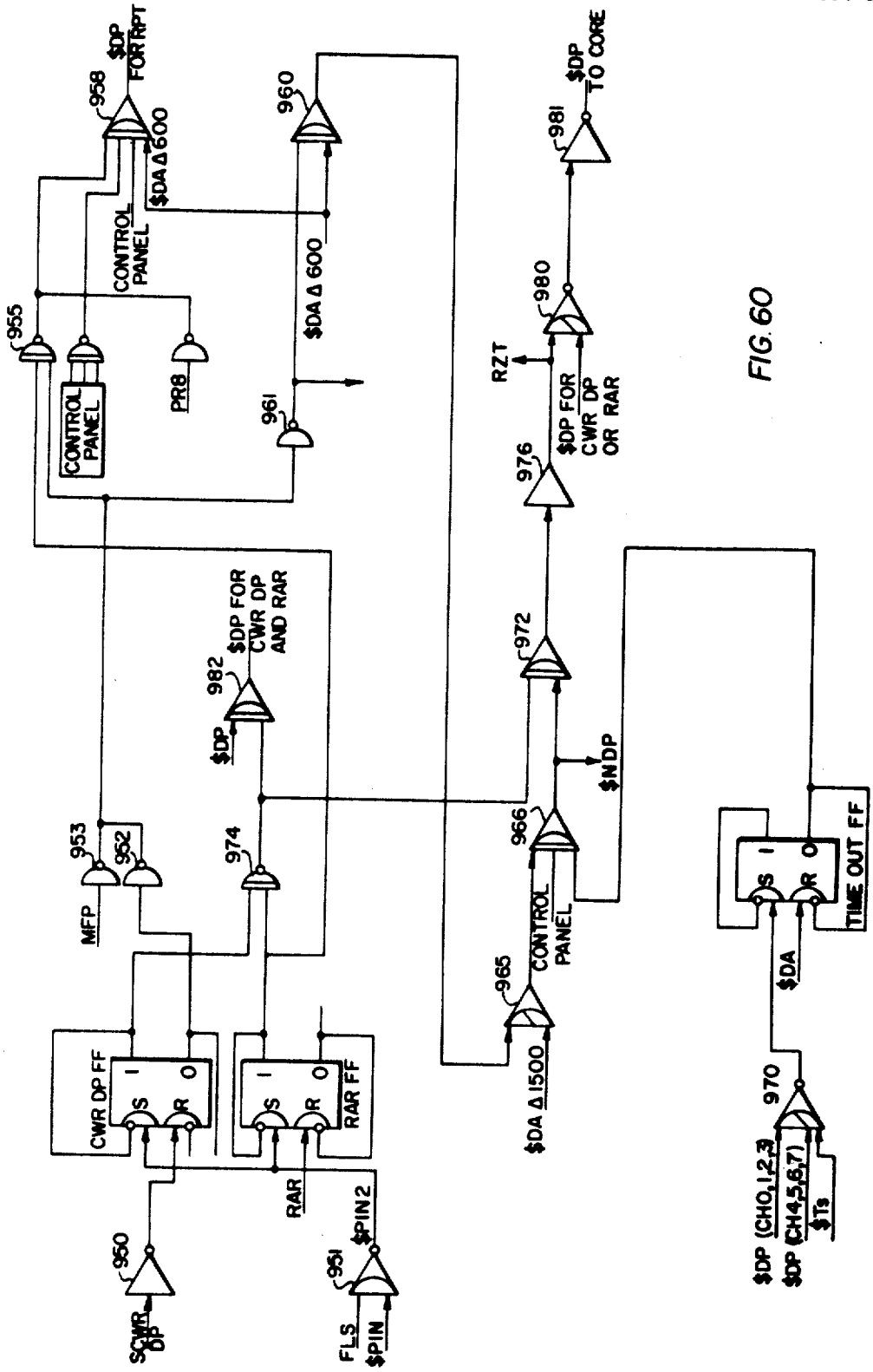
FIGURE 60 is a schematic illustration showing the generation of the double precision pulse $DP.

Referring to FIGURE 60, the generation of the double precision pulse $DP for the clear/write double precision command (CWR DP) and the read/alter/rewrite command (RAR) is shown. The generation of these signals and also the generation of the double precision signal to the memory unit $DP (to core) is utilized for the reading, writing, retrieval, etc. of a double precision word. Since each access to a memory core results in the retrieval of two thirty-six bit words, the double precision pulse permits the writing of a second thirty-six bit word, or the reading thereof, in the memory register. Referring to FIGURE 60, the clear/write double precision command $CWR DP is applied through an amplifier 950 to the clear/write double precision flip-flop. The flip-flop is reset by the application of the appropriate pulse and is reset to the set state by the application of a signal $PIN2 to the set input thereof. Since the clear/write double precision flip-flop includes feedbacks from the 1-output to the set input and from the 0-output to the reset input, the state of the flip-flop is determined solely by the application of the input signal from either the clear/write double precision amplifier or the $PIN2 signal. The latter signal is developed through the conjunction of the PIN signals $PIN and a reset signal FLS combined in an amplifier 951 and applied to the set input. The read/alter/rewrite command (RAR) is applied to the read/alter/rewrite flip-flop at the reset input thereof. Similarly, the read/alter/rewrite flip-flop is set by the application of the $PIN2 signal thereto. Further, the read/alter/rewrite flip-flop includes feedback resetting through the utilization or through the connection of the 1-output to the set input and the 0-output to the reset input.

The reset output of clear/write double precision flip-flop is applied through an inverter 952 and joined with the output of the second inverter 953 to which is supplied the signal MFP (from the set mask MSK or set file protect SFP flip-flop). The signal is then applied to a NAND-gate 955 and conjunctively combined with the set output of the read/alter/rewrite flip-flop. The output of this NAND-gate is applied to a conjunctive amplifier 958 wherein the signal is combined with a control panel signal, a second control panel signal indicating the position of the normal or repeat switch, and the delayed data available pulse $DAΔ600. The simultaneous occurrence of these signals results in the double precision pulse for the repeat mode $DP. The repeat mode is utilized in a test and diagnostic routine wherein the utilization of a double precision signal $DP is needed. It may be noted that a priority signal PR8 is also applied to the conjunctive amplifier 958 indicating that the control panel or control channel 8 has priority. The outputs of the inverters 952 and 953 are combined and are also applied to the conjunctive amplifier 960 through an inverter 961. It may be noted that the signal thus applied to the amplifier 960 will be true if the clear/write double precision command CWR DP has been decoded or the set mask command (SMSK) has been decoded or if the set file protect command (SFP) has been decoded. The latter two commands will result in the application of an appropriate signal to the amplifier 960 through the application of like signals from the set mask and set file flip-flops to the inverter 953 (signal MFP). The amplifier 960 also receives a delayed data available signal $DAΔ600. The output of the amplifier 960 is applied to a disjunctive amplifier 965 wherein it is combined with the data available delayed signal $DAΔ1500. The output of the amplifier is applied to a conjunctive amplifier 966 which also receives a control panel signal indicating the normal-test switch in the normal position and the output of a timeout flip-flop. The timeout flip-flop provides an appropriate timing control in response to the application thereto of the data available signal $DA to the reset input thereof, and the output of a disjunctive amplifier 970 which, in turn, receives the double precision signals $DP from the respective channels (channel 0–channel 7) and the cycle initiate pulse $T_S. The output of the amplifier 966 is combined in amplifier 972 with a signal representing the combined set outputs of the clear/write double precision flip-flop and read/alter/rewrite flip-flop, the latter combination occurring in the NAND-gate 974. The output of the amplifier 972 is again amplified in amplifier 976 and provides an output signal RZT to be utilized elsewhere in the control circuitry and to be described later. This signal is applied to a disjunctive amplifier 980 together with the double precision signal $DP for the clear/write double precision or read/alter/rewrite commands. The result of either the signal RZT or $DP for the CWR DP or RAR is an amplified signal through the amplifier 981 that is used as a double precision command $DP to the core memory.

The output of the NAND-gate 974 is also applied to a conjunctive amplifier 982 which also receives the double precision command $DP from the corresponding channel providing the double precision signal. The output of the amplifier 982 provides the double precision signal $DP for the clear/write double precision command and the read/alter/rewrite command. This signal is the same signal utilized in the disjunctive amplifier 980 for providing the double precision pulse $DP to the core memory. It may be noted that the disjunctive amplifier 970 not only receives a double precision pulse $DP from the respective channels, but also receives a cycle initiate pulse $T_S. As a result of the conjunction of the clear/write double precision command $CWR DP, the cycle started delay signal $PIN, the reset signal FLS, the cycle started signal $T_S, the read/alter/rewrite command RAR, and the double precision pulse $DP from the respective channels, the appropriate action is taken aided by the receipt of the data available delayed signal $DAΔ600 and Δ1500 resulting in the generation of a double precision signal or pulse $DP for either the repeat mode or simply for the utilization of the core in generating a double precision core cycle.

Figure 61:
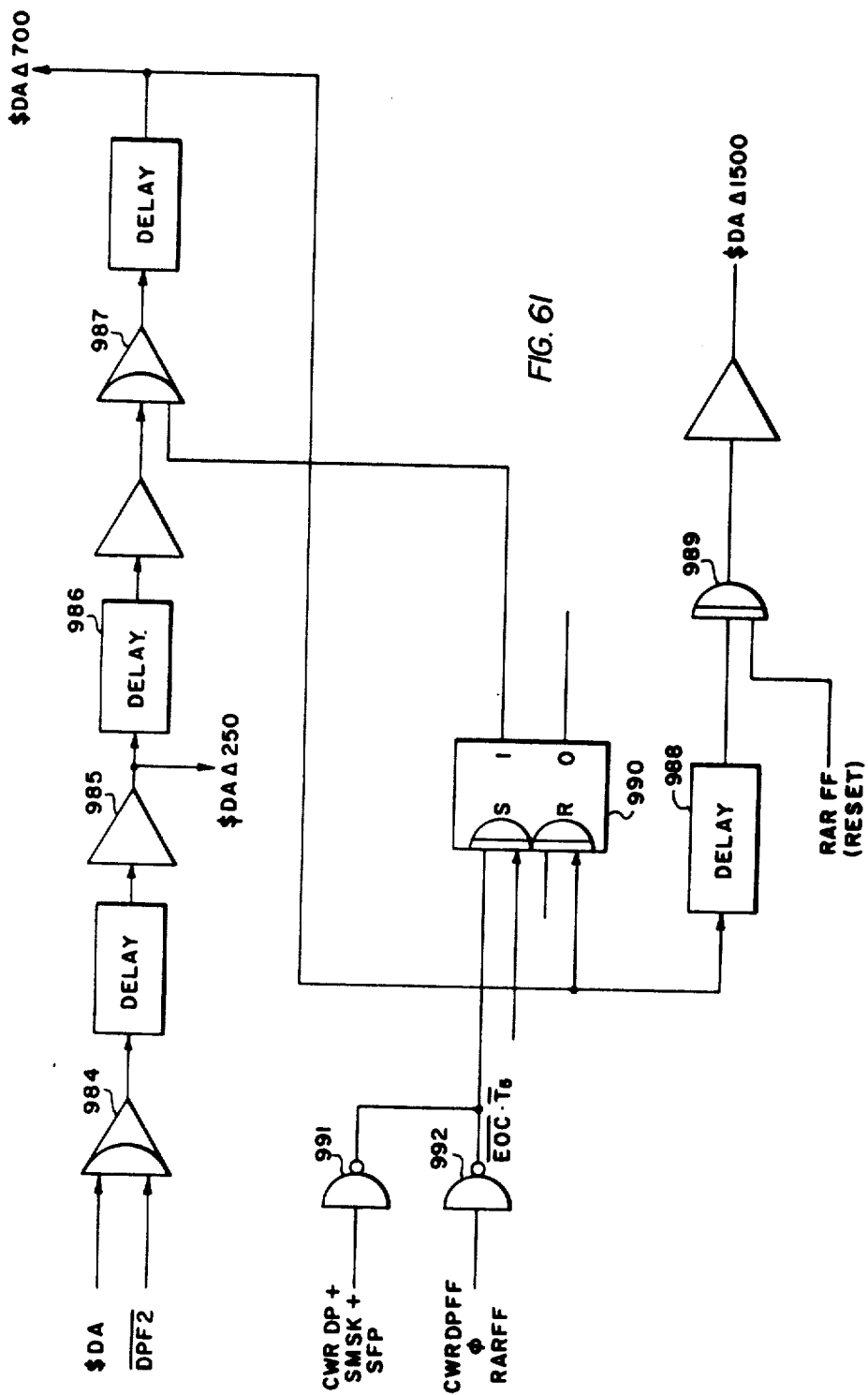
FIGURE 61 is a schematic illustration showing the development of delayed data available pulses.

The generation of timing signals for utilization throughout the memory controller may be achieved in numerous ways. In the embodiment chosen for illustration, the memory controller develops certain controls signals through the utilization of a generated pulse and subsequently delaying the pulse to obtain succeeding pulses having a predetermined time relationship to the originally generated pulse. For example, the pulse indicating that data is available ($DA) may be generated to control certain functions within the memory controller. The signal, as indicated previously, may also be provided to a communicating device to indicate the availability of data at the output terminals of the memory controller. This signal is also utilized in a delayed form to provide other control pulses throughout the memory controller. The signal may be delayed a number of nanoseconds to provide a pulse which may be designated as the data available pulse $DA delayed by a predetermined number of nanoseconds such as: Δ250. Referring to FIGURE 61, a schematic illustration is shown of the development of certain delayed data available pulses. The data available pulse $DA is applied to the conjunctive amplifier 984 together with the signal indicating that the double precision flip-flop is in the reset state ($\overline{DPF2}$). The output of the amplifier 984 is delayed, amplified in an amplifier 985 and is utilized as the 250 nanosecond delayed data available pulse $DAΔ250. This same signal may be delayed again in delay circuit 986, subsequently amplified, and applied to the conjunctive amplifier 987. The output of amplifier 987 is once again delayed and provides the delayed data available pulse $DAΔ700. The latter is again delayed in the delay circuit 988 and is applied to AND-gate 989. The output of the AND-gate 989 is amplified and results in a delayed data available pulse $DAΔ1500. The amplifier 987 also receives a logic level from a flip-flop 990 receiving at the set input thereof the logic $\overline{EOC} \cdot T_S$. The set input also receives the outputs of inverters 991 and 992, the inputs of which may be described as follows: inverter 991 inverts a signal indicating the existence of the clear/write double precision signal CWR DP or the set mask signal SMSK or the set file protect signal SFP; the inverter 992 receives as an input thereof the set outputs of a clear/write double precision flip-flop and the read/alter/rewrite flip-flop.

The AND-gate 989 also receives a signal from the reset output of the read/alter/rewrite flip-flop. Thus, the application of the data available pulse $DA wherein the double precision flip-flop second output is false results in the generation of the data available pulse $DAΔ250.

In the event that the clear/write double precision command has been decoded, or the set mask command has been decoded or the set file protect command has been decoded or in the event the clear/write double precision flip-flop is set or the read/alter/rewrite flip-flop is set, together with the false condition of the end-of-cycle and cycle initiate the delayed pulse $DAΔ250 is amplified and delayed again to provide the second delay pulse $DAΔ700. The latter pulse resets the flip-flop 990 and is again delayed and applied to an AND-gate. When the read/alter/rewrite flip-flop is reset and the signal generated thereby is applied to the AND-gate 989, the delayed data available pulse $DAΔ700 is once again delayed and generates the data available delayed pulse $DAΔ1500.

Thus, the pulse $DA is utilized to generate several succeeding pulses each having a predetermined time relationship with the pulse $DA. Logical functions may then be performed and timed in relation to the received or generated pulse. Other pulses may similarly be generated through the delay of a predetermined pulse and succeeding signals derived therefrom utilized to perform other functions in a manner similar to the delay of the delayed data available $DAΔ250, $DAΔ700 and $DAΔ1500. It will be obvious to those skilled in the art that the time delays herein described are chosen only to describe a specific embodiment having a predetermined memory speed. A change in memory speed, for example, may result in the modification of the delays imposed in various signals throughout the system.

Certain operations of the memory controller are designated as illegal actions wherein certain commands have been received to manipulate data under conditions failing to meet the criteria necessary for a valid operation. The illegal actions include:

(1) The attempted performance of certain operations when the request for such operations come from other than the control processor. This illegal action is designated as $\overline{CONTROL}$ and is encoded $A\overline{BC}$.
(2) Certain operations requested by a control processor may be performed only if the processor is operating in the master mode. In those instances where requested operations require a master mode, and the processor is not in that mode, the illegal action is designated as $\overline{MASTER}$ and is encoded $\overline{A}B\overline{C}$.
(3) When a communicating device has requested access to the protected area of memory, the illegal action designated "protected area" is indicated and is represented by the code $AB\overline{C}$.
(4) When a parity error occurs, the illegal action "parity error" is indicated and encoded $\overline{A}BC$.

Figure 62:
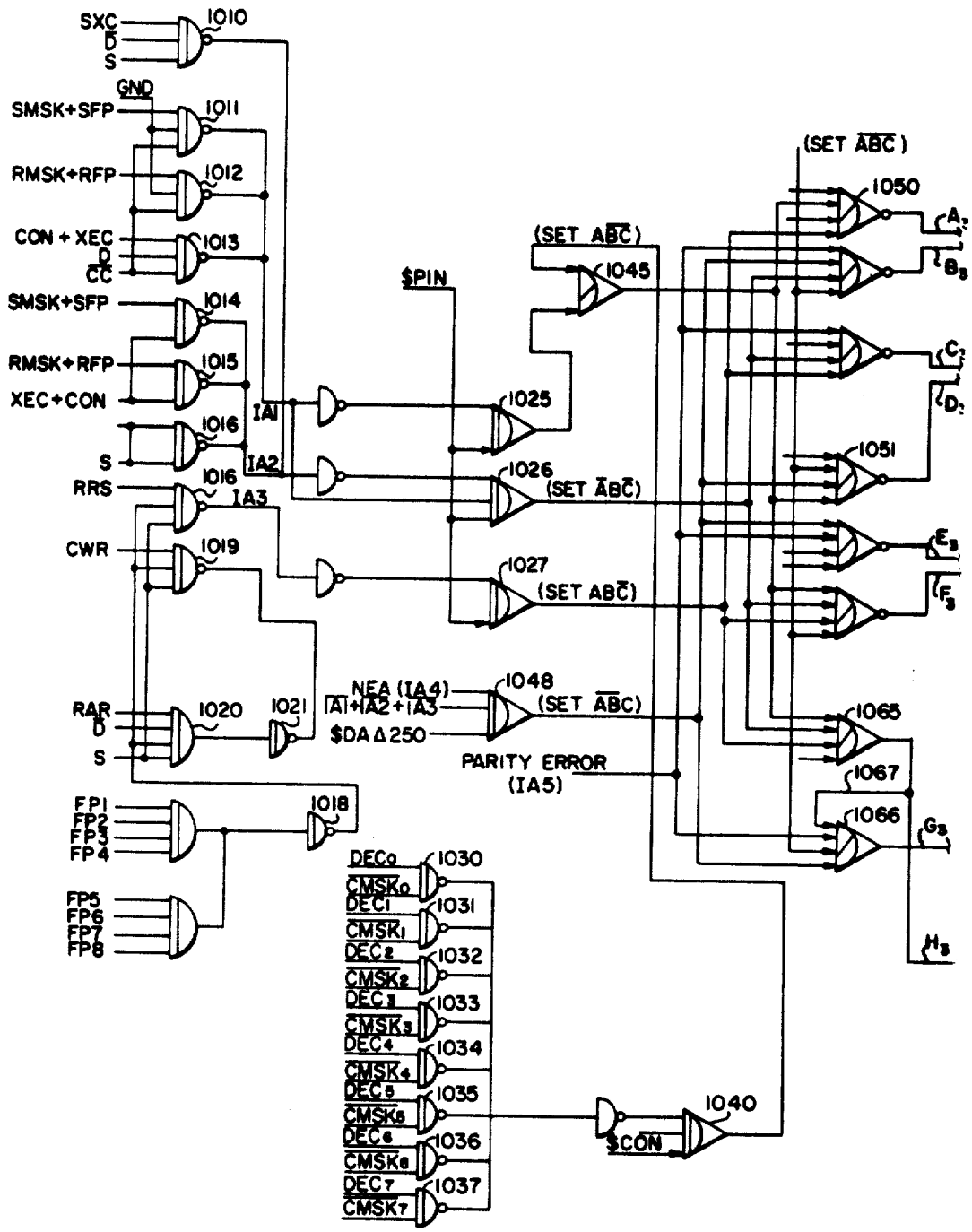
FIGURES 62 and 63 are schematic illustrations showing the development of illegal action codes.
Figure 63:
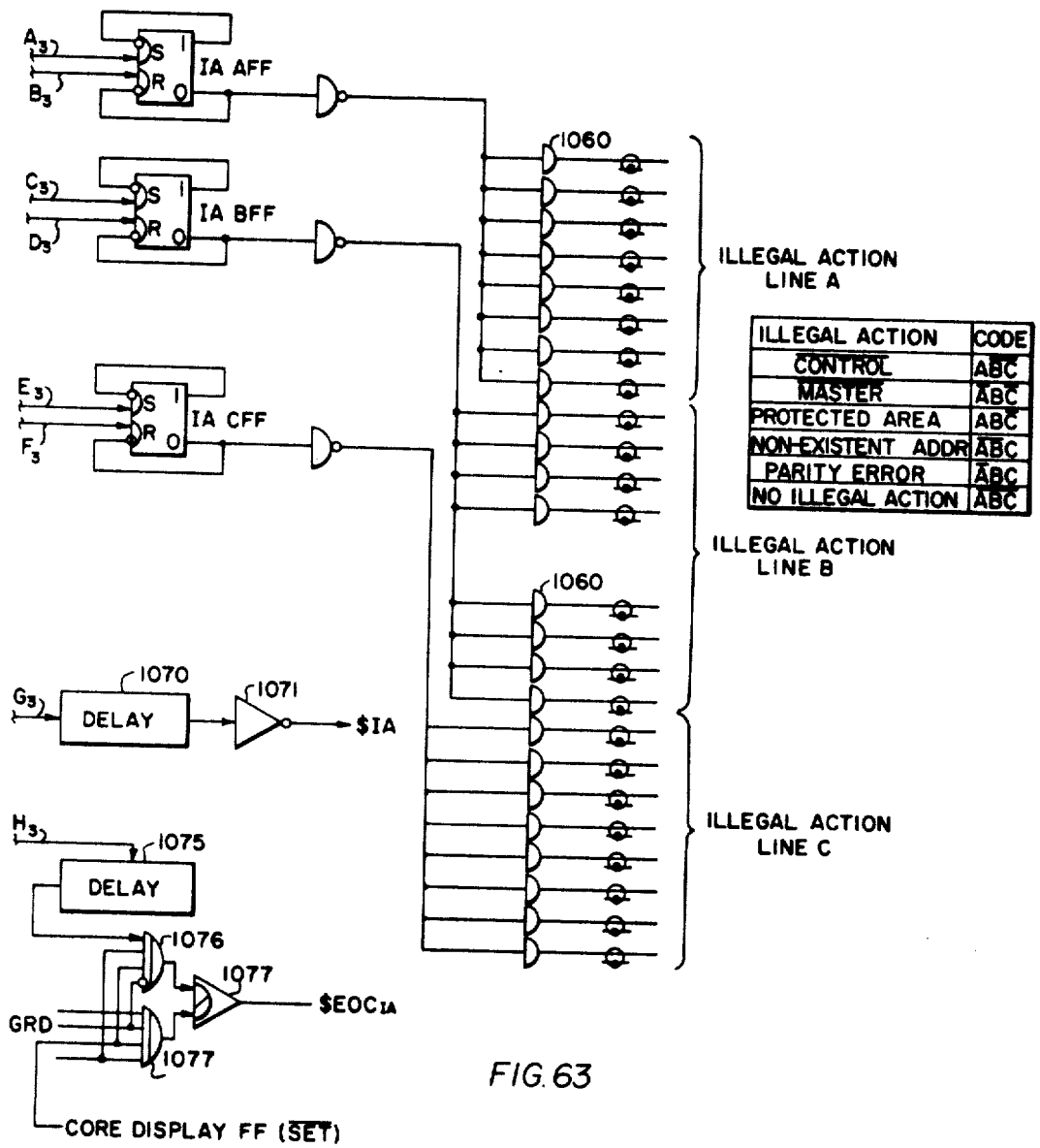

Three flip-flops designated the illegal action A flip-flop, illegal action B flip-flop and illegal action C flip-flop are utilized to encode the illegal action occurring. The three bit code resulting from the set or reset state of the three flip-flops represents the code delivered to the communicating device from which the illegal action was received. In those instances where no illegal action has occurred, the code $\overline{ABC}$ remains on the illegal action code lines. The detecting and encoding of illegal actions may be seen by reference to FIGURES 62 and 63 (taken together form a single schematic) wherein the decoded command SXC and the command bit $\overline{D}$ as well as the false level of the protect line (indicated as slave mode signal S) are applied to the NAND-gate 1010. NAND-gate 1011 receives the decoded commands set mask SMSK or set file protect SFP as well as the signal $\overline{CC}$ indicating that the port from which the command was received was not the controlled channel (not the control processor). NAND-gate 1012 receives the decoded commands read mask RMSK or read file protect RFP as well as the control channel signal $\overline{CC}$. NAND-gate 1013 receives the decoded command connect CON or execute XEC as well as the final bit of the command code (bit D—the combination of signals applied to gate 1013 thus represent a connect command). The NAND-gate 1013 also receives the not control channel signal $\overline{CC}$. NAND-gate 1014 is connected to receive the decoded command set mask SMSK or set file protect SFP and the execute XEC or connect CON commands. NAND-gate 1015 is connected to receive the read mask command RMSK or read file protect command RFP and the execute command XEC or connect CON. NAND-gate 1016 receives only the protect line signal S indicating the slave mode condition. NAND-circuit 1017 receives the read/restore command RRS as well as a file protect signal from NAND-gate 1018. NAND-gate 1019 receives a clear/write command CWR as well as a file protect command from NAND-gate 1018 and a protect slave mode signal S.

NAND-gates 1011, 1012 and 1013 therefore provide the encoded illegal action code IA1 thereby indicating that the particular action requested by the communicating device was requested when the requesting device was not the control processor. NAND-gates 1014, 1015 and 1016 together with NAND-gate 1010 provide the encoded illegal action code IA2 indicating that the communicating device, although the control processor, was not in the master mode.

NAND-gates 1017 and 1019 provide the encoded illegal action code IA3 to indicate that a protected area of the memory has been addressed.

AND-gate 1020 receives the read/alter/rewrite command RAR as well as the final bit of the command $\overline{D}$ and the protect line slave mode signal S. The output of the AND-gate 1020 is inverted in an inverter 1021 and is also used to generate the illegal action code IA3. The encoded illegal actions are applied to amplifiers 1025, 1026 and 1027 and are gated by the application of the cycle started delayed pulse $PIN. When a connect command is received from a communicating device, the decoded channel address for the connect command is checked to see that the channel specified thereby has not been masked. The encoded illegal action for this error is $\overline{CONTROL}$ $A\overline{BC}$, NAND-gates 1030–1037 each receive the decoded channel address specifying a particular channel ($DEC_0$–$DEC_7$) and also receive an indication of the state of the channel mask flip-flop from the corresponding channels ($\overline{CMSK_0}$–$\overline{CMSK_7}$). The outputs of the NAND-gates 1030–1037 are inverted and applied to an amplifier 1040 which is pulsed by the decoded connect signal $CON. The output of the amplifier 1040 is applied to the amplifier 1045 together with the output of the amplifier 1025. When a nonexistent address has beeen received by the core, a nonexistent address signal NEA is provided to an amplifier 1048. The amplifier 1048 also receives enabling signals (developed by the inversion of the encoded illegal action codes IA1–IA3) to logically place into the amplifier 1048 the condition that no illegal action code has been encoded or detected. The latter provision enables the amplifier 1048 to provide an output when, and only when, a nonexistence address has been supplied by a communicating device. The amplifier 1048 is gated by the application of a delayed data available pulse, described previously, and designated as $DAΔ250. The illegal action having been detected, and resulting signals supplied to corresponding amplifiers, the amplifiers 1025, 1026, 1027, 1045 and 1048 each provides signals to an illegal action register encoder indicated in FIGURE 62 generally at 1050 and 1051. The resulting application of encoding signals to the flip-flops IA–A FF, IA–B FF and IA–C FF results in the development of a three bit code indicating the illegal action detected. The output of each of the flip-flops is taken from the reset output thereof and applied to a plurality of drivers 1060 each of which provides the necessary amplification and impedance matching for supplying the code to the appropriate communicating device. The flip-flop outputs are fanned out to provide signals to each of the corresponding memory controller ports.

In addition to the encoded illegal action designation provided by the state of the three illegal action flip-flops, a pulse is provided to the communicating device indicating the existence of no illegal action. To this end, all of the illegal actions detected are disjunctively combined in amplifiers 1065 and 1066. The output of amplifier 1066 (which includes by way of conductor 1067 the output of amplifier 1065) is applied to a delay 1070 the output of which is amplified in amplifier 1071 and subsequently provides the illegal action pulse $IA to the communicating device. The output of amplifier 1065 is also applied to a delay line 1075 which is subsequently combined in an AND-gate 1076 with the signal provided by the set output of the core display flip-flop. The output of the AND-gate 1076 supplied to a disjunctive amplifier 1077 together with the output of an AND-gate 1077 which, in turn, receives the same output provided by the core display flip-flop but does not receive the output of the delay 1075. The amplifier 1077 thereby provides a pulse indicating the end-of-cycle for those cycles in which an illegal action has occurred (the designation for this signal is $EOC$_{IA}$).

Therefore, when a command has been received from a communicating device by the memory controller, and the command has been decoded, the contents of the command are compared with the request contained in the command as well as the status of communicating device. In those instances where a connect command has been received, the channel addressed in the connect command cycle is also checked to see that the port address has not been masked. In the event of any illegal action (defined as a requested procedure falling outside of the requirements for that procedure) an illegal action pulse is generated and provided to the communicating device. Along with the illegal pulse, an illegal action code comprising the status of three illegal action flip-flops of an illegal action register is also provided to that communicating device to thereby indicate to the device the reason for the illegal action pulse. After a predetermined delay, an end-of-cycle pulse is generated to permit the memory controller to proceed without waiting for corrective action in regard to the illegal action. The end-of-cycle pulse thus generated is designated as the end-of-cycle pulse $EOC$_{IA}$.

The generation of the read/restore RRS, read/alter/rewrite RAR, connect CON, set file protect SFP and set mask SMSK commands may be generated by the decode mechanism described previously wherein the four command code bits were received and decoded. In that decode network, the first three bits, bits A, B and C were decoded to provide signals indicating combinations of commands, such as, for example, connect CON or execute XEC. The fourth bit of the four bit command code was not decoded in combination with the first three bits. Thus, the final decoding of the command codes RRS, RAR, CON, SFP and SMSK may be described by reference to FIGURE 64. The delayed double precision pulse $DP$\Delta$200 and the no double precision pulse $NDP are applied to a disjunctive amplifier 1110. The output pulse from the amplifier 1110 is applied to the set mask or the set file protect flip-flop. The cycle initiate pulse $T$_S$ is applied to a conjunctive amplifier 1111. The amplifiers are also gated by the receipt of the protect line high state signal representing a master mode M and the signal indicating the commands set mask SMSK or set file protect SFP. The output of the amplifier 1111 is applied to the reset input of the set mask or set file protect flip-flop. The output of the amplifier 1111 is also applied to a second amplifier 1112 prior to its application to a plurality of amplifiers for final decoding and fan out. The pulse provided by amplifier 1112 is applied to amplifiers 1115, 1116 and 1117. The output of amplifier 1115 is applied to a plurality of fan out amplifiers 1120 each of which inverts the signal applied thereto and provides the set mask upper pulse $SMSKU. The outputs of amplifiers 1116 and 1117 are utilized directly as the set file protect upper signals $SFPU.

The reset output of the set mask or set file protect flip-flop is amplified in an inverting amplifier 1125 and applied to amplifiers 1126, 1127 and 1128. The outputs from amplifiers 1127 and 1128 are used as the set file protect lower signal $SFPL. The output of amplifier 1126 is applied to inverting amplifiers 1130, acting as fan out amplifiers, to provide the signal set mask lower $SMSKL. The utilization of the fourth bit of the command code in the final decoding of the commands may be seen in FIGURE 64 by the application of the final bit in its false state, $\overline{D}$, to amplifiers 1115 and 1126, and to the application of the bit in its true state, D, to amplifiers 1116, 1117, 1127 and 1128.

A split cycle signal is provided to the memory core for reasons to be expained more fully hereinafter. The split cycle signal is developed through the application of the cycle initiate pulse $T$_S$ and the read/alter/rewrite command RAR applied to amplifier 1140. The output of the amplifier 1140 is applied to the set input of the split cycle flip-flop. The other set input to the split cycle flip-flop is received from core fault circuits and is designated the inhibit core cycle signal ICT. A true state of this signal will inhibit the next core cycle. The split cycle flip-flop also receives at the reset input thereof the data available pulse from core $DA CORE. The set output of the split cycle flip-flop is provided to drivers 1142 prior to the application thereof to both the internal core and the external core.

Figure 64:
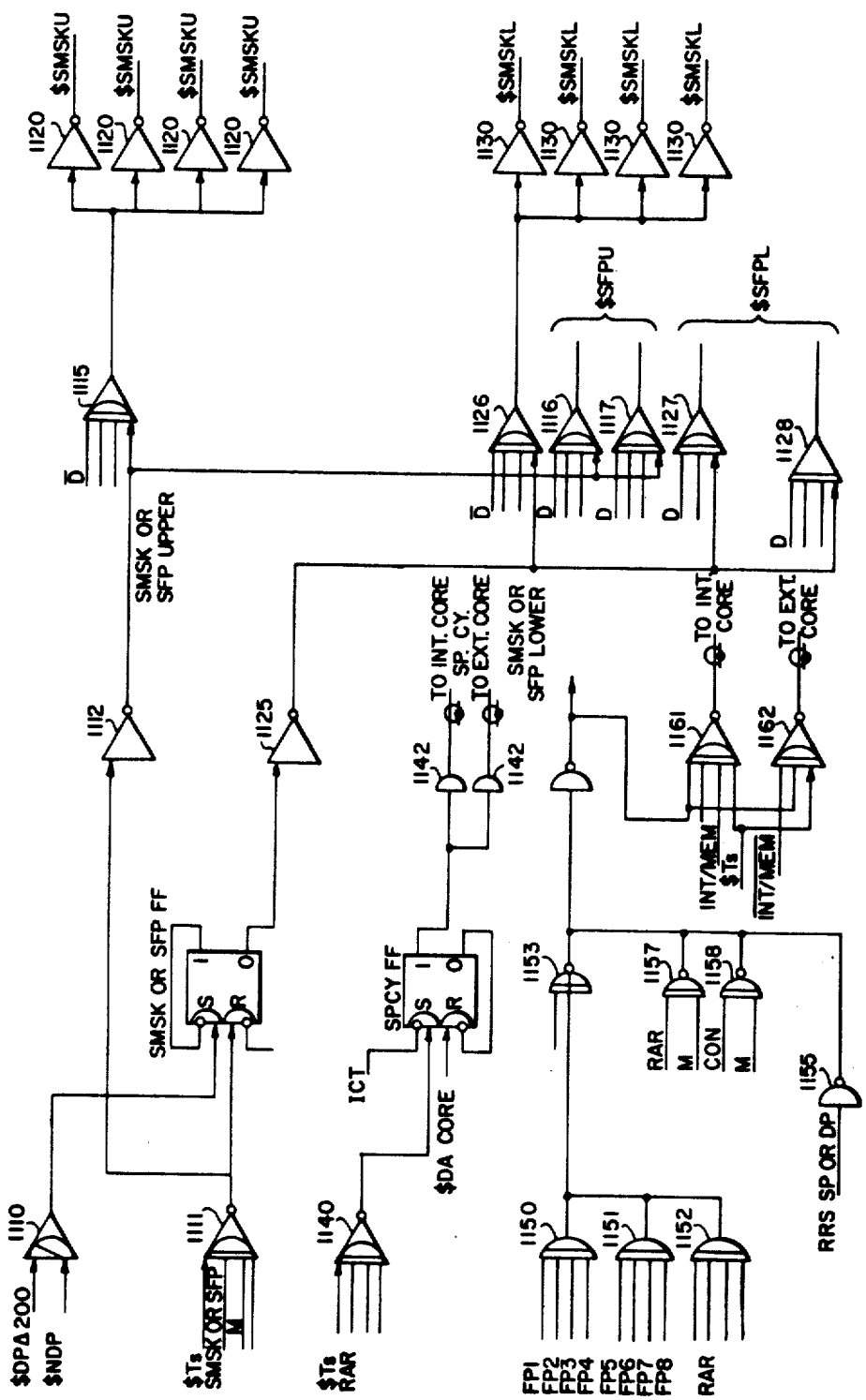
FIGURE 64 is a schematic illustration showing the decoding of command codes.

A read cycle is provided to the core and is developed through the application of predetermined command codes logically gated as shown in FIGURE 64. File protect signals FP1–FP8 (to be described more fully hereinafter) are applied to AND-gates 1150 and 1151. A read/alter/rewrite command RAR is applied through AND-gate 1152 to the outputs of gates 1150 and 1151. The combined outputs of these gates are inverted by an inverter 1153. A read/restore single precision RRS SP or read/restore double precision RRS DP command is applied through an inverter 1155 to the output of the inverter 1153. Similarly, NAND-gate 1157 receives the read/alter/rewrite command RAR as well as the file protect line high state signal M NAND-gate 1158 receives the decoded connect command CON and the high state protect signal M. The outputs of NAND-gates 1157 and 1158 are also applied to the output of the inverter 1153. The combined outputs of NAND-gates 1153, 1157, 1158 and inverter 1155 are inverter in an inverter 1160 and applied to amplifiers 1161 and 1162. The two amplifiers are gated by the cycle initiate pulse $T$_S$; amplifier 1161 is also enabled by the true state of the internal memory signal INT/MEM and amplifier 1162 is enabled by the false state of the internal memory signal $\overline{INT/MEM}$. The outputs of amplifiers 1161 and 1162 provide the read cycle signal to the internal core and to the external core respectively.

Figure 65:
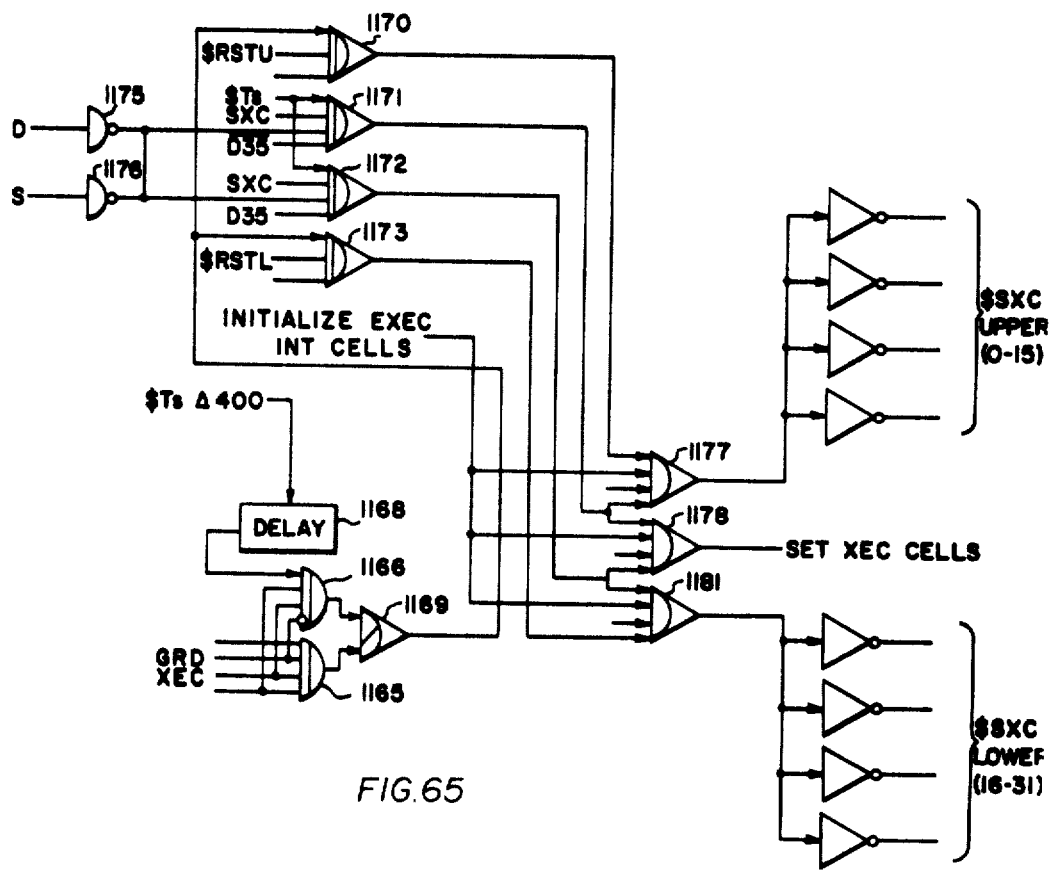
FIGURE 65 is a schematic illustration showing the generation of the set execute signals.

In a like manner, the set execute upper and set execute lower commands $SXCU and $SXCL are developed from the application of the decoded connect or execute signal and the fourth bit of the command code. Referring to FIGURE 65, the set output of the execute flip-flop XEC FF is applied to AND-gate 1165 and AND-gate 1166. AND-gate 1166 is enabled by a delay signal applied through the delay 1168; the signal applied to the delay is the delayed cycle initiate signal $T$_S$\Delta$400 or $T$_S$\Delta$600. The output from the AND-gate 1166 is applied to the amplifier 1169 the output of which gates amplifiers 1170, 1171, 1172 and 1173. The fourth bit of the command code, bit D, is applied to an inverter 1175 the output of which is applied to amplifiers 1171 and 1172. The low state signal of the protect line, the slave mode signal S, is applied through an inverter 1176 to the amplifiers 1171 and 1172. Amplifier 1170 receives the signal $RSTU indicating that one or more of the execute interrupt cells 0–15 is set and unmasked. The amplifier 1171 also receives the cycle initiate pulse $T$_S$, the set execute command signal SXC, as well as the logic level of the data bit $D_{35}$. The amplifier 1171 requires the false level for the data bit 35 $\overline{D}_{35}$.

Amplifier 1172 also receives the set execute command SXC and the true state of the data bit $D_{35}$. Amplifier 1173 receives the signal $RSTL which indicates that one or more of the execute interrupt cells 16–31 is set and unmasked.

The output of amplifier 1170 is applied to disjunctive amplifier 1177, the output of amplifier 1171 is applied to disjunctive amplifiers 1177 and 1178, the output of amplifier 1171 is applied to disjunctive amplifiers 1180 and 1181, and the output of amplifier 1173 is applied to disjunctive amplifier 1181. The amplifiers 1177, 1180 and 1181 may be enabled by the application of initialize execute interrupt cell signal applied thereto to initially set all cells. The output of the amplifier 1177 is applied to a plurality of inverting amplifiers acting as fan out amplifiers to provide the set execute upper pulse $SXCU for setting interrupt cells 0–15. The output of amplifier 1181 is applied to a plurality of inverting amplifiers acting as fan out amplifiers the outputs of which provide the set execute lower pulse $SXCL for setting interrupt cells 16–31. The output of amplifier 1180 provides a set XEC cell signal for utilization elsewhere in the control circuitry.

Figure 66:
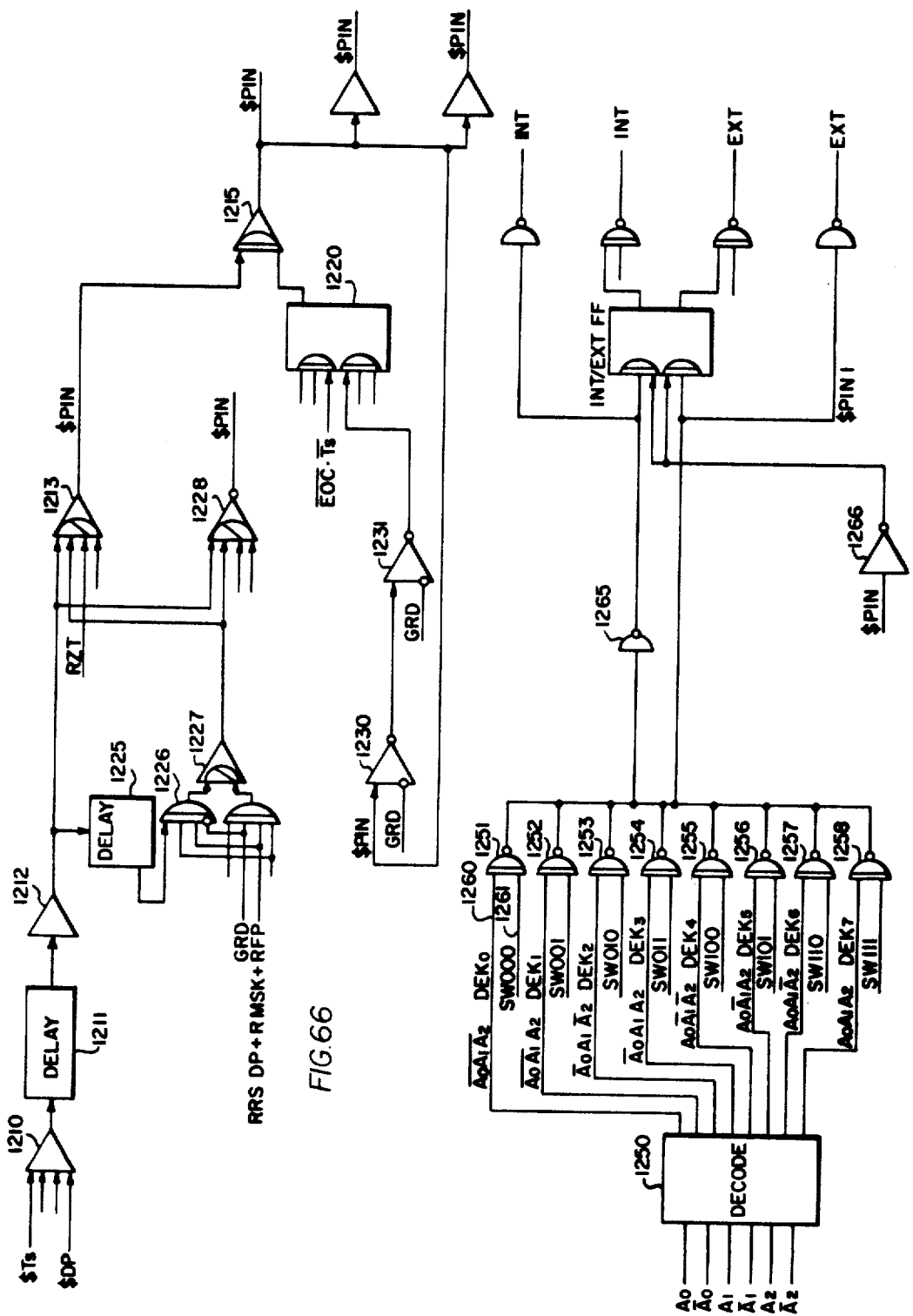
FIGURE 66 is a schematic illustration showing the development of $PIN signals.

A cycle started delay signal is utilized in the memory controller to indicate to communicating devices that zone, address and command information is no longer required by the memory controller. In those instances wherein a double precision command or read/alter/rewrite command is being executed, two such signals are generated. The signal is designated as $PIN and in the case of a double precision or read/alter/rewrite command the two cycle started delay signals are designated $PIN1 and $PIN2. The development of the $PIN signals is shown in FIGURE 66. Referring to FIGURE 66, the cycle initiate signal $T_S$ and the double precision pulse $DP is applied to a disjunctive amplifier 1210. The output of the amplifier 1210 is applied to a delay circuit 1211 and subsequently amplified again in an amplifier 1212 and applied to disjunctive amplifier 1213. The output of amplifier 1213 represents the cycle started delayed pulse $PIN which is gated through amplifier 1215 by the application of the set output from flip-flop 1220. The signal $PIN is also applied to a plurality of fan out amplifiers used for amplifying and applying the signal $PIN throughout the present system.

The output of the amplifier 1212 is also delayed in a delay circuit 1225 and applied to an AND-gate 1226. AND-gate 1226 also receives a signal representing the commands read/restore double precision RRS DP or read mask RMSK or read file protect RFP. The output of the AND-gate 1226 is applied to the amplifier 1227 which supplies a signal to the disjunctive amplifier 1213 and the disjunctive amplifier 1228. It may therefore be seen that the cycle started delayed pulse $PIN may be generated by the application of the cycle initiate pulse $T_S$ or the double precision pulse $DP after a predetermined delay. The delay may be either imposed by simply the delay 1211 or by the delay 1211 and delay 1225; in the latter case only if one of the commands RRS DP, RMSK or RFP is present.

The output of amplifier 1215 is also applied to amplifier 1230 which is connected through amplifiers 1231 to the reset input of the flip-flop 1220. Therefore, the generation of a cycle started delayed pulse $PIN through the amplifier 1215 results in the resetting of the flip-flop 1220. The flip-flop 1220 is set by the application of a signal, generated within the control logic, indicating that the end-of-cycle flip-flop is in the reset state ($\overline{EOC}$) and no cycle initiate pulse exists ($\overline{T}_S$).

The selection of internal or external core memories, to be described more fully hereinafter, is shown in FIGURE 66. Address bits $A_0$, $A_1$ and $A_2$ (the three most-significant bits of the eighteen bit address) are steered to the memory controller by switch assignments on the devices communicating with the memory controller. In addition to the address assignment switches on the communicating devices, the control panel of the memory controller provides eight switches for assigning specific bit configurations (the first three bits) to the internal or external core. Referring to FIGURE 66, the address bits $A_0$–$A_2$ are shown applied, as well as their inverted values, to a decode network 1250. The decode network 1250 may be formed from any of a number of conventional decode networks and need not be described here. The outputs of the decode network 1250 represent the eight possible combinations of the first three address bits $A_0$–$A_2$. Each of these outputs is applied to a NAND-gate 1251–1258 each of which also receives a signal from one of the core assignment switches of the control panel. For example, if address bits $A_0$, $A_1$ and $A_2$ are all zeroes, a binary 1 level will exist on line 1260 applied to NAND-gate 1251. The switch on the control panel corresponding to the first three bit code 000 (SW000) may be either in the external position (EXT) which would provide a binary 1 level on the conductor 1261, or may be in the internal position (INT) to provide a binary 0 level to the conductor 1261. Thus, assuming that the switch is in the external position, and conductor 1261 is at a binary 1 level, both conductors 1260 and 1261 will apply binary 1's to the NAND-gate 1251. The output thereof will thus be at a 0 level. If the switch is on the internal setting, the output of the NAND-gate 1251 will be at a 1 level. The outputs from the NAND-gate 1251–1258 are applied to the reset input of the internal/external flip-flop (INT/EXT FF). The outputs are also inverted in an inverter 1265 and applied to the set input of the internal/external flip-flop. The internal/external flip-flop is gated by the application of the cycle started delay pulse $PIN applied thereto through the amplifier 1266. It may be seen that the flip-flop thus assumes the set or reset state in accordance with the bit configuration of the first three bits of the address currently being processed in a memory controller. Whether the first three bits of a particular bit configuration are to be considered as an address to the internal or external memory is determined by the control panel switch corresponding to that bit configuration. The set input of the internal/external flip-flop, as well as the set output thereof, provide internal signals for gating addresses to the internal core; correspondingly, the reset input and the reset output of the internal/external flip-flop provide external signals for gating addresses to the external core.

Figure 67:
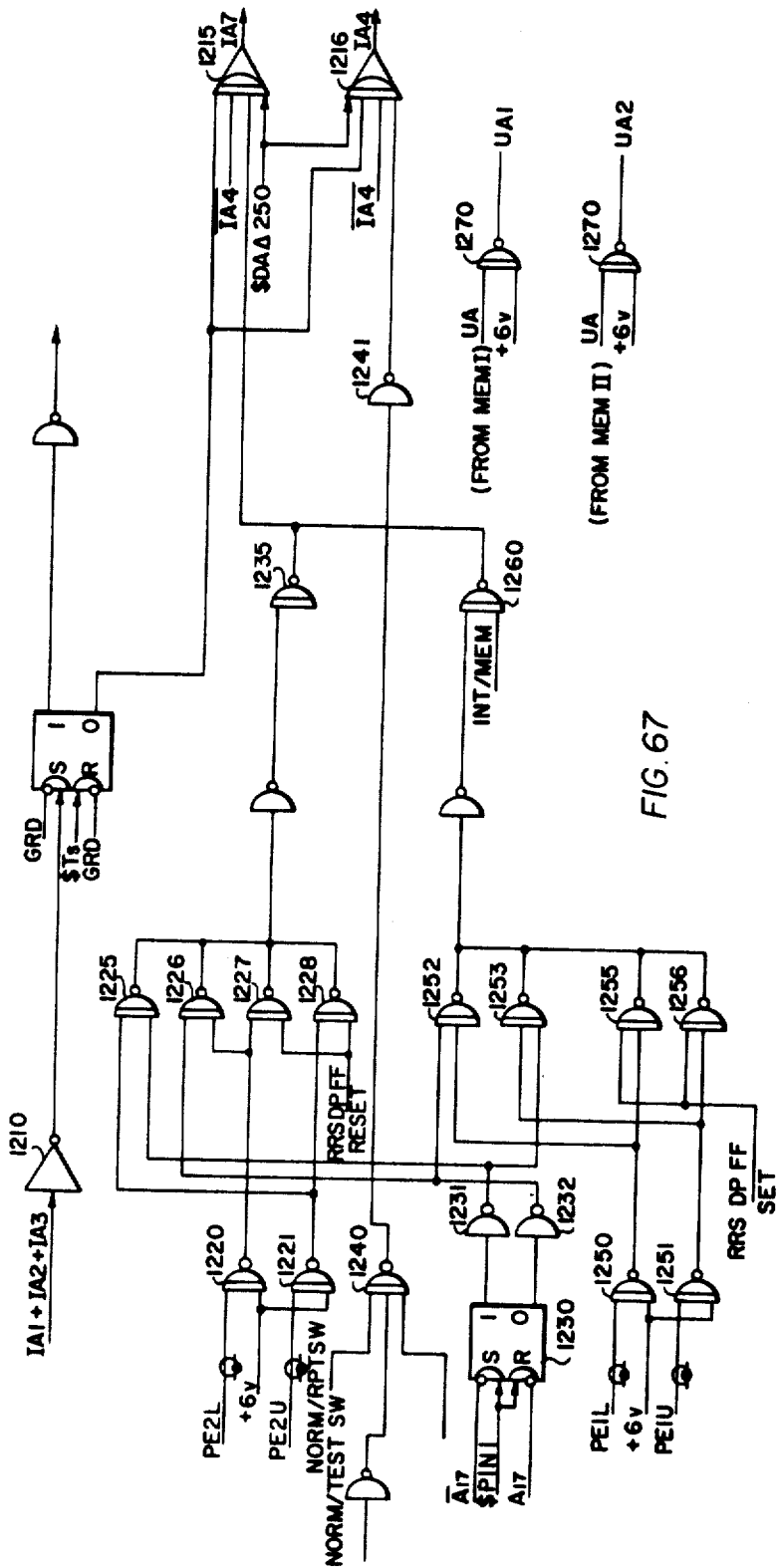
FIGURE 67 is a schematic illustration showing the generation of illegal action pulses.

The generation of the illegal action pulses indicating a parity error, or indicating that no illegal action exists, are developed by the apparatus of FIGURE 67. Referring to FIGURE 67, a flip-flop designated as the illegal action priority flip-flop is provided for detecting the presence of any of the first three illegal action codes IA1, IA2 or IA3. These codes are applied to the flip-flop through an amplifier 1310 and received at the set input thereof. If none of the first three illegal action signals are present, and a cycle initiate pulse $T_S$ is received at the reset input of the flip-flop, the reset output thereof applies enabling signals to conjunctive amplifiers 1315 and 1316. Parity error signals are originated within the memory cores and are applied to the memory controller such as, for example, shown in FIGURE 67 as parity error signals PE2L (parity error memory 2-lower), PE2U (parity error memory 2-upper), PE1L (parity error memory 1-lower) and PE1U (parity error memory 1-upper). Parity error signals PE2L and PE2U are applied to NAND-gates 1320 and 1321 respectively, the outputs of which are applied to NAND-gates 1326, 1327 and 1325, 1328 respectively. The eighteenth bit of the address (bit $A_{17}$) is detected and the false condition thereof is applied to the set input of a flip-flop 1330. The true condition of the $A_{17}$ bit is applied to the reset input of the flip-flop 1330. The flip-flop is enabled by the application of the cycle started delay signal $PIN. The outputs of the flip-flop are applied through inverters 1331 and 1332 to NAND-gates 1325 and 1326 respectively. The reset output of the read/restore double precision flip-flop RRS DP FF is applied to NAND-gates 1327 and 1328. The outputs of NAND-gates 1325–1328 are inverted and applied to NAND-gate 1335 wherein it is combined with the signal indicating external memory. The output of NAND-gate 1335 is also applied to the amplifier 1315. The control panel also may be utilized as indicated in FIGURE 67 by the connection of the normal-repeat switch (NORM/RPT SW) of the control panel to the NAND-gate 1340. The NAND-gate also receives the output of the normal test switch (NORM/TEST) of the control panel and the output of the interrupt push button switch (INT PB) also of the control panel. The output of NAND-gate 1340 is also applied to the amplifier 1315; however, the same signal is inverted in an inverter 1341 and applied to the amplifier 1316.

Parity error signals PE1L and PE1U are applied through NAND-gates 1350 and 1351 to NAND-gates 1352 and 1353 respectively. NAND-gate 1352 is also connected to receive the output of NAND-gate 1332 and NAND-gate 1353 is connected to receive the output of NAND-gate 1331. The set output of the read/restore double precision flip-flop RRS DP FF is connected to NAND-gates 1355 and 1356. The output of NAND-gates 1352, 1353, 1355 and 1356 is inverted and applied to NAND-gate 1360 wherein they are combined with a signal indicating internal memory (INT/MEM). The output of NAND-gate 1360 is applied directly to the amplifier 1315 and is also inverted in the inverter 1341 and applied to the amplifier 1316. Amplifier 1315 receives, as the remaining inputs thereto, the signal $\overline{IA4}$ to indicate that the fourth priority illegal action (non-existent address) does not exist, and the delayed data available pulse $DA\Delta250. The amplifier 1316 receives as the remaining signals thereof the same illegal action signal $\overline{IA4}$ and delayed data available pulse $DA\Delta250. The output of amplifier 1315 indicates that an illegal action having the seventh priority, or parity error, exists. Since the inputs to both amplifiers 1315 and 1316 are identical with the exception that one signal is inverted, only one amplifier will be gated to provide an output signal. Since the input signals to the amplifiers indicate that illegal actions IA1, IA2, IA3 and IA4 do not exist, then the only illegal action signals available for generation are the parity error signal IA7 and the no illegal action signal IA5 (illegal action IA6 is not used in the embodiment chosen for illustration).

The unit available, or memory unit available, signal UA is produced within each memory core and is provided, as shown in FIGURE 67, to a NAND-gate 1370 from each memory core to thereby generate a signal UA1 and UA2 to indicate that the corresponding memory unit is available.

Figure 68:
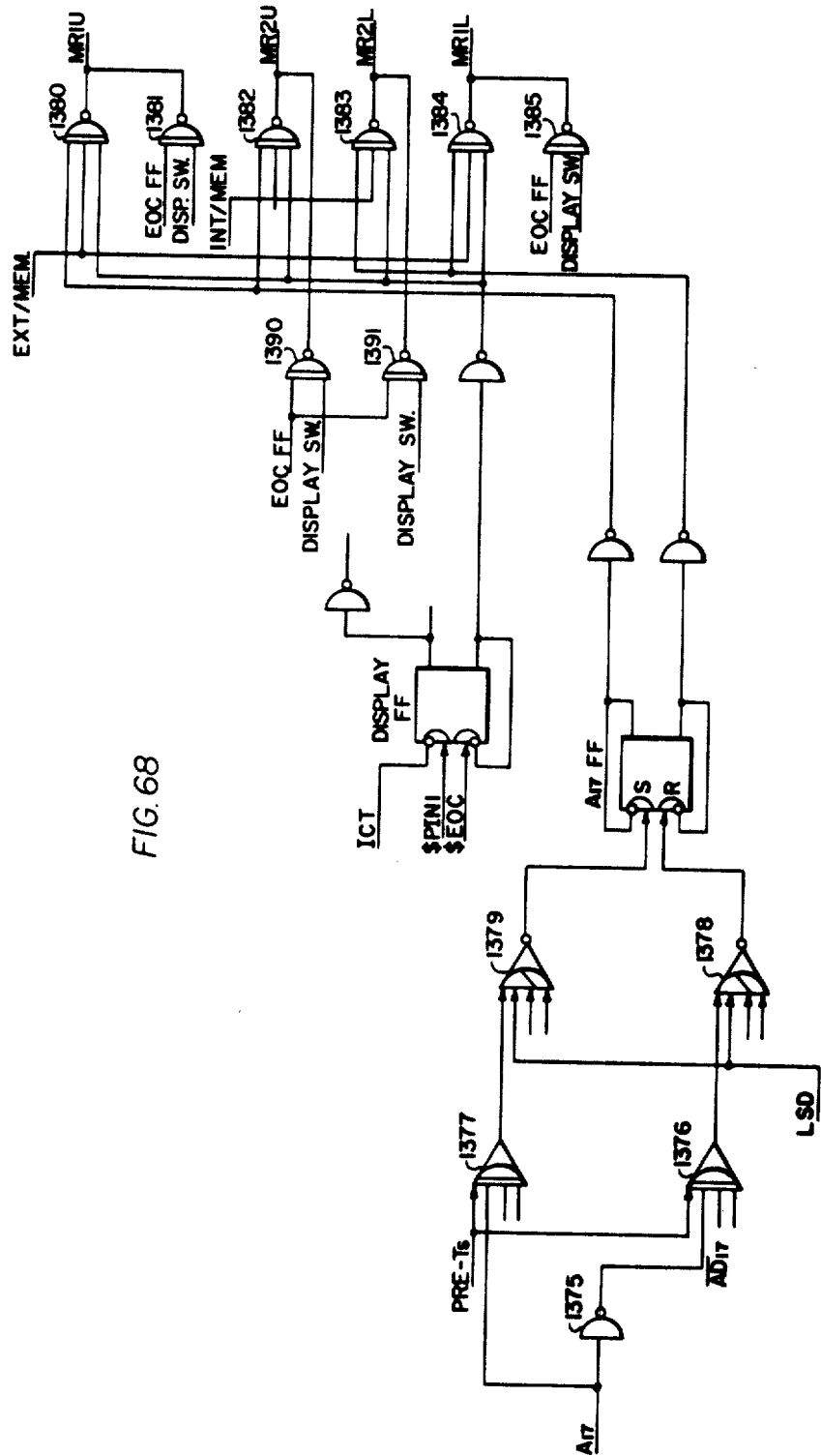
FIGURE 68 is a schematic illustration showing the utilization of the $A_{17}$ flip-flop for storing the binary value of the $A_{17}$ address bit.

The condition of the eighteenth address bit, $A_{17}$, is stored in an $A_{17}$ flip-flop. Referring to FIGURE 68, the $A_{17}$ bit is applied to an inverter 1375 and thence to a conjunctive amplifier 1376. A precycle initiate signal PRE-$T_S$ is also applied to the amplifier 1376. A similar amplifier 1377, except that the $A_{17}$ bit is not inverted, also receives the precycle initiate pulse. The output of amplifier 1376 is applied to amplifier 1378 and the output of amplifier 1377 is applied to amplifier 1379. Each of the amplifiers 1378 and 1379 receives a timing signal LSD generated from the data available pulse $DA CORE delayed. The outputs of the amplifiers 1378 and 1379 are applied to the reset and set inputs respectively of the $A_{17}$ flip-flop. The flip-flop thus stores the condition of the least significant bit of the eighteen bit address. The set output of the flip-flop is inverted and is used as a signal for selecting the upper half of the seventy-two bit word in memory; similarly, the reset output of the $A_{17}$ flip-flop is inverted and utilized for selecting the lower half of the seventy-two bit word in memory. These flip-flop output signals are applied to NAND-gates 1380, 1382, 1383 and 1384. NAND-gate 1380, in addition to receiving the select upper signal from the $A_{17}$ flip-flop, also receives an external memory signal applied thereto. NAND-gate 1384 also receives the external memory signal. An internal memory signal is applied to NAND-gates 1382 and 1383.

An inhibit core cycle signal is applied to the set input of the core display flip-flop. An end-of-cycle pulse $EOC is applied to the reset input thereof. The cycle started delay pulse $PIN enables the setting of the core display flip-flop, the set output of which is inverted and utilized elsewhere in the system. The reset output of the core display flip-flop is inverted and is applied to NAND-gates 1382, 1383 and 1384. NAND-gate 1381 receives the end-of-cycle flip-flop output EOC FF as well as output from the control panel display switch. Similar signals are provided to the NAND-gate 1385. The output of NAND-gate 1380, MR1U, enables the placement of data bits 0–35 from the internal core memory register on data lines 0–35 to the input/output channels. NAND-gate 1382 permits the placement of data bits 0–35 from the external core memory register on data lines 0–35 to the input/output channels. NAND-gate 1383 output, MR2L, permits the placement of data bits 36–71 from the external core memory register on data lines 0–35 to the input/output channels similarly, NAND-gate 1384 output MR1L permits the placement of data bits 36–71 from the internal core memory register on data lines 0–35 to the input/output channels.

NAND-gates 1390 and 1391 each receive end-of-cycle flip-flop signals, EOC FF and signals from the control panel display switch. It may be seen by reference to FIGURE 68 that while the generation of the signals MR1U, MR2U, MR1L and MR2L is the result of the inputs from the $A_{17}$ flip-flop, the internal/external flip-flop, and the core display flip-flop, the same effect may be achieved to result in the display of the contents of a memory register by the appropriate switching of a switch on the memory control panel together with the proper state of the end-of-cycle flip-flop.

Figure 69:
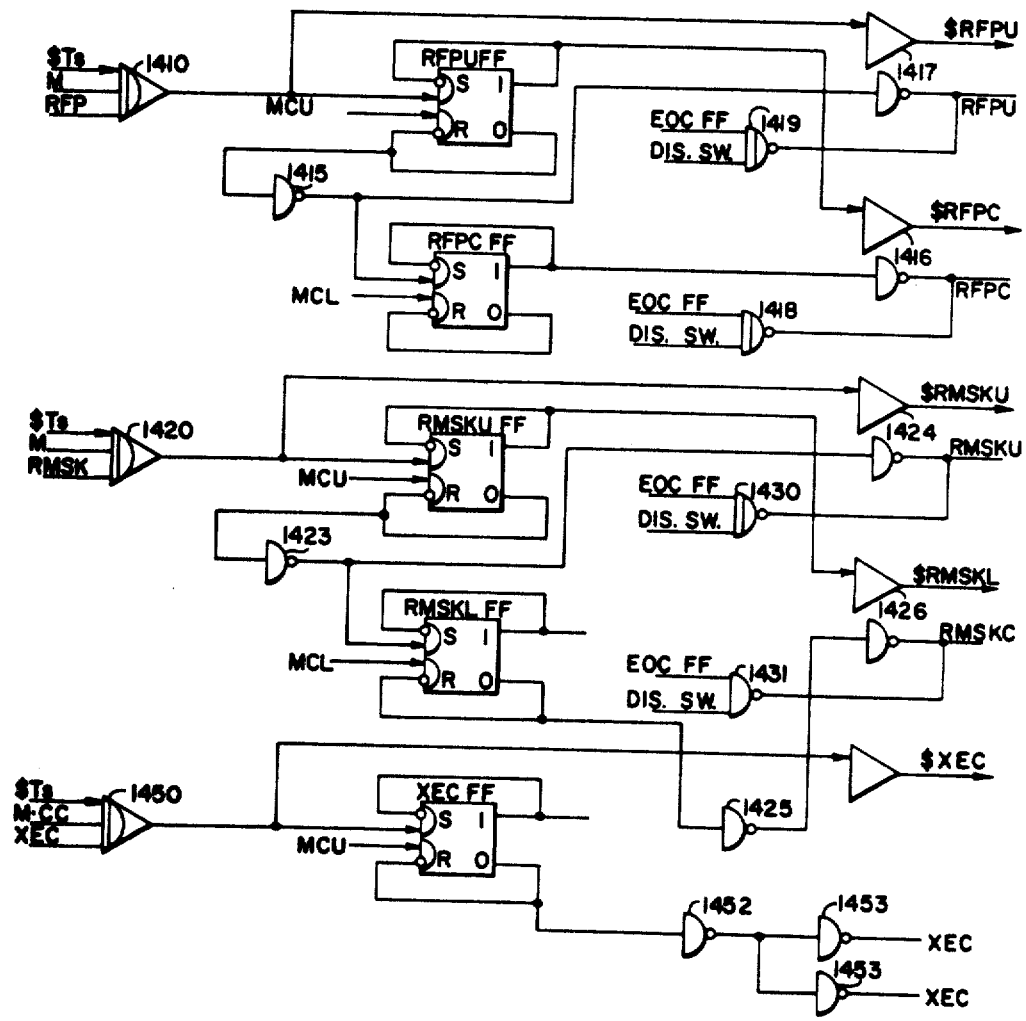
FIGURE 69 is a schematic illustration showing the generation of the read file protect and read mask pulses.

The decoding of the read/file/protect RFP, read/mask RMSK, execute XEC and connect CON commands has already been discussed; however, the utilization of these commands to set or reset corresponding flip-flops may be described by reference to the FIGURE 69. Referring to FIGURE 69, the read/file/protect upper flip-flop RFPU FF is set by the application of a pulse thereto at the set input thereof from conjunctive amplifier 1410. The latter receives an enabling pulse cycle initiate $T_S$ master mode signal M, and the decoded read/file/protect command RFP. The flip-flop is reset by the application of a signal MCU which is generated to reset a read/mask, read/file/protect and execute flip-flops. The set output of the read/file/protect upper flip-flop is applied to an amplifier 1411 which provides the read/file/protect lower signal $RFPL. The input to the set input of the flip-flop is applied to an amplifier 1412 and provides the read/file/protect upper signal $RFPU. The reset output of the flip-flop is inverted in inverter 1415 and applied to the set input of the read/file/protect lower flip-flop RFPL FF. The read/file/protect lower flip-flop is reset by the resetting signal generated to reset all read/mask, read/file/protect, execute flip-flops. The set output of the read/file/protect flip-flop is inverted in inverter 1416 and provides the logic level read/file/protect lower RFPL. The input pulse to the flip-flop is also inverted in inverter 1417 and provides the logic level read/file/protect upper RFPU. The outputs of inverters 1416 and 1417 are each connected to the output of the NAND-gates 1418 and 1419 respectively. Each of the NAND-gates receives an input from the end-of-cycle flip-flop and input from a control panel display switch.

The cycle initiate pulses $T_S$, the master mode signal

M and the decoded command read/mask RMSK are applied to amplifier 1420 the output of which is utilized to enable the set input of the read/mask upper flip-flop RMSKU FF. The output of the amplifier 1420 is also applied to amplifier 1421 to provide a read/mask upper pulse $RMSKU. The set output of the read/mask upper flip-flop is applied to amplifier 1422 for the generation of a read/mask lower pulse $RMSKL. The reset output of the flip-flop is inverted in inverter 1423 and applied to the set input of the read mask lower flip-flop. The output of inverter 1423 is also inverted in inverter 1424 to provide logic level read mask upper RMSKU. The reset output of the read mask lower flip-flop is inverted in an inverter 1425 and again in an inverter 1426 to provide the logic level read mask lower RMSKL. The output of inverters 1424 and 1426 is connected to the outputs of NAND-gates 1430 and 1431 each of which is connected to receive an output of the end-of-cycle flip-flop EOC FF and the output of a display switch of the control panel.

The cycle initiate pulse is applied to an amplifier 1450. The amplifier 1450 also receives the decoded execute command XEC and the signals master mode M and control processor CC. The output of the amplifier 1450 is applied to the execute flip-flop at the set input thereof. The output of amplifier 1450 is also applied to amplifier 1451 for the generation of the execute pulse $XEC. The set output of the execute flip-flop XEC FF provides a logic level XEC for utilization throughout the system. The reset output of the execute flip-flop is inverted in an inverter 1452 and subsequently applied to a plurality of inverters 1453 to provide a fan out of the reset output logic level of the execute flip-flop. This logic level may also be generated from the control panel connected to the reset output of the execute flip-flop XEC FF.

As stated prviously, the flip-flops RFPU FF, RFPL FF, RMSKU FF, RMSKL FF and XEC may all be reset by a signal generated for the specific purpose of resetting all read mask, read file and execute flip-flops.

Figure 70:
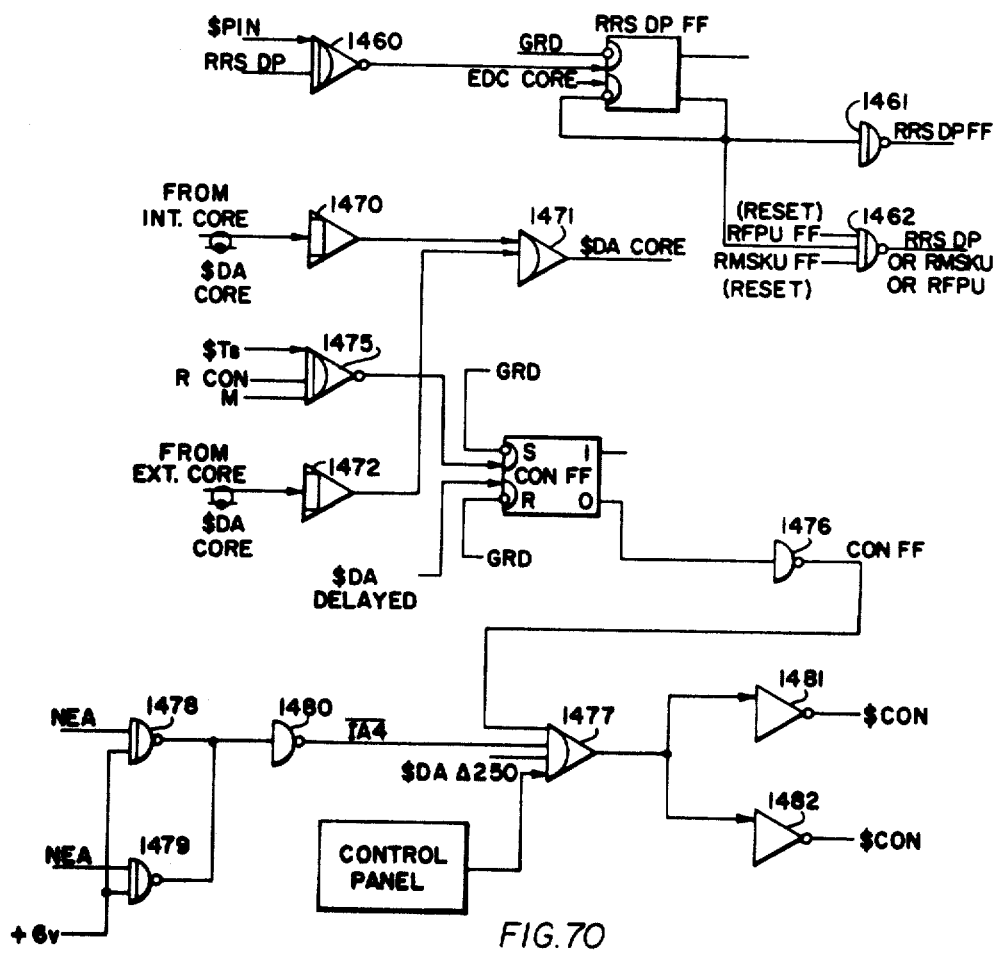
FIGURE 70 is a schematic illustration showing the generation of the read restore logic levels and the connect pulse.

Referring to FIGURE 70, the cycle started delayed pulse $PIN and the decoded command read/restore double precision RRS DP are applied to the amplifier 1460. The output of the amplifier 1460 is applied to the set input of the read/restore double precision flip-flop RRS DP FF. The application of the output of the amplifier 1460 to the flip-flop automatically sets the latter which is reset by the application of a pulse EOS$_{CORE}$. The reset output of the read/restore double precision flip-flop is inverted in an inverter 1461 to provide a logic level indicating the set condition of the read/restore flip-flop RRSDP FF. The reset output of the flip-flop is also applied to a NAND-gate 1462 where it is conjunctively joined with the reset output of the read/file/protect upper flip-flop RFPU FF, and the read/mask upper flip-flop reset output RMSKU FF. The output of NAND-gate 1462 is used throughout the system to indicate the set state of the read/restore double precision flip-flop, the read/mask upper flip-flop or the read/file/protect upper flip-flop.

The data of available signal from the internal core $DA$_{CORE}$ is applied to an amplifier 1470 the output of which is connected to the disjunctive amplifier 1471 to provide a data available core pulse $DA$_{CORE}$ is applied to an amplifier 1472 the output of which is also applied to amplifier 1471 to provide the data available core pulse $DA$_{CORE}$.

The cycle initiate pulse $T$_S$ is applied and enables amplifier 1475. The decoder connect command CON and the master mode signal M is also applied to the amplifier 1475 the output of which is applied to the connect flip-flop and automatically sets the latter. The connect flip-flop is reset by the application of a data available pulse delay $DAΔ. The set output of the connect flip-flop is inverted in an inverter 1476 to provide the connect flip-flop logic level CON FF. This logic level is applied to a conjunctive amplifier 1477 which also receives the delayed data available pulse $DAΔ250. A control panel signal is also applied to the amplifier 1477 for use in test modes. The amplifier 1477 also recieves a signal indicating the nonexistence of the illegal action code for the illegal action $\overline{4IA4}$. This particular illegal action represents a nonexistent address the signals for which (NEA) are applied to NAND-gates 1478 and 1479 from the respective memories and are joined in an inverter 1480 to provide the appropriate input to the amplifier 1477. The output of amplifier 1477 is applied to amplifiers 1481 and 1482 each of which generates the control pulse $CON for connect.

Figure 71:
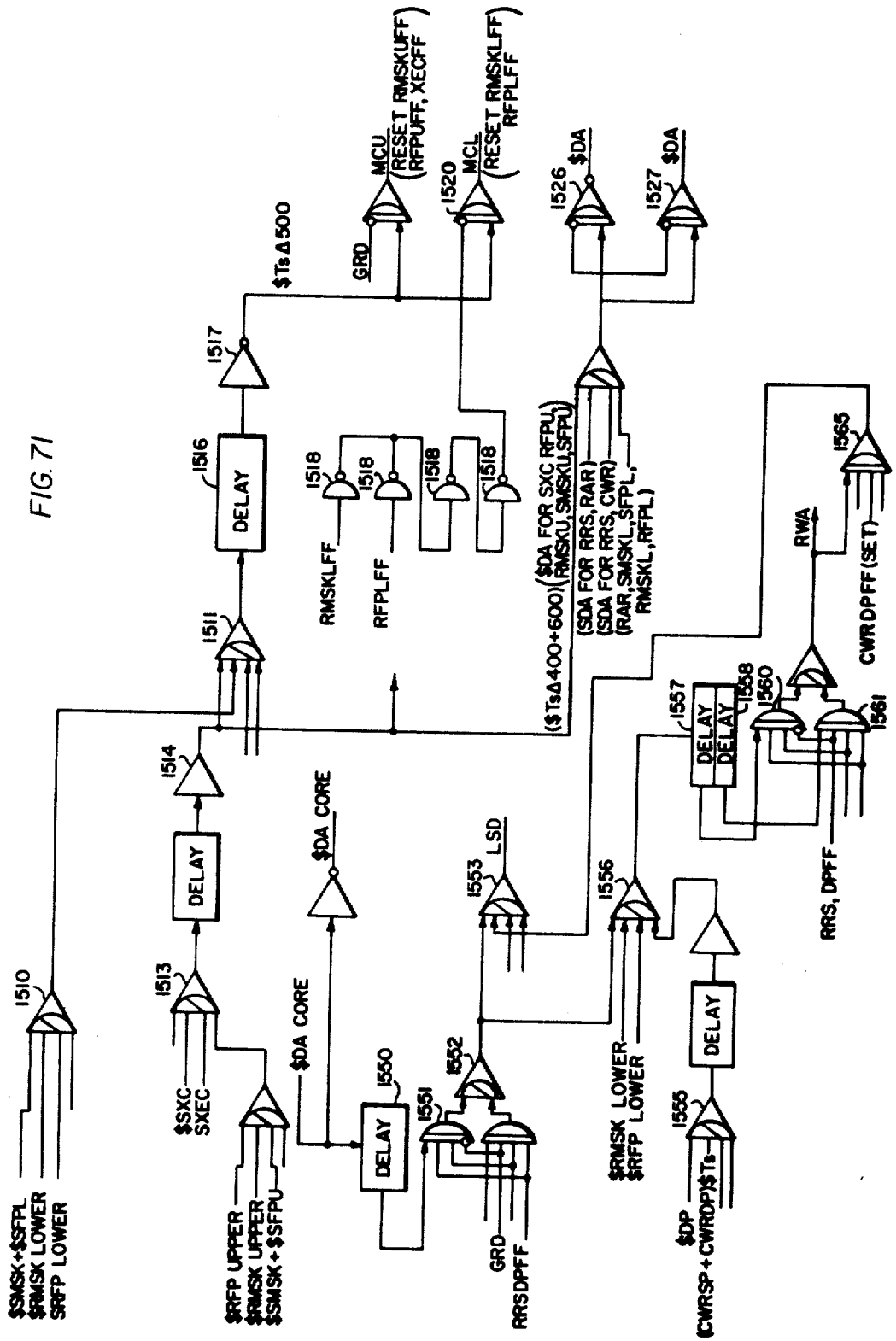
FIGURE 71 is a schematic illustration of the development of data available pulses.

Referring now to FIGURE 71, the set mask pulse $SMSK or the set/file/protect lower pulse $SFPL is applied to the disjunctive amplifier 1510. The amplifier also receives the read/mask lower pulse $RMSKL and the read/file/protect lower pulse $RFPL. The output of this amplifier is applied to disjunctive amplifier 1511. The read/file/protect upper pulse $RFPU, the read/mask pulse $RMSKU, and the set/mask or set/file/protect pulses $SMSKU or $SFPU are applied to disjunctive amplifier 1512. The output of amplifier 1512 is applied to amplifier 1513 which also receives the set execute pulse $SXC, and the execute pulse $XEC. The output of the amplifier 1513 is delayed, amplified again in amplifier 1514 and applied to the amplifier 1511. The output of amplifier 1511 is delayed in delay circuit 1516, amplified in amplifier 1517, and utilized to generate the reset read/mask, read/file/protect and execute flip-flop signals MCU and MCL. The output amplifier 1517 is also utilized as the cycle initiate delayed pulse $T$_S$Δ500. To generate the reset signal for use in the read/mask lower flip-flop RMSKL FF and read/file/protect lower flip-flop RFPL FF, the read/mask lower flip-flop and read/file/protect lower flip-flop signals are applied through a series of inverters 1518 and subsequently applied to the amplifier 1520 with the output of the amplifier 1517.

The output of amplifier 1514 is also utilized as the cycle initiate delay pulse $T$_S$Δ400; the latter pulse is used as the data available pulse $DA for the set execute SXC, read/file/protect upper RFPU, read/mask upper RMSKU, read/set/mask upper RSMSKU and set/file/protect upper SFPU commands. This pulse is applied to amplifier 1525. Amplifier 1525 also receives the data available pulse $DA for the read/restore RRS and read/alter/rewrite RAR commands. The third input to the amplifier 1525 receives the data available pulse $DA for the read/restore RRS and clear/write CWR commands. The fourth input to the amplifier 1525 is the logic level representing read/alter/rewrite, set/mask lower SMSKL, set/file/protect lower SFPL, read/file/protect lower RFPL and read/mask lower RMSKL. The output of amplifier 1525 is applied to a pair of fan out amplifiers 1526 and 1527 each of which provides a data available pulse $DA for utilization throughout the present system.

The data available pulse derived from the memory core $DA$_{CORE}$ is applied to a delay circuit 1550 and subsequently applied to an AND-gate 1551. The read/restore/double precision flip-flop is also connected to the AND-gate 1551 the output of which is applied through an amplifier 1552 to the disjunctive amplifier 1553.

The double precision pulse $DP is applied to a disjunctive amplifier 1555 together with a logic level indicating clear/write/single precision or double precision and the cycle initiated pulse $TS delayed. The output of amplifier 1555 is again delayed and applied to a disjunctive amplifier 1556. Amplifier 1556 also receives the read/file/protect pulse $RFPL and read/mask pulse $RMSKL. The output of amplifier 1552 is also applied to amplifier 1556 the output of which is delayed in a double delay circuit divided into an upper delay 1557 and a lower delay 1558. The signal applied from amplifier 1556 is first delayed in delay portion 1557 and applied to AND-gate 1560. The same signal is delayed again in the delay portion 1558 and applied to the AND-gate 1561. The output of the read/restore/double precision flip-flop RRS DP FF is applied to both AND-gates 1560 and 1561; however, the signal is inverted prior to its application to gate 1560. Thus, when a true signal is applied from the delay 1557 to the AND-gate 1560, a false output from the read/restore/double precision flip-flop is required to enable the gate 1560; similarly, when an output from delay 1558 is applied to the AND-gate 1561, a true condition of the read/restore flip-flop is necessary to enable the latter. The outputs of both AND-gates 1560 and 1561 are amplified and generate a signal designated RWA to be utilized elsewhere in the system. This signal is also applied to a conjunctive amplifier 1565 where it is combined with the set output of the clear/write/double precision flip-flop the output of which is applied to the amplifier 1553. The output of amplifier 1553, designated LSD, is a signal applied to the amplifiers connected to the input of the $A_{17}$ flip-flop. This signal is used for generating the complement of the address bit $A_{17}$.

Figure 72:
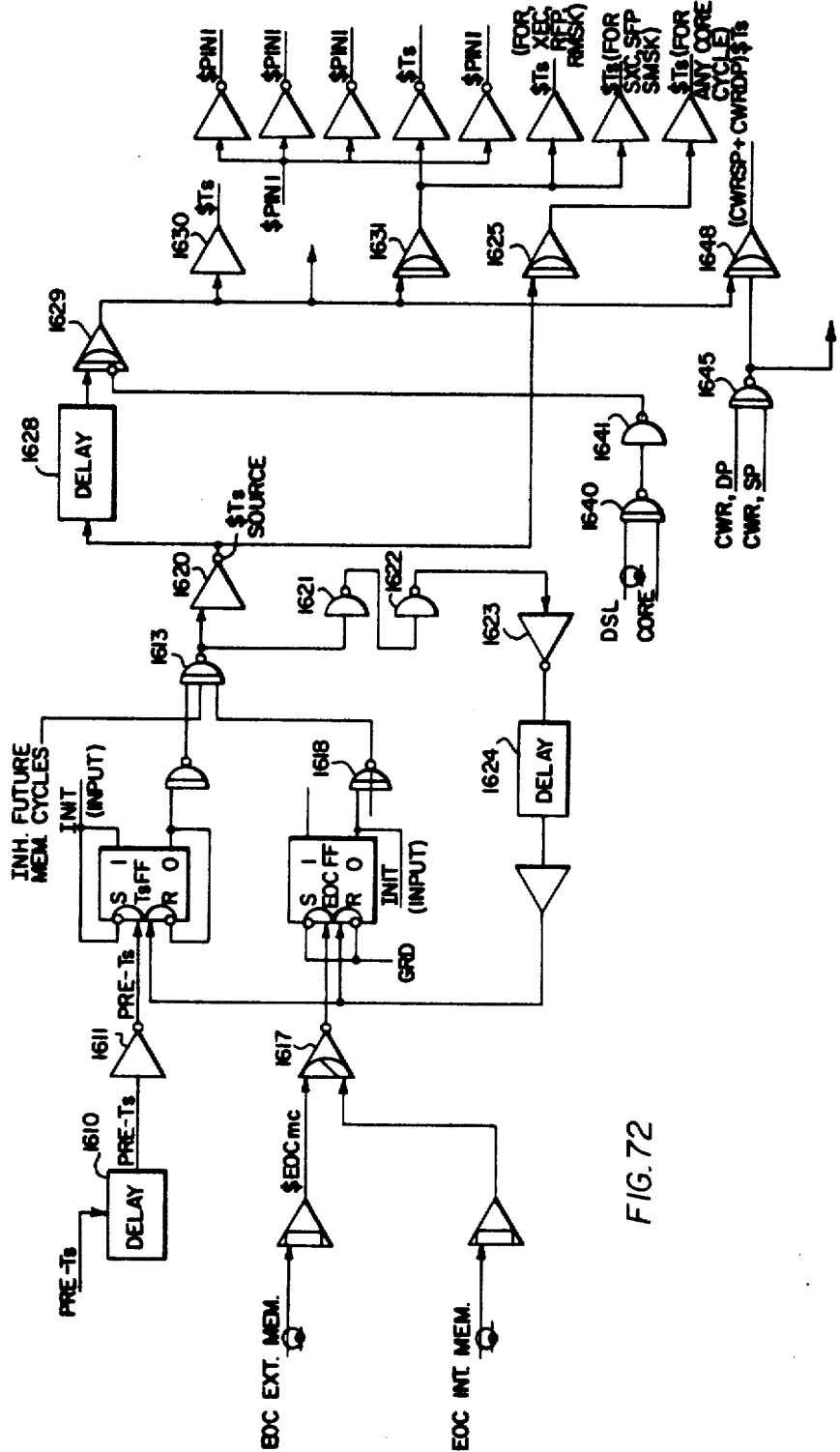
FIGURE 72 is a schematic illustration showing the generation of the cycle initiate pulse $T_S$.

The generation of the cycle initiate pulse $T_S$ may be seen by reference to FIGURE 72. A precycle initiate pulse PRE-$T_S$ is applied to a delay circuit 1610. The precycle initiate pulse is derived from the channel interrupt scheme described previously. The precycle initiate pulse is amplified in an amplifier 1611 and applied to the cycle initiate flip-flop at the set input thereof. The reset output of the cycle initiate pulse is amplified and applied to NAND-gate 1613 where it is conjunctively combined with a signal from the control panel and from the inverted output of the reset output of the end-of-cycle flip-flop EOC FF.

The end-of-cycle pulse EOC EXT MEM, and the pulse EOC INT MEM, from the external and internal memories respectively, are each amplified and applied to the disjunctive amplifier 1617. The end-of-cycle pulse from the memory controller $EOC_{MC}$ is also applied to the amplifiers 1617 the output of which is connected to the set input of the end-of-cycle flip-flop EOC FF. The reset output of the end-of-cycle flip-flop is connected to the NAND-gate 1613 as described previously, through NAND-gate 1618 which inverts the logic level thereof. It may also be noted that the reset output of the end-of-cycle flip-flop is connected to the control panel initialization switches to permit the forcing the end-of-cycle flip-flop into the reset state.

The output of the NAND-gate 1613 is amplified in an amplifier 1620 the output of which provides the prime source for the cycle initiate pulse $T_S$. The output of NAND-gate 1613 is also inverted in inverters 1621 and 1622, amplified in amplifier 1623, delayed in delay circuit 1624, and fed back to the reset inputs of the end-of-cycle flip-flop EOC FF and the cycle initiate flip-flop $T_S$ FF. The output of amplifier 1620 is applied to amplifier 1625, and through amplifier 1626 to provide the cycle initiate pulse $T_S$ for any core cycle. The same output from amplifier 1620 is delayed in a delay circuit 1628 and applied to a conjunctive amplifier 1629. The output of amplifier 1629 is applied to amplifier 1630 the output of which provides the cycle initiate pulse $T_S$; output of amplifier 1629 is also applied to amplifier 1631 which ultimately provides the cycle initiate pulse $T_S$ for memory controller commands execute XEC, read/file/protect RFP, read/mask RMSK, set execute SXC, set/file/protect SFP and set/mask SMSK.

In some instances, it may be desirable to utilize memory cores having different speeds; to accommodate various speed memories while nevertheless utilizing the same logical structure implemented in the memory controller of the present invention, a signal may be developed from the corresponding core memory to indicate the speed thereof. For example, in the embodiment chosen for illustration, a signal DSL is gated from the core through NAND-gate 1640. The existence of the binary 1 for the signal DSL represents a memory of one microsecond; similarly, a binary 0 value for the signal DSL indicates a two microsecond memory. The output of a NAND-gate 1640 is inverted in inverter 1641 and applied to the NAND-gate 1629 described previously. The gating of NAND gate 1629 by the appropriate signal from the corresponding memory core will result in a cycle initiate pulse $T_S$ being generated through the delay circuit 1628. It will be obvious to those skilled in the art that the generation of the cycle initiate pulse $T_S$ may be modified substantially in accordance with the specific memory speeds intended to be used with the memory controller.

The cycle initiate pulse $T_S$ for utilization in connection with the clear/write/single precision and clear/write/double precision commands is developed through the application of the corresponding commands to NAND-gate 1645. A decoding of a clear/write/double precision command CWR DP or clear/write single precision command CWR SP will result in the placement of a binary 0 at the input to the NAND-gate 1645. NAND-gate 1645 will thus generate a logical 1 output if either or both of the clear/write commands are present. The output of gate 1645 is applied to conjunctive amplifier 1648 which is gated to provide the cycle initiate pulse $T_S$ for the clear/write/single precision and clear/write double precision commands.

Figure 73:
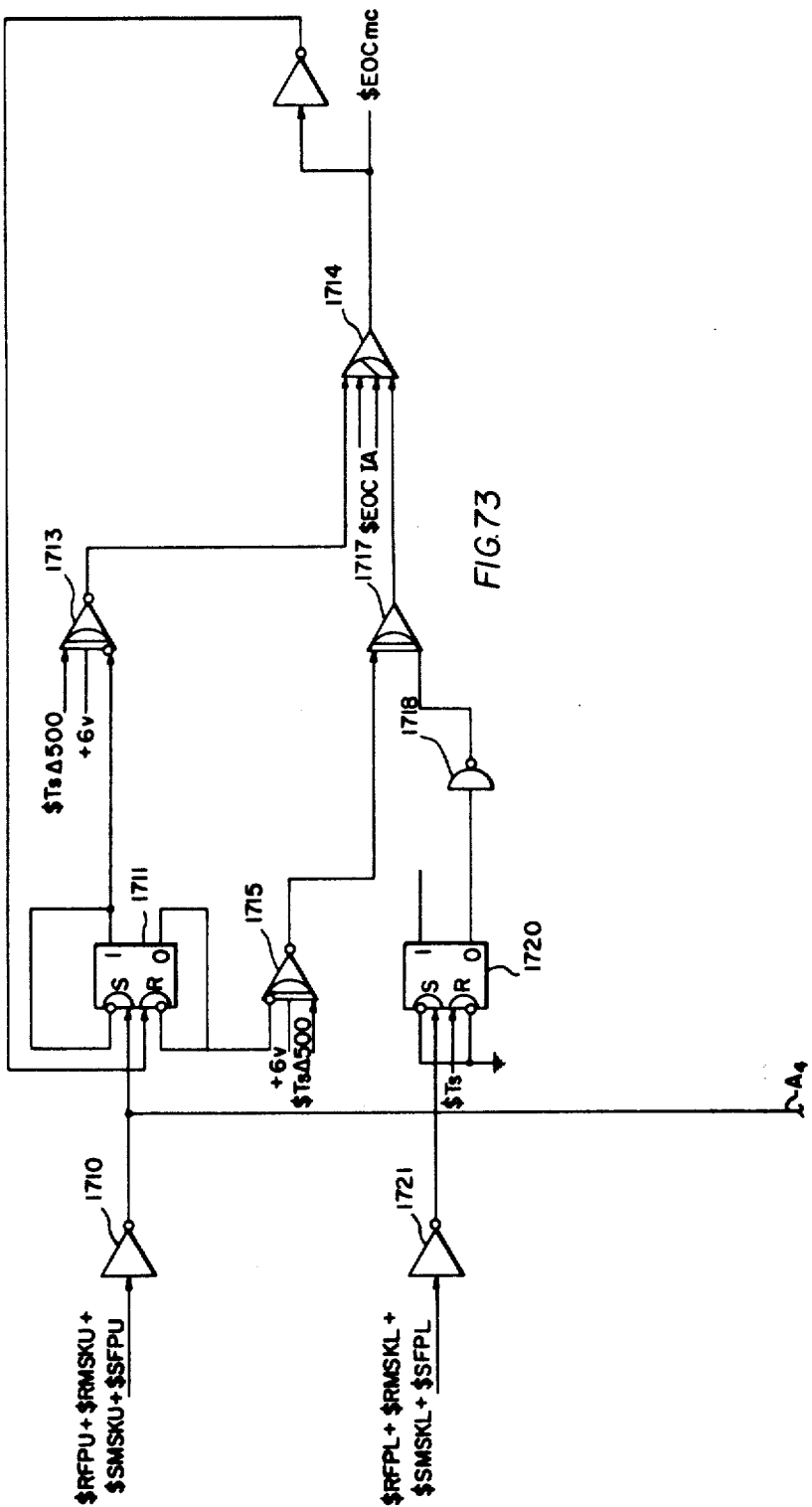
FIGURES 73 and 74 are schematic illustrations showing the generation of the end-of-cycle pulse and the sample interrupt pulse respectively.

The generation of the end-of-cycle pulse for the memory controller $EOC_{MC}$ and the generation of the sample interrupt pulse $SI$ are shown and may be described by reference to FIGURES 73 and 74. Memory controller commands of double precision nature required different treatment in the generation of the sample interrupt pulse $SI$; the double precision pulses or commands requiring double precision pulses must be given the opportunity to complete the operation undertaken in response to the command without the interruption of a sample interrupt pulse that may award priority to a different communicating device than the one requesting the double precision operation. Accordingly, memory controller double precision commands $RFPU, $RMSKU, $SMSKU and $SFPU are applied to an amplifier 1710. The output of the amplifier is connected to the set input of flip-flop 1711. The set output of flip-flop 1711 is inverted and applied to conjunctive amplifier 1713. The amplifier also receives a cycle started delayed pulse $T_S\Delta 500$. The false state of the set output of flip-flop 1711 will thus, in combination with the cycle pulse $T_S\Delta 500$, generate a pulse from the output of amplifier 1713 through the disjunctive amplifier 1714 to represent the end-of-cycle memory controller pulse $EOC_{MC}$. The output of amplifier 1714 is also amplified and fed back to the reset input of the flip-flop 1711. The reset output of flip-flop 1711 is applied to conjunctive amplifier 1715 which is gated by the application of the cycle initiate delayed pulse $T_S\Delta 500$. The output of amplifier 1715 is applied to amplifiers 1717 and there conjoined with the output of inverter 1718 which receives as an input the reset output of flip-flop 1720.

Memory controller commands $RFPL, $RMSKL, $SMSKL and $SFPL are applied to amplifier 1721 the output of which is applied to the set input of flip-flop 1720. An output from the amplifier 1721 will cause the setting of flip-flop 1720 and the false state of the reset output thereof. This output, inverted in the inverter 1718, will enable the amplifier 1717 and result in a pulse applied to the amplifier 1714. An output from the amplifier 1714 will, as described previously, be utilized as the end-of-cycle pulse memory core $EOC_{MC}$. Resetting of flip-flop 1720 is provided by the application of the cycle initiate pulse $T_S$ to the reset input thereof.

Amplifier 1714 also receives the end-of-cycle illegal action pulse $EOC_{IA}$ which, when amplified by the amplifier 1714, provides the end-of-cycle memory core pulse $EOC_{MC}$.

Figure 74:
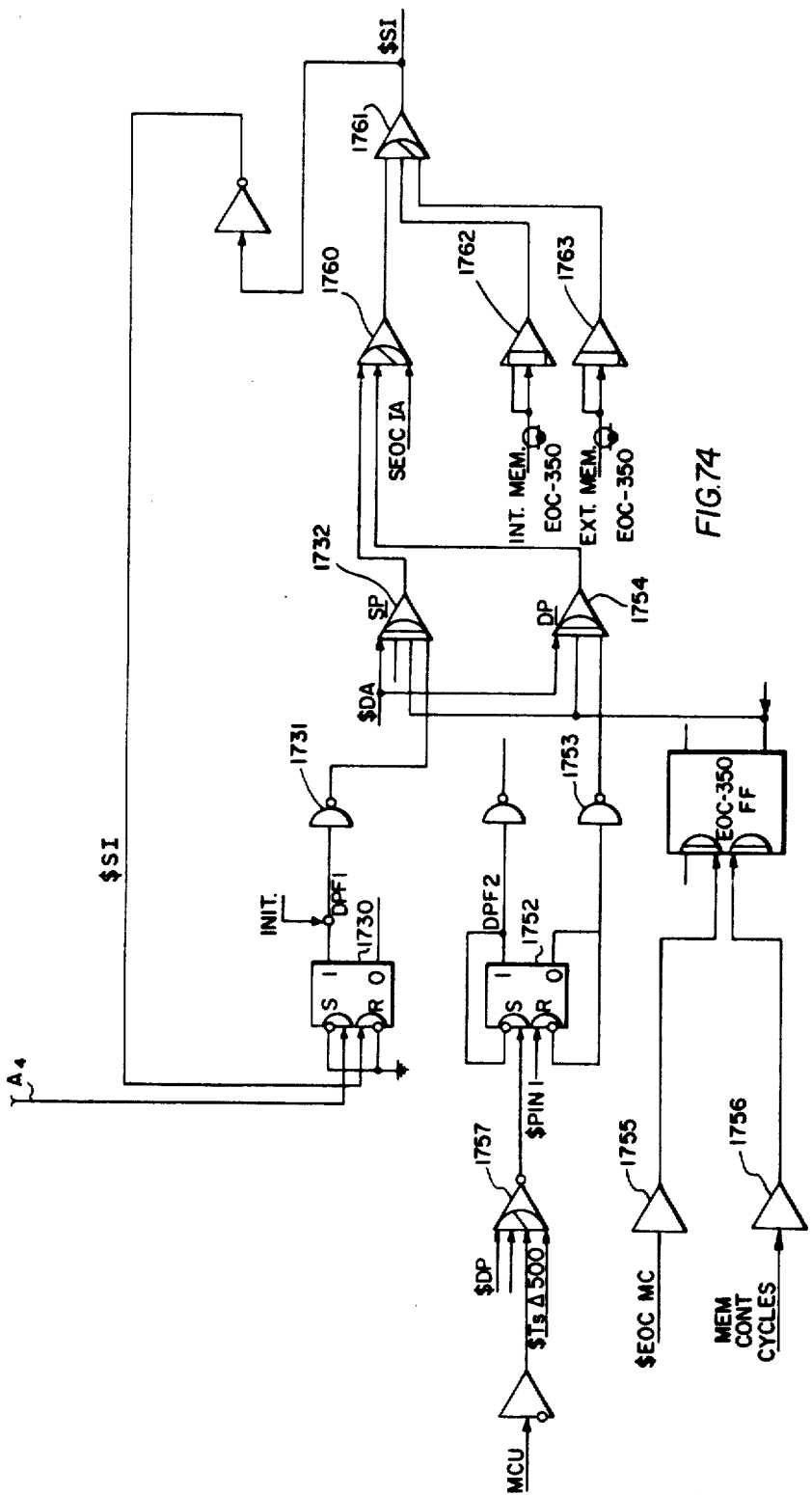

Referring now to FIGURE 74, the output of amplifier 1710 is also applied to the set input of flip-flop 1730 the set output of the flip-flop 1730 is inverted in an inverter 1731 and applied to an amplifier 1732. The amplifier 1732 is also connected to receive the reset output of the end-of-cycle-350 flip-flop (EOC-350) and is gated by the application of the data available pulse $DA. The amplifier 1732 thus provides an appropriate output signal when the command being decoded is a single precision command. The flip-flop 1730 may be forced into the appropriate state by the application of an initialization signal applied to the set input thereof from the control panel.

A reset signal for resetting the read/mask/upper, the read/file/protect upper, and the execute flip-flops MCU is applied to an amplifier 1750. The output of the amplifier is applied to disjunctive amplifier 1751 which also receives the double precision pulse $DP and the cycle initiate delayed pulse $T_S \Delta 500$. The output of the amplifier 1751 is applied to the set input of a flip-flop 1752. Flip-flop 1752 is set by the application of the output of amplifier 1751 and is reset by the application of the cycle started delayed pulse $PIN1. The set output of the flip-flop 1752 is indicative of the existence of a double precision command and may be utilized throughout the system. The reset output of the flip-flop 1752 is inverted in an inverter 1753 and is applied to amplifier 1754 which may be designated the double precision amplifier. Amplifier 1754 also receives the reset output of the end-of-cycle-350 flip-flop and is gated by the data available pulse $DA. The output of amplifier 1754 therefore indicates the distance of a double precision command and may be utilized throughout the system for the necessary housekeeping functions concomitant with double precision operations.

The end-of-cycle memory controller pulse $EOC_{MC}$ is applied to an amplifier 1755 the output of which is connected to the set input of the end-of-cycle-350 flip-flop. The reset input to the flip-flop is connected to the output of amplifier 1756 which receives a pulse indicating a memory controller cycle command. The flip-flop may also be forced into the appropriate state by the application of an initialization pulse applied to the reset output thereof from the control panel. As stated previously, the output signals from the single precision amplifier 1732 and the double precision amplifier 1754 are connected to disjunctive amplifier 1760 which provides one input to a disjunctive amplifier 1761. End-of-cycle-350 pulses generated from the internal and from the external memory cores are amplified in amplifiers 1762 and 1763 and are also applied to the amplifier 1761. The output of amplifier 1761 is the sample interrupt pulse $SI which institutes another priority search and assignment to the channels connected to the memory controller. The sample interrupt pulse $SI is also amplified and fed back to the reset input of flip-flop 1730. It may thus be seen that the detection of a double precision operation command applied to the amplifier 1710 results in the setting of flip-flop 1730 to thereby inhibit the generation of a signal from the single precision amplifier 1732. Correspondingly, a double precision command will result in the setting of flip-flop 1752 in the set state and the enabling of double precision amplifier 1754.

*Memory core system*

Figure 75:
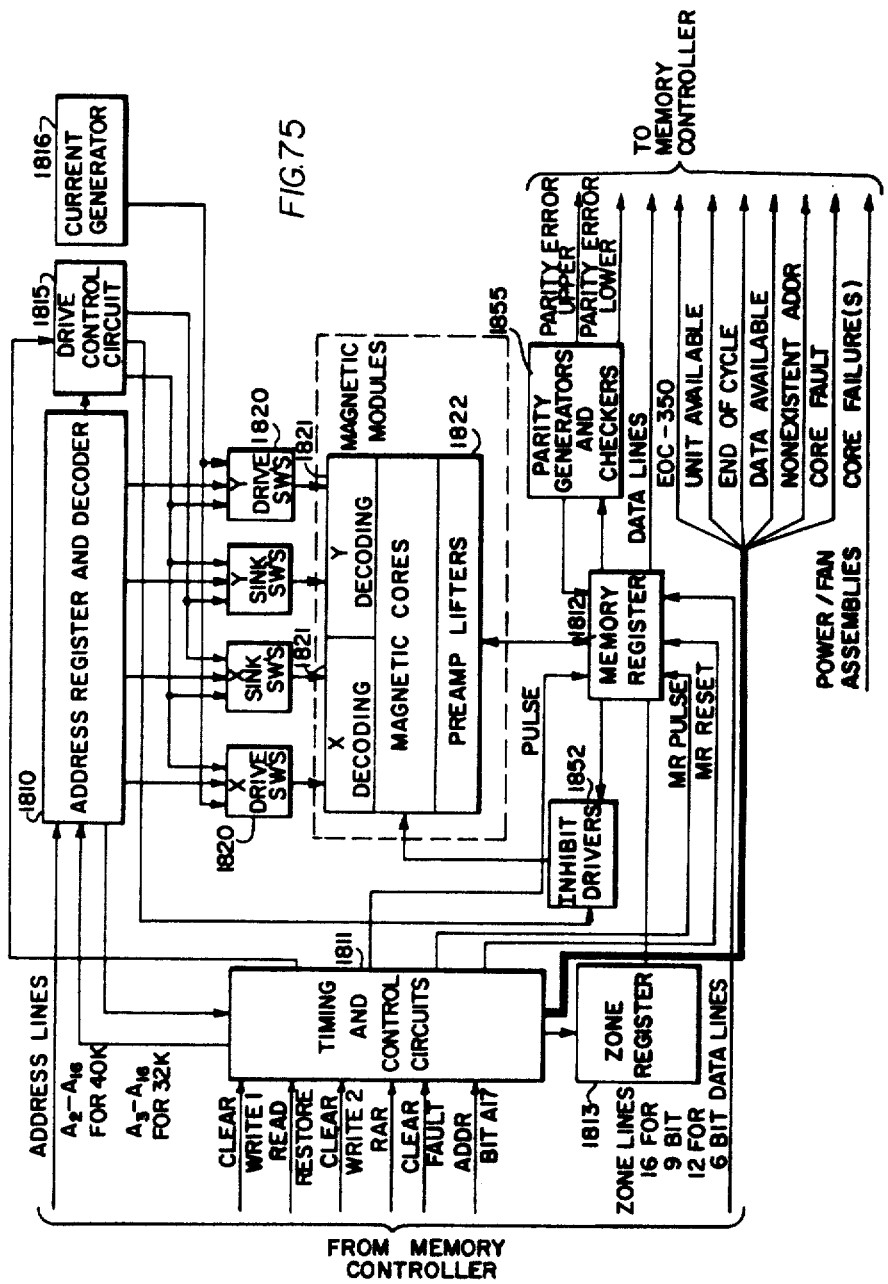
FIGURE 75 is a simplified block diagram showing the memory core system.

The memory core system stores binary data received from the communicating devices through the memory controller and restores this data to the communicating device upon receipt of the proper command. The core system may be any size within the limits of available addressing capabilities. The memory is divided into internal and external blocks which are based upon 32K or 40K modules. The 32K or 40K memory core each comprises two 16K or two 20K core halves, the halves being identical. Each half contains logic and storage for 16K or 20K thirty-six bit data words plus one parity bit. The core system handles the half data words in parallel to form words of seventy-two data bits and two parity bits. A memory cycle includes a read timing sequence followed by a write timing sequence. During a memory cycle, either a read/restore/clear/write or read/alter/rewrite operation is performed. The appropriate signals are provided to the timing and control circuits of the core system from the memory controller. Referring to FIGURE 75, a simplified block diagram is shown of the memory core system. It may be seen that the interface with the memory controller is indicated in FIGURE 75 by the notation "from memory controller" and the notation "to memory controller."

The input lines includes address lines intended to route an address word to the core system. The address word will include fifteen bits (address bits $A_2$–$A_{16}$) for a 40K core system and fourteen bits ($A_3$–$A_{16}$) for a 32K core system. These address bits are applied in parallel with a zero voltage level representing a binary 0 and a 1 volt level representing a binary 1. The address lines are applied to an address register and decoder 1810.

The address line for the address bit $A_{17}$ is not applied to the address register; this bit is utilized in a specific manner to be described later and is applied directly to the timing and control circuits 1811 of the core system. The address bit $A_{17}$ indicates to the core system that the thirty-six bit word being addressed is either the upper half or the lower half of the seventy-two bit word utilized in the core system. A logic level of one indicates that the thirty-six bit word being addressed is in the upper half (bits 0–35) of the data word addressed. Conversely, a logic level 0 of the bit $A_{17}$ indicates to the core system that the lower half (bits 36–71) of the seventy-two bit word being addressed is to be used.

A thirty-six bit word received by the memory controller is applied through drivers to both upper and lower locations of an address thus resulting in seventy-two data lines applied to the memory register 1812. The data lines route a data word to be stored to the core system; the data words are applied in parallel and are applied directly to the memory register. Whether the data is to be written into the upper or lower half of the seventy-two bit core system data word will depend, as stated previously, upon the condition of address bit $A_{17}$.

Figure 76:
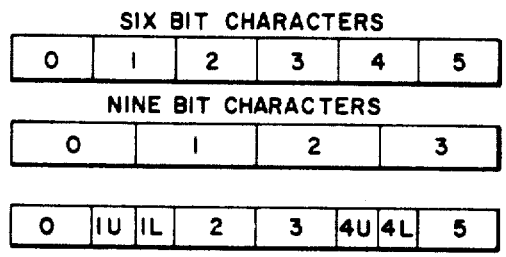
FIGURE 76 is an illustration of a data word showing six bit characters and nine bit characters.

Zone control lines route zone control data to the zone register 1813 of the core system. The zone information thus presented to the core system enables the selection of specific increments in the seventy-two bit data word for either the clear/write or read/alter/rewrite operations. The relationship of the zone register with the memory register and the ability of the zone register to control utilization of incoming information for changing specific portions or increments of a data word may best be described by reference to FIGURE 76. The zone register implements a unique six/nine bit option wherein any thirty-six bit half of a seventy-two bit data word may be utilized as a six 6 bit character word or four 9 bit character word. Referring to FIGURE 76, a thirty-six bit half of a seventy-two bit data word is shown divided into zones. The upper portion of FIGURE 76 shows the division of thirty-six bits into six 6 bit characters numbered 0–5. The middle portion of FIGURE 76 shows the same thirty-six bits divided into four 9 bit characters numbered 0–3. The lower portion of FIGURE 76 illustrates the zones utilized in the system of the present invention to differentiate between the 6 bit or 9 bit chaacters in a thirty-six bit word. The zones are designated as follows: Z0, Z1U (upper), Z1L (lower), Z2, Z3, Z4U (upper), Z4L (lower) and Z5. If it is desired to write into a thirty-six bit word six characters of 6 bits each, then predetermined zone lines will be energized with binary 1 levels to thereby permit the insertion of the characters; correspondingly, different zone lines will be energized to enable the writing of four 9 bit characters in the thirty-six bit word. The following table illustrates the zone lines having a logic 1 thereon for enabling the writing of any specific character position in either the six 6 bit character word or the four 9 bit character word:

TABLE I

| Character Position | Zone Lines Having Logic ONE |
|---|---|
| 36 bit word | six 6 bit characters |
| 0 | Z0 |
| 1 | Z1U, Z1L |
| 2 | Z2 |
| 3 | Z3 |
| 4 | Z4U, Z4L |
| 5 | Z5 |
| 36 bit word | four 9 bit characters |
| 0 | Z0, Z1U |
| 1 | Z1L, Z2 |
| 2 | Z3, Z4U |
| 3 | Z4L, Z5 |

For example, if it is desired to write into character position 4 of a thirty-six bit word comprising six 6 bit characters, the necessary data lines may be energized to contain the desired character information, and zone lines Z4U and Z4L will be energized to assume a logic level of 1 thereby permitting the writing of the 6 bit character in character position 4. Similarly, a 9 bit character may be written into character position 2 through the energization of zone lines Z3 and Z4U. In this manner, data words may comprise six or nine bit characters and successive words may change from six to nine bit characters. The six/nine bit option presents the flexibility; specifically, the flexibility is provided by the manner in which the option is exercised and implemented in the utilization of eight zone lines for each thirty-six bit word.

Referring again to FIGURE 75, the read/restore command $RRS is applied to the timing and control circuit 1811 to provide the data word in memory associated with the address specified on the core system data output line. The data word, thus read from core, is restored to core at the same address from which it was read. The clear/write single precision command pulse $CRW SP or $CWR1 is applied to the timing and control circuit 1811 and enables the core system to accept the data word on the input line then stored in a location specified by the address and the zone line data. Single precision/clear/write commands are performed on one-half of the seventy-two bit data word and a read/restore is performed on half of the seventy-two bit data word. The half of the seventy-two bit word being read or being written depends on the status of the $A_{17}$ bit flip-flop. Data to be written into memory is received from a communicating device by the memory controller together with the appropriate zone information. The zone information is applied to the zone register in accordance with whichever half of the seventy-two bit of memory space is to be utilized. In double precision commands, two thirty-six bit words are received from the communicating device together with two 8 bit zone codes which are stored in the zone register for control of the reading or writing of the seventy-two bit word into memory.

The clear/write double precision command pulse $CWR DP enables the core system memory register 12 to store half data words (thirty-six bits) either in position 0–35 or 36–71 depending on the zone data information. A clear/write single precision pulse $CWR1 follows the double precision pulse $CWR2 by a predetermined time delay (200–700 nanoseconds); the latter gates the remaining half of the data word bits into the core system.

During the second part of the cycle in a double precision cycle, the core system retains the data information fed in during the first part of the cycle; the second half data word is then loaded into the memory register at locations depending on the zone data information. The core system then gates the entire seventy-two bits into the core stack at the address specified by the address lines.

A read/alter/rewrite command, RAR, enables the core system to provide the word in memory associated with the address specified, on the core system data output line. The data word is then modified and restored at the same address and with the same specified zones. A pulse on the read/restore line along with the read/alter/rewrite signal initiates the read memory cycle; a pulse on the clear/write single precision line along with the read/alter/rewrite signal initiates the rewrite portion of the read/alter/rewrite memory cycle.

A clear fault line is provided and provides a signal to the timing and control circuits 1811 to clear the core memory system logic control flip-flops. The clear fault signal is sent if the memory is stopped in a clear/write double precision CWR DP command, or read/alter/rewrite RAR and a double precision pulse $DP (on the clear/write one line $CWR1) was not received.

The memory core system provides data output lines to route the data word from the memory register to the memory controller. Parity error lines are also provided, one for designating a parity error in the least significant thirty-six bits of a seventy-two bit data word (PEL) the other for indicating parity in the most significant thirty-six bits (PEU). Both lines are activated for the read/restore (RRS) and read/alter/rewrite (RAR) operations and are reset at the end of the cycle. A unit available line indicates to the memory controller that the core system is available. An end-of-cycle pulse line provides a pulse $EOC_{CORE}$ to indicate that the end of a core cycle has occurred; an output is also provided to indicate that the end-of-cycle pulse will occur in approximately 350 nanoseconds. This pulse, EOC-350, is used to ready the memory controller for the reception of the end-of-cycle core $EOC_{CORE}$. A data available output line for providing a data available pulse $DA is also provided and indicates to the memory controller that the data word is present and stable on the core system data output lines. A nonexistent address lines is provided for delivering a nonexistent logic level NEA to indicate that a nonexistent address has been attempted by the communicating device.

A core fault line is provided to indicate to the memory controller that the memory is stopped in a clear/write double precision CWR DP or a read/alter/rewrite RAR cycle because a double precision pulse $DP was not received from the memory controller within the predetermined time allotted for its receipt. A core failure line is provided and indicates to the memory controller that a core system has failed for mechanical reasons such as, fan, temperature, power failure, etc. The core failure signal CF inhibits future core cycles and the core system starts a nondestructive shutdown.

The timing and control circuits 1811 include pulse generators, delay lines and logic circuits all of which are well-known in the art and need not be described in detail. These circuits convert input signal levels from the memory controller to levels compatible with the memory core and produce the required read/write and inhibit timing levels to enable the required drive currents to flow in the selected drive lines. These circuits also provide reference voltage output and also generate the unit available UA and end-of-cycle EOC signals. The data available pulse $DA, the memory register reset pulse, the memory register pulse and the read amplifier pulse $RA are also generated by the timing and control circuits 1811. The address register and decoder 1810 also comprise circuits that are well-known in the prior art. These circuits may comprise an address register having a flip-flop for each of the address word and a binary to octal address decoder. A plurality of the decoder circuits may be provided, each decoder circuit converting three binary address bits to one octal output. The decoders select the drive and sink switches necessary to drive a magnetic core X and Y lines. Drive control circuits 1815 shape and amplify signals from the timing and control circuits. The drive control circuits provide inhibit driver timing to inhibit drivers, sink switch read and write timing sink switches, and appropriate logic levels to the sink and drive switches.

Figure 77:
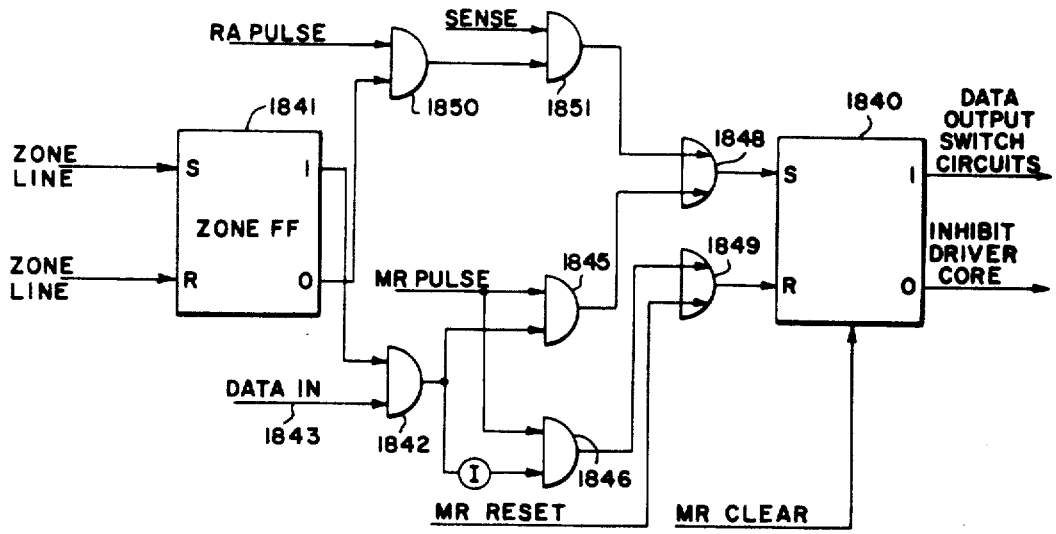
FIGURE 77 is a schematic illustration showing a single memory register flip-flop in relation to a corresponding zone flip-flop.

The current generator 1816 functions to provide the X and Y core drive currents required for a read or write operation when the selected drive and sink switches are closed. The drive and sink switches 1820 function together with the transformer decoders 1821 to steer drive currents through selected cores. The sink and drive switches are selected by the address held in the address register and enabled by the corresponding timing signals. The transformer decoding circuits 1821 comprise drive and isolating transformers for converting the read and write sink and drive switch outputs into bipolar drive currents. Preamplifiers 1822 are provided and are connected to the sense winding of each stack of memory cores. The output of the preamplifiers is routed to the sense input of the read amplifier circuits on the memory register. The memory register 1812 includes a flip-flop for each input or output data bit, and two flip-flops for two parity bits (one associated with each thirty-six bit half data word). While the memory register may be formed from elements well-known in the prior art, the interrelationship of the memory register and the zone register is of significance. Accordingly, reference may now be made to FIGURE 77 which shows a simplified schematic diagram of the relationship of a zone flip-flop with a memory register flip-flop. Referring to FIGURE 77, a single memory register flip-flop 1840 is shown and its relation is also shown to a corresponding zone flip-flop 1841 to which it is connected. It will be understood that the zone flip-flop 1841 is connected to more than one memory register flip-flop to implement the zone control described previously. The zone flip-flop 1841 receives a zone line input at the reset input thereof and a zone reset line at the reset input thereof. The set output of the zone flip-flop is conjunctively combined in an AND-gate 1842 with information received on a data line 1843. The output of the AND-gate 1842 is applied to AND-gate 1845 and is inverted and applied to AND-gate 1846. AND-gates 1845 and 1846 are enabled by a memory register pulse applied thereto. The outputs of AND-gates 1845 and 1846 are applied to the memory register flip-flop 1840 through OR-gates 1848 and 1849.

The reset output of the zone flip-flop 1841 is combined in AND-gate 1850 with a read amplifier pulse. The output of AND-gate 1850 is applied to AND-gate 1851 that is enabled by the receipt of a sense pulse from the magnetic core. The output of AND-gate 1851 is applied to the set input of a memory register flip-flop through the OR-gate 1848. The memory register flip-flop may be reset by the application of a reset pulse through the OR-gate 1849 to the reset input thereof and may be cleared by the application of an appropriate memory register clear pulse thereto. The set output of the memory register flip-flop 1840, in the embodiment chosen for illustration in FIGURE 77, is applied to the memory controller and represents the data output from the memory register. The reset output of the memory register is applied to inhibit drivers for application to the magnetic cores. To write into a specific location in a thirty-six bit word, the corresponding zone line must be at a binary 1 level to set the zone flip-flop of the zone register corresponding to that bit position. The set condition of the zone flip-flop enables the binary value of the input data to set or reset the memory register flip-flop in accordance therewith. If the zone flip-flop corresponding to the bit position is in the reset state, the data applied to that memory register flip-flop is inhibited from effecting the state thereof. When it is desired to read the contents of a specific memory location, the zone line is such that the zone flip-flop corresponding to that bit position is in a reset state so that the read amplifier pulse is gated resulting in the sense pulse from core being gated to the memory register flip-flop for that bit position. In a read/alter/rewrite cycle, if a particular zone is not going to be written into, then the zone flip-flop is in a 0-state and information from core is read into the memory register flip-flop; if, however, information will be read into a particular zone, that zone flip-flop is set to the set state and information from core is inhibited from affecting the memory register flip-flop which is set or reset only in accordance with the data input from the memory controller.

Returning to FIGURE 75, inhibit drivers 1852 enable the transfer of data from the memory register to the memory cores during a write operation or during the restore portion of a read cycle. Each inhibit driver receives an enabling or disabling signal from an associated memory register stage and a timing signal from the drive control circuit to produce inhibit winding current flow through the core matrix. Writing or restoring of ones and zeroes is controlled by the inhibit drivers in response to these signals. The inhibit winding current effectively cancels approximately one-half of the X and Y drive line currents.

Parity generating and checking circuits 1855 are provided to check the outputs of the thirty-six memory register flip-flops to determine if there is odd or even parity in the word. During a clear/write cycle, if parity is even, a one parity bit is generated to be stored at the same time that the data word is stored in the magnetic core. In a read/restore cycle, the data half word (thirty-six bits) and its associated parity bit are applied from the memory register to the parity checker circuit. If parity is even, a parity error signal (PEU or PEL) is sent to the memory controller.

During a memory cycle, either a read/restore (RRS), clear/write/single precision (CWR SP), clear/write/ double precision (CWR DP) or a read/alter/rewrite (RAR) operation is performed. The operation is executed depending upon the signals received on the clear/write, read/restore, clear/write 2 and read/alter/rewrite input lines to the timing and control circuits 1811.

A clear/write single precision cycle is initiated by a pulse on the clear/write 1 line CWR1. The first half of the cycle is used to clear the magnetic cores at the selected address to permit new information to be written in for storage. The final half cycle is used to route new information from the memory controller to the magnetic cores. As the cycle begins the core system receives and stores the address word in the address register and decoder; the data word is received and stored in the memory register, and the zone information is stored in the zone register. During the clear portion of the clear/write cycle, all data in the magnetic cores at the select address are cleared (all seventy-two cores are reset to the 0-state) by a read current gate from the drive control circuits. To prevent loss of data in the zones where information is not to be written, this data is stored in the memory register flip-flops and then restored to the magnetic cores at the same address along with the new data transferred into the active zones. As described previously, the read amplifiers for zones where new data is to be stored are prevented from affecting the corresponding memory register flip-flop states while those associated with zones which are not to be changed are gated to the corresponding memory register flip-flops during the clear portion of the cycle. It is therefore possible to write into the memory register flip-flops only that data that is to be read back into the magnetic cores and it is impossible to read into the memory register information that is to be discarded in those positions to contain new information.

At the start of the write portion of the clear/write cycle, the address is located in the address register. An X and Y drive line are chosen and the write timing signal from the timing and control circuit enables the selected write sink switches. Drive lines are selected for drive current flow in the write direction. The new information on the data input lines is applied to those memory register flip-flops as selected by the zone level. Each memory register flip-flop is accordingly set by the application of a one data bit or reset when the data bit is zero.

Each memory register flip-flop is coupled, as explained previously, to an inhibit driver which is enabled by a timing signal from the drive control circuit when the flip-flop is in the reset or 0-state. When a zero is to be written into a specific memory location, an inhibit current is applied through the inhibit winding. The inhibit current is equal to one-half of the selected X and Y currents and flows in the opposite direction thereby cancelling a sufficient proportion of the magnetomotive force to prevent the core located at the intersection of the X and Y drive lines from being switched to the 1-state. Therefore, those cores which receive write currents and no inhibit current are driven to the 1-state.

A clear/write double precision cycle CWR DP is a modification of the single precision cycle. The double precision cycle is initiated by a clear/write pulse on the clear/write 2 CWR2 input followed within 200–700 nanoseconds by a similar pulse on the clear/write 1 input. Upon receipt of the pulse on the clear/write 2 line either data bits 0–35 or 36–71 are stored in thirty-six memory register flip-flops, depending on the zone information. Upon the subsequent receipt of a pulse on a clear/write one line, along with zone levels, a normal clear/write cycle is initiated except that no data is loaded in the memory register flip-flops in which data was stored previously but is pulsed into the remaining thirty-six memory register flip-flops. During the clear portion of the cycle no read amplifier is associated with the memory register flip-flops in which data was stored during the double precision write. Therefore, during the write portion of the cycle the contents of the entire memory register (seventy-two bits) are written into the magnetic cores at this specified address.

The read/restore cycle (RRS) is initiated by a pulse on the read/restore input line. The first half of the cycle is used to interrogate the magnetic cores (full seventy-two bit data word) at the selected address and transfer the information stored to the memory register for transmittal to the memory controller. Following this word retrieval, the data word is restored to the memory core at the same address.

A read/alter/rewrite cycle (referred to previously as a split cycle) is initiated by a pulse in the read/alter/rewrite line to the timing and control circuits together with a pulse on the read/restore input line. During the read portion, the entire data word stored at the selected address is read out of the magnetic core into the memory register and routed to the communicating device through the memory controller. The communicating device may then modify the data in the memory register before it is restored to the magnetic core. The restore portion of the cycle is initiated by a pulse on the read/alter/rewrite input line together with a pulse on the clear/write one line. As in the clear/write cycle, there is provision for zone transfer when the modified data is pulsed into the memory register. The entire data word, altered in accordance with the data provided by the communicating device, is then written into the magnetic core. During the read/alter/rewrite operation, parity is checked during the read portion and during the write portion of the cycle; the parity bit for the new word is generated and the parity bits are written into the magnetic cores.

*File protect*

The memory controller of the present invention provides a means for protecting specified blocks of memory in accordance with a command received from the control processor. The memory protection thus afforded by the file protect system of the present invention is in addition to and of a different type than the boundary checking provisions provided by the processor. The file protect system includes a file protect register comprising storage means (flip-flops) for information relating to areas of memory to be protected. Each bit stored in each flip-flop of the file protect register is utilized as a means for indicating that a corresponding 1024 word block of memory is to be protected. The file protect register is loaded from the control processor through the utilization of the set/file/protect upper $SFPU and set/file/protect lower $SFPL pulses derived from the set/file/protect command. The application of these pulses to the file protect register permits the setting or resetting of the file protect register flip-flops in accordance with the set or reset state of the data lines at the time the file/protect command was detected. Subsequent to the loading of the file protect register, the output of the file protect register is continuously applied to compare circuits. All subsequently received addresses have bits $A_2$–$A_7$ applied to the decode circuits the output of which are also applied to the compare circuits. A positive comparison with the contents of the file protect register results in the generation of an illegal action pulse $IA together with an illegal action code indicating that a portected area has been addressed.

Figure 78:
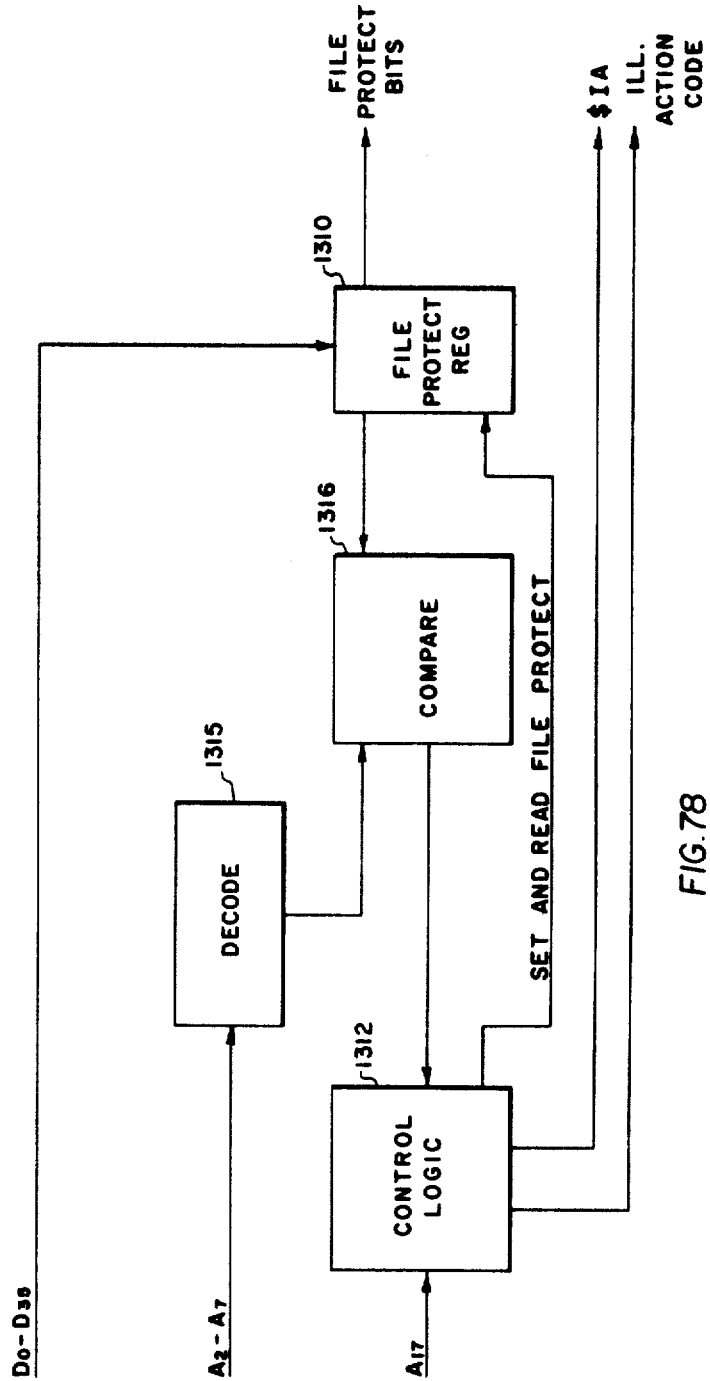
FIGURE 78 is a simplified block diagram illustrating the relationship of the file protect register to the remainder of a memory controller subsystem.

A simplified block diagram is shown in FIGURE 78 and is intended to illustrate the relationship of the file protect register to the remainder of the memory controller subsystem. Referring to FIGURE 78, the file protect register 1910 receives data bits $D_0$–$D_{35}$ when the register has been enabled by a set/file/protect command from the control logic 1912. Address bit $A_{17}$ is applied to the control logic 1912 to enable all sixty-four flip-flops of the file protect register to be set or reset in accordance with two successive thirty-six bit data words applied thereto. Subsequently, all addresses received by the memory controller have bits $A_2$–$A_7$ applied to a decode circuit 1915 which applies the decoded address to a compare circuit 1916. The compare circuit compares the decoded address bits $A_2$–$A_7$ with the contents of the file protect register. Correspondence between the two results in a signal to the control logic 1912 indicating that a protected area of memory has been addressed. The control logic provides an illegal action pulse $IA to the communicating device as well as an illegal action code indicating the protected area has been addressed.

Figure 79:
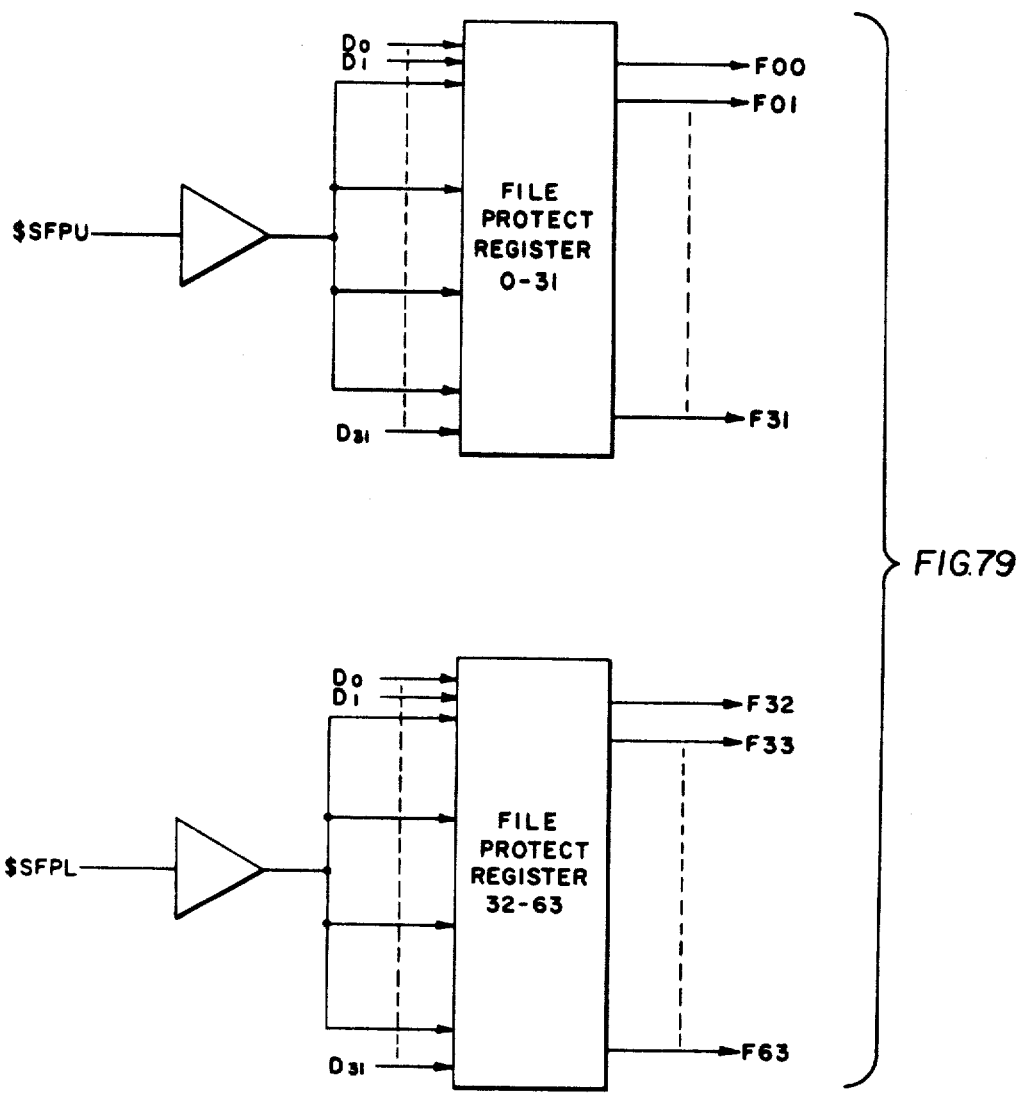
FIGURE 79 is a schematic illustration of the arrangement of file protect registers receiving a set file protect pulse.

Referring to FIGURE 79, the file protect register may comprise a plurality of flip-flops arranged in a well-known manner each flip-flop arranged to receive the logic level of one of the input data lines. The file protect register is divided into halves the first of which stores the protect information on the upper files 0–31 and the second half of which contains protect information relating to the lower files 32–63. Each register is enabled by the application of a set/file/protect pulse $SFPU or $SFPL. The output of the file protect register is designated file protect block F00 through file protect block F63. The outputs of the file protect registers are applied to a comparison network which also receives the decoded address bits $A_2$–$A_7$.

Figure 80:
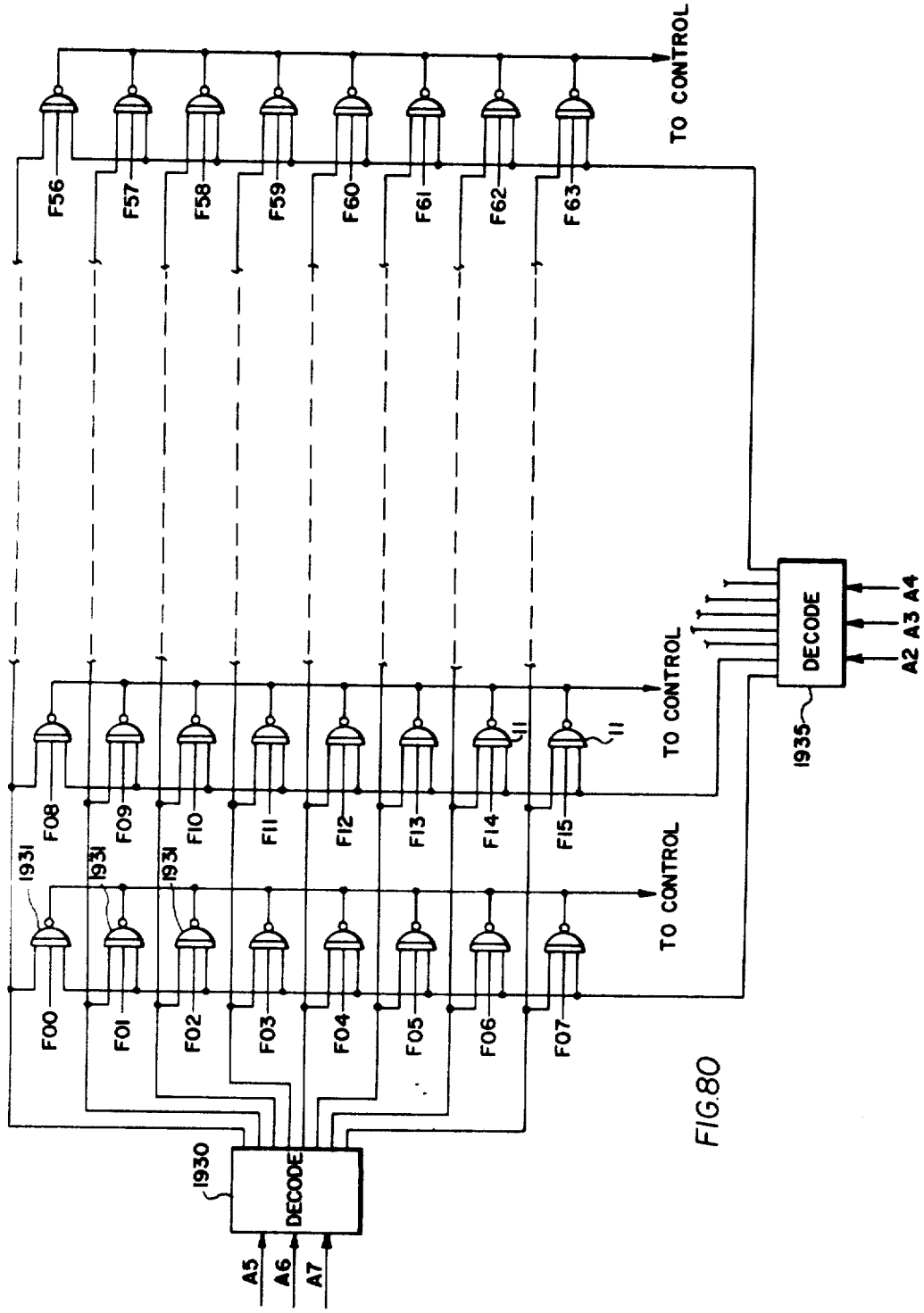
FIGURE 80 is a schematic illustration of a decode arrangement and matrix for use in the file protect scheme.

Referring to FIGURE 80, it may be seen that address bits $A_2$–$A_7$ are decoded and are compared with the output of the file protect register. The decoded (octal) address bits A2, A3 and A4 enable one leg of a series of three input gates. The address bits A5, A6 and A7 are applied to decode circuit 1930 the outputs of which are connected to a series of gates 1931 each connected to receive one of the outputs of the decode circuit 1930 and also connected to receive an output of the decode circuit 1935. Decode circuit 1935 receives address bits A2, A3 and A4 and provides the second leg to the series of gates 1931. The third input to each of the gates 1931 is connected to one of the sixty-four file protect register outputs. Thus, with the file protect register set to a specific bit pattern, a one bit of the register will enable those gates to which it is connected. When a specific address configuration of bits A2, A3 and A4 results in the application of a one to the same gate, and when the decoding of address bits A5, A6 and A7 also result in the application of a one signal to the same gate, the resulting logic level output from the gate indicates that a decoded address is addressing an area of memory previously designated as a protected area by the setting of the appropriate file protect flip-flop. This gate output signal is sent back to the control logic to generate the appropriate illegal action pulse and code. The utilization of the octal decoding of the six address bits $A_2$-$A_7$, and the resulting row and column of the matrix of FIGURE 80 selected may be shown by reference to the accompanying table indicating row and column selections corresponding to the bit configurations of address bits $A_2$-$A_7$.

TABLE II

| Row Selected | 32K A7 | 16K A6 | 8K A5 | 4K A4 | 2K A3 | 1K A2 | Column Selected |
|---|---|---|---|---|---|---|---|
| 1 | 0 | 0 | 0 | 0 | 0 | 0 | 1 |
| 2 | 0 | 0 | 1 | 0 | 0 | 1 | 2 |
| 3 | 0 | 1 | 0 | 0 | 1 | 0 | 3 |
| 4 | 0 | 1 | 1 | 0 | 1 | 1 | 4 |
| 5 | 1 | 0 | 0 | 1 | 0 | 0 | 5 |
| 6 | 1 | 0 | 1 | 1 | 0 | 1 | 6 |
| 7 | 1 | 1 | 0 | 1 | 1 | 0 | 7 |
| 8 | 1 | 1 | 1 | 1 | 1 | 1 | 8 |

The file protect register may contain any configuration of protected memory blocks by setting or resetting the corresponding flip-flops of the register through the utilization of the set/file/protect command SFP. The set/file/protect command is recognized as a valid command only when it is received by the control processor (a communicating processor designated as the control processor by the position of the control panel switch) and only when the control processor is in the master mode (master mode being indicated by the logic 1-state of the protect line). It may be noted that since the protect line of the input/output controller is always in the logic one or high-state, the memory controller interprets communications from the IOC as always being in the master mode. While the input/output controller cannot set the file protect register, the communications received therefrom nevertheless override file protect register memory protection scheme. The set/file/protect register command is a double precision command requiring that data lines $D_0$-$D_{31}$ contain the protect information for the upper or lower file protect register with the next succeeding information on lines $D_0$-$D_{31}$ containing the corresponding second half of the file protect register information.

The file protect register may be read to determine the contents thereof through the utilization of the read/file/protect command. This command is a double precision command similar to the set/file/protect command and the information in the file protect register will be communicated to the communicating device only if the device is a control processor and if the protect command line is at a logic one level indicating that the device is in the master mode. The set/file/protect SFP and the read/file/protect RFP commands will be discussed in greater detail in the section dealing with memory controller commands.

Interrupt cells

Figure 81:
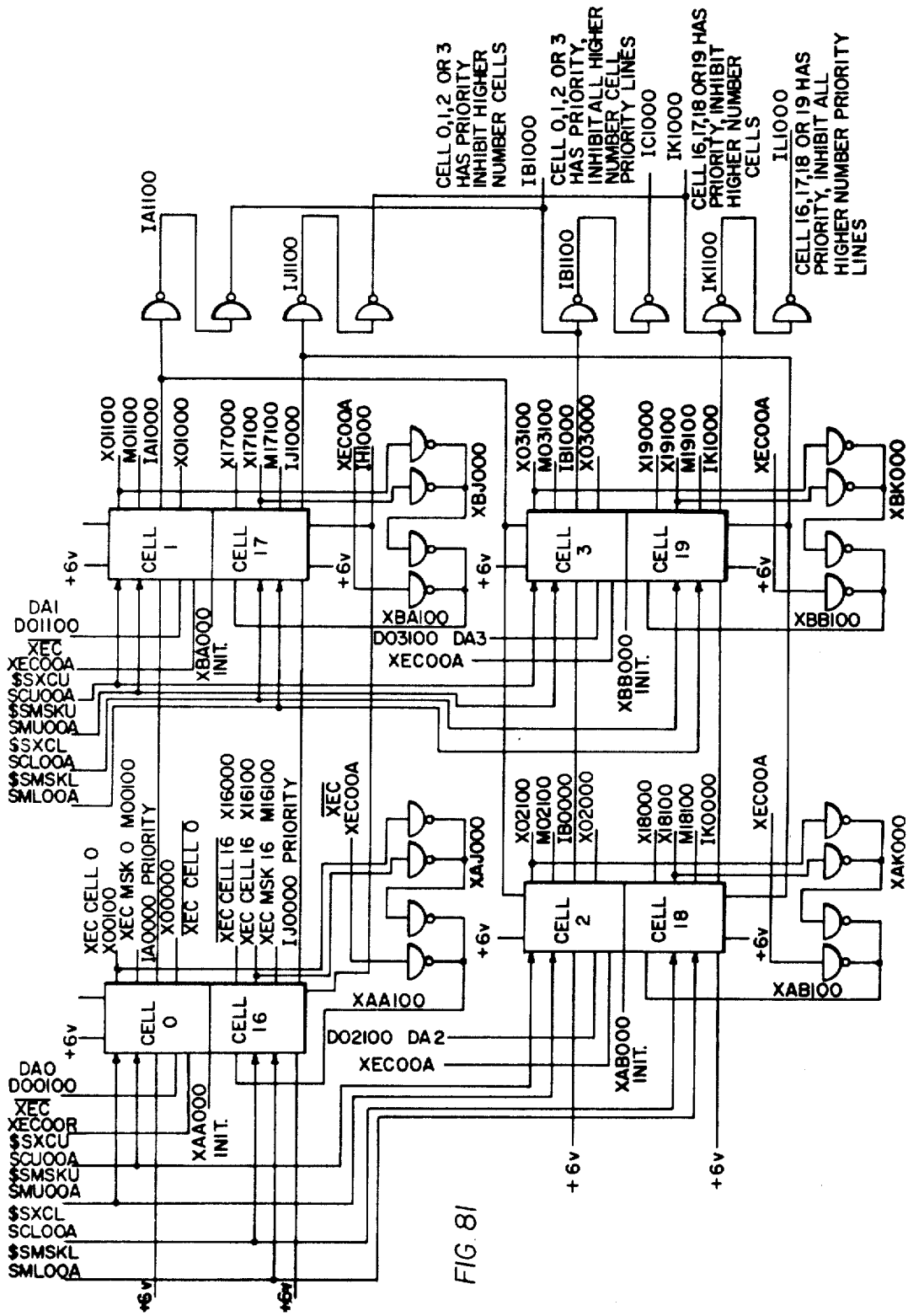
FIGURES 81, 82, 83 and 84 are schematic representations of the program interrupt cells of the memory controller.
Figure 82:
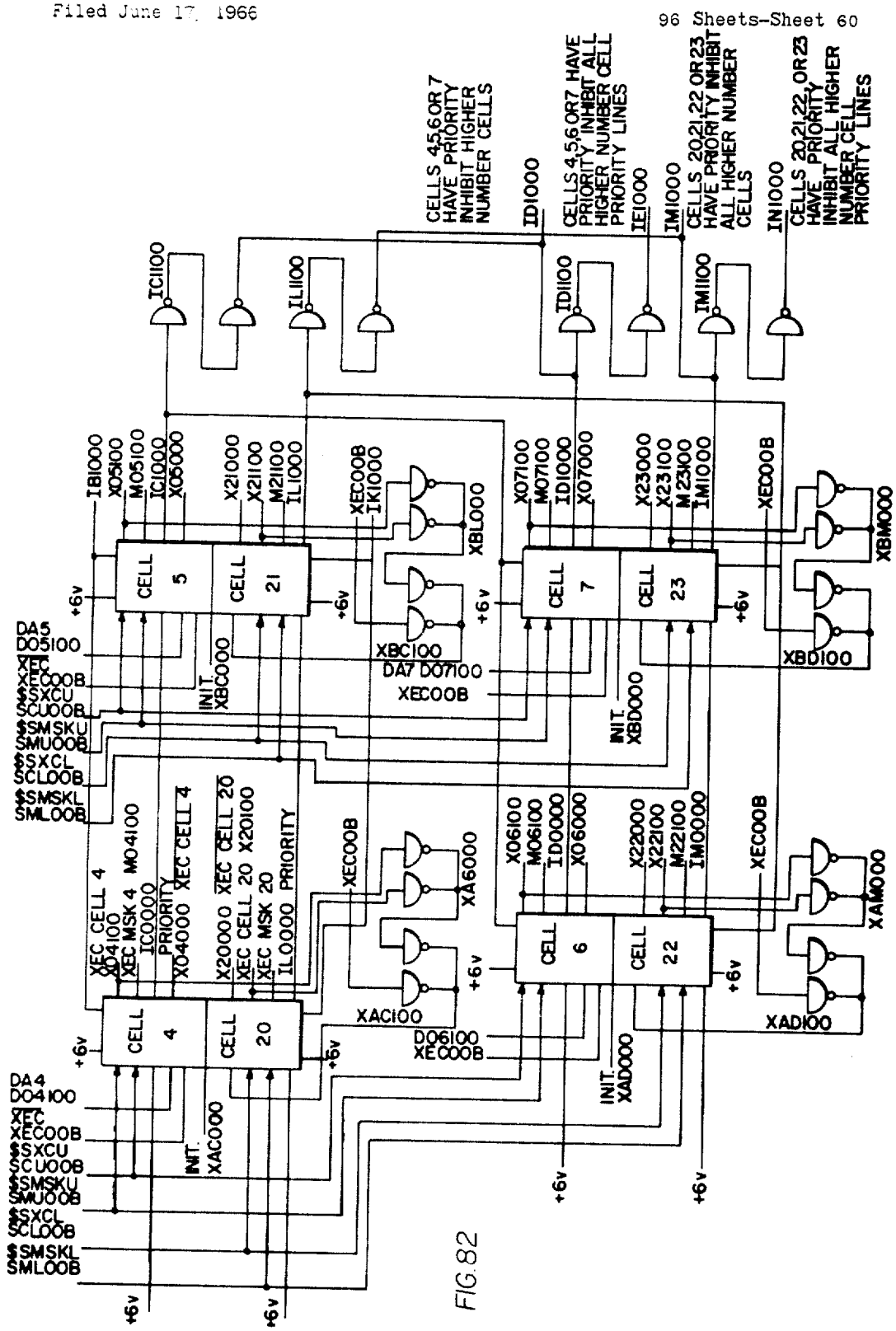
Figure 83:
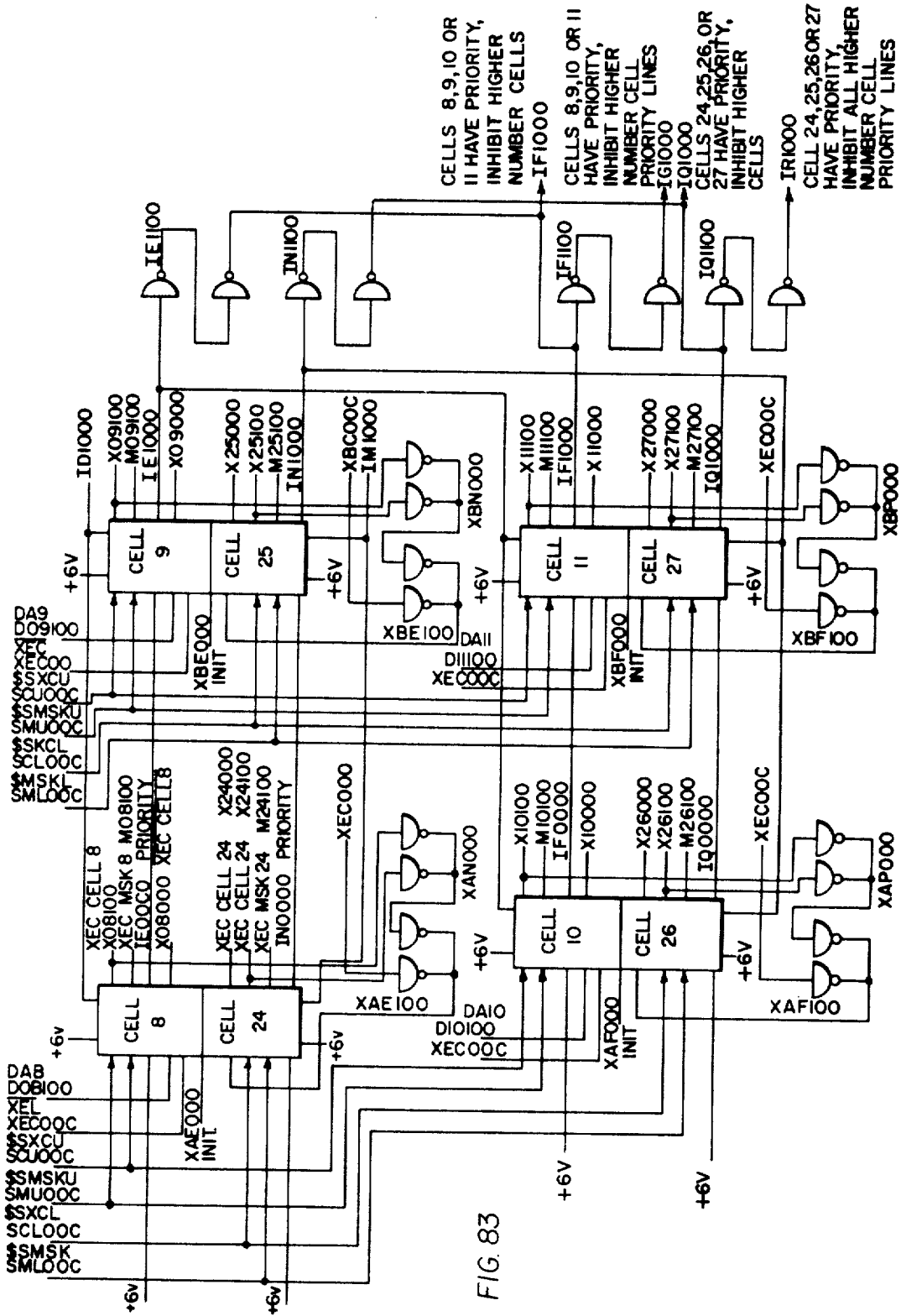
Figure 84:
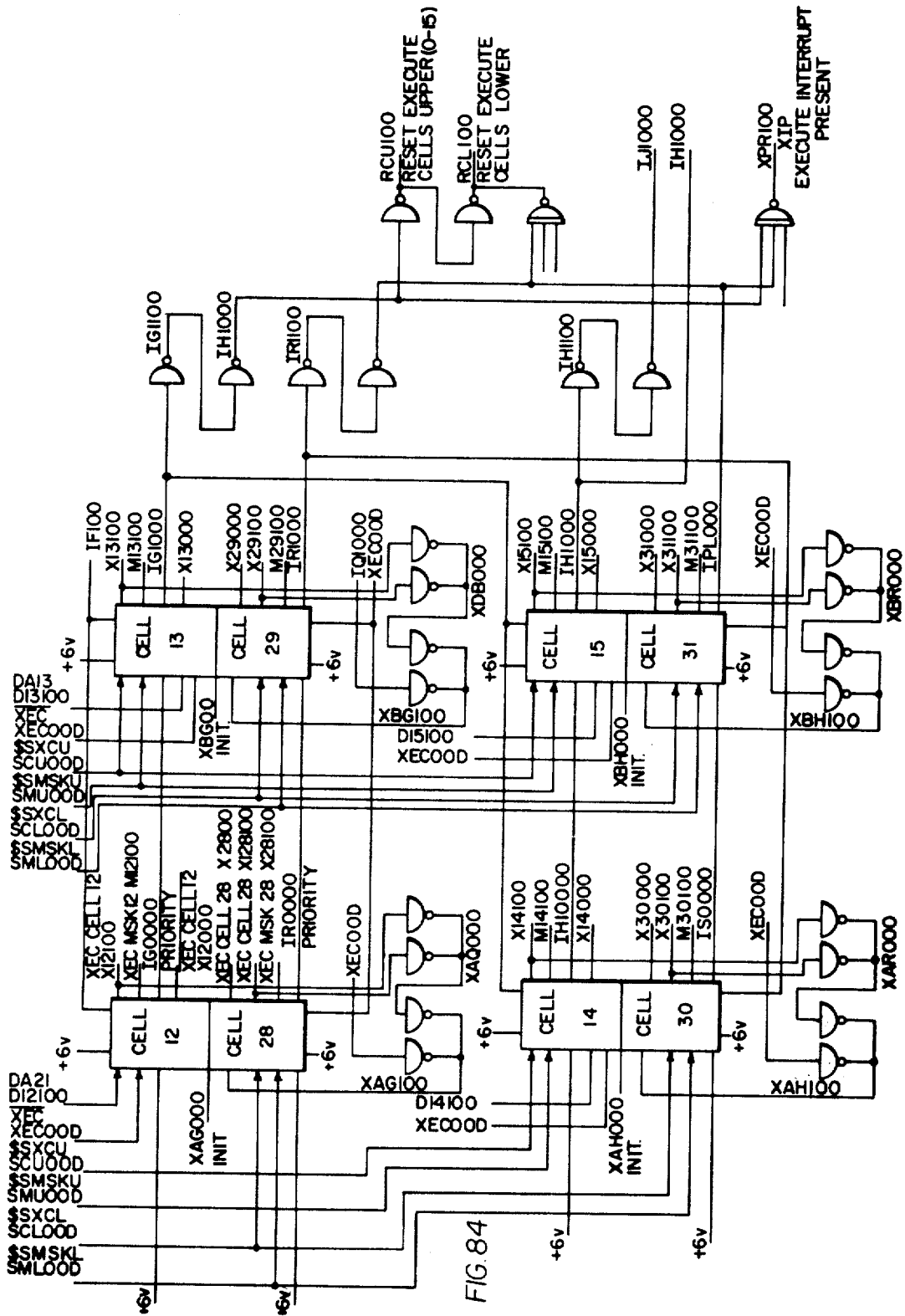

Interrupt cells are provided to receive and store requests for program interrupts from communicating devices. The interrupt cells are arranged in pairs, each having a corresponding mask flip-flop associated therewith. In the embodiment chosen for illustration, thirty-two interrupt cells are provided and are arranged with cells 0 and 16, 1 and 15, 2 and 17, 3 and 18, etc., arranged in pairs. To facilitate the detailed description of the interrupt cell structure, reference will be made to signal designations having more particular meaning than reference numerals or signal designations used previously. For example, the execute signal designation $\overline{XEC}$ may be discussed when describing the general arrangement of the program interrupt scheme; however, when describing the details of the interrupt cells, the signal may be designated in various ways depending on which interrupt cell is receiving the signal. Thus, the signal $\overline{XEC}$ may become XECOOA when applied to interrupt cell 3 to distinguish from the same type of control signal applied to the other interrupt cells (e.g., XECOOD applied to cell 12). Referring to FIGURES 81, 82 and 83 cells 0–31 are shown.

The cells are arranged having predetermined wired priority with cell 0 having the highest priority and cell 31 having the lowest priority. Certain cells receive a cell interrupt inhibit signal for purposes of parallel priority, this signal is designated IA0000 for cell 1, IB0000 for cell 3, IC0000 for cell 5, ID0000 for cell 7, IE0000 for cell 9, IF0000 for cell 11, IG0000 for cell 13 and IH0000 for cell 15.

Figure 85:
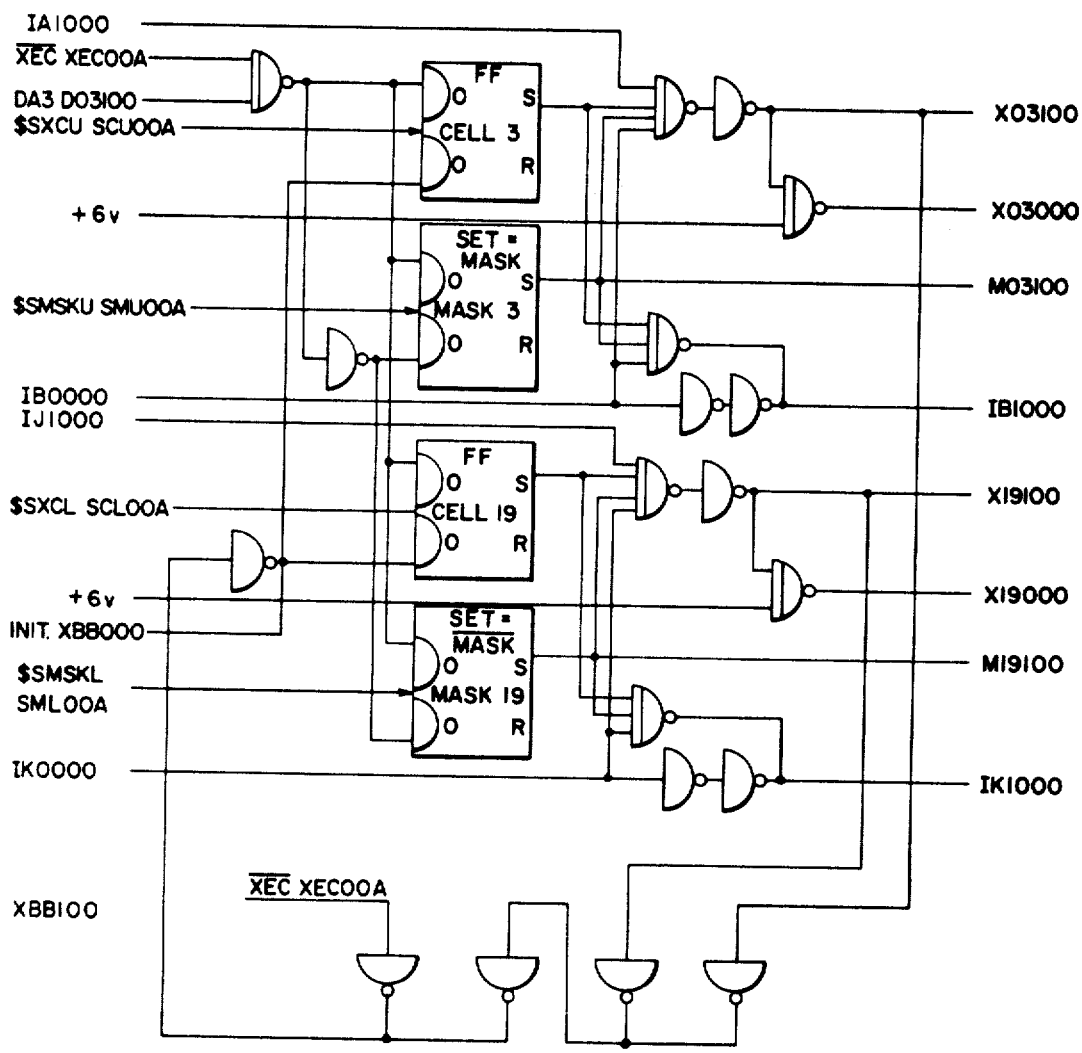
FIGURE 85 is a schematic illustration of program interrupt cells 3 and 19 shown in greater detail.

Each cell is also provided with an execute control command ($\overline{XEC}$) which is designated as XECOOA for cells 0–3 and 16–19, XECOOB for cells 4–7 and 20–23, XECOOC for cells 8–11 and 24–27, XECOOD for cells 12–15 and 28–31. The storage of an indication that a program interrupt request is present is controlled by the existence of a bit on one of the data lines as described previously, and applied to each of the cells as a data bit $D_n$ designated as D00100 for cells 0 and 16 through D15100 for cells 15 and 31. It may be noted that, as described previously, only one cell of each pair of cells is "loaded" or set at any one time; each pair of cells shares a common data input. Each cell also receives an enabling signal \$SXCU or \$SXCL which, when applied, sets or resets the cell in accordance with the data applied thereto. A similar enabling signal \$SMSKU or \$SMSKL is applied to the corresponding mask flip-flops. The enabling signals for the interrupt cells are designated as SCUOOA for cells 0 and 2 through SCLOOD for cells 29 and 31. To more fully understand the operation of the interrupt cells of FIGURES 81 through 84, reference will now be had to FIGURE 85 wherein, for purposes of illustration, interrupt cells 3 and 19 are shown in greater detail. The cells are shown having a flip-flop representing cell 3 and a flip-flop representing cell 19. Similarly, a flip-flop is provided as the mask flip-flop for cell 3 and a flip-flop is provided as the mask flip-flop for cell 19. To set cell 3, the control signal XECOOA must be applied thereto along with a cell and mask input D03100. A set execute cell upper signal SCUOOA enables the flip-flop to assume the set or reset state in accordance with the control and cell and mask inputs applied thereto. The mask flip-flop for cell 3 may be enabled through the application of a set mask upper signal SMUOOA applied thereto together with the appropriate input signals from the control and cell and mask inputs. Cell 19 flip-flop also receives the result of the conjunctive combination of the control signal XECOOA and the cell and mask input signal D03100; however, cell 19 is enabled by the set execute lower signal SCLOOA. The mask flip-flop for cell 19 is set in a manner similar to that of the mask for cell 3 and receives an enabling signal, the set mask lower signal SMLOOA. It may thus be seen that cell 3 or cell 19 may be set or reset, and their corresponding mask flip-flops may be set or reset by applying appropriate information to the identical inputs with the exception that the upper or lower (cell 3 or cell 19) cell is enabled by different enabling pulses. Thus, command data is entered into all upper cells at one time or into all lower cells at one time.

The priority of the respective cells is provided by two priority arrangements. The first priority arrangement is a cell inhibit priority or parallel provided in FIGURE 85 by the signal IA1000. It will be noted that this signal is derived from the output of cell 1 of FIGURE 81. An interrupt priority signal or serial priority signal IB0000 is derived from the output of cell 2 in FIGURE 81. Thus, any output of cell 3 requires the receipt of signals from cells 1 and 2. Similarly, a parallel priority signal IJ1000 and a serial priority signal IK0000 is provided to cell 19 from cells 17 and 18. The output of interrupt cells 3 and 19 provides serial and parallel priority signals to all higher numbered or lower priority cells. Cell 3 provides an interrupt priority output IB1000 and cell 19 provides an interrupt priority output IT1000. Cell 3 also provides a cell interrupt present signal X03100 and the logical inverse of this signal, execute interrupt X03000. Similarly, the lower cell or cell 19 provides cell interrupt present signal X19100 and the inverse of that signal, execute interrupt X19000. The cell interrupt present-upper X03100 and the cell interrupt present-lower X19100 are both fed back through inverters to become signal XBB100 to enable the resetting of cells 3 and 19 (FIGURE 81). It may be noted in FIGURE 84 that the outputs of the cells 15 and 31, interrupt priority output-upper IH1000 and interrupt priority output-lower IPL000, are logically ANDed to provide the execute interrupt signal (XIP) XPR100.

Figure 86:
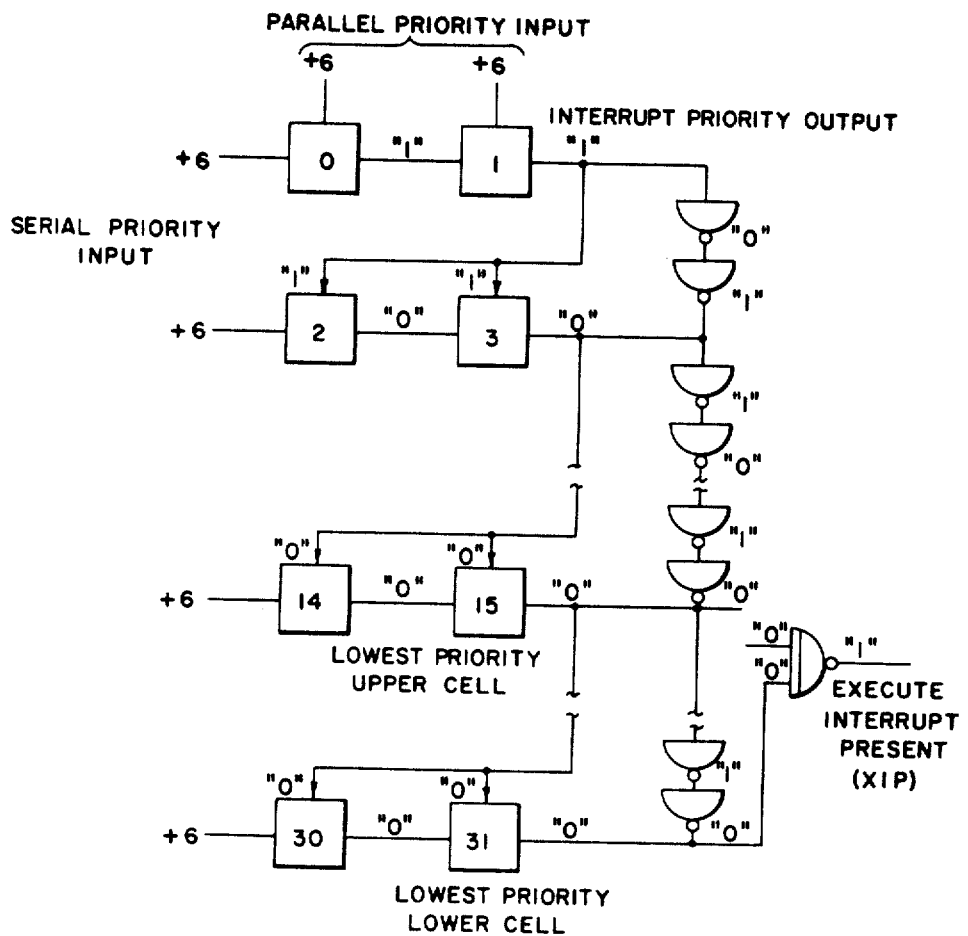
FIGURE 86 is a schematic block diagram, greatly simplified, showing the priority arrangement of the program interrupt cells.

To more clearly describe the parallel and serial priority arrangements of the execute interrupt cells, reference will now be had to FIGURE 86 wherein a simplified schematic block diagram is shown of the respective interrupt cells. It may be seen that the serial priority input to cells 0, 2, 4 . . . 30, when coupled with a parallel priority input applied thereto, results in the application of a changed signal to the corresponding interrupt cells 1, 3, 5 . . . 31. The interrupt priority output of each of the odd numbered interrupt cells is applied to the next two higher numbered interrupt cells as the parallel priority input thereto. Thus, referring to FIGURE 81, it may be seen that cell 1 applies its interrupt priority output IA1000 to both cells 2 and 3, and in FIGURE 82 cell 5 applies its interrupt priority output IC1000 to cells 6 and 7. The correspondence of FIGURE 86 to FIGURES 81 through 84 may thus be seen and the priority input signals applied to each cell dictate whether or not the contents of that specific cell shall be used to control the readout of predetermined information as will be described more fully hereinafter.

An example will now be given of the parallel and serial priority schemes by reference to FIGURE 86. The numbers on FIGURE 86 in quotations indicate the binary state of the respective cells or flip-flops. The example will assume that cell 2 is not masked and has been set, and that no other cell has been set. Under these conditions, serial and parallel priority inputs to cell 0 are both a 1; since cell 0 is not set, the serial priority output applied to cell 1 is a binary 1 and, as indicated in FIGURE 86, the parallel input to cell 1 is a +6 volts or a binary 1. Again, since cell 1 is not set, the output priority therefrom (which becomes the parallel priority input for cells 2 and 3) is a 1. The parallel priority input to cell 2 being a 1, and the serial priority input to cell 2 being a 1, permits cell 2 to set the serial output signal therefrom in accordance with the set or reset state of the cell. Since our problem has assumed cell 2 has been set, the serial priority output from cell 2 is now a binary 0. The result of the application of a serial priority 0 and a parallel priority 1 to cell 3 results in a priority output of 0. The output of cell 3 is applied to cells 4 and 5 as the parallel priority input. Therefore, all succeeding cells will receive at least one of the priority inputs applied thereto as a binary 0. It will be remembered that the status of the interrupt cell will not affect the system of the present invention unless both priority inputs to the cell are a binary 1.

In the example chosen for illustration, it may therefore be seen that cell 2 will be "read" and the status thereof (being set) will result in an execute interrupt present signal XIP. The junction of the priority output of cell 3 and the inverters connected between the priority outputs of cell 1 and cell 3 is forced to a binary 0 by the output of cell 3. Thus, similar junctions between priority outputs of the respective cells and the inverters joining the output of that cell with the preceding cell are also forced to a binary 0. The priority output of cell 15 and the priority output of cell 31 are ANDed in a NAND-gate to provide the signal XIP. If all of the cells are in the reset state, the junctions between the priority output of the odd interrupt cells and the inverters connecting that output to the preceding odd priority cell will always be at a 1 therefore resulting in the conjunction of the priority output of cells 15 and 31 equal to 0 (execute interrupt present not $\overline{XIP}$).

Figure 87:
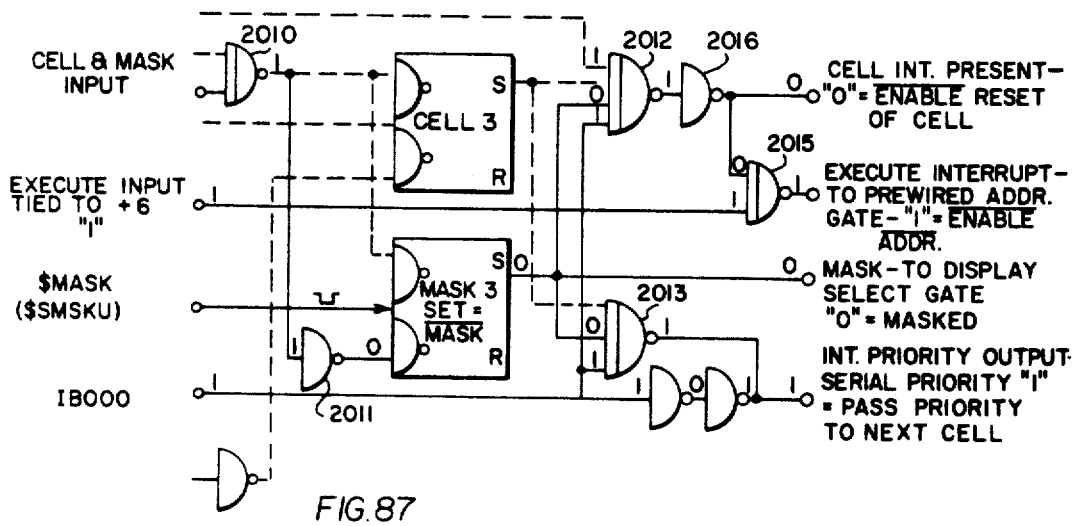
FIGURE 87 is a schematic block diagram of the program interrupt cell 3 useful for describing the masking of the cell.

The setting of the mask flip-flop (or "masking" the cell) may be described by reference to FIGURE 87. FIGURE 87 shows a portion of FIGURE 85 relating to cell 3 and excludes those portions of the logic unnecessary to the description of the setting of the mask flip-flop. Setting the mask flip-flop is accomplished when the cell and mask input is a binary 0, and when the set mask pulse ($SMSKU) is supplied to the cell. The execute upper input is tied to a positive 6 volt source (binary 1) and the serial priority input signal IB0000 is also at a binary 1. Output of NAND circuit 2010 is thus a binary 1 which is inverted in the inverter 2011 to a binary 0 and is applied to the reset input of the mask flip-flop. Since an inverter or inverters are integral with the mask flip-flop, the binary 0 application to the reset input thereof results in an equivalent binary 1 applied to the reset input of the flip-flop without the inversion. With this signal applied to the reset input, the set mask pulse applied to the mask flip-flop resets the flip-flop thus causing the set output thereof to assume a binary 0 level. This 0 level is applied to NAND-gate 2012 and NAND-gate 2013. The output of NAND-gate 2012 is inverted in the inverter 2016, the output of which is supplied to NAND-gate 2015 to be combined with the execute input to result in a binary 1. With the mask flip-flop reset, the cell interrupt present-upper output signal will be at a logical 0 level which disables the reset enable of the execute interrupt cell. The execute interrupt upper output will be at a binary 1 level and will therefore prevent the pre-wired fixed address associated with cell 3 from being gated to the output data switch. The mask output will be at a 0 level to indicate to the display select gate that the cell is masked. The interrupt priority output-upper will be in a 1-state thereby passing priority to the next higher numbered interrupt cell.

Figure 88:
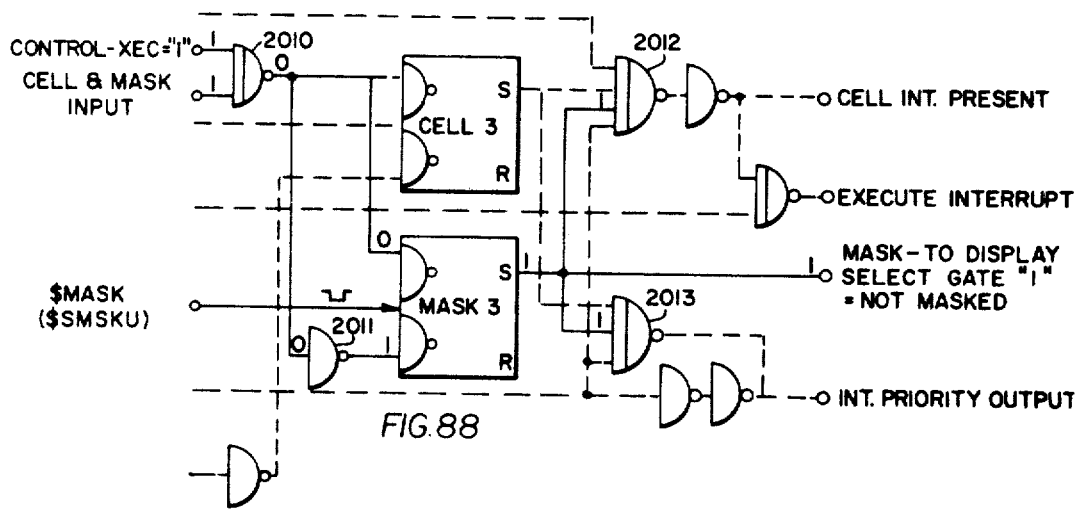
FIGURE 88 is a schematic illustration of the interrupt cell 3 showing the manner in which the cell is unmasked.

To reset the mask flip-flop, the set mask upper pulse ($SMSKU) will again be used; however, the cell and mask input will be a binary 1 rather than a binary 0. The resetting of the mask flip-flop may be facilitated by reference to FIGURE 88 which, similar to FIGURE 87, shows those logic elements necessary only to describe the resetting of the mask flip-flop. The control signal ($\overline{XEC}$) XECOOA is now a binary 1 and the conjunction of the cell and mask input with the control input in NAND-gate 2010 results in a binary 0 which is inverted in the inverter 2011 and applied to the reset input of the mask flip-flop. The same output of NAND-gate 2010 is applied to the set input of the mask flip-flop which, together with the set mask signal $SMSKU causes the mask flip-flop to assume the set state. The binary 1 output of the mask flip-flop caused by the setting thereof is combined in NAND-gates 2012 and 2013 in the manner similar to that described in connection with FIGURE 87. The cell interrupt present-upper output will be at a 0 level when the cell is unmasked or if the cell has been set and has been unable to indicate a set condition because the mask has been set, the output of the cell interrupt present-upper will be a 1 level. The execute interrupt-upper output will either be in a 0 to 1 level depending on the status of the cell which, in turn, is indicated by the binary value of the cell interrupt present-upper signal. The mask output will assume a binary 1 level to indicate to the display select gate that the cell is not masked. The interrupt priority output-upper output will be a 1 and will thus pass priority to the next cell if the execute interrupt cell 3 is not set; conversely, the output will assume a binary 0 level and will inhibit priority for all cells with a higher cell number if the cell 3 is in the set state.

Figure 89:
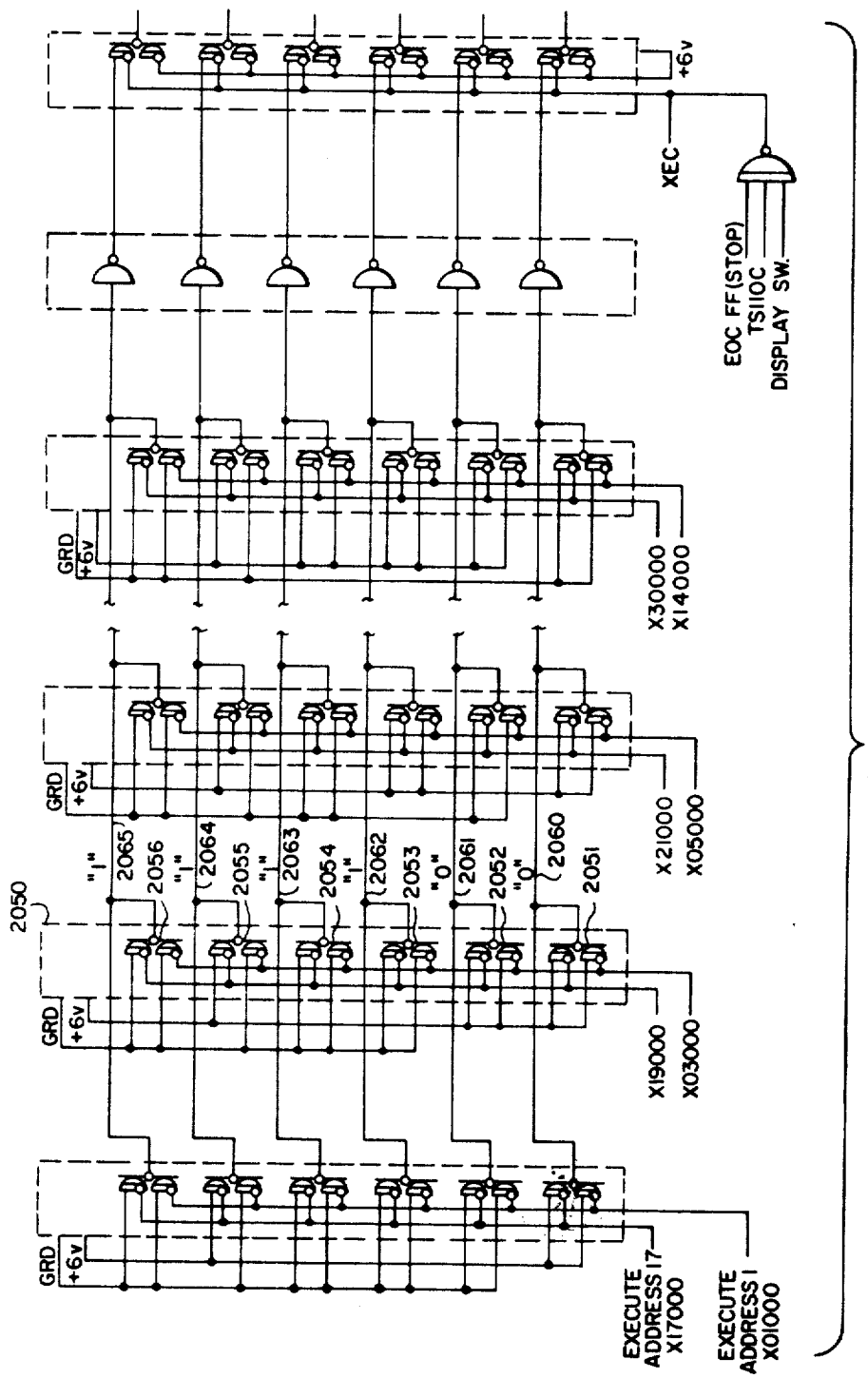
FIGURE 89 is a schematic illustration showing the generation of a pre-wired address from each of the execute interrupt cells.

A predetermined wired address is provided to the output of the memory controller subsystem whenever one of the interrupt cells is set. The cell having the highest priority, as previously described, and being unmasked will provide an output signal to generate the wired address. The address consists of a unique six bit code designating which of the interrupt cells has been set. Referring to FIGURE 89, a schematic logic diagram is shown wherein the execute interrupt signals from the corresponding interrupt cells are applied to logic gates for the generation of the prewired address. The gates are arranged so that the existence of a binary 0 at the input of any one gate will be combined with prewired binary 1's and 0's to produce a unique six bit binary code. For example, the execute interrupt signal from interrupt cell 3 of FIGURE 85 X030000 is applied to the group of gates enclosed within the dotted line 2050. A positive 6 volt source is connected to predetermined gates and other predetermined gates are connected to ground. The existence of a set condition on any particular interrupt cell will result in the generation of a binary 0 on the execute interrupt output thereof. Accordingly, signal X03000 at the output of interrupt cell 3 will be a 0 and that binary 0 will be applied to the address generating gates.

Looking at gate 2051 it may be seen that the signal X03000 is a 0, signal X19000 is a 1 and the remaining inputs to gate 2051 are the wired 6 volt level or binary 1's. Signals X03000 and X19000 are inverted before being conjunctively joined with the positive 6 volt signal applied to the gate 2051. The result of the joining of the above enumerated signals is a binary 0 and conductor 2060 will be at a binary 0 level. Since gate 2052 is connected in a manner identical to gate 2051, it will also have a binary 0 at the output thereof and conductor 2061 will thus be at a binary 0 level. Since the wired input to gate 2053 is at ground level, both of the NAND circuits thereof will generate a binary 1 output regardless of the status X19000 and X03000. Accordingly, the output of gate 2053 will be a binary 1 and conductor 2062 will be at a binary 1 level. Since gates 2054 and 2056 are wired in a manner identical to gate 2053, conductors 2063 and 2065 will be at binary 1 levels. The NAND-gate receiving signal X03000 of gate 2055 is also connected to the wired ground level and will thus always generate a binary 1; the second NAND-gate of gate 2055 is wired to receive a positive 6 volt level. However, since the other input to the second NAND-gate is connected to receive signal X19000, and the latter is at a binary 1-state, the output of gate 2055 will also be a binary 1 and the corresponding conductor 2064 will be at a binary 1 level. Therefore, the setting of interrupt cell 3 resulted in the generation of a binary 0 level of the signal X03000 which, when applied to the address generating arrangement of FIGURE 89 resulted in the binary code 00111. This code was placed upon conductors 2060–2065. These signals are inverted and subsequently gated to the output drivers of the memory controller in data positions $D_{11}$–$D_{16}$.

Figure 90:
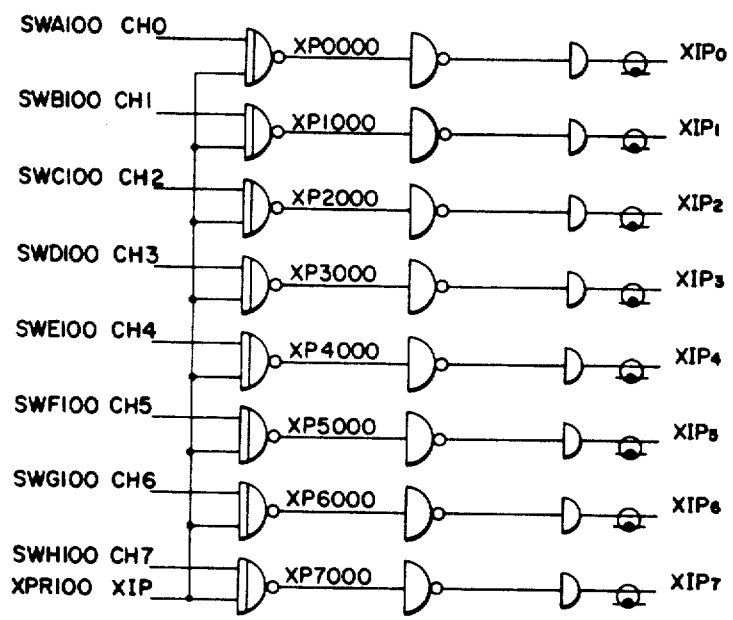
FIGURE 90 is a schematic illustration showing the gating of execute interrupt present signal to an appropriate control processor.

As mentioned above, the outputs of interrupt cell 15 and interrupt cell 31 are ANDed together and if the result of the combination is a binary 1, the output is sent to a predetermined communicating device via a select switch on the control panel of the memory controller. This execute interrupt present signal XIP is shown in FIGURE 90 being applied to a plurality of NAND-gates. The signal XPR100 is applied to each of these gates to enable the gates in accordance with the binary setting of the corresponding switch signal SWA100 through SWH100. Each switch signal corresponds to one of the eight channels and whichever channel has been designated the control channel, the switch signal assumes a binary state thus causing the corresponding NAND-gate to provide an output signal XP0000 through XP7000. These signals are subsequently inverted and sent to the communicating device. Since the execute interrupt present signal is utilized only by the processor connected to the memory controller designated as the control processor, the control processor select switch on the control panel of the memory controller is set to correspond to that channel or post to which the processor designated as the control processor is connected. Therefore, the generation of an execute interrupt present signal by ANDing the outputs of interrupt cell 15 and interrupt cell 31 results in the gating of the execute interrupt signal XIP to the control processor of the processing system.

*Output data switch circuits*

Figure 91:
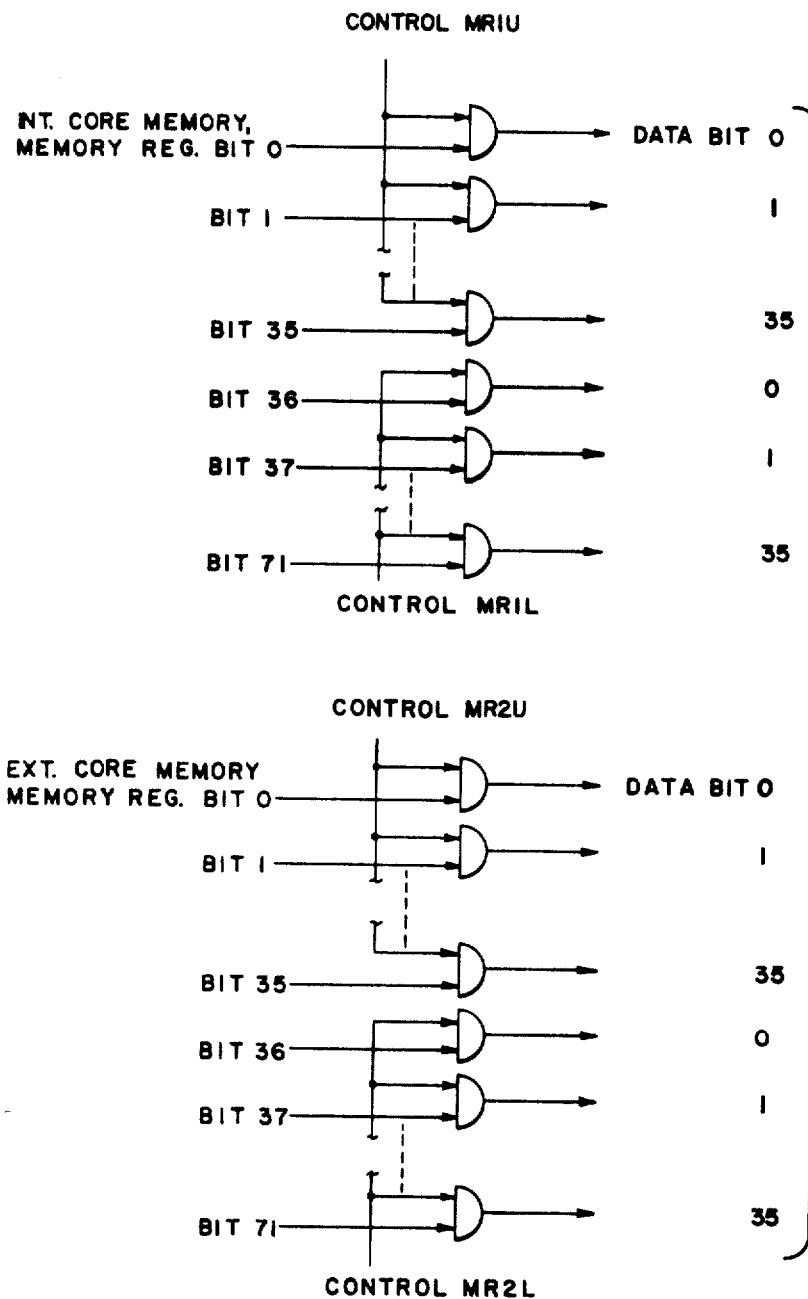

The output data switch circuits are utilized to gate information from the memory registers, the mask register, the execute interrupt cell addresses and the file protect register to the communicating devices. Since this data is provided to the communicating devices over the output data lines, it is necessary that the information from the various areas within the memory controller be gated in accordance with gating signals derived within the memory controller in response to predetermined logic conditions. FIGURES 91 and 92 schematically illustrate the information applied to the output data switch circuits and the control signals from the control logic circuits which gate the information to the output data drivers. Referring to FIGURE 91, the internal core memory and the external core memory each are provided with a memory register for temporarily storing seventy-two bits; since the communicating device receives a thirty-six bit word, it is necessary to gate only one-half of the internal or external memory register to the output data lines at any one time. Accordingly, the internal core memory register bits 0–35 are applied to gates which are enabled by the application of the memory register one upper signal (MR1U) from the control logic circuits; similarly, memory register bits 36–71 of the internal core memory are gated to the communicating device through the application of the memory register one lower control signal MR1L. In a like manner, the external core memory register is connected to provide output bits 0–35 on data output lines 0–35 through the application of control signal MR2U (memory register 2-upper). The memory register bits 36–71 of the external core memory are gated to the output data lines 0–35 through the application of the control signal memory register 2-lower MR2L.

Referring to FIGURE 92, it may be seen that the interrupt cell address is gated over the data output lines in data bit positions 12–16. The application of the five bit interrupt cell address to the output gates together with the control signal execute address XEC ADDR result in the transmission of the interrupt cell address over data output lines in bit positions 12–16.

The read/mask command RMSK results in the output of the contents of the execute interrupt cell mask register and the channel mask register. The execute interrupt mask register is a thirty-two bit register and, since the read mask command RMSK is a double precision command, the first half (bits 0–15) of the execute interrupt mask register are provided to the communicating device in data bit positions 0–15; the second half of the double precision command provides execute interrupt mask register bits 16–31 to the communicating device in data bit positions 0–15. In a like manner, the channel mask register contents bit positions 0–3 are provided to the communicating device in data bit positions 32–35. The second half of the double precision command results in the application of channel mask register bits 4–7 to the output data bit positions 32–35.

The file protect register stores sixty-four bits corresponding to sixty-four 1064 word blocks of memory. The file protect register may be read out to a communicating device through the utilization of the read file protect command. Since the communicating device receives only a thirty-six bit word at any one time, the contents of the file protect register must be delivered to the output data lines one-half at a time. Accordingly, referring to FIGURE 92, it may be seen that the file protect register bits 0–63 are applied to gates that are enabled through the application of control signals read file protect upper RFPU and read file protect lower RFPL. The application of the control signal RFPU enables file protect register bits 0–31 to be sent to the communicating device in data bit positions 0–31; similarly, the control signal RFPL enables the file protect register bits 32–63 to be supplied to the communicating device in data bit positions 0–31.

The output data drivers need not be discussed in detail and may be constructed of any of several well-known driving circuits suitable for providing appropriate impedance matching and current amplification of the logic levels on the output data line.

Output pulse and select drivers

While the output data switch circuits switch data from within the memory controller to all of the output data lines regardless of the port to which the data lines are connected, a communicating device must be notified when an output is available from the memory controller. To facilitate the notice to the communicating device, the data available pulse $DA is provided thereto. This pulse, data available $DA, also indicates to the communicating device that in those instances where data is to be stored the data provided to the memory controller has been stored and the cycle is complete. In certain instances, it is also necessary to provide the communicating device with a pulse to indicate that the command received by the memory controller from the communicating device is under process and that the communicating device may remove the command information from the input terminals of the memory controller. This pulse, $PIN, is termed the cycle started delay pulse and must be provided to only the communicating device. In a manner similar to that for gating the data available pulse, the cycle started delayed pulse is gated to only the communicating device currently having priority in the memory controller. Further, the existence of an illegal action code, which has been provided to all illegal action code output lines, must be brought to the attention of the communicating device. To this end, the illegal action pulse $IA is provided to only the communicating device having priority with the memory controller at the time the illegal action occurred. Accordingly, the cycle started delayed pulse $PIN, the data available pulse $DA and the illegal action pulse $IA are all gated to the communicating device having priority at the time that the specific pulse is generated; the gating of these pulses is accomplished in the output pulse and select drivers shown in FIGURE 93.

Figure 93:
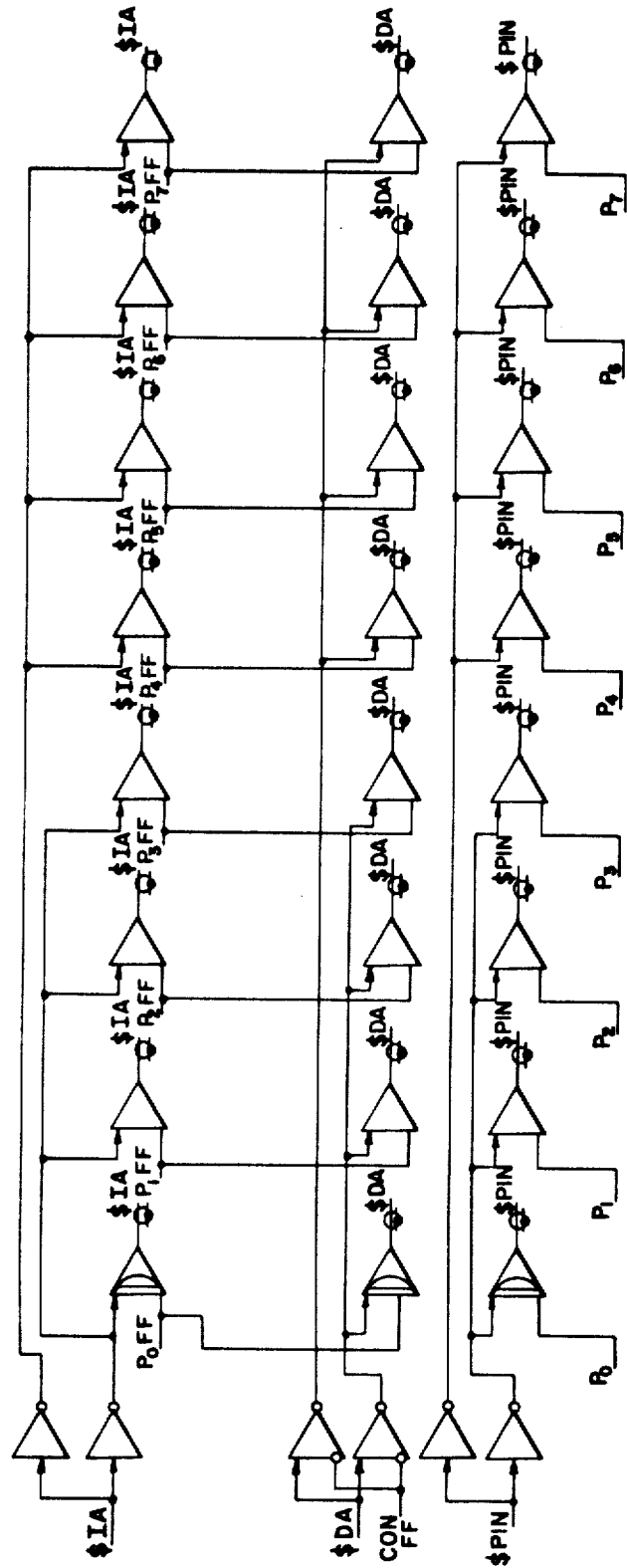
FIGURE 93 is a schematic illustration showing the selection of an appropriate output channel for delivery of the illegal action, data available, and cycle started delayed pulses.

Referring to FIGURE 93, the illegal action pulse $IA is received from the control circuitry and applied to a pair of amplifiers each of which is connected to the input of a plurality of conjunctive amplifiers. The conjunctive amplifiers are arranged, one for each output channel, and each is enabled by the application of the true output of the priority flip-flop corresponding to that channel. Thus, the first conjunctive amplifier will receive the illegal action pulse $IA together with the logic level $P_0$ FF the result of which will be the application of the illegal action pulse to channel 0. Correspondingly, the remaining conjuctive amplifiers are enabled by the application of the priority flip-flop corresponding to that particular channel. In this manner, the generation of an illegal action pulse within the control section of the memory controller will result in the application of that pulse to the communicating device currently having priority in the memory controller and whose command and data have generated the illegal action.

In FIGURE 93 it may also be seen that the data available pulse $DA is also applied to a pair of amplifiers which are connected to a plurality of conjunctive amplifiers each corresponding to a different communicating device channel. Each of these conjunctive amplifiers also receives the output from a corresponding priority flip-flop. However, it may be noted that the data available pulse $DA will be ineffective to enable the conjunctive amplifiers assigned to each output channel unless the connect flip-flop CON FF provides a false input to the amplifiers receiving the data available pulse. Thus, the connect command will inhibit the transmission of the data available pulse to the communicating device. The connect command will be discussed in greater detail in the following sections on commands.

The cycle started delayed pulse $PIN is also applied to a pair of amplifiers each of which is connected to a plurality of conjunctive amplifiers assigned to respective output channels. In a like manner, each of the channel-assigned amplifiers is enabled by the application of a priority signal indicating that the respective channel is connected to the communicating device currently having priority with the memory controller.

The generation of illegal action pulses $IA, data available pulses $DA and cycle started delayed pulses $PIN within the control section of the memory controller thus results in the transmission of the corresponding pulse to the communicating device having priority with the memory controller at the time that the pulse is generated.

Illegal action code lines provided to the ports or channels connected to the memory controller each are provided with logic levels in accordance with the illegal action code generated in the control logic circuits. The logic levels are provided to illegal action drivers which, in a manner similar to that discussed in connection with the output data drivers, are of conventional design and need not be discussed here. The drivers provide the necessary logic level current amplification as well as impedance matching for the output channel. Similarly, the execute interrupt present driver providing the interrupt present signal to each channel also is of conventional driver design and may be constructed of any of several alternative designs. The drivers are intended merely to provide the necessary amplification and impedance matching between memory controller and the connected communicating device.

Connect select output

Figure 94:
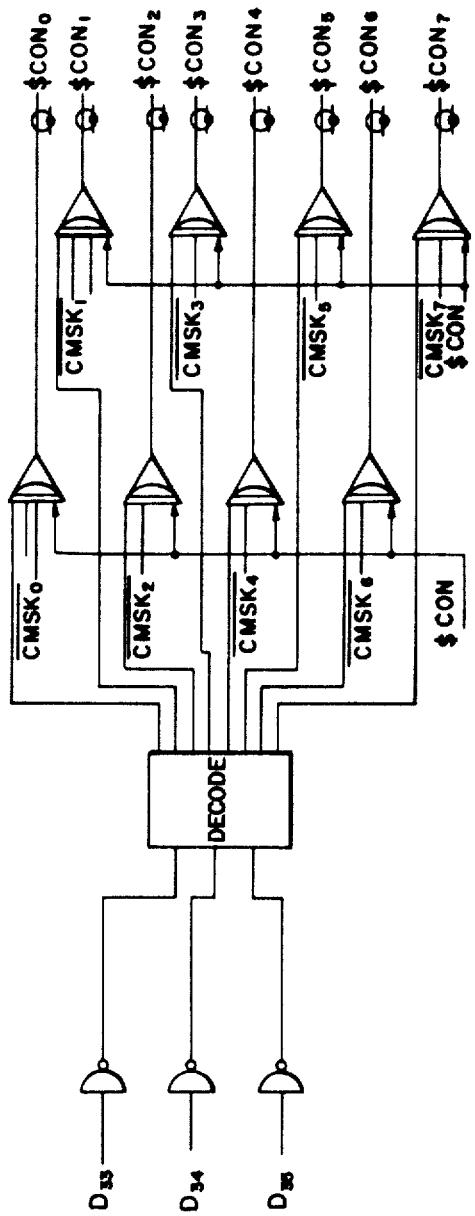
FIGURE 94 is a schematic illustration showing the decoding of data bits $D_{33}$–$D_{35}$ for the selection of an appropriate channel for the delivery of the connect pulse.

The connect command, when decoded by the memory controller, results in the placing of the contents of the core storage location specified by the address lines $A_0$–$A_{17}$ on the output data line accompanied by a pulse on the connect output pulse line. The specific connect output pulse line associated with the particular channel is determined by the three least significant bits of the data word pulled from memory. These data bits (D33–D35) are decoded and applied to gate the connect pulse $CON to the designated communicating device. Referring to FIGURE 94, it may be seen that the data bits D33, D34 and D35 are each applied to a decode circuit which generates logic levels corresponding to the eight binary combinations of the three bits. Each of the logic output levels is applied to a conjunctive amplifier; each amplifier corresponds to one of the eight channels connected to communicating devices. Each amplifier is also enabled by the application of the connect pulse $CON resulting from the detection and decoding of the connect command CON received from a communicating device. The simultaneous occurrence of a true logic level from the decode circuit and the connect pulse $CON will result in the transmission of the connect pulse $CON to the communicating device channel designated by the bits D33–D35 pulled from memory at the location specified by the address lines $A_0$–$A_{17}$ accompanying the connect command.

Commands

There are twelve basic commands that are performed by the memory controller; these commands are encoded by the communicating device on the four command code lines discussed previously and are executed when the memory access request (channel interrupt request) is acknowledged by the memory controller and priority is granted to the communicating device. The twelve memory commands may be divided into two classifications, the first of which concerns the transfer of information within the registers of the memory controller (memory controller cycle commands) and the second of which concerns the transfer of information between the memory controller and the memory core system (memory core cycle commands). The memory controller cycle commands are:

(1) Set execute interrupt cells SXC (command line code 1110)
(2) Execute XEC (command line code 1101)
(3) Set file protect register SFP (command line code 0111)
(4) Set execute and channel interrupt mask registers SMSK (command line code 0110)
(5) Read/file/protect register RFP (command line code 0011)
(6) Read execute and channel interrupt mask registers RMSK (command line code 0010).

The memory core cycle commands are as follows:

(1) Clear/write single precision CWR SP (command line code 0100)
(2) Clear/write double precision CWR DP (command line code 0101)
(3) Read/restore single precision RRS SP (command line code 0000)
(4) Read/restore double precision RRS DP (command line code 0001)
(5) Read/alter/rewrite RAR (command line code 1000)
(6) Connect CON (command line code 1100).

Communicating devices may designate the desired command by encoding on command lines as mentioned previously; however, in the embodiment chosen for illustration the input/output controller (IOC) is capable of only giving the read/restore single precision RRS SP, clear/write single precision CWR SP and the set execute interrupt cell SXC commands. The processor is not limited in its command repertoire.

The commands may now be discussed individually together with accompanying drawings illustrating timing sequences as well as information flow.

CLEAR/WRITE SINGLE PRECISION (CWR SP)

The clear/write single precision command stores the data existing on the data input lines $D_0$–$D_{35}$ in the core storage location specified by the address lines $A_0$–$A_{17}$. A data available pulse $DA is then returned over the data available/stored line notifying the communicating device that the data has been stored. Only the character positions specified by ones on the zone lines $Z_0$–$Z_5$ are replaced with the data existing on the input data lines.

The equation for the generation of the pulse which initiates a clear/write single precision core memory cycle is:

$$\$CWR1 = (INT+EXT)\overline{CF}(\overline{FPC}+M) \cdot CWR\ SP \cdot \$T_S$$

Figure 95:
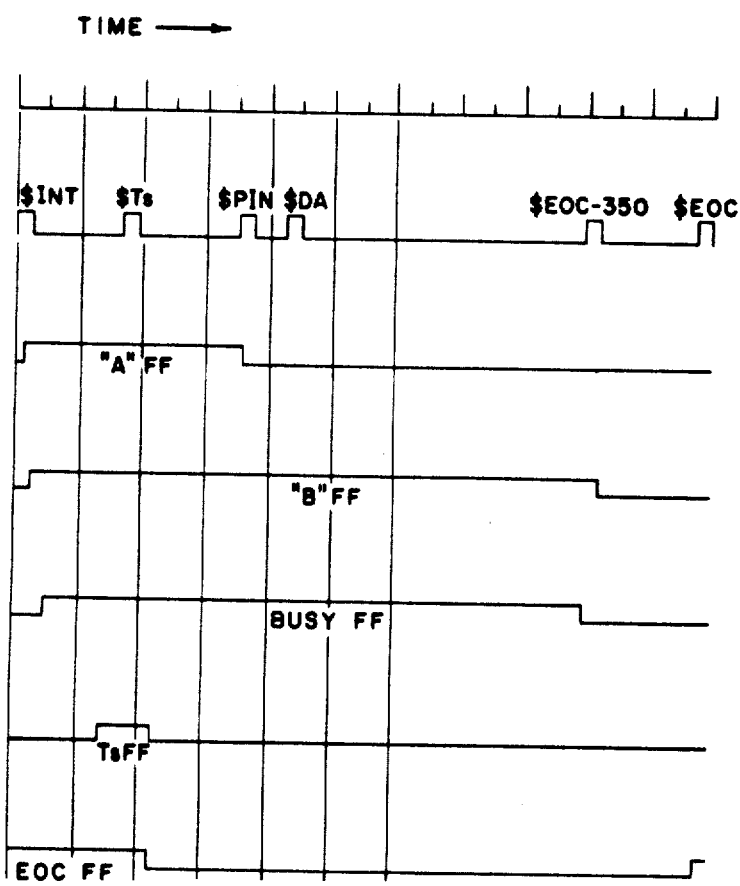
FIGURE 95 is a timing diagram useful for describing the timing sequence of the clear/write single precision command.
Figure 96:
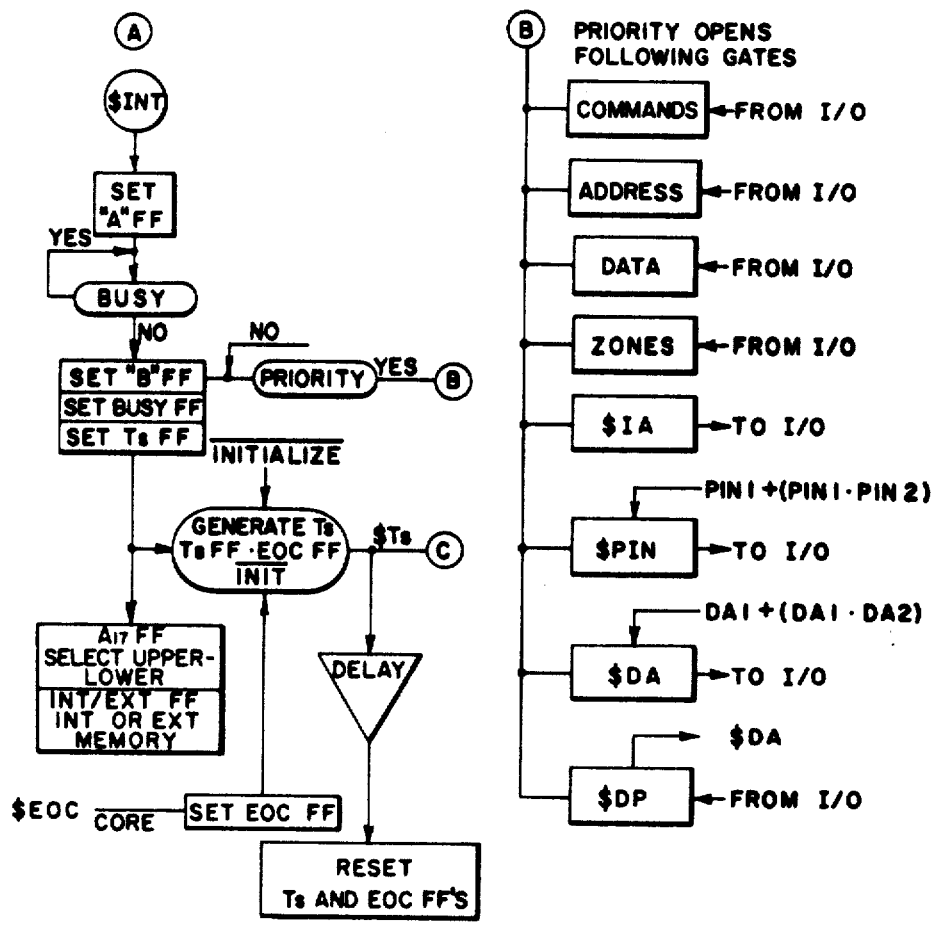
FIGURE 96 is a flow diagram useful for describing the operation of the clear/write single precision command.

$\overline{CF}$=no core system failures (fan, temperature, power)
M=in master mode
$T_S$=cycle started pulse
$\overline{FPC}$=no file protect comparison
CWR SP=clear/write command, command lines $\overline{A} \cdot B \cdot \overline{C} \cdot \overline{D}$
INT+EXT Memory=decoding of address bits $A_0$–$A_2$ ANDed with core assignment switches Reference may now be had to FIGURES 95 and 96 which illustrate the timing sequence for the clear/write single precision command and the flow diagram for the command respectively. Starting from the initialized state in the performance of a clear/write single precision CWR SP command, a memory access interrupt request $INT is sent by the communicating device on one of the eight channels of the memory controller. The pulse $INT is accompanied by the command clear/write single precision CWR SP encoded on the four command lines; also accompanying the command are the address for the corresponding storage location on address lines $A_0$–$A_{17}$, the data on data lines $D_0$–$D_{35}$, and ones on the zone lines $Z_0$–$Z_5$ which are to be effected by the clear/write command. The pulse $INT will set the intermediate storage flip-flop (the A flip-flop) the output of which is ANDed with the not busy ($\overline{BUSY}$) and will lead to the generation of the pre-cycle initiate PRE–$T_S$ pulse which will set the busy flip-flop. At the same time the reset output of the busy flip-flop, inverted, is ANDed with the reset output of the A flip-flop; this signal is used to set the final storage flip-flop (the B flip-flop). As discussed previously in connection with channel priority, the contents of the A flip-flop are transferred to the B flip-flop; the transference to the B flip-flop indicates priority has been granted to that channel if no other B flip-flop of higher priority has been set.

Priority, once it is granted, is used to gate the command lines to the command decode. At the same time that the command is decoded, the priority signal for that channel ($P_0$–$P_8$) will gate the address lines $A_0$–$A_{17}$, the data lines $D_0$–$D_{35}$ and the zone lines $Z_0$–$Z_5$ to the core system. After the memory access interrupt request pulse $INT is received, and after priority has been granted, the precycle initiate $PRE–$T_S$ sets the busy flip-flop and locks out any other channel interrupt from gaining priority for the next memory cycle. Having started from the initialized state, the end of cycle flip-flop EOC FF is in the proper state and the cycle initiate flip-flop $T_S$ FF is enabled and is waiting for the pulse to set it; the flip-flop is set by the precycle initiate PRE–$T_S$ and the outputs of the cycle initiate flip-flop, the end-of-cycle initiate flip-flop and the not initialization logic level are then ANDed together to give the cycle initiate pulse $T_S$.

$$\$T_S = T_S\ FF \cdot EOC\ FF \cdot \overline{INIT}$$

The cycle initiate pulse occurs at a predetermined time delay after the receipt of the memory access request pulse $INT resulting in the granting of priority to the communicating device. The resetting of the cycle initiate flip-flop and the end-of-cycle flip-flop is accomplished by the cycle initiated pulse delayed by a predetermined time delay ($T_S\Delta$). In starting from other than an initialized state, the end-of-cycle flip-flop will be set by a pulse from the core ($EOC_{CORE}$) and the cycle initiate pulse $T_S$ will be generated at the end of the cycle.

As stated previously, the granting of priority results in the gating of the address lines to the memory core and at the same time address bits $A_0$–$A_2$ are also sent to a decode circuit where the bits are octally decoded. The octally decoded bits $A_0$–$A_2$ are combined with the settings of the core assignment switches of the control panel to steer the accompanying address to the internal or external memory. The resultant output of the logical combination of the decoded address bits $A_0$–$A_2$ and the outputs of the control panel core assignment switches result in the setting or resetting of the internal/external flip-flop INT/EXT FF, the output of which is utilized to steer the address as stated above.

At the same time, address bits $A_0$–$A_{16}$ are gated to the appropriate core while bit $A_{17}$ is gated to the memory controller and ANDed with the precycle initiate pulse $PRE–$T_S$. The resulting signal will either set or reset the $A_{17}$ flip-flop to designate the upper and lower half of the seventy-two bit memory word. The output of the $A_{17}$ flip-flop is now used to select the upper or lower memory zone lines; the $A_{17}$ flip-flop in the reset state ($\overline{A}_{17}$ FF) will select the upper memory zone and the set state ($A_{17}$ FF) will select the lower memory zone. The upper memory zones are used to designate the most significant bits of the seventy-two bit words (bits 0–35) while the lower memory zones are used to manipulate the least significant bits of the seventy-two bit words (bits 36–71).

With the generation of the cycle initiated pulse $T_s$ it is now possible to produce a clear/write pulse $CWR1 and form the decoded command.

$$\$CWR1 = (INT+EXT)\overline{CF}(\overline{FPC}+M) \cdot CWR\ SP \cdot \$T_s$$

Figure 97:
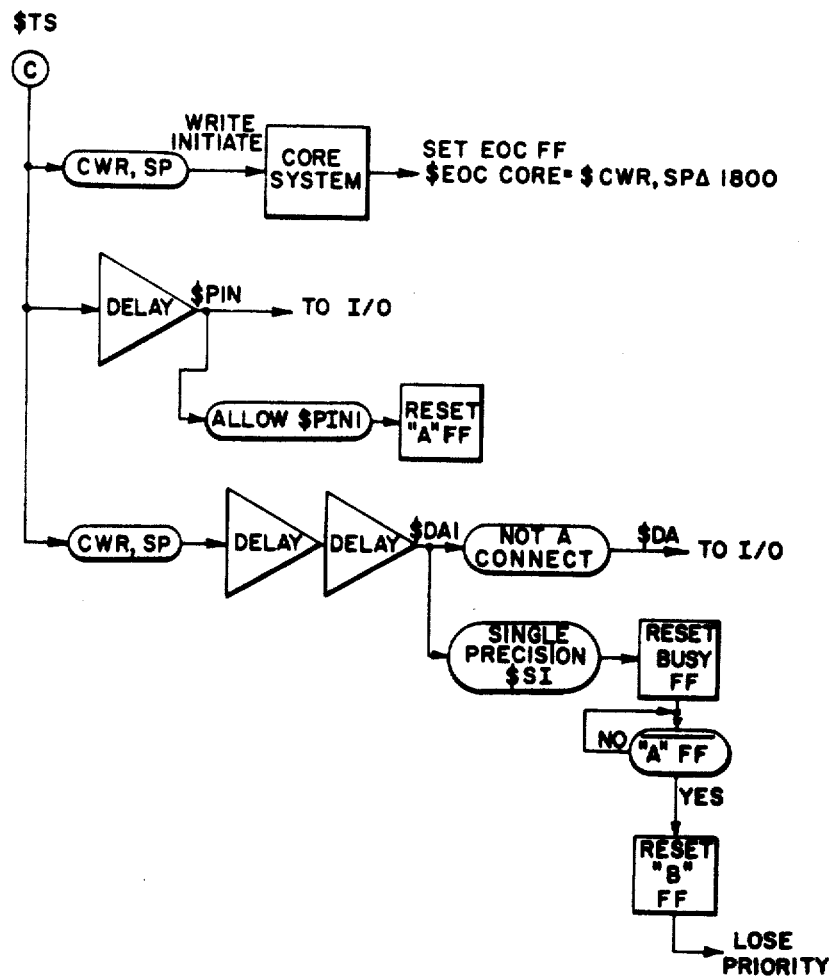
FIGURE 97 is a flow diagram continuing from the flow diagram of FIGURE 96.

With the generation of the clear/write pulse $CWR1, reference may now be had to FIGURE 97 illustrating the continuing flow diagram after the generation of the cycle initiate pulse $T_s$. The pulse $CWR1 results from the conjunctive combination of the clear/write single precision command, the internal/external memory signal as decoded and derived from the core assignment switches and the coded address bits $A_0$–$A_2$, the no core system failure logic level, the cycle started pulse $T_s$ and the logic level indicating that there is no file protect comparison (no attempt is being made to access a protected area of memory). In the event that there is a file protect comparison, the clear/write one pulse $CWR1 may nevertheless be generated if the protect line indicating that the communicating device is in the master mode. The clear/write one pulse $CWR1 is sent to the memory system described previously; the memory is thus loaded with the information contained on the data lines at the address specified by the address lines and in that half of the seventy-two bit memory location designated by the $A_{17}$ flip-flop. The portions of the word being written are designated by the contents of the zones lines.

After receiving the memory access request pulse $INT, and after priority has been granted to the communicating device, the cycle initiated pulse $T_s$ is generated as described above and is also used to generate a cycle started delay pulse $PIN. This pulse is generated from the simple delay of the cycle initiate pulse $T_s$ and is sent to the communicating device to tell the communicating device that the information existing on the zone address and command lines may be removed and that the channel will be ready within a predetermined time thereafter for another channel interrupt or memory access request. The cycle initiate pulse $T_s$, at the same time, is conjunctively combined with a decoded command CWR SP and delayed an additional predetermined time to generate the data available pulse $DA. The pulse $DA tells the communicating device that the information from the data lines may be removed. When the pulse $PIN is generated, it is combined with the priority level to reset the intermediate storage flip-flop (A flip-flop). The sample interrupt pulse $SI is generated by a signal from core. The clear/write one pulse $CWR1 is delayed for a predetermined time and then sent by the core system back to the memory controller as the end-of-cycle 350 (EOC–350) pulse (indicating that the end-of-cycle pulse $EOC_{CORE}$ will occur in approximately 350 nanoseconds) The end-of-cycle pulse $EOC–350 becomes the sample interrupt pulse $SI for a memory core cycle and resets the busy flip-flop to not busy ($\overline{BUSY}$). With the busy flip-flop and the A flip-flop both reset, the final storage flip-flop (B flip-flop) is reset which causes priority to be lost. As indicated above, the clear/write one pulse $CWR1 is also delayed an additional 350 nanoseconds to provide the end-of-cycle $EOC_{CORE}$. This pulse sets the end-of-cycle flip-flop signifying that a cycle has terminated and that the subsystem is ready to commence a new cycle.

The setting of the A flip-flop, the B flip-flop and the busy flip-flop as well as the award of priority is identical for all twelve commands and is discussed in greater detail in the section pertaining to the channel interrupt scheme. Therefore, in the following description of the remaining commands, the discussions will begin with the generation of the cycle initiate pulse $T_s$.

CLEAR/WRITE DOUBLE PRECISION (CWR DP)

Figure 98:
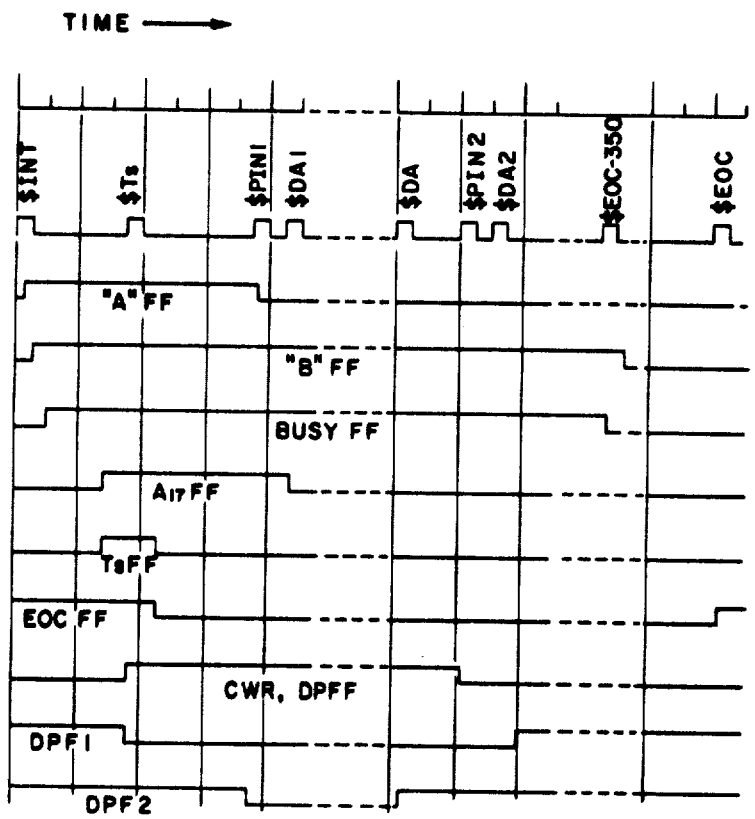
FIGURE 98 is a timing diagram useful for describing the operation of the command clear/write double precision.
Figure 99:
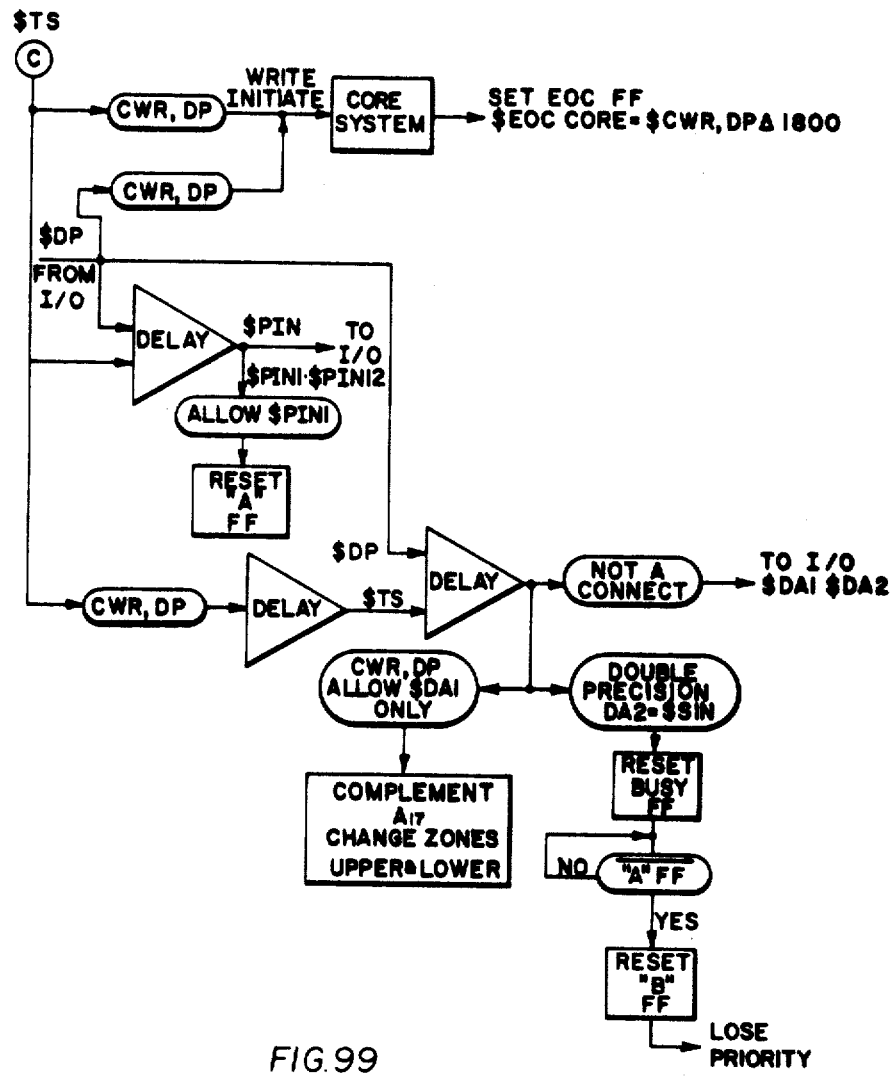
FIGURE 99 is a flow diagram useful for describing the operation of the command clear/write double precision.

A discussion of the clear/write double precision command may be facilitated by reference to FIGURES 98 and 99. When the clear/write double precision command is delivered by the communicating device over the command lines, the memory system will store the data existing in the input data lines into the upper half of the memory register (when the $A_{17}$ bit is equal to zero). A data available pulse $DA is then returned to the communicating device over the data available/stored line; upon receipt of the double precision pulse $DP on the double precision line the data existing on the input data lines is then placed on the lower half of the memory register (when $A_{17}$ address bit has been complemented to a one). A storage cycle within the memory system is then initiated; only the character positions specified by ones on the zone lines are changed. If the communicating device fails to provide a double precision pulse $DP within a predetermined delay time after the receipt of the clear/write double precision command, the command will automatically be completed to prevent the memory controller from becoming locked in a BUSY state. Since this command is a double precision command, two clear/write pulses are required, $CWR1 and $CWR2. The equations for the generation of these pulses which initiate a clear/write double precision core member cycle are:

$$\$CWR2 = (INT + EXT)\overline{CF}(\overline{FPC} + M) \cdot CWR\ DP \cdot \$T_s$$
$$\$CWR1 = (INT + EXT)CWR\ DP \cdot \$DP$$

CWR DP = clear/write double precision command command lines $\overline{A}$, B, $\overline{C}$, D $DP = double precision/rewrite pulse As stated previously, the cycle initiate pulse $T_s$ is generated by this command in the identical manner and time as for the clear/write single precision command.

The generation of the cycle initiate pulse $T_S$ implies that priority has been granted, that the intermediate storage flip-flop (A flip-flop), the final storage flip-flop (B flip-flop) and busy flip-flop have been set, the internal or external core selected, no core failures detected and the command decoded. For a clear/write double precision command, the address at $A_{17}$ must be a zero so that the first half of the word being written into memory is the lower half. The $A_{17}$ bit is complemented during the second half of the cycle to permit writing the second half of the word into the upper zones. When the cycle initiated pulse $T_S$ is generated, the clear/write double precision pulse $CWR2 is produced to perform the first half of the decoded command.

$$\$CWR2 = (INT + EXT)\overline{CF}(\overline{FPC} + M) \cdot CWR\ DP \cdot \$T_S$$

The clear/write pulse $CWR2 is the first of two pulses required between the memory controller and the core memory system for a clear/write double precision command. The pulse $CWR2 is applied to the upper half of the core system memory register as indicated by the address bit $A_{17}$ being equal to zero and is the result of ANDing the clear/write double precision command, the internal or external memory, no core system failures, the cycle initiate pulse $T_S$, and no file protect comparison or the protect command indicating the master mode. This pulse also indicates to the core memory system that a second pulse will follow to initiate the clear/write cycle. At the same time the clear/write pulse $CWR2 is generated, $T_S$, $\overline{CF}$, and CWR DP are ANDed to produce the setting of the clear/write double precision flip-flop and the output therefrom $CWR DP FF.

The cycle initiate pulse $T_S$ is delayed and used to generate other pulses. The cycle started delay pulse $PIN1 is generated from the delayed cycle initiate pulse $T_S$ and is identical to the pulse $PIN described in connection with the description of the single precision command; however, since two such pulses will be required in double precision commands, the command is now designated $PIN1. The pulse $PIN1 is sent to the communicating channel and tells the communicating device that the information existing on the addressing pulse lines may be removed and that the zone information may be changed in preparation to the second half of the double precision cycle. Also, the communicating device is informed that the channel interrupt or memory access request flip-flop (A flip-flop) will be reset and the double precision flip-flop DPF2 will be set in the second half of the cycle to generate the sample interrupt pulse.

The cycle initiate pulse $T_S$ is combined with the decoded command CWR DP and delayed to generate the data available pulse $DA. As in the case of the pulse $PIN, the data available pulse $DA is identical to this same pulse described in connection with the description of the single precision command; however, since two such pulses are now required, the pulse is now referred to as $DA1. This pulse tells the communicating device that the information on the data lines may be changed in preparation for the second half of the double precision cycle.

The same source that generates the data available pulse $DA1 is used to set the $A_{17}$ flip-flop and thereby select the lower memory zones. The clear/write double precision flip-flop is reset. The reset output of the sample interrupt flip-flop, which in the set state inhibits the $DA1 pulse or a double precision command, thereby prevents the generation of the sample interrupt pulse $SI and the resetting of the BUSY flip-flop during the first half of the double precision cycle. As stated previously, two pulses must be provided to the core system to perform a double precision command. In a single precision command the cycle initiate pulse $T_S$ provides the necessary pulse to the core system; however, in a double precision command the second pulse $DP must be provided by the communicating device. Within a predetermined time delay after the data available pulse $DA1 has been transmitted to the communicating device, the communicating device must reply with the double precision pulse $DP or with the double precision line. This pulse $DP is used to initiate the second half of the memory cycle in the double precision command. The receipt of the double precision pulse $DP permits the generation of the clear/write one pulse $CWR1 as given in the following equation:

$$\$CWR1 = (INT + EXT)CWR\ DP \cdot \$DP$$

It may be noted that this equation differs from that given for $CWR2 in that the double precision pulse $DP replaces $T_S$ and that the core system failure signals are removed. The double precision pulse $DP is delayed and is used to generate the second cycle started delay pulse $PIN2 which is sent to the communicating device to indicate that the information existing on the zone lines may be removed. The second cycle started delayed $PIN2 is also used to set the clear/write double precision flip-flop which, once set, prevents the generation of any further clear/write pulses $CWR1. The double precision pulse $DP is also combined with the clear/write double precision command CWR DP and delayed a predetermined time to provide the second data available pulse $DA2. The sample interrupt flip-flop inhibits the pulse $DA2 from generating the sample interrupt pulse $SI; the latter is generated from core EOC-350 which, in turn, is generated by the delay of the clear/write pulse $CWR1. The sample interrupt pulse resets the BUSY flip-flop to $\overline{BUSY}$. The clear/write pulse $CWR1 is also delayed by the core for an additional time period and sent back to the memory controller as the end-of-cycle pulse $EOC_{CORE}$. This pulse sets the end-of-cycle flip-flop signifying that the cycle has terminated and the memory controller is ready to commence a new cycle.

READ RESTORE SINGLE PRECISION (RRS SP)

Figure 100:
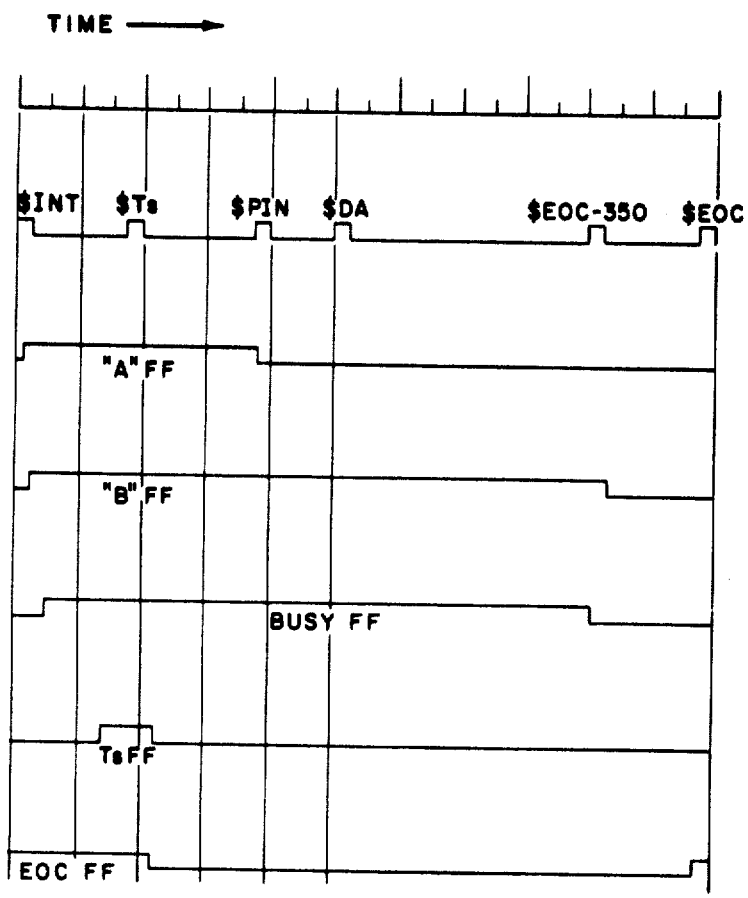
FIGURE 100 is a timing diagram useful in the description of the read/restore single precision command.
Figure 101:
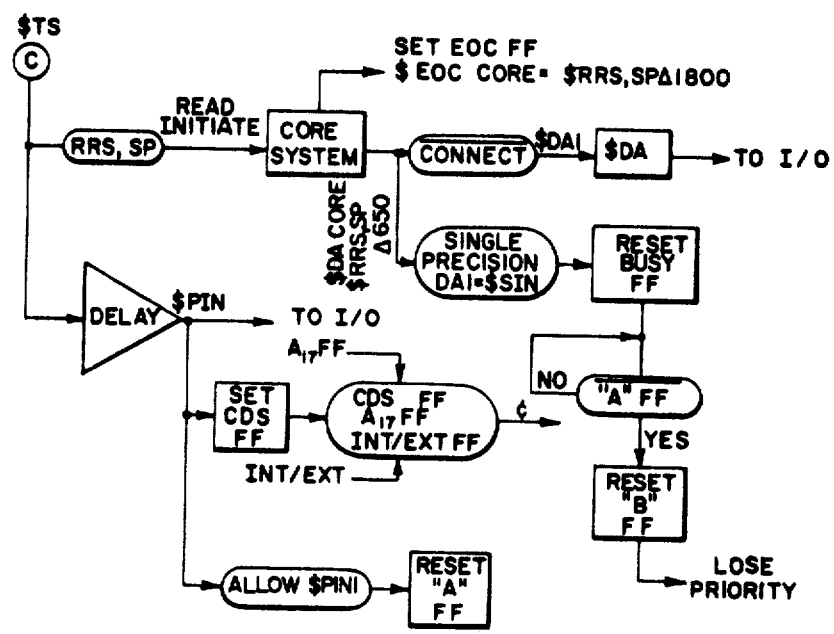
FIGURE 101 is a flow diagram useful for describing the operation of the read/restore single precision command.

The read/restore single precision command may be described with an aid of FIGURES 100 and 101 respectively, indicating a typical timing cycle and a flow diagram of the command. When the read/restore single precision command is provided by the communicating device, the memory will place the contents of the core storage locations specified by the address lines $A_0$–$A_{17}$ on the output data lines accompanied by a pulse on the data available stored line $DA. The data will remain stable on the output lines for a predetermined time. The zone lines are not used during the read/command; the contents of the specified core storage location are not changed. The equation for generating the pulse which initiates a read/restore single precision memory cycle is:

$$\$RRS\ SP = (INT + EXT)\overline{CF} \cdot RRS\ SP \cdot \$T_S$$

RRS SP=read/restore single precision command lines $\overline{A} \cdot \overline{B} \cdot \overline{C} \cdot \overline{D}$.

The cycle started pulse $T_S$ is generated for this command in the identical manner and times for the previous commands described. With the generation of the cycle initiate pulse $T_S$, the following is true: priority has been granted; the A flip-flop, B flip-flop and BUSY flip-flop have been set; the internal or external core selected; no core failures detected; and the command decoded. The presence of the cycle initiate pulse $T_S$ indicates that it is now possible to produce a read/restore pulse $RRS and perform the decoded command.

$$\$RRS = (INT + EXT)\overline{CF} \cdot RRS\ SP \cdot \$T_S$$

The pulse $RRS, which initiates a read/restore single precision core memory cycle, results (as indicated in the above equation) from ANDing the read/restore single precision command, the internal or external memory logic level (as derived from address bits $A_0$–$A_2$), no core failures ($\overline{CF}$) and the cycle initiate pulse $T_S$. Once the read/restore initiate pulse is generated, it is sent to core memory system where a seventy-two bit word is obtained from core. The cycle initiate pulse $T_S$ is delayed a predetermined time and is utilized as the cycle started delayed pulse $PIN. This pulse is sent to the communicating device to indicate that the information existing on the address command lines may be removed and that the channel interrupt or memory access channel will be available for another channel interrupt request after a predetermined time delay.

The read/restore pulse $RRS, in addition to starting a read cycle, is also delayed by the core for a predetermined time and sent back to the memory controller as the data available core pulse $DA_{CORE}$. When a clear/write command is being executed, the purpose of the $A_{17}$ fip-flop is to select either the upper or lower memory zone lines; in the performance of a read command; the zone lines are not used so the output of the $A_{17}$ flip-flop is now directed toward the selection of upper memory or lower memory. The selection of internal or external memory was one of the conditions for generating the read/restore pulse $RRS and the state of the $A_{17}$ flip-flop was determined prior to the cycle initiate $T_S$ time. All conditions for selecting upper or lower memory in either internal or external core are now present. The internal output of the internal/external flip-flop is combined with the core display flip-flop CDS FF and the $A_{17}$ flip-flop to generate a control signal that selects the internal memory upper (MR1U). In a like manner, the internal and external memory upper and lower may be selected with the combination of the external/internal flip-flops in $A_{17}$ flip-flop outputs. The control signals are thus memory register 1-upper MR1U, memory register 1-lower MR1L, memory register 2-upper MR2U and memory register 2-lower MR2L. It will be noted that in all conditions the core display flip-flop CDS FF must be set and that the internal/external flip-flop and the $A_{17}$ flip-flop may be either set or reset. The control signal generated will gate the selected portion of the memory to the output data lines.

After a predetermined delay upon receipt of the data available core, $DA_{CORE}$, the latter is sent to the communicating device as the data available pulse $DA. The $DA pulse tells the communicating device that information is on the data output lines and will remain there for a predetermined period of time. The reset output of the sample interrupt flip-flop SI FF which is in the set state, will inhibit the data available pulse $DA from generating the sample interrupt pulse $SI. The sample interrupt pulse SI is generated by a signal from the core system. The read/restore pulse $RRS is delayed for a predetermined time and sent back to the memory controller as the end-of-cycle-350 ($EOC$–350) pulse which in turn becomes the sample interrupt pulse $SI and resets the BUSY flip-flop to $\overline{BUSY}$. With the BUSY flip-flop and the A flip-flop both reset the B flip-flop is reset which in turn causes priority to be lost. The read/restore pulse $RRS is also delayed an additional amount and is sent back to the memory controller as the end-of-cycle pulse $EOC_{CORE}. This pulse then sets the end-of-cycle flip-flop which indicates that the cycle has terminated and that the memory controller is ready to commence a new cycle.

READ/RESTORE DOUBLE PRECISION (RRS DP)

Figure 102:
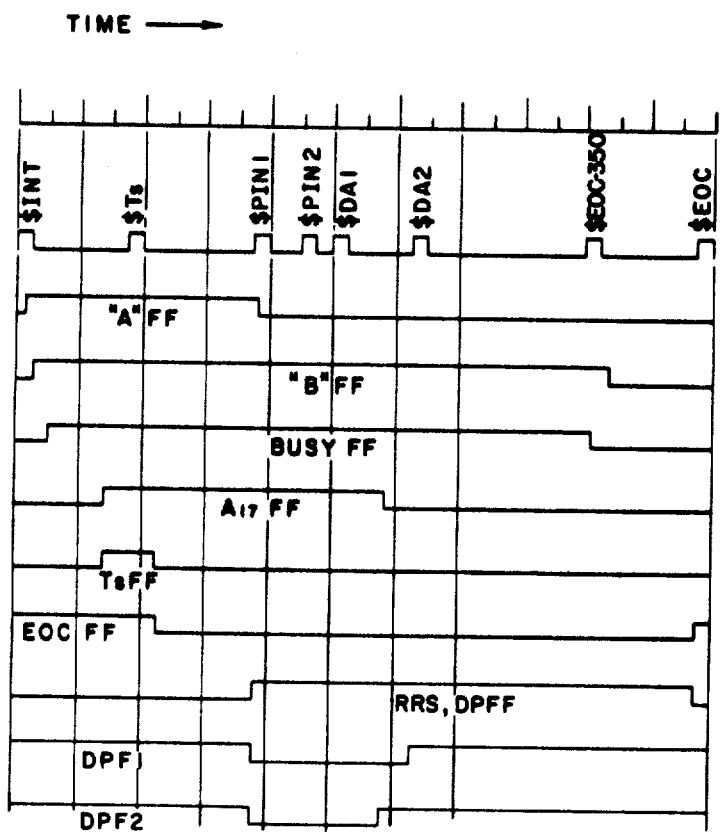
FIGURE 102 is a timing diagram useful in the description of the operation of the read/restore double precision command.
Figure 103:
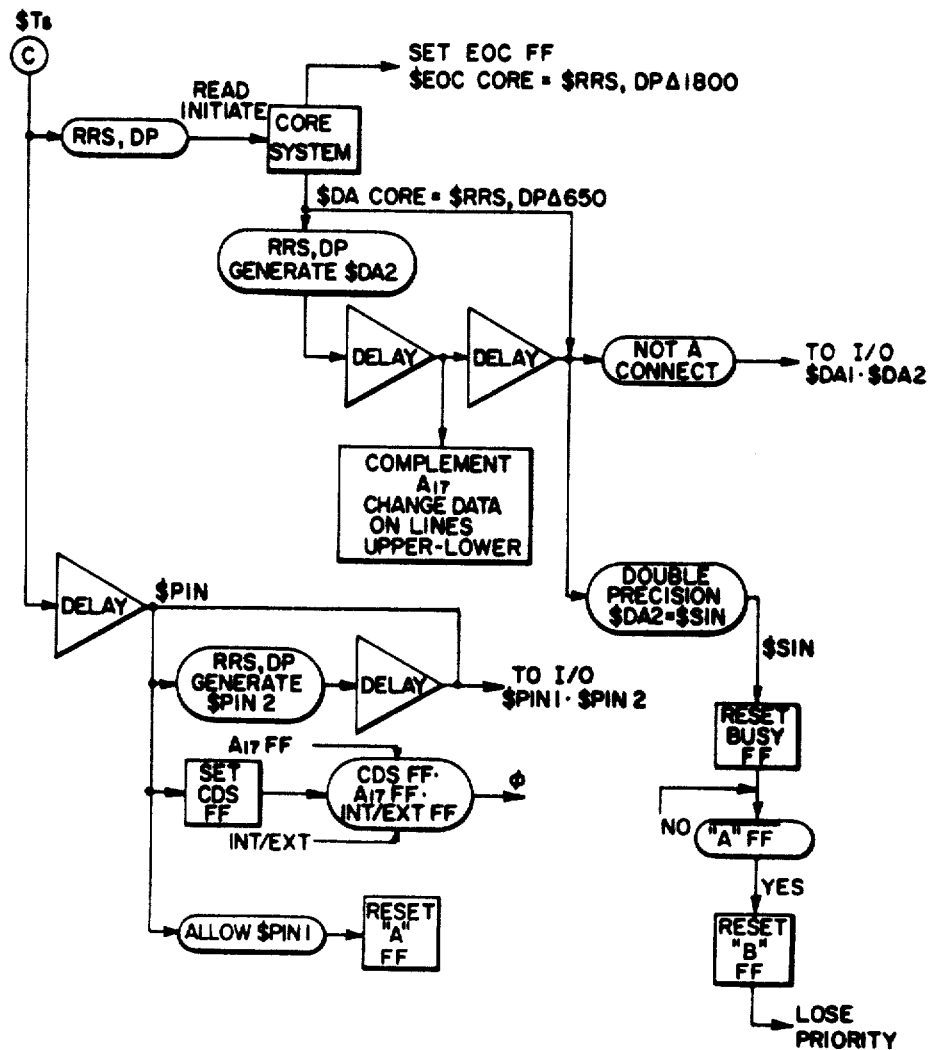
FIGURE 103 is a flow diagram useful for describing the operation of the read/restore double precision command.

The read/restore double precision command may be described by reference to FIGURES 102 and 103 showing the timing and the information flow of the command. When the read/restore double precision command is received by the memory controller from the communicating device, the memory will place the contents of the upper half (address bits $A_0$–$A_{17}$) of the data word (most significant thirty-six bits) stored at the location specified by the address lines $A_0$–$A_{17}$ on the output data lines accompanied by a pulse on the data available stored line $DA1. The data will remain on the output lines for predetermined time delay after which time the address $A_{17}$ will be complemented and the lower half of the data word will be placed from the output lines accompanied by a second pulse on the data available/stored line $DA2. The second half of the data word will also remain on the output lines for a predetermined time. The equation for the generation of the pulse which initiates a read/restore double precision core memory cycle is:

$$\$RRS\ DP = (INT + EXT) CF \cdot RRS\ DP \cdot \$T_S$$

RRS DP=read/restore double precision command command lines $\overline{A} \cdot \overline{B} \cdot \overline{C} \cdot D$ The conditions that generate the control signals MR1U, MR1L, MR2U and MR2L for the selection of output data switches as described in connection with the read/restore single precision command are also directly applicable to the read/restore double precision command.

The cycle initiate pulse $T_S$ is generated for this command in the identical manner and time as for the previously described commands. The generation of the cycle initiate pulse $T_S$ implies the following to be true: priority has been granted, the A flip-flop, B flip-flop and BUSY flip-flop have been set, the internal or external core selected, no core failures detected and the command decoded. For the read/restore single precision command, the $A_{17}$ flip-flop could be placed in either set or reset state; however, for the double precision command the address $A_{17}$ must be in the 0-state (the bit is complemented for the second half of the double precision command). The zone lines are not used in the execution of a read command and the $A_{17}$ flip-flop is not now needed for directing upper or lower zone enabling. The presence of the cycle initiate pulse $T_S$ indicates that it is now possible to produce a read/restore pulse $RRS and perform the decoded command. The pulse $RRS initiates a read/restore double precision core memory cycle and results from the ANDing of the read/restore double precision command, the internal or external memory logic level, the no core system failures logic level, and the cycle started pulse $T_S$. Once the read/restore initiate pulse is generated, it is sent to the core memory system where a seventy-two bit word is obtained from core.

The cycle initiate pulse $T_S$ is delayed a predetermined time and is utilized as a cycle started delayed pulse $PIN1; the latter pulse performs many functions, one of the most important of which is its application to the communicating device to indicate to the latter that information on the address and command lines may now be removed. The pulse is also combined with the read/restore double precision command RRS DP and the resulting signal is used to set the read/restore double precision flip-flop RRS DP FF and the double precision flip-flop DPF1 FF. The latter flip-flop when in a set state inhibits the data available pulse $DA1 for a double precision command from generating the sample interrupt pulse $SI and thereby prevents the resetting of the BUSY flip-flop during the first half of the cycle (if the inhibiting did not take place priority would be lost by the communicating device half-way through the double precision command). The cycle initiate delay pulse $PIN1 is also fed back and used to reset the A flip-flop and the double precision flip-flop DPF2 FF.

The selection of internal or external memory was one of the conditions for generating the read/restore pulse $RRS; the state of the $A_{17}$ flip-flop is determined prior to the generation of the pulse $T_S$ and with the generation of the cycle started delay pulse $PIN1 the core display flip-flop CDS FF has been set. All conditions for selecting upper memory in either internal or external core are now present.

The cycle initiate pulse $T_S$ is delayed an additional predetermined time and combined with the output of the read/restore double precision flip-flop; the pulse thus generated is the cycle started delayed pulse $PIN2 which is provided to the communicating device.

The read/restore pulse $RRS is delayed by the core for a predetermined time and sent back to the memory controller as the data available control pulse $DA_{CORE}. Upon receipt of this pulse it is sent to the communicating device as the data available pulse $DA1. Concurrently with the data available core pulse $DA_{CORE} being delivered to the communicating device, it is also delayed and combined with the output of the read/restore double precision flip-flop. This output is used to set the double precision flip-flop DPF2 FF, to set the $A_{17}$ flip-flop, and is delayed an additional period of time and utilized as the data available pulse $DA2. By setting the $A_{17}$ flip-flop the lower memory is selected for the second half of the cycle. The $DA2 pulse, as with the $DA1 pulse, is inhibited by the sample interrupt flip-flop SI FF from generating the sample interrupt pulse $SI. The latter pulse is generated from the core as follows. The read/restore pulse $RRS is delayed for a predetermined time by the core and sent back to the memory controller as the end-of-cycle-350 pulse ($EOC–350) which in turn becomes the sample interrupt pulse and resets the BUSY flip-flop. The sample interrupt pulse also resets the DPF1 flip-flop. With the BUSY flip-flop and the A flip-flop both reset, the B flip-flop is reset which causes priority to be lost. The read/restore pulse $RRS, in addition to being delayed to produce the data available core $DA_{CORE} is delayed an additional amount and sent back to the memory controller as the end-of-cycle pulse $EOC_{CORE}. This pulse will then reset the read/restore double precision flip-flop and set the end-of-cycle flip-flop signifying that a cycle has been terminated and that the unit is ready to commence a new cycle.

READ/ALTER/REWRITE (RAR)

Figure 104:
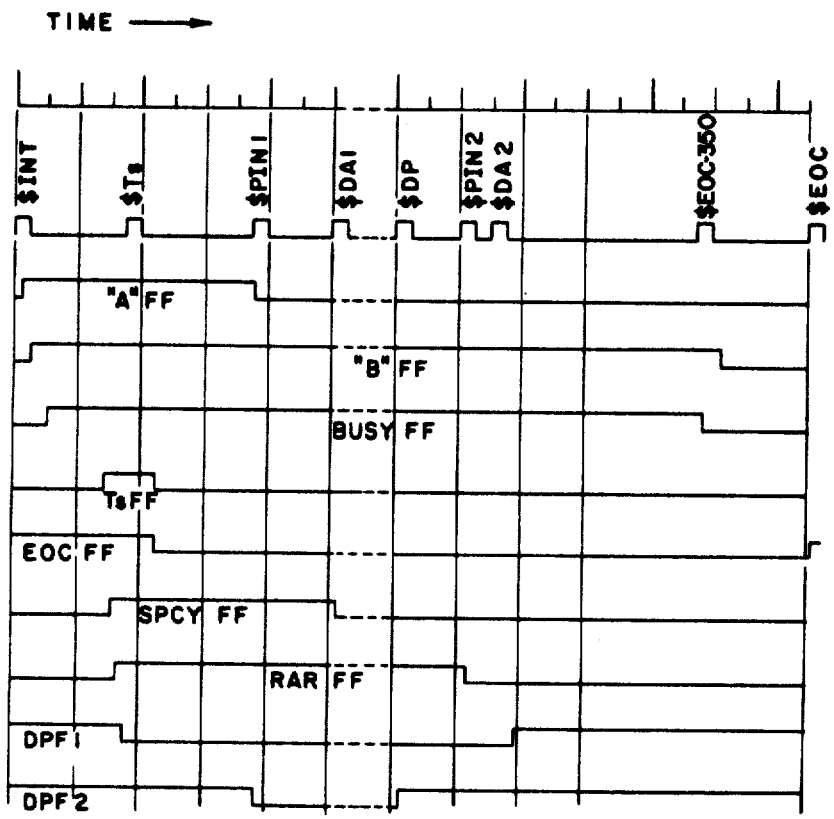
FIGURE 104 is a timing diagram useful in the description of the read/alter/rewrite command.
Figure 105:
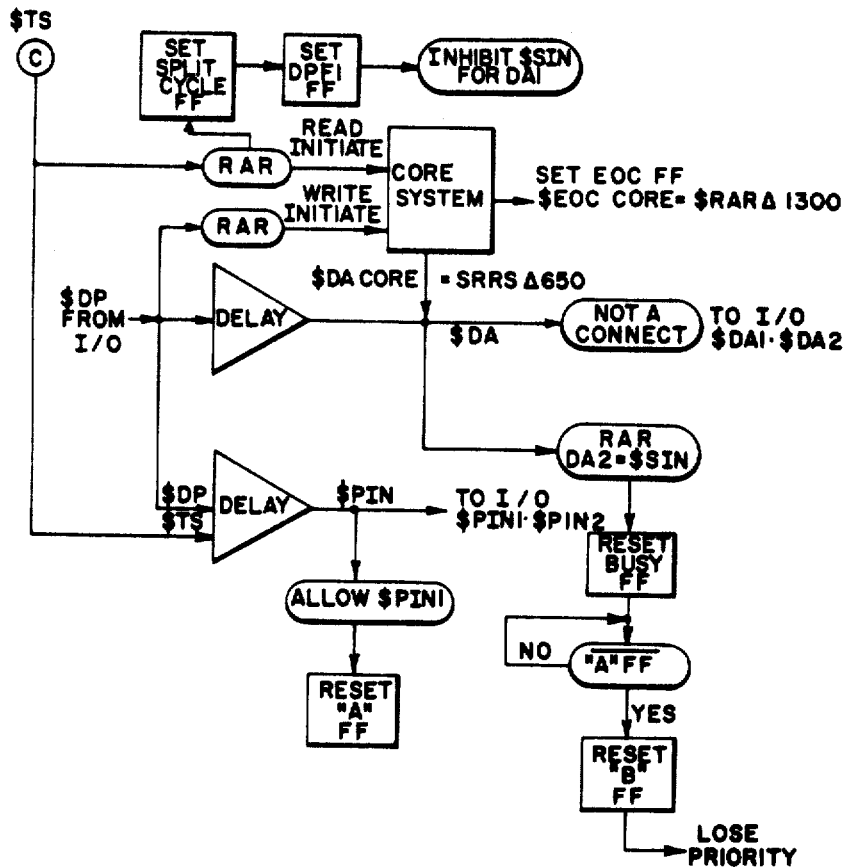
FIGURE 105 is a flow diagram useful for describing the operation of the read/alter/rewrite command.

The description of the read/alter/rewrite command may be facilitated by reference to the timing diagram of FIGURE 104 and the flow diagram on FIGURE 105. When the read/alter/rewrite command is received by the memory controller from the communicating device, the memory controller will place the contents of the core storage locations specified by the address lines $A_0$–$A_{17}$ on the data output lines $D_0$–$D_{35}$ accompanied by a pulse on the data available/stored line $DA. The double precision pulse $DP is then returned on the double precision/rewrite pulse line from the communicating device; the memory, upon receipt of this pulse, will store the data existing on the input data lines at the core storage location originally specified by the address lines and by the zone lines which have accompanied the double precision pulse $DP. Only the character positions specified by the ones on the zone lines will be altered by the data existing on the data input lines. The zone lines are not used during the read portion of the read/alter/rewrite command.

If the communicating device fails to respond after the completion of the first half of the read/alter/rewrite command and provide a double precision rewrite pulse $DP within a predetermined time, the second data available pulse $DA2 and the second cycle started delay pulse $PIN2, will not be sent to the communicating device but the rewrite portion of the memory cycle will be carried out. Although the read/alter/rewrite command is not a double precision command, nevertheless two initiate pulses will be required, a read pulse for the first half and a write pulse for the second half of a memory cycle. The equations for the generation of the pulses which initiate a read/alter/rewrite core memory cycle are:

$RAR(\text{Read}) = (INT + EXT)\overline{CF} \cdot RAR(\overline{FPC} + M)\$T_S$
Set $SPCY = \overline{CF} \cdot RAR \cdot \$T_S$
Reset $SPCY = \$DA_{CORE}$
$RAR(\text{Rewrite}) = (INT + EXT)RAR(\overline{FPC} + M)\$DP$
  RAR Read/Alter/Rewrite command
    command lines $A \cdot \overline{B} \cdot \overline{C} \cdot \overline{D}$
  $SPCY$ = Split Cycle The conditions for generating the control signals for reading the upper and lower internal and external memory registers discussed previously (MR1U, MR1L, MR2U and MR2L), are applicable to the read portion of the read/alter/rewrite command. The cycle initiate pulse $T_S$ is generated for this command in a manner identical to that described in connection with the previous commands.

The presence of the cycle initiate pulse $T_S$ automatically implies that priority has been granted, that the intermediate storage flip-flop (A flip-flop), the final storage flip-flop (B flip-flop) and the BUSY flip-flop have been set, the internal or external core selected, no core failures have been detected and the command has been decoded.

The address bit $A_{17}$ is combined with the precycle initiate pulse $PRE-T_S$ and the resultant signal will either set or reset the $A_{17}$ flip-flop, the output of which will be directed toward the selection of upper or lower memory. The state of the internal/external flip-flop is determined at the same time as that of the $A_{17}$ flip-flop. The decoding of memory bits $A_0$–$A_2$ in connection with the positions of the core select switches on the control panel will determine which memory will receive the address. When the cycle inititae pulse $T_S$ is generated, it becomes possible to produce the read/alter/rewrite logic level RAR and the read/alter/rewrite pulse $RAR-Read required between the memory controller and the core system to perform the first half of the decoded command.

$RAR(\text{Read}) = (INT + EXT)\overline{CF} \cdot RAR(\overline{FPC} + M)\$T_S$ The read/alter/rewrite-read pulse $RAR-Read is the first of two pulses required between the memory controller and the core system for the read/alter/rewrite operation. The read core memory cycle is initiated by the read/alter/rewrite pulse which is the result of ANDing the read/alter/rewrite command, internal or external memory, no core system failures, and no file protect comparison or master mode indication on the protect line. The read/alter/rewrite level, coincident with the read pulse to the core, informs the core that it is to execute a read/alter/rewrite command. This level is the result of ANDing the read/alter/rewrite command, no core system failures, and cycle initiate pulse $T_S$. The resultant signal sets the SPCY flip-flop, and also sets the read/alter/rewrite flip-flop. The cycle initiate pulse $T_S$ is delayed a predetermined time and utilized as the cycle started delay 1 pulse, $PIN1. This pulse is sent to the communicating device to indicate the information presently on the command and address lines may be removed, and that the channel interrupt or channel interrupt request channel will be ready within a predetermined time for another memory access request. The A flip-flop and the double precision 2 flip-flop PPF2 FF is reset.

The read/alter/rewrite-read pulse $RAR-read is also delayed by the core for a predetermined time and sent back to the memory controller as the data available core pulse $DA_{CORE}$. Upon receipt of this pulse it is provided to the communicating device to indicate thereto that the data on the data output lines will remain there for a time determined by the time necessary to receive the double precision pulse $DP from the communicating device. The $DA_{CORE}$ pulse also resets the SPCY FF.

As indicated previously, two pulses must be sent to the core system to perform a read/alter/rewrite command. Within a predetermined time after the data available pulse $DA1 has been transmitted to the communicating device, the device replies with the double precision pulse $DP. The latter pulse serves as the initiate pulse for the second half of the read/alter/rewrite cycle. The double precision pulse $DP is provided to the memory controller by the communicating device along the with the necessary information on the data and zone lines to perform the second half of the read/alter/rewrite cycle. The double precision pulse initiates the write cycle in the core system and the equation for the read/alter/rewrite-write pulse is given as follows:

$RAR(\text{Write}) = (INT + EXT)RAR(\overline{FPC} + M)\$DP$

It may be noted that the above equation differs from that of the pulse necessary to generate the read/alter/rewrite-read pulse in that the double precision pulse $DP replaces the cycle initiate pulse $T_S$ and that the signals indicating core system failures are removed. The double precision pulse $DP also sets the DP2 FF flip-flop. The double precision pulse also is delayed a predetermined time and generates the second cycle initiate delayed pulse $PIN2. The other pulse is provided to the communicating device to indicate that the information on the data and zone lines may be removed. The pulse $PIN2 is also used to set the read/alter/rewrite flip-flop which subsequently locks out any further generation of command pulses for the core system. The double precision pulse is delayed an additional period of time and is utilized as the data available #2 pulse $DA2 which is inhibited in generating the sample interrupt pulse $SI by the set state of the sample interrupt flip-flop SI FF. The sample interrupt pulse $SI is generated by the delay of the read/alter/rewrite-write pulse $RAR-write from the core system sent back to the memory controller as the end-of-cycle–350 ($EOC–350) pulse. This pulse becomes the sample interrupt pulse that resets the BUSY flip-flop. When the BUSY flip-flop and the A flip-flop are both reset, the B flip-flop also becomes reset which causes priority to be lost.

The read/alter/rewrite-write pulse is also delayed by the core for an additional period of time and sent back to the memory controller as the end-of-cycle pulse $EOC_{CORE}$. This pulse sets the end-of-cycle flip-flop EOC FF thereby indicating that the read/alter/rewrite has terminated and the memory controller is now ready to receive a new command.

CONNECT (CON)

Figure 106:
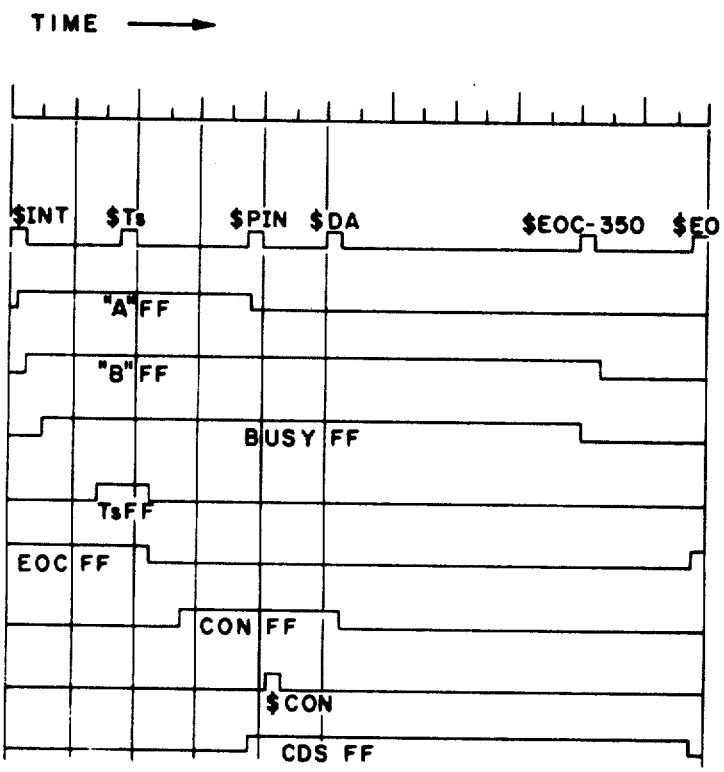
FIGURE 106 is a timing diagram useful in the description of the operation of the connect command.
Figure 107:
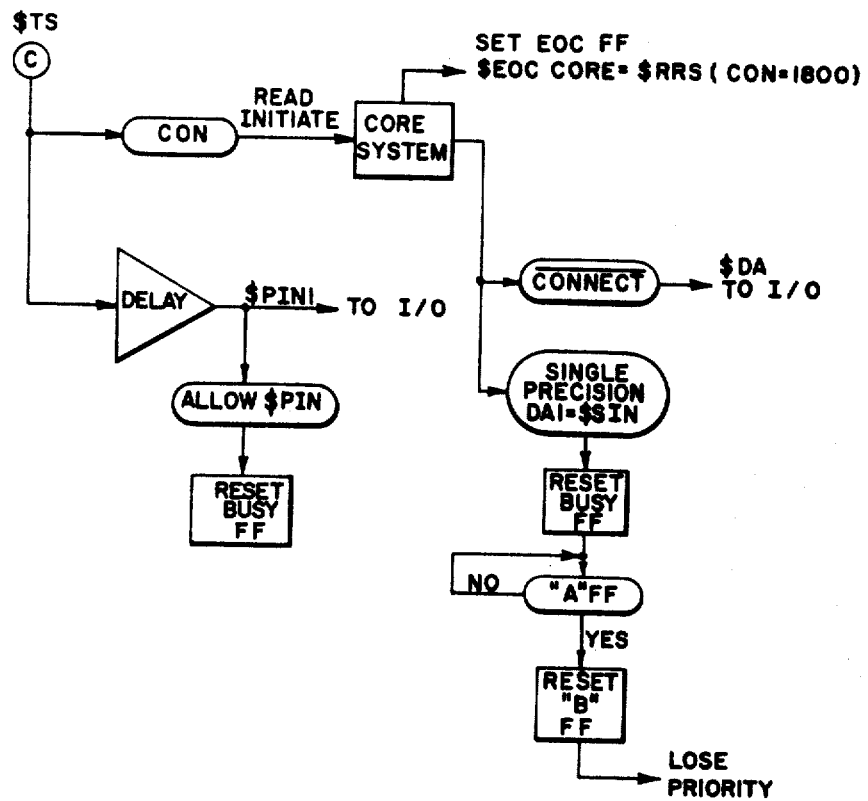
FIGURE 107 is a flow diagram useful for describing the operation of the connect command.

The description of the connect command may be facilitated by reference to the timing diagram of FIGURE 106 and the flow diagram of FIGURE 107. When the connect command is received by the memory controller from the communicating device, the controller will place the contents of the core storage location specified by the address lines $A_0$–$A_{17}$ on the output data lines accompanied by a pulse on the connect output pulse line $CON associated with the memory port or channel designated by the three least significant bits of the data word ($D_{33}$–$D_{35}$) pulled from memory. This will take place only when the communicating device is the control processor and only if a one is placed on the protect line indicating that the control processor is in the master mode. Otherwise, the command will be ignored and a pulse placed on the illegal action pulse line together with an appropriate illegal action code.

The equations for the generation of a pulse which initiates a connect memory cycle in the internal or external memory and for the selection of the memory port to receive the connect pulse R are:

$RRS_{(CON)} = (INT + EXT)\overline{CF} \cdot CON \cdot M \cdot CC\ \$T_S$
$CON(OUTPUT) = (DEC_0 \cdot \overline{CMSK}_0 + \cdots$
$\qquad\qquad + DEC_7 \cdot \overline{CMSK}_7) CON\ FF \cdot \$DA_{\Delta 80}$ CON = connect command command lines $A \cdot B \cdot \overline{C} \cdot \overline{D}$
CC = Control channel
$DEC_{0-7}$ = Decoded data bits $D_{33}$–$D_{35}$
$CMSK_{0-7}$ = Channel mask 0–7
CON FF = Connect flip-flop It may be noted that insofar as the core system is concerned, the connect command appears substantially the same as a read/restore single precision command.

The control signals for designating the appropriate memory register described in connection with previous commands are equally applicable here (MI1U, MI1L, MI2U and MI2L). In the second equation given above, each term contains the channel mask flip-flop associated with the specified output channel. If the channel mask is "on" the output connect pulse will be inhibited. The cycle initiate pulse $T_S$ is generated for the connect command in the manner identical to that described with the previous commands. When the cycle initiate pulse is present, the following is true: the A flip-flop, the B flip-flop and the BUSY flip-flop are set; priority has been granted; the internal or external core selected; and the command has been decoded.

The presence of a cycle initiate pulse $T_S$ permits the generation of connect pulse $RRS_{CON} and the performance of the decoded command.

$RRS_{(CON)} = (INT + EXT)\overline{CF} \cdot CON \cdot M \cdot CC \cdot \$T_S$

The pulse $RRS_{CON}, which initiates a read memory cycle, results, as indicated in the above equation, from ANDing the memory internal or external, the connect command, the clear fault logic level, the master mode logic level, and control channel logic level as well as cycle initiate pulse $T_S$. The cycle initiate pulse $T_S$ is delayed a predetermined time and combined with the connect command to set the connect flip-flop CON FF. The cycle initiate pulse $T_S$ is also delayed another predetermined time and is utilized as a cycle started delay pulse $PIN which is sent to the communicating device to indicate that the information on the address and command lines may be removed and that the channel interrupt or memory access interrupt line is available for the next memory access interrupt request. The cycle started delay pulse $PIN will also reset the intermediate storage flip-flop (A flip-flop) and will set the core display flip-flop CDS FF. The read/restore connect pulse $RRS_{CON} is delayed in the core for a predetermined time and sent back to the memory controller as the data available core pulse $DA_{CORE}. The latter pulse will not be sent to the communicating device in the execution of a connect command because the output of the connect flip-flop is used to inhibit such action. The $A_{17}$ flip-flop is set or reset in accordance with the combination of the $A_{17}$ bit and the precycle initiate pulse $PRE-T_S the output of which will be utilized to select upper or lower memory.

The three least significant data bits ($D_{33}$–$D_{35}$) from the core location specified by the address lines are applied to the connect channel decode circuits and the resulting output will represent the memory port or channel that the connect output pulse $CON will be applied to. The data available core $DA_{CORE} pulse is delayed for a predetermined time and combined with the output of the connect flip-flop the output of this combination resulting in the output connect pulse $CON (output).

$CON(OUTPUT) = (DEC_0 \cdot \overline{CMSK}_0 + \cdots$
$\qquad\qquad + DEC_7 \cdot \overline{CMSK}_7) CON\ FF \cdot \$DA^\Delta_{80}$ Thus, the connect pulse will be applied to the output channel, and only the output channel, indicated by the decoded bits of the last or least three significant bits of the data word retrieved from the core system at the specified address.

The sample interrupt pulse $SI is generated by the read/restore connect pulse $RRS_{CON} which has been delayed in the core for a predetermined time and sent back to the memory controller as the end-of-cycle–350 pulse ($EOC–350). The latter pulse becomes the sample interrupt pulse and resets the BUSY flip-flop to $\overline{BUSY}$. When the BUSY flip-flop and the A flip-flop have both reset, the B flip-flop becomes reset and priority is lost. The read/restore connect pulse $RRS_{CON} is delayed in core for an additional period of time and sent back to the memory controller as the end-of-cycle pulse core $EOC_{CORE} which resets the core display flip-flop CDS FF and sets the end-of-cycle flip-flop EOC FF signifying that a cycle has terminated and that the memory controller is ready to commence a new cycle.

SET EXECUTE INTERRUPT CELLS (SXC)

The set/execute interrupt cells command has been discussed in connection with the execute interrupt cells mask and priority scheme; therefore, it will not be necessary to describe the flow diagram, the logic diagrams, or the timing diagrams of the command. The set/execute interrupt cell command is a single precision command that performs a store function by placing the information on the input data lines $D_0$–$D_{15}$ into the interrupt cells 0–15 or interrupt cells 16–31 depending on whether the data bit 35 is a zero or one respectively. A binary 1 on a given data line will set a given interrupt cell thus requesting a program interrupt. A binary 0 will not affect the given cell. A pulse on the data available/stored line notifies the communicating device that the cells have been set. The transfer of this information will take place only if a binary 1 is placed on the protect line indicating that the communicating device is in the master mode; otherwise, the command will be ignored and a pulse will be placed on illegal action pulse line. It may be noted that if the communicating device is a processor, the processor protect line must be at the high level (binary 1) to indicate that it is in the master mode; however, if the communicating device is an input/output controller, the protect line thereof is wired at a high level thereby permitting the input/output controller to always have access to the execute interrupt cells.

As discussed previously in connection with the execute interrupt cells, the level of priority descends from execute cell 0 to execute cell 31; the associated five bit address of each cell is the same as the cell number. The equations which generate the pulses to set the execute interrupt cells are:

$SXC_{0-15} = SXC \cdot M \cdot \overline{D}_{35} \cdot \$T_{S\Delta 200}$
$SXC_{16-31} = SXC \cdot M \cdot D_{35} \cdot \$T_{S\Delta 200}$ SXC = Set Execute Interrupt Cells Command Command Lines $A \cdot B \cdot C \cdot \overline{D}$
$D_{35}$ = Data Bit 35

The cycle initiate pulse $T_S$ is generated for this command in the manner described previously in connection with other commands. It may be noted that the six previous commands described were classified as memory core cycle commands (commands involving the memory core system in a cycle); the set/execute command SXC, and the five commands following are referred to as memory controller cycle commands (command cycles involving the transfer of information among the registers of the memory controller without involving the memory core system). Whereas in the core cycle commands the state of internal/external flip-flop and the state of the $A_{17}$ flip-flop were of significance, the memory controller commands are not concerned with the status of these flip-flops.

When the cycle initiate pulse $T_S$ is generated, the following conditions exist: priority has been granted; the A flip-flop, B flip-flop and BUSY flip-flop have been set; and a command has been decoded. The presence of the cycle initiate pulse $T_S$ now permits the generation of the set execute upper pulse \$SXCU or the set execute cell lower pulse \$SXCL and to perform the decoded command.

The equations given above for the generation of the set execute pulse \$SXC may be seen to include the simultaneous occurrence of the decoded set/execute command SXC, the binary 1-state of the protect line (master mode M) the true or false state of data bit $D_{35}$, and the delayed cycle initiate pulse $T_{S_{\Delta}200}$. The highest priority unmasked set execute cell flags the control processor which returns with an execute command XEC (to be described). The existence of an execute interrupt, as stated above, results in the delivery of the execute interrupt present pulse or flag XIP to the control processor through the interrupt present line; the latter is designated by a switch on the control panel indicating which of the communicating devices has been previously designated as the control processor. The setting of an execute interrupt cell thus having been achieved, the signal XIP is applied to the control processor; however, any subsequent action to be taken must be instigated by the control processor—the command set/execute SXC has been completed.

EXECUTE XEC

Figure 108:
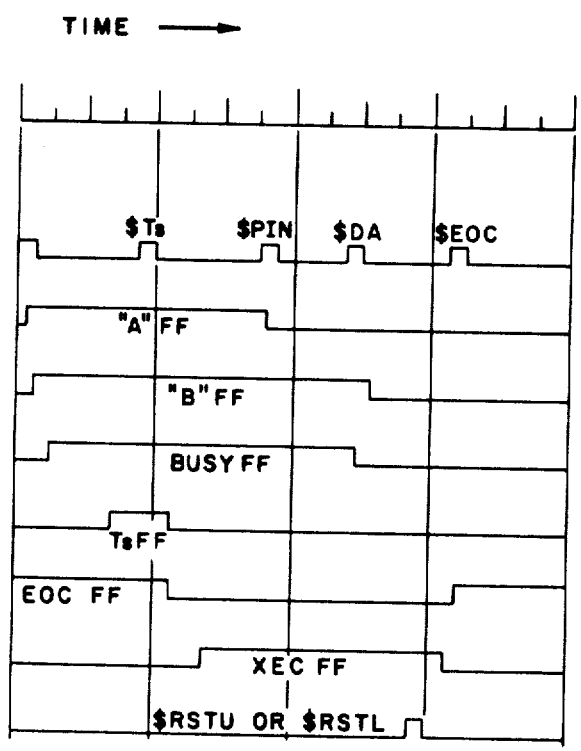
FIGURE 108 is a timing diagram useful in describing the operation of the execute command.
Figure 109:
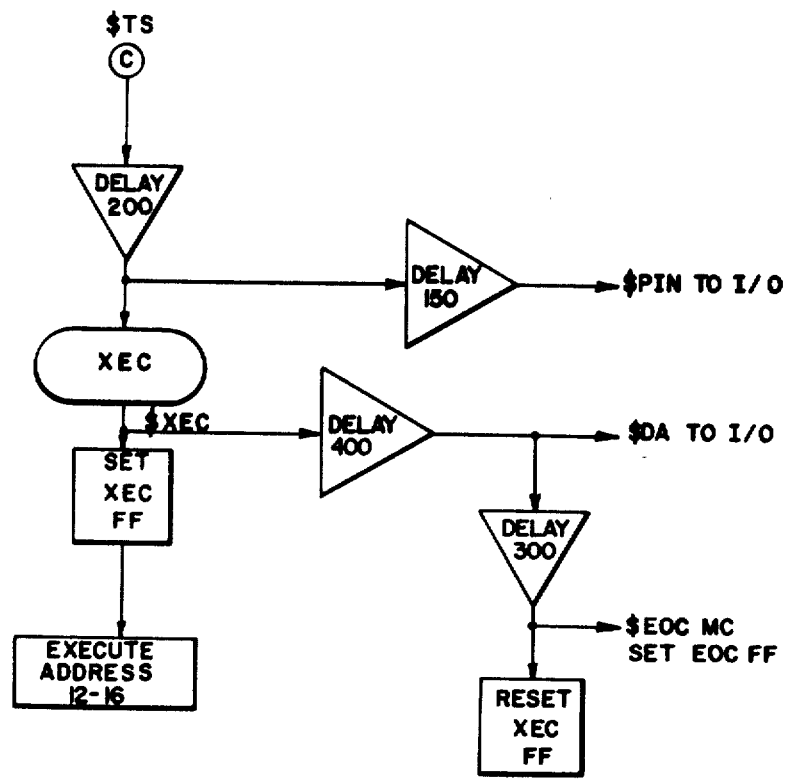
FIGURE 109 is a flow diagram useful for describing the operation of the execute command.

The description of the execute command may be facilitated by reference to the timing diagram of FIGURE 108 and the flow diagram of FIGURE 109. The execute command is used only by the control processor as a response to an execute interrupt present signal XIP from the memory controller signifying the presence of one or more program interrupts. This command will, when the interrupt is acknowledged, cause the memory to send five prewired fixed address bits corresponding to the highest unmasked priority interrupt cell that has been set to a one by the control processor onto the output data lines $D_{12}-D_{16}$ accompanied by a data available/stored pulse \$DA.

As noted previously, the execute command XEC occurs only in response to the execute interrupt present XIP signal from the memory controller to a control processor. Thus, the command can be provided to the memory controller only if the communicating device is the control processor. An additional prerequisite for the recognition of the execute command is that the control processor be in the master mode (the protect line at a logic level 1).

The equations which generate the pulse to reset the execute interrupt cell being answered and to gate the prewired fixed address of the execute interrupt cell to the output lines $D_{12}-D_{16}$ are:

$\$XEC = $ Set $XEC\ FF = XEC \cdot M \cdot CC \cdot \$T_{S\Delta 200}$
Reset $XEC\ FF = \$T_{S\Delta 900}$
$\$XEC$ (output) $= XEC\ FF +$ Display·Stop XEC = Execute Command Command Lines $A \cdot B \cdot \overline{C} \cdot D$.

The cycle initiate pulse $T_S$ is generated for this command in a manner identical to that described in connection with the description of previous commands. The generation of the cycle initiate pulse $T_S$ indicates that the following conditions exist: priority has been granted; the A flip-flop, B flip-flop and BUSY flip-flop have been set; and the command has been decoded. The presence of the cycle initiate pulse $T_S$ together with the master mode, the control channel and the decoded execute command XEC enables the generation of the execute interrupt pulse \$XEC; the latter pulse generates the reset of the execute interrupt cell causing the program interrupt and also generates the execute control which switches the prewired fixed address of that cell to the output data lines. The execute control level is derived from the execute flip-flop XEC FF. The set output of the execute flip-flop is utilized as the execute XEC logic level. The cycle initiate pulse $T_S$ is delayed a predetermined time and utilized as a cycle started delay pulse \$PIN delivered to the communicating device to indicate that the information existing on the command line may be removed. This pulse also resets the A flip-flop and the DPF2 flip-flop; the execute pulse \$XEC is also delayed a predetermined time and combined with the execute logic level XEC to provide the data available pulse \$DA. The latter pulse is sent to the communicating device to indicate that the prewired fixed address of the execute interrupt cell involved in the program interrupt is present on the output data lines $D_{12}-D_{16}$ and will be there for a predetermined time. The data available pulse \$DA is also utilized to generate the sample interrupt pulse \$SI to reset the BUSY flip-flop to $\overline{BUSY}$. With the A flip-flop and BUSY flip-flop reset, the B flip-flop is reset and causes priority to be lost. The execute pulse XEC is also delayed and combined with a logic level RSTU or a logic level RSTL (the former indicating that one or more execute interrupt cells 0–15 is set and unmasked the latter indicating that one or more interrupt cells 16–31 is set and unmasked); the result of the combination of these signals is a pulse \$RSTU or \$RSTL utilized to reset the corresponding execute interrupt cell. The resetting of interrupt cells has been described in more detail in that section dealing therewith; therefore, a detailed description thereof will not be given here.

The pulse that was used to generate the data available pulse \$DA is further delayed and is utilized to reset the execute flip-flop XEC FF. The cycle initiate pulse $T_S$ is delayed further and, when gated, is utilized as the end-of-cycle pulse \$EOC$_{MC}$. The end-of-cycle memory controller pulse \$EOC$_{MC}$ will set the end-of-cycle flip-flop EOC FF indicating that a cycle has been terminated and that the memory controller is ready to commence a new cycle.

SET FILE PROTECT REGISTER (SFP)

Figure 110:
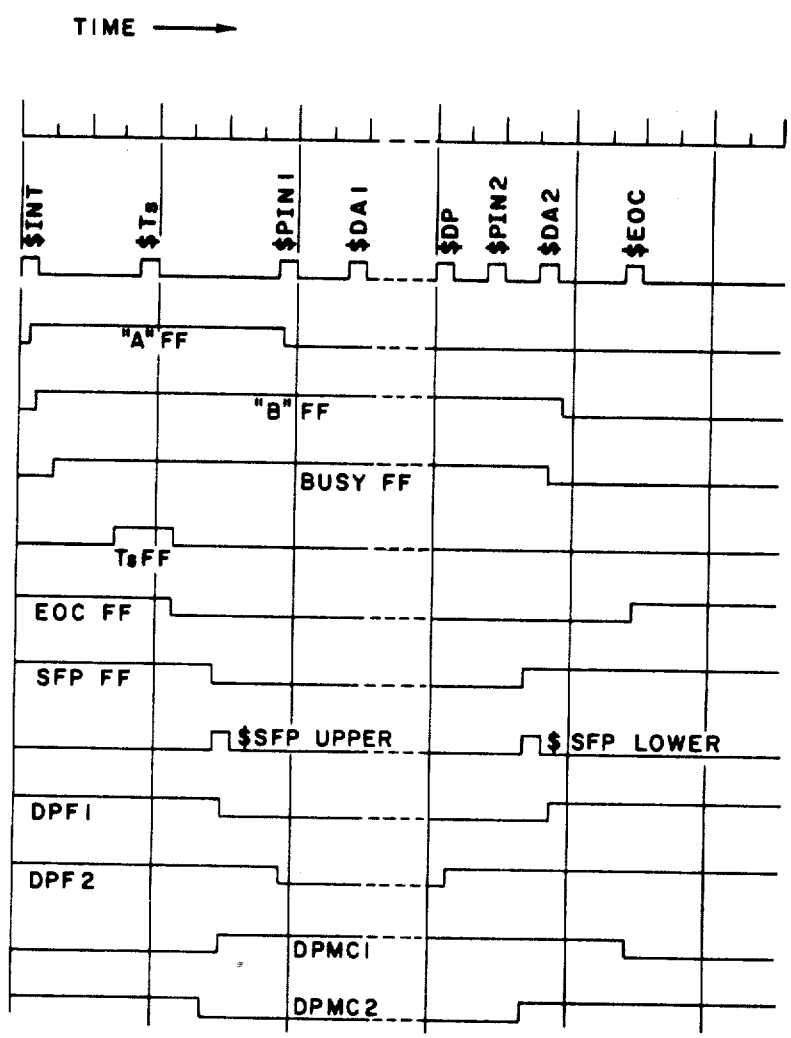
FIGURE 110 is a timing diagram useful in the description of the set/file/protect command.
Figure 111:
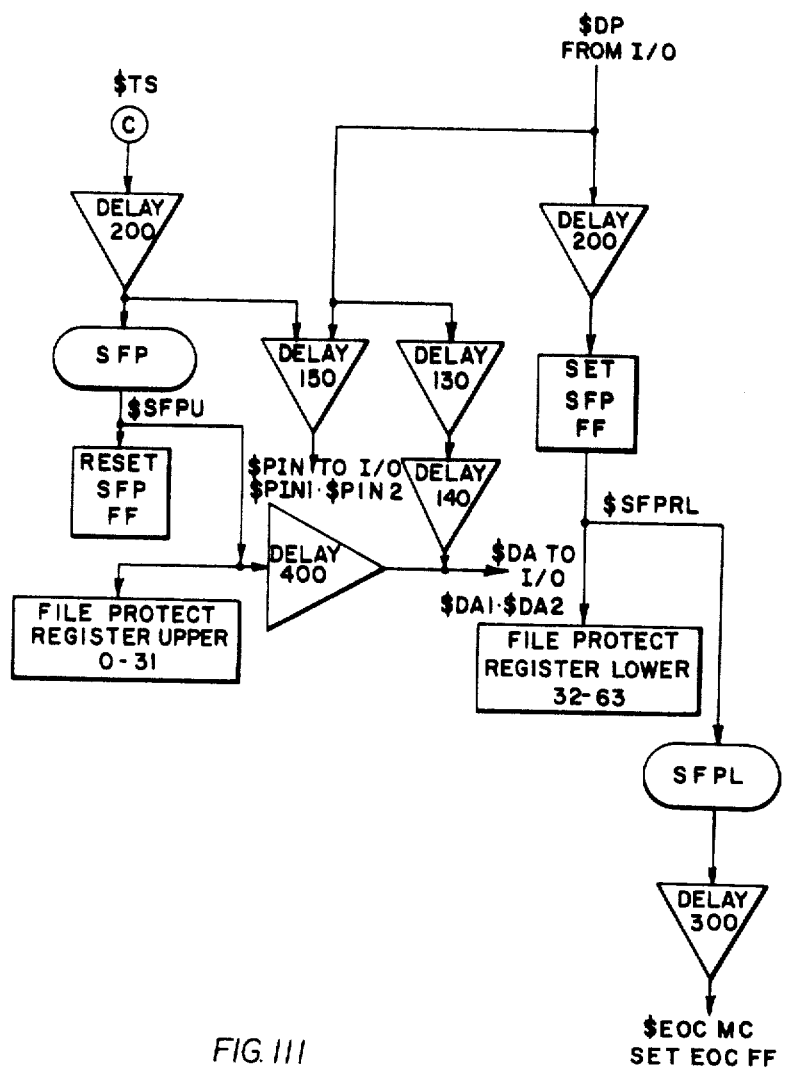
FIGURE 111 is a flow diagram useful for describing the operation of the set/file/protect command.

The description of the set/file/protect register command may be facilitated by reference to the timing diagram of FIGURE 110 and the flow diagram of FIGURE 111. The set/file/protect register command is a double precision command and will, when the command is acknowledged, place the information existing on the input data lines $D_0-D_{31}$ into bits 0–31 of the file protect register. As discussed previously in connection with the file protect scheme of the memory controller of the present invention, the file protect register bits correspond to that part of the core storage banks specified by an address with the most significant bit (address bit A2) equal to a binary 0. After the bits are placed in the file protect register, a pulse is returned over the data available/stored line notifying the communicating device that the second word may be transferred.

Upon receipt of a pulse on a double precision/rewrite line, the information on the data input lines $D_0-D_{31}$ will be placed into bit positions 32–63 of the file protect register. These file protect register bits correspond to that part of the core storage banks specified by an address with an address bit $A_2$ equal to a binary 1.

It may be noted that the transfer of data from data lines into the file protect register will take place only if the communicating device is the control processor and only if the protect line is at a binary 1 logic level indicating that the control processor is in the master mode. If the command is received from other than the control processor, or from the control processor not in the master mode, the command will be ignored and a pulse will be placed on the illegal action pulse line.

A binary 0 on a given data line will place a binary 0 into the corresponding bit position of the file protect register and will restrict access to the corresponding block of 1024 words to a communicating device unless it is in the master mode. A binary 1 in the file protect register indicates that the corresponding storage block is unrestricted. As noted previously, the input/output controller of the system includes a protect line that is continuously at a binary 1 logic level; therefore, the file protect register will not prevent the input/output controller from accessing storage blocks specified by the file protect register.

If the communicating device fails to respond to the data available pulse $DA within a predetermined time, the set/file/protect register command is automatically completed but the cycle initiated delayed pulse $PIN2 and the second data available pulse $DA2 will not be sent to the communicating device.

The cycle initiate pulse $T_S$ is generated for this command in a manner identical to that described in connection with the previous command; the generation of the cycle initiate pulse $T_S$ indicates the following conditions to exist: priority has been granted; the A, B and BUSY flip-flops have been set; and the command has been coded. The pulse $SFP_{UPPER}$ sets the upper file protect register and is the result from the combination of the command set/file/protect, the master mode (protect line binary 1), the control channel signal indicating that the communicating device is the control processor, and the cycle initiate pulse $T_S$ delayed.

The cycle initiate pulse $T_S$, once generated, resets the DPMCF2 flip-flop and is also delayed a predetermined time; the delayed cycle initiate pulse is utilized as a cycle initiate delayed pulse $PIN and, as in other double precision commands, since two $PIN pulses are used the first pulse is designated $PIN1. The pulse $PIN1 resets the A flip-flop and the DPF2 flip-flop which will be set in a second half of the set/file/protect cycle to generate the sample interrupt pulse.

The set/file/protect upper pulse $SFP_{UPPER}$ is also delayed a predetermined time and is utilized as a data available pulse $DA1; this latter pulse is sent to the communicating device to indicate that the second word may now be transferred. The pulse $SFP_{UPPER}$ sets the DPF1 flip-flop and the DPMCF1 flip-flop. The DPF1 flip-flop, when set, prevents the data available pulse $DA1 from generating the sample interrupt pulse $SI to thereby prevent the BUSY flip-flop from being reset and causing the loss of priority in the middle of the double precision command. The DPMCF1 flip-flop in the set state, in a double precision command, inhibits the generation of the end-of-cycle pulse $EOC_{MC}$ during the first half of the cycle.

Within a predetermined time, the communicating device must respond to the data available pulse $DA1 with a double precision pulse $DP. If this pulse is not received within the predetermined time, the command is completed without the benefit of the additional information communicated to the memory controller by the communicating device. When the pulse $DP is received, it is utilized within the memory controller as the cycle initiate pulse $T_S$ was used in the first half of the cycle.

The receipt of the double precision pulse $DP together with the control channel signal CC, the master mode level of the protect line M, and the decoded command set/file/protect, results in the generation of the set/file/protect lower pulse $SFP_{LOWER}$. This pulse will set the DPMCF2 flip-flop. The double precision pulse $DP sets the DPF2 flip-flop and is also delayed a predetermined time and utilized as the cycle started delayed pulse $PIN2. The pulse is also delayed an additional period of time and is utilized as a data available pulse $DA2. When the latter is generated, it is gated by DPF2 flip-flop and the sample interrupt flip-flop to generate the sample interrupt pulse $SI. The sample interrupt pulse $SI resets the BUSY flip-flop to $\overline{BUSY}$; therefore, with the BUSY flip-flop and the A flip-flop both reset, the final storage flip-flop (B flip-flop) is reset which causes priority to be lost. The sample interrupt pulse $SI also resets the DPF1 flip-flop.

The data available pulse $DA2 which has been transmitted to the communicating device, tells the latter that the information in the input data lines may be removed. The set file protect lower pulse $SFP_{LOWER}$ sets the DPMCF2 flip-flop and is delayed a predetermined time to be utilized as the end-of-cycle pulse $EOC_{MC}$; this pulse will set the end-of-cycle flip-flop indicating that a cycle has been determined and that the memory controller is ready to commence a new cycle.

READ FILE PROTECT REGISTER (RFP)

Figure 112:
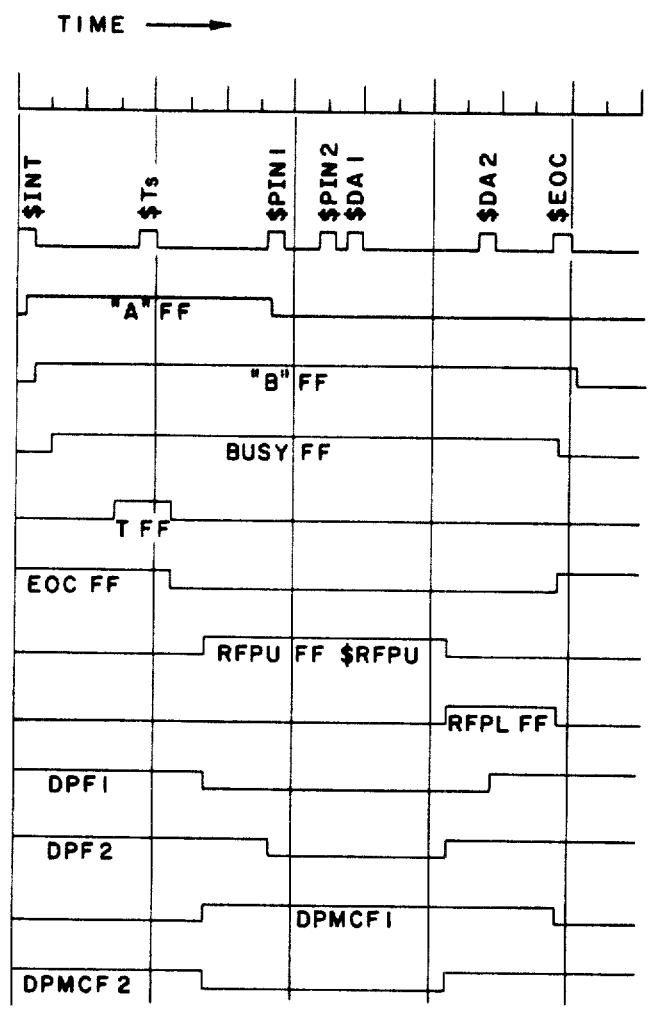
FIGURE 112 is a timing diagram useful in the description of the read/file/protect command.
Figure 113:
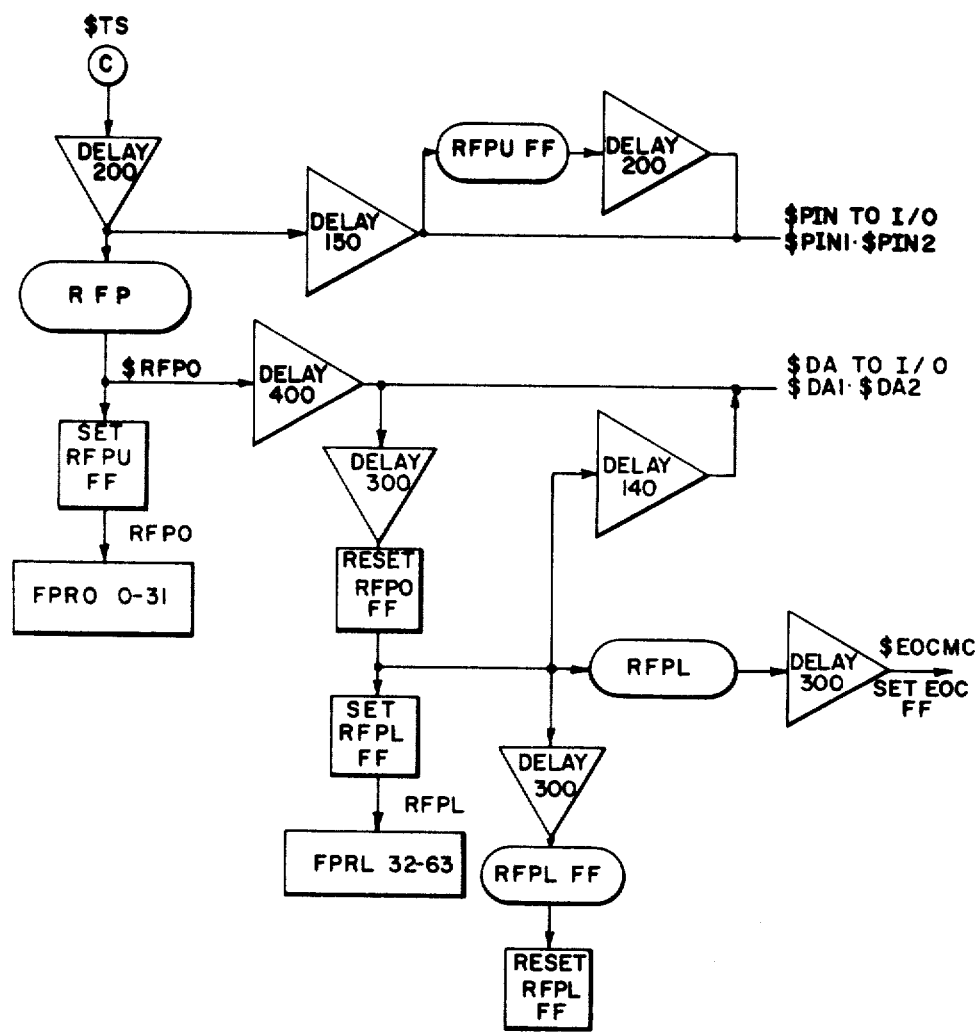
FIGURE 113 is a flow diagram useful for describing the operation of the read/file/protect command.

The read/file/protect command may best be described by reference to the timing diagram of FIGURE 112 in the flow chart of FIGURE 113. The read/file/protect register command is a double precision command and, when the memory access request is acknowledged, places the bits 0-31 of the file protect register corresponding to the core storage bank specified by an address with the most significant bit (address bit $A_2$) equal to a binary 0 on the output data lines $D_0$–$D_{31}$ accompanied by a pulse on a data available/stored line. The information thus provided on the output data lines will remain for a predetermined time after which bits 32-63 of the file protect register corresponding to the core storage banks specified by an address with bit $A_2$ equal to binary 1 will be placed on the output data lines $D_0$–$D_{31}$ accompanied again by a pulse on the data available/stored line. The data, thus placed on the output data lines during the second half of the cycle, will also remain on the output lines for a predetermined time. The read/file/protect register command will generate the transfer of information from the file protect register to the communicating device only if the communicating device is the control processor and only if a binary 1 is placed on the protect command line indicating that the communicating device is in the master mode.

A binary 0 will be placed on a given data line if the corresponding bit in the file protect register is a binary 0 (indicating restricted access).

The cycle initiate pulse $T_S$ is generated in a manner described previously; the generation of the signal indicates the following conditions to be true: priority has been granted; the A, B and BUSY flip-flops have been set; and the command decoded. The first half of the read/file/protect command includes the generation of the read file protect upper pulse $RFPU. This pulse is generated from the combination of the decoded read/file/protect command (RFP), the master mode logic level M on the protect line, the control processor logic level CC from the memory controller control panel, and a delayed cycle initiate pulse. The cycle initiate pulse $T_S$ is delayed a predetermined time and sent to the communicating device as a cycle started delayed pulse $PIN1. The pulse $T_S$ is delayed an additional period of time and is utilized as a cycle started delayed pulse $PIN1. The pulse $PIN2 tells the communicating device that it may begin the formulation of a new request for a new memory controller cycle. The cycle initiate pulse $T_S$ is delayed still another predetermined time and utilized as a data available pulse $DA1. This latter pulse is provided to the communicating device to indicate that the information on the output data lines will remain stable for a predetermined time to enable the communicating device to detect same and act accordingly.

The DPMCF2 flip-flop is reset by the cycle initiate pulse $T_S$ delayed and, at the same time, the read file protect upper flip-flop, the DPMCF1 flip-flop and the DPF1 flip-flop are set. During the memory controller cycle, setting the DPMCF1 flip-flop inhibits the generation of the end-of-cycle pulse for the first half of the read/file/protect command. Setting the DPF1 flip-flop inhibits the generation of the sample interrupt pulse and thereby prevents the BUSY flip-flop from being reset causing the loss of priority during the double precision command. When the cycle started delayed pulse $PIN1 is generated, the pulse is utilized to reset the DPF2 flip-flop thus preventing the data available pulse $DA1 from generating the same interrupt pulse $SI for the double precision command. The cycle started delay pulse $PIN1 also resets the A flip-flop. After the $DA1 pulse is generated, it is delayed and used to set the DPF2 flip-flop and to reset the read file protect upper flip-flop.

The resetting of the read file protect upper flip-flop results in the setting of the read file protect lower flip-flop which results in the reading of the lower file protect register bits 32–64. The reset output of the read file protect upper flip-flop sets the DPMCF2 flip-flop and is also delayed to be utilized as the data available pulse $DA2. This latter pulse indicates to the communicating device that the data will remain on the output data lines for a predetermined time. When the DPF2 flip-flop is set, the data available pulse $DA2 is gated to generate the sample interrupt pulse $SI; the latter pulse resets the BUSY flip-flop to $\overline{BUSY}$. The $\overline{BUSY}$ state of the BUSY flip-flop, the resetting of the A flip-flop, and the resulting resetting of the B flip-flop cause priority to be lost. The sample interrupt pulse $SI resets the DPF1 flip-flop. The signal resulting in the data available pulse $DA2 is delayed and is utilized to reset the read file protect lower flip-flop. At the same time that the read file protect lower flip-flop is being reset, the read file protect upper pulse $RFPU, generated during the first half of the cycle, is delayed and is gated by the set output of the DPMCF2 flip-flop; the resulting output pulse is utilized as the end-of-cycle memory controller pulse $EOC$_{MC}$. This pulse resets the DPMCF1 flip-flop and sets the end-of-cycle flip-flop indicating the cycle has terminated and that the unit is ready to commence a new cycle.

SET EXECUTE AND CHANNEL INTERRUPT MASK REGISTER (SMSK)

Figure 114:
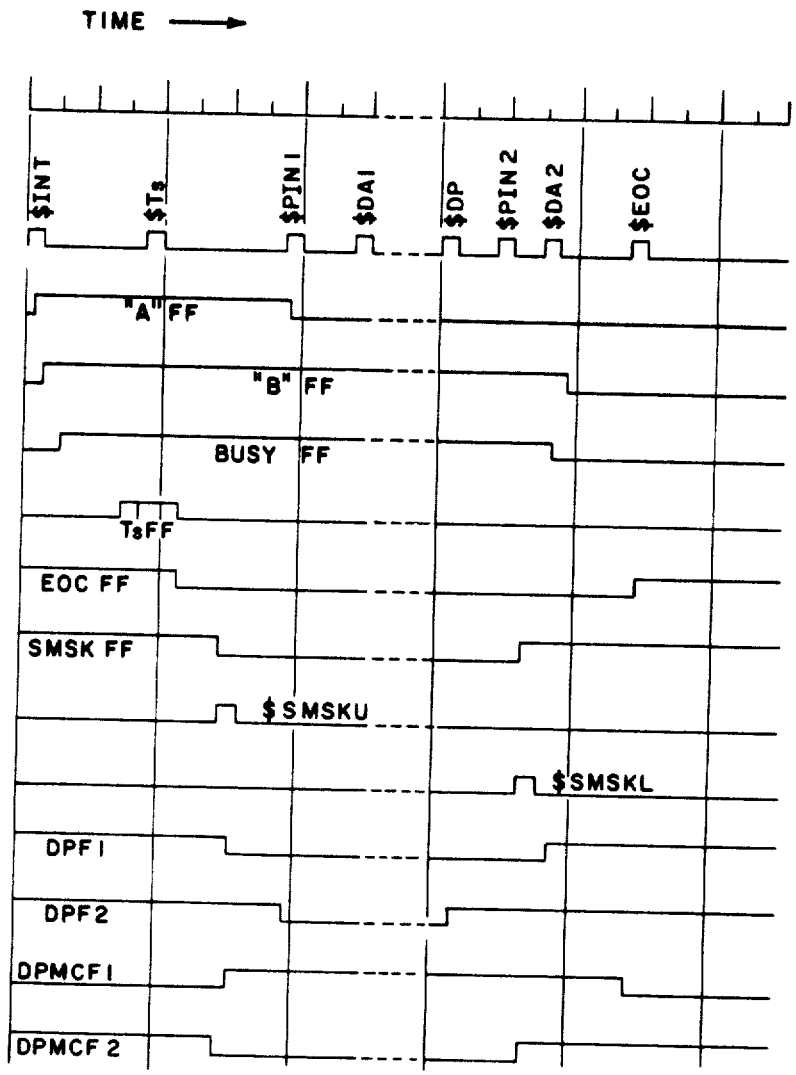
FIGURE 114 is a timing diagram useful in the description of the set/mask command.
Figure 115:
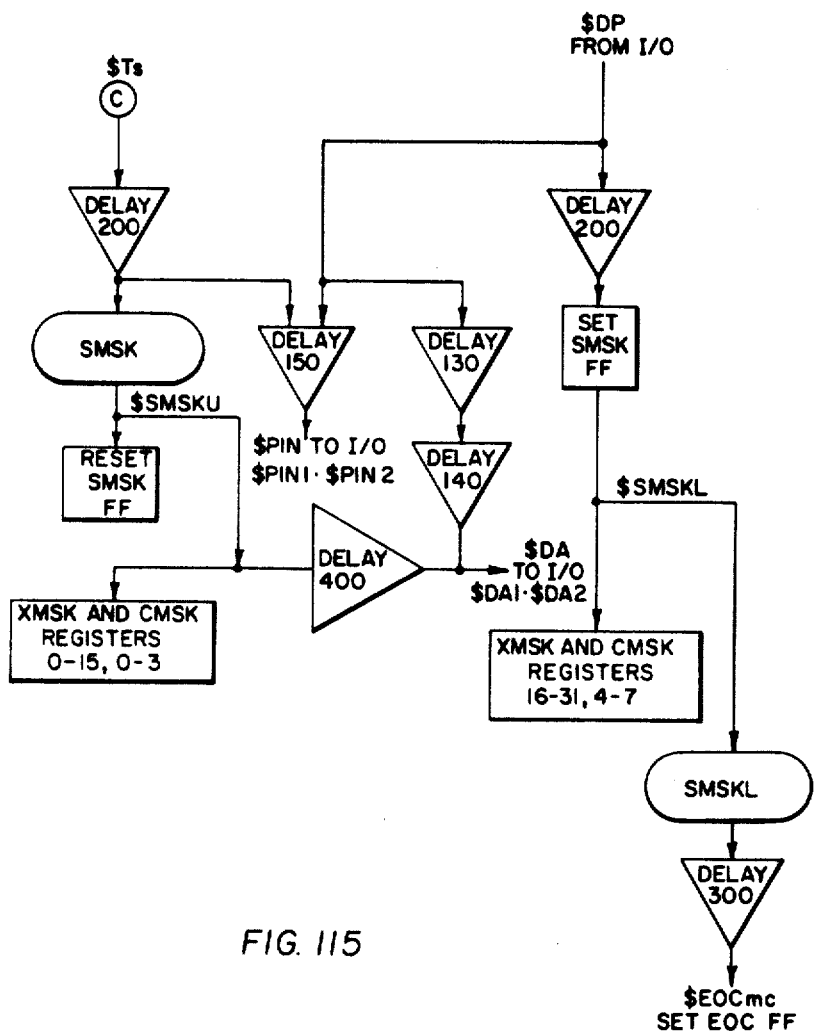
FIGURE 115 is a flow diagram useful in the description of the operation of the set/mask command.

The set/mask command may best be described by reference to FIGURE 114 showing a typical timing diagram of the command cycle and to the flow diagram of FIGURE 115. The set execute and channel interrupt mask register command is a double precision command that places the information existing on input data lines $D_0$–$D_{15}$ into positions 0–15 of the execute interrupt mask register and the information on the input data lines $D_{32}$–$D_{35}$ into bit positions 0–3 of the channel mask register. A pulse is then sent over the data available/stored line to indicate to the communicating device that the second word may be transferred. The communicating device responds with the double precision pulse $DP together with information on data input line $D_0$–$D_{15}$ to be placed into bit positions 16–31 of the execute interrupt mask register and inforamtion on the daily input lines $D_{32}$–$D_{35}$ to be placed into bit positions 4–7 of the channel mask register.

The receipt of information will be accepted by the memory controller only if the communicating device is the control processor and only if a binary 1 is on the protect line indicating that the control processor is in the master mode.

A binary 0 on a given data input line will place a binary 0 in the corresponding bit position of the register; the binary 0 in the register, either the channel interrupt mask register or the set execute mask register will inhibit acknowledgement of interrupts. A binary 1 in the same position enables an acknowledgement. If the communicating device fails to respond to the data available pulse within a predetermined time, the command will automatically be completed but the data available $DA2 and the cycle initiate delayed pulse $PIN2 will not be sent to the communicating device.

Since this is a double precision command, two sets of pulses are required; set mask upper $SMSKU, and set mask lower $SMSKL. The cycle initiate pulse $T$_S$ is generated as described previously; the generation of this pulse indicates the following conditions are true: the A flip-flop, the B flip-flop and the BUSY flip-flop have been set; the command has been decoded. The initial pulse $SMSKU is generated by the combination of the decoded command SMSK, the signal from the control panel indicating that it is the control processor, the true state of the protect line and the delayed cycle initiate pulse $T$_S$. The delayed cycle initiate pulse $T$_S$ resets the DPMCF2 flip-flop and is also delayed to be used as a cycle started delayed pulse $PIN1. The latter pulse resets the A flip-flop and sets the DPF2 flip-flop. The set mask upper pulse $SMSKU is also utilized as the data available pulse $DA1 after the former has been delayed a predetermined time. This pulse also sets the DPMCF1 flip-flop and the DPF1 flip-flop. The DPF1 flip-flop prevents the data available pulse $DA1 from generating the sample interrupt pulse $SI and thereby prevents the BUSY flip-flop from being reset to cause the loss of priority in the middle of the cycle. The DPMCF1 flip-flop in the set state inhibits the generation of the end-of-cycle pulse $EOC during the first half of the set mask cycle.

After the data available pulse $DA1 has been transmitted to the communicating device, the communicating device must reply within a predetermined time with a double precision pulse $DP which serves within the memory controller to perform tasks performed by the cycle initiate pulse $T$_S$ during the first half of the cycle. The receipt of the double precision pulse $DP serves to generate the set mask lower pulse $SMSKL. The latter pulse is generated from the decoded command set/mask SMSK, the master mode M, the control processor signal CC and the double precision $DP. This pulse sets the execute and channel mask registers lower (mask flip-flops of channel interrupt cells 4–7 and execute interrupt cells 16–31). This pulse also sets the DPMCF2 flip-flop. The double precision pulse $DP sets the DPF2 flip-flop and is delayed to be utilized as the cycle started delay pulse $PIN2. The double precision pulse is also delayed an additional period of time and utilized as a data available pulse $DA2. The pulse $DA2 is gated by the DPF2 flip-flop and the sample interrupt flip-flop to generate the sample interrupt pulse $SI. The latter pulse resets the BUSY flip-flop; therefore with BUSY flip-flop and A flip-flop both reset, the B flip-flop is subsequently reset causing priority to be lost. The sample interrupt pulse also resets the DPF1 flip-flop.

After the set mask lower pulse $SMSKL has set the DPMCF2 flip-flop, it is delayed a predetermined time and gated by the DPMCF2 flip-flop to result in an output pulse utilized as the end-of-cycle pulse $EOC$_{MC}$. This delayed pulse sets the end-of-cycle flip-flop indicating that a cycle has terminated and that the memory controller is ready to start in a new cycle.

READ EXECUTE AND CHANNEL INTERRUPT MASK REGISTERS (RMSK)

Figure 116:
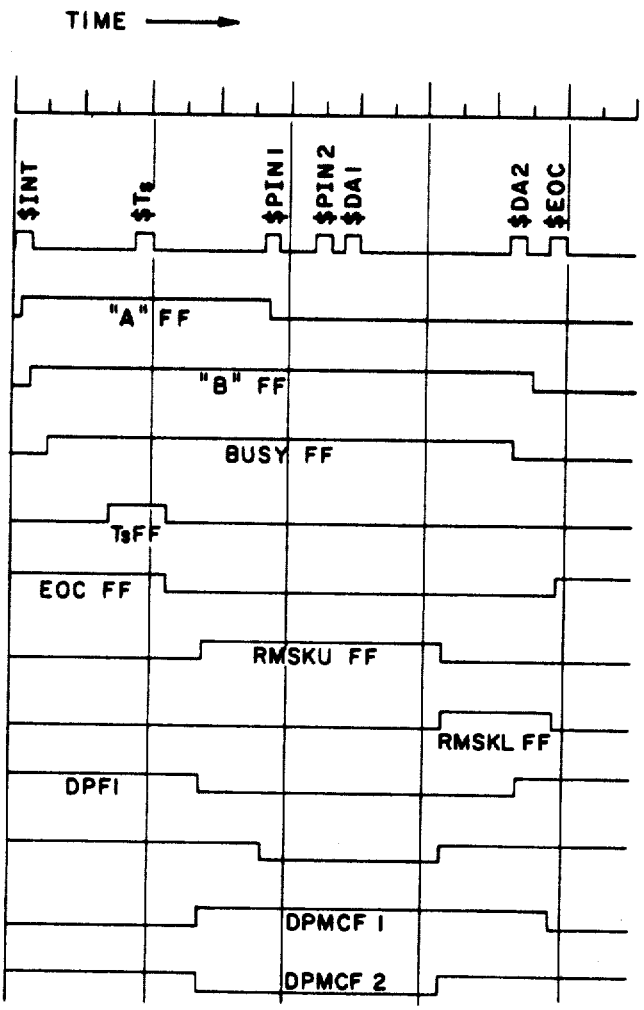
FIGURE 116 is a timing diagram useful in the description of the read/mask command.
Figure 117:
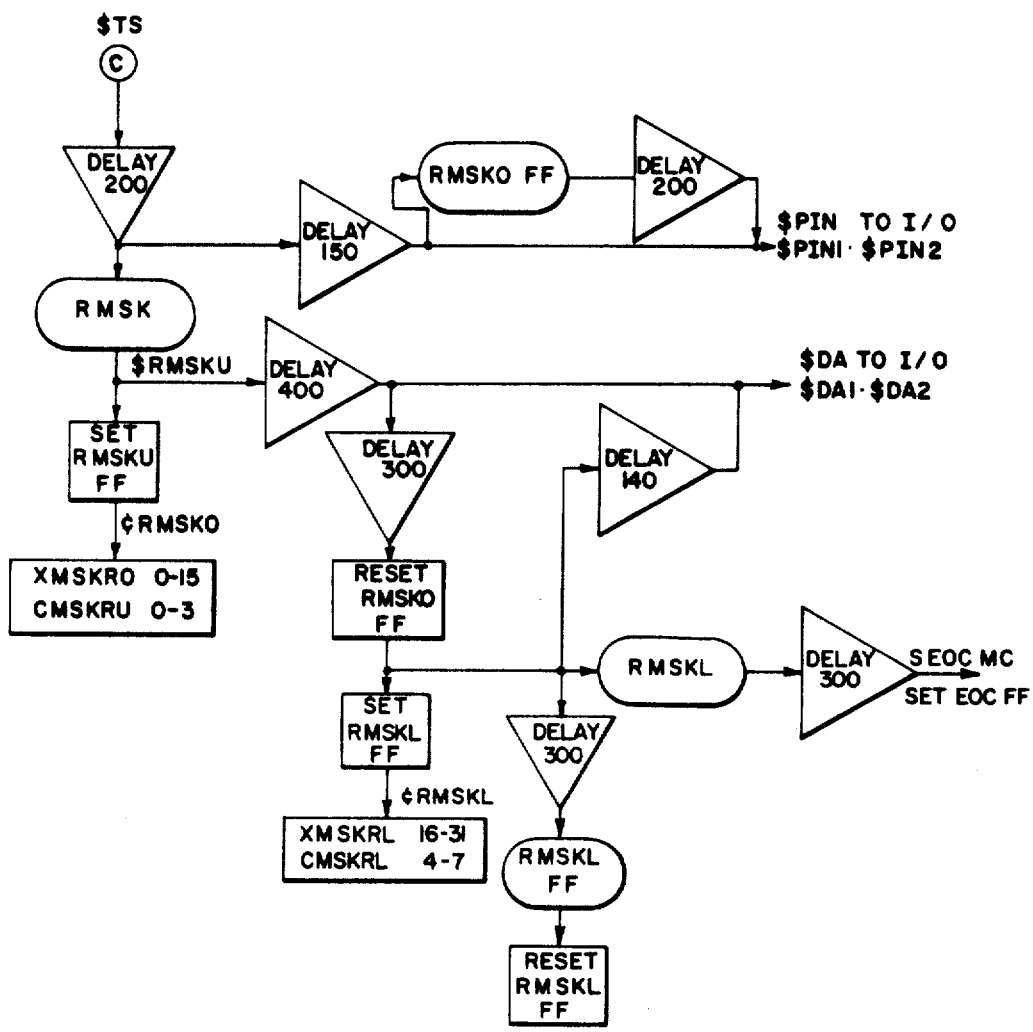
FIGURE 117 is a flow diagram useful in the description of the operation of the read/mask command.

The read/execute and channel/interrupt/mask register command may best be described by reference to the timing diagram of FIGURE 116 and the flow chart of FIGURE 117. The read/execute and channel/interrupt/mask registers command is a double precision command and will place bits 0–15 of the execute interrupt mask register on output data lines $D_0$–$D_{15}$ and place bits 0–3 of the channel mask register on the output data lines $D_{32}$–$D_{35}$ together with a pulse $DA on the data available/stored line. This data will remain on the output lines for a predetermined time after the $DA pulse at which time bits 16–31 of the execute interrupt mask register will be placed on the data output lines $D_0$–$D_{15}$ and bits 4–7 of the channel mask register will be placed on the data output lines $D_{32}$–$D_{35}$ accompanied by a pulse on a data available/stored line $DA2. The second half of the cycle will provide the output information from the mask registers on the output lines for a predetermined time after the pulse $DA2 is set.

The command will be recognized and executed only if the communicating device is the control processor and only if the control processor is in the master mode indicated by a binary 1 level on a protect line. A binary 1 on an output line indicates that the corresponding flip-flop of the register contains a binary 1.

The cycle initiate pulse $T_S$ is generated for this command in an identical matter and time as described for the previous commands. When the pulse $T_S$ is generated, the following conditions exist: the A flip-flop, B flip-flop and BUSY flip-flop have been set, priority has been granted; and the command has been decoded. The read mask upper pulse \$RMSKU may then be generated from the combination of the decoded command RMSK, of the master mode signal M, the control processor signal C and the cycle initiate pulse $T_S$ delayed.

The cycle initiate pulse $T_S$ is delayed a predetermined time and utilized as the cycle started delayed pulse \$PIN1 and sent to the communicating device. The pulse is further delayed and is utilized as the cycle started delayed pulse \$PIN2. The latter indicates to the communicating device that the command information provided to the memory controller may be removed from the memory controller input lines. The cycle initiate pulse may be delayed still further and utilized as the data available pulse \$DA1 which is sent to the communicating device to inform the latter that information provided on the memory controller output lines will remain available for a predetermined time. Prior to the generation of the pulse \$PIN1, the cycle initiate pulse delayed resets the DPMCF2 flip-flop; at approximately the same time, the read mask upper flip-flop is set, the DPMCF1 flip-flop and DPF1 flip-flop are set. The read mask flip-flop is set simultaneously with the generation of the read mask upper pulse.

Setting the DPMCF1 flip-flop inhibits the generation of the end-of-cycle pulse $EOC_{MC}$ for the first half of the read mask cycle; setting the DPF1 flip-flop inhibits the generation of the sample interrupt pulse and thereby prevents the BUSY flip-flop from being reset which would cause the loss of priority during the first half of the cycle. When the pulse \$PIN1 is generated the pulse is utilized to reset the DPF2 flip-flop; resetting the flip-flop will prevent the data available pulse \$DA1 from generating a sample interrupt \$SI for the double precision command. The pulse \$PIN1 also resets the A flip-flop.

After the \$DA1 pulse is generated, it is delayed and used to set the DPF2 flip-flop and to reset the read mask upper flip-flop. The read/mask command RMSK may now be completed by the generation of the read mask lower pulse \$RMSKL and the setting of the read mask lower flip-flop. The resetting of the read mask upper flip-flop automatically sets the read mask lower flip-flop and the set output of the latter gates the lower execute mask register bits 16–31 and the read lower channel mask register bits 4–7 to the controller output lines. When the read mask upper flip-flop is reset and the read mask lower flip-flop is set, the RMSKU flip-flop sets the DPMCF2 flip-flop as well as generating a delay after which a pulse is provided \$DA2; the latter is provided to the communicating device to indicate that the information available on the output data lines will remain there for a predetermined time.

With DPF2 flip-flop in the set state, the data available pulse \$DA2 is gated and the sample interrupt pulse \$SI is generated. The pulse \$SI resets the BUSY flip-flop to $\overline{BUSY}$. The $\overline{BUSY}$ state of the BUSY flip-flop and the reset state of the A flip-flop causes the B flip-flop to be reset which in turn results in the loss of priority; the sample interrupt pulse also rests the DPF1 flip-flop. The read mask lower flip-flop is subsequently reset and the end-of-cycle pulse $EOC_{MC}$ is generated through the utilization of the read mask upper pulse \$RMSKU gated by the set output of the DPMCF2 flip-flop. The end-of-cycle pulse will reset the DPMCF1 flip-flop and will set the end-of-cycle flip-flop indicating that a cycle has been completed and that the memory controller is ready to begin a new cycle.

*Control panel*

Figure 118:
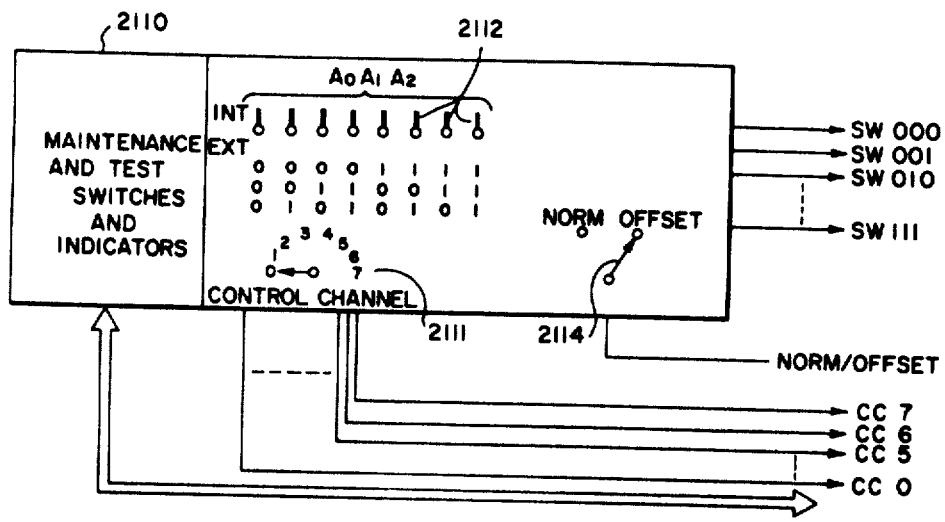
FIGURE 118 is a schematic illustration of the control panel of the memory controller.

The memory controller includes a control panel that provides numerous functions and input signals to the control and logic circuits in addition to providing memory mapping and, together with the address assignment switches of the communicating devices, also permits system reconfiguration. The control panel of the memory controller provides the usual display and maintenance functions such as maintenance and test switches and indicators. Referring to FIGURE 118, the maintenance and test switches and indicators 2110 including channel mask switches each of which will control a channel interrupt mask. The test switches also include switches for the manual insertion of an eighteen bit address for diagnostic and test purposes. Zone switches, data switches, command switches, various test switches and corresponding display indicators are provided. A control channel switch 2111 is provided for the selection of a specific memory controller channel corresponding to the control processor. As described previously in connection with the generation of certain illegal action codes as well as the performance of certain commands, it is necessary for certain commands to be received from a processor designated as the control processor. The control channel switch 2111 permits the manual selection of one of the eight memory controller ports or channels as the control channel port. The output of the control channel switch is provided with eight output lines each corresponding to one of the memory controller input channels, the selected control channel having a logic level of binary 1. The signals from the control channel switch 2111 are designated CC and, to distinguish between the channels the signals are designated in FIGURE 118 as $CC_0$–$CC_7$.

The utilization of the control channel switch output has been shown in connection with the description of various other portions of the memory controller; however, as an example, the use of the control channel switch output as a means for selecting the memory controller output to which an execute interrupt present signal XIP is provided may be seen by referring to FIGURE 90. Referring to that figure, it may be seen that the execute interrupt present signal XIP is applied to a plurality of NAND-gates each of which is connected to receive the output from one of the lines of the control channel switch. The control channel switch, after having been set to a predetermined channel number, provides an appropriate logic level to the corresponding NAND-gate thus gating the execute interrupt present signal XIP to the control processor.

The memory controller control panel also provides a means for core assignment through the utilization of core assignment switches 2112. In the FIGURE 118, each of the switches 2112 may be seen to be a two position switch that may be placed either in the internal (INT) or external (EXT) position. Each of the switches 2112 corresponds to a binary configuration of the three most significant bits of the address $A_0$, $A_1$ and $A_2$. Thus, the left-most switch of FIGURE 118 corresponds to the binary configuration 000 of the address bit $A_0$–$A_2$; the second switch corresponds to the binary configuration 001 etc. The operation of the core assignment switches permits the division of core blocks into two distinct blocks of memory. The memory controller receives eighteen address bits $A_0$–$A_{17}$ from the communicating device; the address bits are applied in parallel and specify one of the core system locations to be accessed in a data word transfer. The address lines are not used in transfers involving registers within the memory controller. In transferring a pair of words to or from the core system, a paid of memory locations is accessed; these addresses are an even and the next higher odd number. In addressing such a pair of locations in an instruction, the address will normally be even and the pair of locations corresponding to the even address and the next higher odd address will be accessed. If the address being accessed is odd, the locations corresponding to the odd address and the next lower even address are accessed.

The address bits $A_0$–$A_{17}$ are gated into the termination and select circuits by the priority scheme described previously. All instructions utilize a full eighteen bit address field. The memory addresses are assigned consecutively beginning with zero and continuing through the full available memory. As stated previously, the communicating devices have switches on their respective control panels for manually assigning the upper three bits $A_0$, $A_1$ and $A_2$ of each address associated with the channels through which the communicating device communicates with the core system. This core location assignment enables the assignment of any 32K block of memory any 32K block address within the continuous available memory. Thus, for example, the processor connected to the memory controller may have the assignment switches thereon positioned such that a memory controller will receive an eighteen bit address; the three most significant bits are decoded and applied to a plurality of gates together with the outputs of the core assignment switches of the control panel of the memory controller. Any address will have the first three bits decoded and will thus be "steered" to either an internal or external memory block. To more completely explain the utilization of the core assignment switches of the control panel in the memory controller, reference may be had to FIGURE 66 wherein it may be seen that the address bits $A_0$–$A_2$ are applied to the decode circuit 1250. The eight possible configurations of the three address bits are each applied to NAND-gates 1251–1258. Each of the gates 1251–1258 also receives an output from one of the core assignment switches of the control panel. The signal designations from these switches are SW000–SW111. Thus, if the core switch corresponding to the binary configuration $A_0$–$A_2$ is 001, and if the bits $A_0$–$A_2$ receive by the memory controller from the communicating device are decoded and are equal to 001, the position of the switch will control whether or not the address is directed to internal or external memory.

The control panel is also provided a normal/offset switch 2114. This switch enables continuous address allocation when 32K memory blocks are combined with 40K memory blocks. For example, when address positions 0–32K are allocated to a 32K memory block, and address positions 32K to 72K are allocated to a 40K block of memory, it is necessary to manipulate at least one bit of the address to provide an appropriate address configuration to the 40K block. Since the system chosen for illustration utilizes eighteen address bits, there exists a capacity of 256K memory; in addressing the first 32K words of memory, it is not necessary that bits $A_0$–$A_2$ be utilized and that only bits $A_3$–$A_{17}$ be used. However, when attempting to address words in the 40K memory, the 8K memory provided in addition to the 32K modular block memory requires special treatment. Accordingly, the normal/offset switches are provided to enable the utilization of (in the embodiment chosen for illustration) an odd sized memory larger than the 32K modular size but less than twice the modular size. To permit the utilization of the 40K memory as part of the continuous block of available memory in the data processing system, the normal/offset switch 14 is placed in the offset position. The normal/offset line thus assumes a logic level of binary 1.

Figure 119:
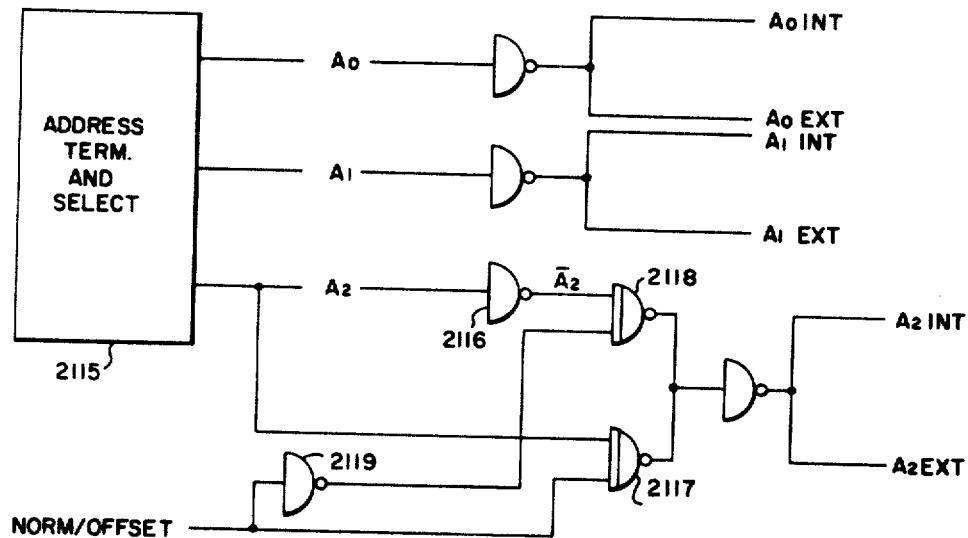
FIGURE 119 is a schematic diagram useful for explaining the operation of memory address manipulation to accommodate an odd sized memory.

Referring to FIGURE 119, the manipulation of the logic level to provide for the 40K memory block may be described. Since the lower order memory (32K) does not require the address bit $A_2$, the address bit $A_2$ may be used to effect a subtraction of 32K from the address applied to the 40K memory by the complementing of the $A_2$ bit with the use of the logic level from the normal/offset switch. The address termination and select circuit 2115 receives the eighteen address bits from the communicating device as described previously in connection with the memory controller block diagram. In FIGURE 119 only address bits $A_0$–$A_2$ are shown coming from the circuit 2115. Address bits $A_0$ and $A_1$ are each applied to an inverter and applied to both the internal and external core memories. As stated previously, the status of the internal/external flip-flop will determine which of the core blocks receives the address. Further, address bits $A_0$ and $A_1$ are not needed by either the 32K or 40K memory blocks. Address $A_2$ is applied to an inverter 2116 and to NAND-gate 2117. The output of the inverter 2116 is applied to NAND-gate 2118. The output of the normal/offset switch of the control panel in applied directly to NAND-gate 2117 and through an inverter 2119 to the NAND-gate 2118. The outputs of NAND-gates 2117 and 2118 are inverted and applied to the internal and external memories as address bit $A_2$. Since the 32K block of memory does not utilize the $A_2$ bit, it is immaterial whether or not the bit is complemented; however, since the 40K block of memory must use the $A_2$ bit to address the upper 8K memory, complementing the $A_2$ bit essentially subtracts 32K from the address to present the address to the core system as if the address were beginning from zero. The arrangement of FIGURE 119 indicates that NAND-gate 2118 combines $\overline{A}_2$ and $\overline{\text{offset}}$ while the NAND-gate 2117 combines $A_2$ and offset. The binary 1 logic level of the normal/offset switch thus compleemnts the $A_2$ bit as illustrated in the following table.

TABLE III

| $A_2$ | $\overline{A}_2$ | Offset | $\overline{\text{Offset}}$ | $A_2$·Offset | $\overline{A}_2$·$\overline{\text{Offset}}$ | $A_2$ to Core System |
|---|---|---|---|---|---|---|
| 1 | 0 | 1 | 0 | 0 | 1 | 0 |
| 0 | 1 | 1 | 0 | 1 | 1 | 1 |
| 1 | 0 | 0 | 1 | 1 | 1 | 1 |
| 0 | 1 | 0 | 1 | 1 | 0 | 0 |

Figure 120:
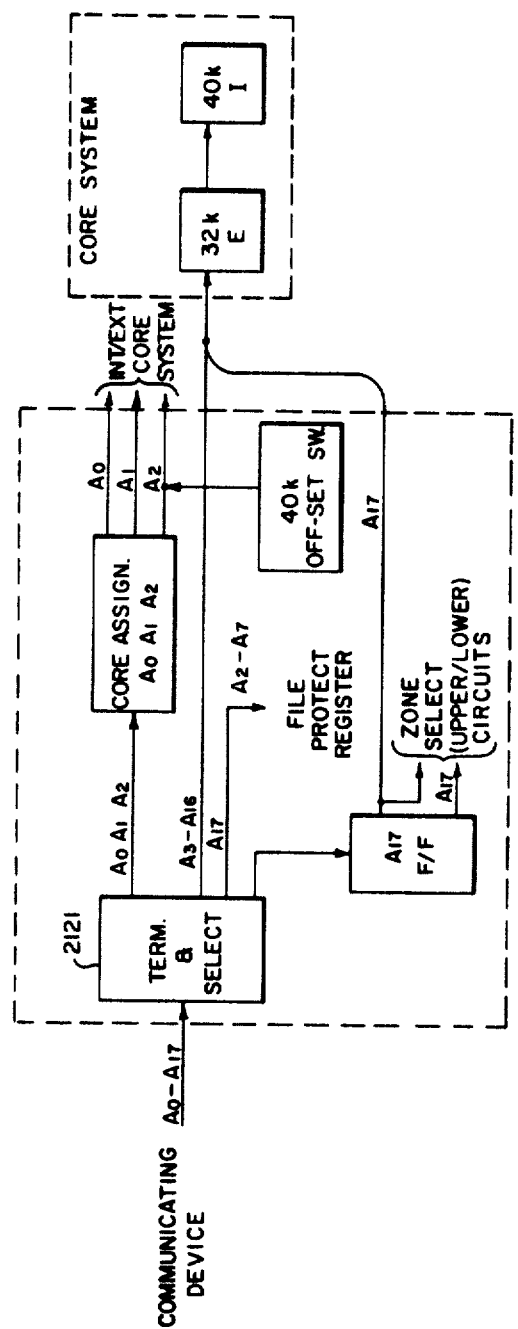
FIGURE 120 is a schematic block diagram showing portions of the block diagram of the memory controller useful for describing the utilization of core assignment switches.

To illustrate the utilization of the core assignment switches as well as the offset switch of the control panel, reference may be had to FIGURE 120 wherein a simplified schematic block diagram is shown including portions of the block diagram of the memory controller. Referring to FIGURE 120, the communicating device provides the eighteen address bits $A_0$–$A_{17}$ to the address termination and select circuits 2121; the three most significant bits $A_0$–$A_2$ are decoded and are combined with the switch settings of the core assignment switches on the memory controller control panel. The result of this combination indicates whether or not the address is to be applied to the internal or external core system. In those instances wherein a 40K block of memory is added to a 32K block of memory, the offset switch complements address bit $A_2$ to enable the continuous addressing of the 40K block to yield an effective total core storage system of 72K. The least significant address bit $A_{17}$ is applied to the $A_{17}$ flip-flop as described previously and is subsequently utilized to enable the reading or writing of the upper or lower half of the seventy-two bit word written into or read from the core system. The $A_{17}$ address bit is also utilized in combination with the $A_2$–$A_7$ address bits for comparison with the contents of the file protect register as described previously in connection with the file protect register.

The control panel therefore permits the steering of any eighteen bit address to one of two blocks of memory. The control panel also includes a normal/offset switch that permits the combining of a memory block having a total capacity of $2^n$ words (where $n$ is an integer) as one block of memory with a second block of memory having a total storage capacity more than the first block of memory but less than $2^{n+1}$.

Memory Controller Mnemonic Definitions

| Mnemonic: | Definition |
|---|---|
| $A_n$ | Address bits 0–17 from one of eight communicating devices. |
| $A_{17}$ FF | Address bit 17 flip-flop. This flip-flop is set from the I/O channels AD17 line, and complemented within the memory controller for zone selection to core and core data selection (upper/lower) to I/O channels. |
| $AI_{0-8}$ | The intermediate storage flip-flop in a channel interrupt cell. It is set with a channel interrupt pulse when its associated mask is off. |
| $BI_{0-8}$ | The final storage flip-flop in a channel interrupt cell. If no higher priority BI flip-flops are set, then $BI_n$ will be serviced by the memory controller in the next memory cycle. |
| BUSY | The BUSY flip-flop. This is the control flip-flop for the channel interrupt cells. If an $AI_n$ (intermediate) flip-flop is set by a channel interrupt requesting access to memory, the $BI_n$ (final) flip-flop, which gains access, is not set until the BUSY flip-flop becomes $\overline{BUSY}$. |
| CC | The control channel, as designated by the control channel switch. |
| CDS FF | Core display flip-flop. Part of control for allowing data output for core type read cycle. |
| CF | Core failure. There has been a fan, temperature, or power failure in external or internal memory. This signal inhibits future core cycles, and the core system starts a non-destructive shutdown. |
| CL FLT | Clear fault. This signal clears the core memory system logic control flip-flops. It is sent if the memory is stopped in a CWR DP cycle or RAR because a $DP (on $CWR1) was not received. |
| CR FLT | Core fault. A signal from the core memory system which indicates the memory is stopped in a CWR DP cycle or RAR because a $DP (on $CWR1) was not received. |
| CMSKRL | Channel interrupt mask register lower (bits 4–7). |
| CMSKRU | Channel interrupt mask register upper (bits 0–3). |
| $CMD_n$ | Command lines A–D and P from one of the eight communicating devices. |
| CON | Connect command. |
| $CON | Output connect pulse. This pulse accompanies a connect data word which is the result of a connect command issued to the memory controller. |
| CON FF | Connect flip-flop. |
| $CWR1 | The clear/write initiate pulse to the core memory system. Each $CWR1 writes a seventy-two bit word. For single precision clear/write commands a CWR is performed in one-half of the word, a RRS in the other half (indicated by zones=0). |
| $CWR2 | The clear/write double precision pulse to the core memory system. This signal pulses one-half of the memory register in the core memory system according to the zones specified and indicates that a $CWR1 will follow to initiate the CWR cycle. |
| CWR DP | Clear/write double precision command. |
| CWR DP FF | Clear/write double precision flip-flop. |
| CWR SP | Clear/write single precision command. |
| $CWR DP | Clear/write double precision pulse. Used for setting DPF1 and CWR DP FF. |
| $DA | A pulse to the I/O channels which means that data information is no longer required by the memory controller or that data being read from memory is on the data output lines. Two $DA's are sent for a double precision command and RAR. |
| $DA_{CORE}$ | The data available pulse from the internal (RR1) or external (RR2) core system. Received only on RRS and RAR cycles. |
| $D_n$ | Data bits 0–35 from one of eight communicating devices. |
| $DEC_{0-7}$ | Decoded data bits 33–35 from core. |
| $DEK_{0-7}$ | Decoded address bits $A_0$, $A_1$ and $A_2$. |
| $DP | Double precision rewrite pulse. This pulse is received from the eight I/O channels and control panel. Its function is to complete the second half of the double precision cycles SFP, SMSK, CWR DP and the rewrite part of read/alter/rewrite. |
| DPF1 | A flip-flop that allows $DA1 for single precision commands and inhibits for a double precision command in the generation of $SI. |
| DPF2 | A flip-flop that allows $DA (DA2) for double precision commands in the generation of $SI. |
| DPMCF1 | A flip-flop that allows a $DA1$\Delta$250 for single precision commands and inhibits for a double precision command in the generation of $EOC_{MC}$. |
| DPMCF2 | A flip-flop that allows $DP$\Delta$500 in the case of SMSK or SFP, or $T_S$\Delta$1200 in the case of RMSK or RFP. |

Memory Controller Mnemonic Definitions—Continued

| Mnemonic: | Definition |
|---|---|
| $EOC_{CORE}$ | The end-of-cycle pulse from the internal (EC1) or external (EC2) core system. |
| EOC FF | End-of-cycle flip-flop. |
| $EOC_{IA}$ | End-of-cycle pulse generated when illegal actions #1, 2 or 3 inhibit a memory cycle. |
| $EOC_{MC}$ | End-of-cycle pulses for memory controller type commands; that is, those commands not involving the core system. |
| $EOC-350 | A pulse generated within the memory unit which occurs 350 nsec. prior to $EOC_{CORE}$. |
| $EOC_{NDP}$ | End-of-cycle pulse generated when a $DP is not received in a specified time interval for SMSK and SFP. |
| EXT | External core memory system. This signal is derived from a flip-flop which is set or reset depending on the input address bits $A_0, A_1, A_2$ and the setting of the core assignment switches on the maintenance panel. It is used to direct core cycle initiate pulses to external core. |
| FPRU | File protect register upper (bits 0-31). |
| FPRL | File protect register lower (bits 32-63). |
| $FPC_n$ | Core memory 1K blocks decoded from address bits 2-7 and compared with file protect register bits 0-63. |
| F0-F63 | File protect register flip-flops. |
| $IA | Output illegal action pulse accompanies the encoded illegal action (A,B,C). |
| IA1 | Illegal action #1. ($\overline{Control}$) or connecting to a masked channel. Highest priority illegal action. |
| IA2 | Illegal action #2. ($\overline{Master}$) |
| IA3 | Illegal action #3. (Protected Area) |
| IA4 | Illegal action #4. Nonexistent address. This illegal action applies to memories of 40K capacity. A nonexistent address (between 40 and 64K) signal is generated in the core system. |
| IA5 | Illegal action #5. (Parity error). There are two parity error lines from the core system, one for each half of the seventy-two bit word. |
| IA7 | Illegal action #7. (No Illegal Action). |
| INT | Internal core memory system. This signal is derived from a flip-flop which is set or reset depending on the input address bits $A_0, A_1, A_2$ and the setting of the core assignment switches on the maintenance panel. It is used to direct core cycle initiate pulses to internal core. |
| $INT | Pulse interrupt-signal received from communicating device to set "A" FF. |

| Mnemonic: | Definition |
|---|---|
| M | Indicates master mode of operation as opposed to slave; that is, when the protect command line from the I/O channels is a logical "1." |
| MR1L | Data from internal core memory register lower (bits 36-71). |
| MR2U | Data from external core memory register upper (bits 0-35). |
| MR1L | Control signal which places data bits 36-71 from the internal core MR on data lines 0-35 to the I/O channels. |
| MR1U | Control signal which places data bits 0-35 from the internal core MR on data lines 0-35 to the I/O channels. |
| MR2L | Control signal which places data bits 36-71 from the external core MR on data lines 0-35 to the I/O channels. |
| MR2U | Control signal which places data bits 0-35 from the external core MR on data lines 0-35 to the I/O channels. |
| NEA | Nonexistent address. A signal from the internal (NA1) or external (NA2) core system which means that the address is between 40 and 60K for a 40K memory. |
| $NDP | No double precision pulse. For the CWR DP, SFP, SMSK and RAR commands if a $DP is not received from the I/O channels within a fixed interval of time, a $NDP is generated which serves to terminate the cycle. |
| PE1L | Parity error from internal memory lower (36-71). |
| PE1U | Parity error from internal memory upper (0-35). |
| PE2L | Parity error from external memory lower (36-71). |
| PE2U | Parity error from external memory upper (0-35). |
| $PIN | Cycle started delayed ($PIN=$T_S\Delta340$) pulse to the I/O channels which means that zone, address and command information is no longer required by the memory controller. Two $PIN's are sent for a double precision command and RAR. |
| $P_n$ | Channel "n" priority. The channel interrupt $BI_n$ flip-flops are serviced on a priority basis. Each channel priority line allows or inhibits zone, command, address data and pulse information from that particular channel. |
| $P_n$ FF | Channel "n" priority flip-flop. Used for gating the illegal action pulse to the I/O channels. |
| RAR | The read/alter/rewrite command. |
| $RAR | Read alter rewrite pulse which sets the SPCY and DPF1 flip-flops. |
| RAR FF | Read/alter/rewrite flip-flop. |
| RFP | Read/file/protect register command. |

Memory Controller Mnemonic Definitions—Continued

| Mnemonic: | Definition |
|---|---|
| $RFPU | Read file protect upper pulse. Used for $DA and set of DPF1 flip-flop. |
| RFPL FF | Read file protect lower flip-flop, which places register bits 32–63 on data lines 0–31 to the I/O channels. |
| RFPU FF | Read file protect upper flip-flop, which places register bits 0–31 on data lines 0–31 to the I/O channels. |
| RFPL | Control signal to place the contents of the file protect register bits 32–63 on the I/O data bit lines 0–31. |
| RFPU | Control signal to place the contents of the file protect register bits 0–31 on the I/O data bit lines 0–31. |
| RMSK | Read/execute and channel/mask/register command. |
| $RMSKU | Read execute and channel mask upper pulse. Used for $DA and set of DPF1 flip-flop. |
| RMSKL FF | Read execute and channel mask registers (lower) flip-flop, which places execute mask bits 16–31 and channel mask bits 4–7 on data lines 0–15 and 32–35 respectively to the I/O channels. |
| RMSKU FF | Read execute and channel mask registers (upper) flip-flop, which places execute mask bits 0–15 and channel mark bits 0–3 on data lines 0–15 and 32–35 respectively to the I/O channels. |
| RMSKL | Control signal to place the contents of the execute interrupt mask register bits 16–31 on I/O data bit lines 0–15, and the contents of the channel interrupt mask register bits 4–7 on I/O data bit lines 32–35. |
| RSMKU | Control signal to place the contents of the execute interrupt mask register bits 0–15 on I/O data bit lines 0–15, and the contents of the channel interrupt mask register bits 0–3 on I/O data bit lines 32–35. |
| $RPT INT | Repeating interrupt pulse. Generated either internally or from an external source. |
| $RRS | The read-restore initiate pulse to the core memory system. (RC1, internal; RC2, external). Each $RRS obtains a seventy-two bit word from core. |
| $RRS DP | Read-restore double precision pulse, sets the DPF1 flip-flop and the RRS DP FF. |
| RRS DP FF | Read-restore double precision flip-flop. |
| RRS DP | Read/restore double precision command. |
| RRS SP | Read/restore single precision command. |
| RSTL | A logic level which, when it is a "1" indicates that one or more of the execute interrupt cells 16–31 is set and unmasked. |
| RSTU | A logic level which, when it is a "1" indicates that one or more of the execute interrupt cells 0–15 is set and unmasked. |
| $RSTL | Reset execute interrupt cells lower pulse. This pulse resets any one of execute cells 16–31 which has been serviced by an execute command. |
| $RSTU | Reset execute interrupt cells upper pulse. This pulse resets any one of execute cells 0–15 which has been serviced by an execute command. |
| S | Indicates slave mode of operation as opposed to master; that is, when the protect command line from the I/O channels is a logical "0." |
| SFP | Set/file/protect register command. |
| $SFPL | Set file protect lower pulse (32–63). |
| $SFPU | Set file protect upper pulse (0–31). |
| $SI | Sample interrupt pulse. This pulse resets the BUSY flip-flop which effectively transfers the contents of all the AI flip-flops to their respective BI flip-flops. |
| SI FF | A flip-flop which determines whether to use the sample interrupt pulse generated within the memory controller or use $EOC$_{-350}$. |
| SMSK | Set/execute and channel/mask register command. |
| $SMSKL | Set execute and channel mask lowerr pulse. (Execute mask bits 16–31, channel mask bits 4–7.) |
| $SMSKU | Set execute and channel mask upper pulse. (Execute mask bits 0–15, channel mask bits 0–3.) |
| SP CY FF | Split cycle flip-flop. This signal along with $RRS indicates the read/alter/rewrite command to the core memory system. |
| SXC | Set/execute/cell command. |
| $SXCL | Set execute interrupt cells lower pulse (16–31). |
| $SXCU | Set execute interrupt cells upper pulse (0–15). |
| SW$_{000-111}$ | Core assignment switches. |
| $T$_S$ | Cycle initiate pulse. In the "stop" condition, if a channel interrupt pulse is received, a $T$_S$ is generated which is logically directed to perform a decoded command. If the memory controller is performing a command and a channel interrupt is received, a $T$_S$ is generated at end-of-cycle (stop). |
| T$_S$ FF | T$_S$ flip-flop. Stores channel interrupt occurrence until an EOC occurs at which time a new cycle is started. |
| TO FF | $DP time-out flip-flop. This flip-flop is set with $T$_S$ every cycle and reset with $DA. Thus the time-out of $DP is started with the first $DA. If a $DP is sent back to the memory core unit in the prescribed amount of time, the TO FF is reset therefore ending the time-out. |

Memory Controller Mnemonic Definitions—Continued

| Mnemonic: | Definition |
|---|---|
| $XCL_{0-31}$ | Execute interrupt cells 0–31. 0–15=upper cells, 16–31=lower cells. |
| XEC | Execute command. |
| XEC AD | Execute cell address. Hardwired address placed on data out bits 12–16 to the I/O channels, indicating the address of the cell being executed. |
| XEC FF | Execute flip-flops. Places execute cell address on data out lines 12–16. Also is used in resetting cell that has been answered by the execute command. |
| XIP | Execute interrupt present. One or more of the execute interrupt cells is set and unmasked (0–31). |
| XMSK RL | Execute interrupt mask register lower (bits 16–31). When these masks are on, the fact that an execute interrupt cell gets set is hidden until the mask is removed. |
| XMSK RU | Execute interrupt mask register upper (bits 0–15). When these masks are on, the fact that an execute interrupt cell gets set is hidden until the mask is removed. |
| $Z_n$ | Zone bits 0–7 from one of eight communicating devices. When the device places a "1" on a zone line it indicates that, that portion of the data word controlled by the specific zone can be written in core, however a "0" on the zone line inhibits altering that portion of the word. |

What is claimed is:

1. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations; a plurality of memory controllers each connected to a different memory device and all connected to said communicating devices; each of said communicating devices including means for directing addresses of memory locations to preselected ones of said memory controllers.

2. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations; a plurality of memory controllers each connected to a different memory device and all connected to said communicating devices; each of said communicating devices including switch means for directing addresses of memory locations to preselected ones of said memory controllers.

3. A reconfigurable data processing system comprising: a plurality of communicating devices each comprising a data processor for manipulating data in accordance with the instructions of programs and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations; a plurality of memory controllers each connected to a different memory device and all connected to said communicating devices, and each including means for selecting a predetermined one of said data processors as a control processor for exercising executive control over a connected memory controller; each of said connecting devices including means for directing addresses of memory locations to preselected ones of said memory controllers.

4. A reconfigurable data processing system comprising: a plurality of communicating devices each comprising a data processor for manipulating data in accordance with the instructions of programs and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations; a plurality of memory controllers each connected to a different memory device and all connected to said communicating devices, and each including means for selecting a predetermined one of said data processors as a control processor for exercising executive control over a connected memory controller; each of said communicating devices including switch means for directing addresses of memory locations to preselected ones of said memory controllers.

5. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices; each of said communicating devices including means for directing addresses of memory locations to preselected ones of said memory controllers; said input/output controllers including means for selecting a memory controller connected thereto as the memory controller to which requests for access to said reserved addressable locations are sent.

6. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices; each of said communicating devices including switch means for directing addresses of memory locations to preselected ones of said memory controllers; said input/output controller including means for selecting a memory controller connected thereto as the memory controller to which requests for access to said reserved addressable locations are sent.

7. A reconfigurable data processing system comprising: a plurality of communicating devices each comprising a data processor for manipulating data in accordance with the instructions of programs, and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices and each including means for selecting a predetermined one of said data processors as a control processor for exercising executive control over a connected memory controller; each of said communicating devices including means for directing addresses of memory locations to preselected ones of said memory controllers; said input/output controllers each including means for selecting a memory controller connected thereto as the memory controller to which requests for access to said reserved addressable locations are sent.

8. A reconfigurable data processing system comprising: a plurality of communicating devices each comprising a data processor for manipulating data in accordance with the instructions of programs, and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices and each including means for selecting a predetermined one of said data processors as a control processor for exercising executive control over a connected memory controller; each of said communicating devices including switch means for directing addresses of memory locations to preselected ones of said memory controllers; said input/output controllers each including means for selecting a memory controller connected thereto as the memory controllers to which requests for access to said reserved addressable locations are sent.

9. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices; each of said communicating devices including means for directing addresses of memory locations to preselected ones of said memory controllers; said communicating devices also including means for selecting a memory controller connected thereto as the memory controller to which requests for access to said reserved addressable locations are sent.

10. A reconfigurable data processing system comprising: a communicating device comprising a data processor for manipulating data in accordance with the instructions of a program and including means for addressing memory locations; a communicating device comprising an input/output controller for transmitting and receiving data and instructions to and from peripheral devices, said input/output controller including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices; each of said communicating devices including switch means for directing addresses of memory locations to preselected ones of said memory controllers; said communicating devices also including means for selecting a memory controller connected thereto as the memory controller to which requests for access to said reserved addressable locations are sent.

11. A reconfigurable data processing system comprising: a plurality of communicating devices each comprising a data processor for manipulating data in accordance with the instructions of programs, and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices and each including means for selecting a predetermined one of said data processors as a control processor for exercising executive control over a connected memory controller; each of said communicating devices including means for directing addresses of memory locations to preselected ones of said memory controllers; said communicating devices also including means for selecting a memory controller connected thereto as the memory controller to which requests for access to said reserved addressable locations are sent.

12. A reconfigurable data processing system comprising: a plurality of communicating devices each comprising a data processor for manipulating data in accordance with the instructions of programs, and each including means for addressing memory locations; a plurality of communicating devices each comprising an input/output controller for transmitting and receiving data and instructions to and from peripheral devices, said input/output controllers each including means for addressing memory locations; a plurality of memory devices for storing representations of data and instructions at discrete addressable locations, one of said memory devices including reserved addressable locations the access to which is limited to a specific type of program; a plurality of memory controllers each connected to a different memory device and all connected to said communicating devices and each including means for selecting a predetermined one of said data processors as a control processor for exercising executive control over a connected memory controller; each of said communicating devices including switch means for directing addresses of memory locations to preselected ones of said memory controllers; said communicating devices also including means for selecting a memory controller connected thereto as the memory controllers to which requests for access to said reserved addressable locations are sent.

(References on following page)

References Cited

UNITED STATES PATENTS

| | | | |
|---|---|---|---|
| 3,323,109 | 5/1967 | Hecht et al. | 340—172.5 |
| 3,319,226 | 5/1967 | Mott et al. | 340—172.5 |
| 3,305,839 | 2/1967 | Looschen et al. | 340—172.5 |
| 3,302,182 | 1/1967 | Lynch et al. | 340—172.5 |
| 3,245,042 | 4/1966 | Herwitz et al. | 340—172.5 |
| 3,242,467 | 3/1966 | Lamy | 340—172.5 |
| 3,215,987 | 11/1965 | Terzian | 340—172.5 |
| 3,200,380 | 10/1965 | MacDonald et al. | 340—172.5 |

PAUL J. HENON, *Primary Examiner.*

GARETH D. SHAW, *Assistant Examiner.*